(12) United States Patent
Korpman et al.

(10) Patent No.: US 11,586,613 B2
(45) Date of Patent: Feb. 21, 2023

(54) MANAGING DATA OBJECTS FOR GRAPH-BASED DATA STRUCTURES

(71) Applicant: UnitedHealth Group Incorporated, Minnetonka, MN (US)

(72) Inventors: Ralph A. Korpman, Nashville, TN (US); Rudy R. Hilado, Leesburg, VA (US); W. Randal Clegg, Yucalpa, CA (US); Cindy A. Post, Colton, CA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 16/830,657

(22) Filed: Mar. 26, 2020

(65) Prior Publication Data

US 2020/0320130 A1 Oct. 8, 2020

Related U.S. Application Data

(60) Provisional application No. 62/828,517, filed on Apr. 3, 2019, provisional application No. 62/828,526, filed
(Continued)

(51) Int. Cl.
*G06F 17/00* (2019.01)
*G06F 16/23* (2019.01)
(Continued)

(52) U.S. Cl.
CPC ............ *G06F 16/2379* (2019.01); *G06F 9/54* (2013.01); *G06F 9/541* (2013.01); *G06F 16/23* (2019.01);
(Continued)

(58) Field of Classification Search
CPC .... G06F 16/2379; G06F 16/245; G06F 16/81; G06F 16/23; G06F 16/367;
(Continued)

(56) References Cited

U.S. PATENT DOCUMENTS 5,701,400 A 12/1997 Amado
5,724,575 A 3/1998 Hoover et al.
(Continued)

FOREIGN PATENT DOCUMENTS

CA 2607028 A1 5/2008
CN 108564682 A 9/2018
(Continued)

OTHER PUBLICATIONS

U.S. Patent and Trademark Office, NonFinal Office Action for U.S. Appl. No. 16/155,051, filed Jul. 30, 2020, (52 pages), U.S.
(Continued)

*Primary Examiner* — Greta L Robinson
(74) *Attorney, Agent, or Firm* — Alston & Bird LLP

(57) ABSTRACT

Various embodiments provide methods, systems, apparatus, computer program products, and/or the like for managing, ingesting, monitoring, updating, and/or extracting/retrieving information/data associated with an electronic record (ER) stored in an ER data store and/or accessing information/data from the ER data store, wherein the ERs are generated, updated/modified, and/or accessed via a graph-based domain ontology.

12 Claims, 52 Drawing Sheets

Related U.S. Application Data on Apr. 3, 2019, provisional application No. 62/845,084, filed on May 8, 2019, provisional application No. 62/845,109, filed on May 8, 2019, provisional application No. 62/845,085, filed on May 8, 2019, provisional application No. 62/845,089, filed on May 8, 2019, provisional application No. 62/860,031, filed on Jun. 11, 2019, provisional application No. 62/860,047, filed on Jun. 11, 2019, provisional application No. 62/860,050, filed on Jun. 11, 2019, provisional application No. 62/873,217, filed on Jul. 12, 2019, provisional application No. 62/874,638, filed on Jul. 16, 2019.

(51) Int. Cl.
```
G06F 40/30      (2020.01)
G06F 16/901     (2019.01)
G06F 16/245     (2019.01)
G06F 16/242     (2019.01)
G06F 16/28      (2019.01)
G06F 16/903     (2019.01)
G06F 9/54       (2006.01)
G06F 16/958     (2019.01)
G06F 40/205     (2020.01)
G06F 40/295     (2020.01)
G06F 21/31      (2013.01)
G06F 16/81      (2019.01)
G06F 16/36      (2019.01)
G06F 16/957     (2019.01)
```

(52) U.S. Cl.
CPC ........ *G06F 16/2358* (2019.01); *G06F 16/244* (2019.01); *G06F 16/245* (2019.01); *G06F 16/288* (2019.01); *G06F 16/367* (2019.01); *G06F 16/81* (2019.01); *G06F 16/9024* (2019.01); *G06F 16/9027* (2019.01); *G06F 16/90335* (2019.01); *G06F 16/9577* (2019.01); *G06F 16/986* (2019.01); *G06F 21/31* (2013.01); *G06F 40/205* (2020.01); *G06F 40/295* (2020.01); *G06F 40/30* (2020.01)

(58) Field of Classification Search
CPC ............. G06F 16/90335; G06F 16/986; G06F 16/9577; G06F 16/244; G06F 16/288; G06F 16/2358; G06F 16/9027; G06F 16/9024; G06F 40/205; G06F 40/295; G06F 40/30; G06F 9/54; G06F 9/541; G06F 21/31; G06F 16/8373

See application file for complete search history.

(56) References Cited

U.S. PATENT DOCUMENTS

| | | |
|---|---|---|
| 5,937,409 A | 8/1999 | Wetherbee |
| 5,956,728 A | 9/1999 | Federighi et al. |
| 6,104,963 A | 8/2000 | Cebasek et al. |
| 6,163,781 A | 12/2000 | Wess, Jr. |
| 6,272,468 B1 | 8/2001 | Melrose |
| 6,314,556 B1 | 11/2001 | Debusk et al. |
| 6,502,103 B1 | 12/2002 | Frey et al. |
| 6,519,605 B1 | 2/2003 | Gilgen et al. |
| 6,533,724 B2 | 3/2003 | McNair |
| 6,990,513 B2 | 1/2006 | Belfiore et al. |
| 7,349,859 B1 | 3/2008 | Lamer et al. |
| 7,533,030 B2 | 5/2009 | Hasan et al. |
| 7,720,691 B2 | 5/2010 | Hasan et al. |
| 8,090,590 B2 | 1/2012 | Fotsch et al. |
| 8,108,767 B2 | 1/2012 | Gaurav et al. |
| 8,307,338 B2 | 11/2012 | Ocke et al. |
| 8,412,541 B2 | 4/2013 | Qian et al. |
| 8,429,179 B1* | 4/2013 | Mirhaji ............... G06N 5/02 707/756 |
| 8,478,766 B1 | 7/2013 | Tsypliaev et al. |
| 8,666,922 B2 | 3/2014 | Hohimer et al. |
| 8,756,191 B2 | 6/2014 | B'Far et al. |
| 9,754,220 B1 | 9/2017 | Brestoff et al. |
| 9,792,658 B1 | 10/2017 | Vijendra et al. |
| 9,906,532 B2 | 2/2018 | Perez et al. |
| 9,973,455 B1 | 5/2018 | Fowler et al. |
| 10,127,620 B2 | 11/2018 | Korpman et al. |
| 2001/0049688 A1 | 12/2001 | Fratkina et al. |
| 2001/0051881 A1 | 12/2001 | Filler |
| 2002/0095482 A1 | 7/2002 | Shuster |
| 2002/0103811 A1 | 8/2002 | Fankhauser et al. |
| 2002/0138351 A1 | 9/2002 | Houvener et al. |
| 2002/0194221 A1 | 12/2002 | Strong et al. |
| 2003/0055679 A1 | 3/2003 | Soll et al. |
| 2003/0078813 A1 | 4/2003 | Haskell et al. |
| 2003/0172368 A1 | 9/2003 | Alumbaugh et al. |
| 2003/0227487 A1 | 12/2003 | Hugh |
| 2004/0019502 A1 | 1/2004 | Leaman et al. |
| 2004/0078217 A1 | 4/2004 | Bacevice et al. |
| 2004/0122706 A1 | 6/2004 | Walker et al. |
| 2004/0172307 A1 | 9/2004 | Gruber |
| 2004/0225629 A1 | 11/2004 | Eder |
| 2004/0249672 A1 | 12/2004 | Bocionek et al. |
| 2005/0055321 A1 | 3/2005 | Fratkina et al. |
| 2005/0158767 A1 | 7/2005 | Haskell et al. |
| 2005/0182661 A1 | 8/2005 | Allard et al. |
| 2005/0203771 A1 | 9/2005 | Achan |
| 2005/0228808 A1 | 10/2005 | Mamou et al. |
| 2005/0236474 A1 | 10/2005 | Onuma et al. |
| 2005/0273367 A1 | 12/2005 | Nourie et al. |
| 2005/0283382 A1 | 12/2005 | Donoghue et al. |
| 2006/0010011 A1 | 1/2006 | Ullom et al. |
| 2006/0020466 A1 | 1/2006 | Cousineau et al. |
| 2006/0020493 A1 | 1/2006 | Cousineau et al. |
| 2006/0020581 A1 | 1/2006 | Dettinger et al. |
| 2006/0052945 A1 | 3/2006 | Rabinowitz et al. |
| 2006/0080312 A1 | 4/2006 | Friedlander et al. |
| 2006/0112029 A1 | 5/2006 | Estes |
| 2006/0149573 A1 | 7/2006 | Hoffman et al. |
| 2006/0184389 A1 | 8/2006 | Benja-Athon et al. |
| 2006/0277215 A1 | 12/2006 | Siegel |
| 2007/0005621 A1 | 1/2007 | Lesh et al. |
| 2007/0006322 A1 | 1/2007 | Karimzadeh et al. |
| 2007/0016450 A1 | 1/2007 | Bhora et al. |
| 2007/0078677 A1 | 4/2007 | Hofstetter |
| 2007/0083607 A1 | 4/2007 | Thompson et al. |
| 2007/0106753 A1 | 5/2007 | Moore |
| 2007/0112714 A1 | 5/2007 | Fairweather |
| 2007/0118399 A1 | 5/2007 | Avinash et al. |
| 2007/0179776 A1 | 8/2007 | Second et al. |
| 2007/0192137 A1 | 8/2007 | Ombrellaro |
| 2007/0198539 A1* | 8/2007 | Warshavsky ............ G06F 16/86 |
| 2007/0203750 A1 | 8/2007 | Volcheck |
| 2007/0250405 A1 | 10/2007 | Ronen et al. |
| 2008/0040151 A1 | 2/2008 | Moore |
| 2008/0046292 A1 | 2/2008 | Myers et al. |
| 2008/0134133 A1 | 6/2008 | Dellostritto et al. |
| 2009/0070148 A1 | 3/2009 | Skocic |
| 2009/0299991 A1* | 12/2009 | Zarzar Charur .... G06F 16/3322 707/999.005 |
| 2010/0036680 A1 | 2/2010 | Familant |
| 2010/0088674 A1 | 4/2010 | Della-Libera et al. |
| 2011/0119291 A1 | 5/2011 | Rice |
| 2011/0225176 A1 | 9/2011 | Siegel et al. |
| 2011/0246230 A1 | 10/2011 | Sie et al. |
| 2011/0288877 A1 | 11/2011 | Ofek et al. |
| 2012/0215560 A1 | 8/2012 | Ofek et al. |
| 2013/0246049 A1 | 9/2013 | Mirhaji |
| 2013/0262474 A1 | 10/2013 | Curran et al. |
| 2013/0275448 A1 | 10/2013 | Mirhaji |
| 2013/0311419 A1 | 11/2013 | Xing et al. |
| 2013/0346103 A1 | 12/2013 | Griffin et al. |
| 2014/0032245 A1 | 1/2014 | Korpman et al. |
| 2014/0330835 A1 | 11/2014 | Boyer |
| 2016/0085914 A1 | 3/2016 | Douglass et al. |

(56) References Cited

U.S. PATENT DOCUMENTS

| | | | |
|---|---|---|---|
| 2016/0110525 | A1 | 4/2016 | Power et al. |
| 2016/0132645 | A1 | 5/2016 | Charpentier et al. |
| 2016/0203327 | A1 | 7/2016 | Akkiraju et al. |
| 2016/0267222 | A1 | 9/2016 | Larcom et al. |
| 2016/0267484 | A1 | 9/2016 | Smoley et al. |
| 2017/0046425 | A1 | 2/2017 | Tonkin et al. |
| 2017/0147709 | A1 | 5/2017 | Ganz |
| 2017/0169339 | A1 | 6/2017 | Dalmia et al. |
| 2017/0201508 | A1* | 7/2017 | Beck ................ G06F 21/31 |
| 2017/0300469 | A1 | 10/2017 | Mirhaji |
| 2018/0024901 | A1 | 1/2018 | Tankersley et al. |
| 2018/0060503 | A1 | 3/2018 | Allen |
| 2018/0089383 | A1 | 3/2018 | Allen et al. |
| 2018/0210925 | A1 | 7/2018 | Raghavan et al. |
| 2018/0211058 | A1 | 7/2018 | Aunger et al. |
| 2018/0300310 | A1 | 10/2018 | Shinn et al. |
| 2018/0300640 | A1 | 10/2018 | Birnbaum et al. |
| 2018/0358112 | A1 | 12/2018 | Sharifi Sedeh et al. |
| 2019/0005012 | A1 | 1/2019 | Priestas et al. |
| 2019/0005019 | A1 | 1/2019 | Burke et al. |
| 2019/0051416 | A1 | 2/2019 | Monteverde |
| 2022/0043702 | A1 | 2/2022 | Haines |

FOREIGN PATENT DOCUMENTS

| | | |
|---|---|---|
| EP | 1145179 A2 | 10/2001 |
| EP | 2019362 A2 | 1/2009 |
| EP | 2302533 A1 | 3/2011 |
| JP | 2005-135207 A | 5/2005 |
| WO | 2000/057339 A2 | 9/2000 |
| WO | 02/31738 A1 | 4/2002 |
| WO | 2002/031739 A1 | 4/2002 |
| WO | 2014/089063 A1 | 6/2014 |

OTHER PUBLICATIONS

Summons To Attend Oral Proceedings Pursuant To Rule 115(1) EPC for European Patent Application No. 16178790.8, Apr. 24, 2020, (24 pages), European Patent Office, Munich, Germany.

International Prelminary Examining Authority, International Preliminary Report On Patentability for International Application No. PCT/US2020/025642, dated Jul. 6, 2021, (26 pages), European Patent Office, Munich, Germany.

International Prelminary Examining Authority, International Preliminary Report On Patentability for International Application No. PCT/US2020/025653, dated Jul. 2, 2021, (9 pages), European Patent Office, Munich, Germany.

International Prelminary Examining Authority, International Preliminary Report On Patentability for International Application No. PCT/US2020/025668, dated Jul. 2, 2021, (9 pages), European Patent Office, Munich, Germany.

International Prelminary Examining Authority, International Preliminary Report On Patentability for International Application No. PCT/US2020/025721, dated Jul. 8, 2021, (9 pages), European Patent Office, Munich, Germany.

International Prelminary Examining Authority, International Preliminary Report On Patentability for International Application No. PCT/US2020/025764, dated Jul. 8, 2021, (9 pages), European Patent Office, Munich, Germany.

International Prelminary Examining Authority, International Preliminary Repor tOn Patentability for International Application No. PCT/US2020/025788, dated Jul. 8, 2021, (9 pages), European Patent Office, Munich, Germany.

International Prelminary Examining Authority, International Preliminary Report On Patentability for International Application No. PCT/US2020/025831, dated Jul. 8, 2021, (10 pages), European Patent Office, Munich, Germany.

International Prelminary Examining Authority, International Preliminary Report On Patentability for International Application No. PCT/US2020/025833, dated Jul. 13, 2021, (34 pages), European Patent Office, Munich, Germany.

NonFinal Office Action for U.S. Appl. No. 16/830,578, dated Jul. 2, 2021, (70 pages), United States Patent and Trademark Office, USA.

NonFinal Office Action for U.S. Appl. No. 16/830,635, dated Jul. 7, 2021, (81 pages), United States Patent and Trademark Office, USA.

International Preliminary Examining Authority, Second Written Opinion of the International Preliminary Examining Authority for International Application No. PCT/US2020/025642, dated Oct. 9, 2020, (8 pages), European Patent Office, Munich, Germany.

International Preliminary Examining Authority, Second Written Opinion of the International Preliminary Examining Authority for International Application No. PCT/US2020/025653, dated Oct. 8, 2020, (8 pages), European Patent Office, Munich, Germany.

International Preliminary Examining Authority, Second Written Opinion of the International Preliminary Examining Authority for International Application No. PCT/US2020/025668, dated Oct. 12, 2020, (8 pages), European Patent Office, Munich, Germany.

International Preliminary Examining Authority, Second Written Opinion of the International Preliminary Examining Authority for International Application No. PCT/US2020/025721, dated Oct. 8, 2020, (8 pages), European Patent Office, Munich, Germany.

International Preliminary Examining Authority, Second Written Opinion of the International Preliminary Examining Authority for International Application No. PCT/US2020/025764, dated Oct. 13, 2020, (8 pages), European Patent Office, Munich, Germany.

International Preliminary Examining Authority, Second Written Opinion of the International Preliminary Examining Authority for International Application No. PCT/US2020/025788, dated Oct. 13, 2020, (8 pages), European Patent Office, Munich, Germany.

International Preliminary Examining Authority, Second Written Opinion of the International Preliminary Examining Authority for International Application No. PCT/US2020/025831, dated Oct. 13, 2020, (9 pages), European Patent Office, Munich, Germany.

International Preliminary Examining Authority, Second Written Opinion of the International Preliminary Examining Authority, for International Application No. PCT/US2020/025833, dated Oct. 15, 2020, (8 pages), European Patent Office, Munich, Germany.

Schadow, Gunther et al. "Conceptual Alignment of Electronic Health Record Data With Guideline and Workflow Knowledge." International Journal of Medical informatics, vol. 64, (2001), pp. 259-274.

United States Patent and Trademark Office, NonFinal Office Action for U.S. Appl. No. 14/792,330, filed Oct. 2, 2020, (27 pages), USA.

United States Patent and Trademark Office, Notice of Allowance and Fees Due for U.S. Appl. No. 16/155,051, filed Sep. 29, 2020, (15 pages), USA.

Perez-Rey, D. et al. "Ontofusion: Ontology-based Integration of Genomic and Clinical Databases", Jul. 1, 2006, Computers in Biology and Medicine, pp. 712-730, vol. 36, No. 7-8.

Supplementary European search report dated Oct. 1, 2012 for EP Application No. 07853641.

U.S. Patent and Trademark Office, NonFinal Office Action for U.S. Appl. No. 14/792,330, filed Sep. 27, 2019, (22 pages), USA.

U.S. Patent and Trademark Office, Notice of Allowance for U.S. Appl. No. 14/308,873, filed Aug. 23, 2019, (19 pages), USA.

United States Patent and Trademark Office, NonFinal Office Action for U.S. Appl. No. 16/532,937, filed Nov. 21, 2019, (24 pages), USA.

Webster A Methodology for incorporating web technologies into a computer-baesd patient record, Int'l J Medical Informatics, vol. 68, Issues 1-3, Dec. 2002, pp. 39-47; available at https://doi.org/10.1016/S1386 5056(02)00062-X.

Annex to the communication dated Aug. 4, 2016 for EP Application No. 07853641.

Annex to the communication dated Jan. 5, 2016 for EP Application No. 07853641.

Annex to the communication dated Jan. 8, 2014 for EP Application No. 07853641.

Annex to the communication dated Jul. 7, 2016 for EP Application No. 07853641.

Annex to the communication dated Oct. 10, 2018 for EP Application No. 16178790.

Applicant Initiated Interview Summary (PTOL-413) dated Apr. 4, 2013 for U.S. Appl. No. 12/723,753.

(56) References Cited

OTHER PUBLICATIONS

Applicant Initiated Interview Summary (PTOL-413) dated Jul. 2, 2013 for U.S. Appl. No. 12/723,753.
Applicant Initiated Interview Summary (PTOL-413) dated Oct. 17, 2017 for U.S. Appl. No. 14/308,873.
CA Office Action dated Dec. 27, 2017 for CA Application No. 2958669.
Chong, Q. et al., "Ontology Based Metadata Management in Medical Domains", May 1, 2003, Journal of Research and Practice in Information Technology, pp. 139-153, vol. 35, No. 2.
Communication from the Examining Division dated Jan. 8, 2014 for EP Application No. 07853641.
Communication from the Examining Division dated Oct. 10, 2018 for EP Application No. 16178790.
Contributors, "Ontologie (Informatik)", Sep. 21, 2006, Wikipedia: The Free Encuyclopedia, 17 pages, URL:https://de.wikipedia.org/w/index.php? title=Ontologie_(Informatik)&oldid=21741585, Sep. 17, 2018.
Contributors, "Portal (Informatik)", Aug. 8, 2016, Wikipedia: The Free Encyclopedia, 12 pages, URL:https://de.wikipedia.org/w/index.php? title=Portal_(Informatik)&oldid=19941205, Sep. 17, 2018.
European search opinion dated Apr. 19, 2017 for EP Application No. 16178790.
European search opinion dated Oct. 1, 2012 for EP Application No. 07853641.
European search report dated Apr. 19, 2017 for EP Application No. 16178790.
Final Rejection dated Aug. 22, 2017 for U.S. Appl. No. 14/308,873.
Final Rejection dated Aug. 25, 2017 for U.S. Appl. No. 14/937,354.
Final Rejection dated Dec. 6, 2013 for U.S. Appl. No. 11/862,192.
Final Rejection dated Feb. 1, 2016 for U.S. Appl. No. 14/308,873.
Final Rejection dated Feb. 4, 2011 for U.S. Appl. No. 11/862,192.
Final Rejection dated Feb. 6, 2019 for U.S. Appl. No. 14/792,330.
Final Rejection dated Jun. 4, 2015 for U.S. Appl. No. 11/862,192.
Final Rejection dated Jun. 7, 2012 for U.S. Appl. No. 12/723,753.
Final Rejection dated Nov. 23, 2016 for U.S. Appl. No. 11/862,192.
Final Rejection dated Nov. 28, 2017 for U.S. Appl. No. 11/862,192.
Final Rejection dated Oct. 9, 2015 for U.S. Appl. No. 14/041,769.
International Searching Authority, International Search Report and Written Opinion for International Application No. PCT/US2007/079609, dated Mar. 13, 2008, (8 pages), U.S. Patent and Trademark Office.
ISA/220—Notification of Transmittal or Search Report and Written Opinion of the ISA, or the Declaration dated Mar. 13, 2008 for WO Application No. PCT/US07/079609.
Kerkri, E. M. et al. "An Approach For Integrating Heterogeneous Information Sources In A Medical Data Warehouse", Jan. 1, 2001, Journal of Medical Systems, pp. 167-176, vol. 25, No. 3.
Non-Final Rejection dated Apr. 5, 2016 for U.S. Appl. No. 11/862,192.
Non-Final Rejection dated Apr. 22, 2013 for U.S. Appl. No. 11/862,192.
Non-Final Rejection dated Apr. 23, 2013 for U.S. Appl. No. 12/723,753.
Non-Final Rejection dated Apr. 27, 2018 for U.S. Appl. No. 14/792,330.
Non-Final Rejection dated Aug. 1, 2017 for U.S. Appl. No. 11/862,192.
Non-Final Rejection dated Aug. 10, 2010 for U.S. Appl. No. 11/862,192.
Non-Final Rejection dated Feb. 7, 2017 for U.S. Appl. No. 14/308,873.
Non-Final Rejection dated Jan. 10, 2018 for U.S. Appl. No. 14/937,354.
Non-Final Rejection dated Jan. 28, 2015 for U.S. Appl. No. 14/041,769.
Non-Final Rejection dated May 20, 2015 for U.S. Appl. No. 14/308,873.
Non-Final Rejection dated Nov. 12, 2014 for U.S. Appl. No. 11/862,192.
Non-Final Rejection dated Nov. 28, 2016 for U.S. Appl. No. 14/937,354.
Non-Final Rejection dated Oct. 12, 2011 for U.S. Appl. No. 12/723,753.
Notice of Allowance and Fees Due (PTOL-85) dated Aug. 28, 2013 for U.S. Appl. No. 12/723,753.
Notice of Allowance and Fees Due (PTOL-85) dated Jul. 11, 2018 for U.S. Appl. No. 11/862,192.
Notice of Allowance and Fees Due (PTOL-85) dated Sep. 12, 2018 for U.S. Appl. No. 11/862,192.
Outgoing—ISA/210—International Search Report dated Mar. 13, 2008 for WO Application No. PCT/US07/079609.
Outgoing Written Opinion of the ISA dated Mar. 13, 2008 for WO Application No. PCT/US07/079609.
Paterson, G. I. (2007). Boundary infostructures for chronic disease. (Order No. NR27167, Dalhousie University (Canada)). ProQuest Dissertations and Theses, , 183-n/a. Retrieved from http://search.proquest.com/docview/304792954?accountid=14753. (304792954).
Anagnostakis, Aristidis G. et al. "Semantics-Based Information Modeling For The Health-Care Administration Sector: The Citation Platform," IEEE Transactions on Information Technology in Biomedicine, vol. 9, No. 2, Jun. 2005, pp. 239-247, doi: 10.1109/TITB.2005.847145.
Farfan, Fernando et al. "XOntoRank: Ontology-Aware Search of Electronic Medical Records," 2009 IEEE 25th International Conference on Data Engineering, Mar. 2009, pp. 820-831, Shanghai, China, doi: 10.1109/ICDE.2009.73.
Moner, David et al., "Archetype-Based Semantic Integration and Standardization of Clinical Data," EMBS Annual International Conference, 2006 International Conference of the IEEE Engineering in Medicine and Biology Society, Aug. 30-Sep. 3, 2006, pp. 5141-5144, New York, NY, USA, doi: 10.1109/IEMBS.2006.260124.
NonFinal Office Action for U.S. Appl. No. 16/532,937, dated Mar. 31, 2021, (23 pages), United States Patent and Trademark Office, USA.
NonFinal Office Action for U.S. Appl. No. 16/830,615, dated May 27, 2021, (52 pages), United States Patent and Trademark Office, USA.
Notice of Allowance and Fee(s) Due for U.S. Appl. No. 14/792,330, dated Jun. 1, 2021, (15 pages), United States Patent and Trademark Office, USA.
Tapp, Martin. "Automating System-Level Data-Interchange Software Through A System Interface Description Language," Dec. 2013, Universite de Montreal, pp. 8-10, 17-20, 30-33. (Year: 2013).
Armstrong, Eric, "Working With XML—The Java API For Xml Parsing (JAXP) Tutorial," Version 1.1, Update 31, Aug. 21, 2001 (494 pages).
International Searching Authority, International Search Report and Written Opinion for International Application No. PCT/US2020/025642, dated Jul. 2, 2020, (14 pages), Rijswijk, Netherlands.
International Searching Authority, International Search Report and Written Opinion for International Application No. PCT/US2020/025653, dated Jul. 2, 2020, (14 pages), Rijswijk, Netherlands.
International Searching Authority, International Search Report and Written Opinion for International Application No. PCT/US2020/025668, dated Jul. 1, 2020, (14 pages), Rijswijk, Netherlands.
International Searching Authority, International Search Report and Written Opinion for International Application No. PCT/US2020/025721, dated Jul. 2, 2020, (10 pages), Rijswijk, Netherlands.
International Searching Authority, International Search Report and Written Opinion for International Application No. PCT/US2020/025764, dated Jul. 2, 2020, (10 pages), Rijswijk, Netherlands.
International Searching Authority, International Search Report and Written Opinion for International Application No. PCT/US2020/025788, dated Jul. 2, 2020, (14 pages), Rijswijk, Netherlands.
International Searching Authority, International Search Report and Written Opinion for International Application No. PCT/US2020/025831, dated Jul. 2, 2020, (14 pages), Rijswijk, Netherlands.
International Searching Authority, International Search Report and Written Opinion for International Application No. PCT/US2020/025833, dated Jul. 2, 2020, (14 pages), Rijswijk, Netherlands.
United States Patent and Trademark Office, Final Office Action for U.S. Appl. No. 16/532,937, filed May 21, 2020, (29 pages), USA.
United States Patent and Trademark Office. Final Office Action for U.S. Appl. No. 14/792,330, filed Apr. 16, 2020, (42 pages), USA.

(56) References Cited

OTHER PUBLICATIONS

Corrected Notice of Allowability for U.S. Appl. No. 16/830,578, dated Dec. 22, 2021, (7 pages), United States Patent and Trademark Office, USA.
Corrected Notice of Allowability for U.S. Appl. No. 16/830,635, dated Jan. 21, 2022, (9 pages), United States Patent and Trademark Office, USA.
Lindvall, Sofia et al. "Data Modelling for Home Healthcare Applications", Feb. 8, 2006, Linkopings Universitet, Report No. LITH-IMT/MI20-EX-06/418-SE, Feb. 8, 2006, (69 pages), Linkoping, Sweden.
NonFinal Office Action for U.S. Appl. No. 16/830,534, dated Dec. 24, 2021, (70 pages), United States Patent and Trademark Office, USA.
NonFinal Office Action for U.S. Appl. No. 16/830,597, dated Dec. 23, 2021, (72 pages), United States Patent and Trademark Office, USA.
NonFinal Office Action for U.S. Appl. No. 16/830,671, dated Dec. 24, 2021, (74 pages), United States Patent and Trademark Office, USA.
Notice of Allowance and Fee(s) Due for U.S. Appl. No. 16/830,578, dated Dec. 9, 2021, (17 pages), United States Patent and Trademark Office, USA.
Notice of Allowance and Fee(s) Due for U.S. Appl. No. 16/830,635, dated Dec. 20, 2021, (22 pages), United States Patent and Trademark Office, USA.
Corrected Notice of Allowability for U.S. Appl. No. 14/792,330, dated Oct. 14, 2021, (14 pages), United States Patent and Trademark Office, USA.
Corrected Notice of Allowability for U.S. Appl. No. 16/830,615, dated Sep. 30, 2021, (7 pages), United States Patent and Trademark Office, USA.
Final Office Action for U.S. Appl. No. 16/532,937, dated Sep. 17, 2021, (17 pages), United States Patent and Trademark Office, USA.
Notice of Allowance and Fee(s) Due for U.S. Appl. No. 16/830,615, dated Sep. 23, 2021, (26 pages), United States Patent and Trademark Office, USA.
Corrected Notice of Allowability for U.S. Appl. No. 16/830,578, dated Feb. 9, 2022, (7 pages), United States Patent and Trademark Office, USA.
Corrected Notice of Allowability for U.S. Appl. No. 16/830,635, dated Feb. 9, 2022, (11 pages), United States Patent and Trademark Office, USA.
Final Office Action for U.S. Appl. No. 16/830,534, dated Apr. 6, 2022, (23 pages), United States Patent and Trademark Office, US.
Final Office Action for U.S. Appl. No. 16/830,597, dated May 2, 2022, (22 pages), United States Patent and Trademark Office, US.
Final Office Action for U.S. Appl. No. 16/830,671, dated May 26, 2022, (17 pages), United States Patent and Trademark Office, Alexandria, Virginia, US.
NonFinal Office Action for U.S. Appl. No. 16/830,686, dated Jun. 9, 2022, (75 pages), United States Patent and Trademark Office, Alexandria, Virginia, US.
Advisory Action for U.S. Appl. No. 16/830,597, dated Oct. 14, 2022, (3 pages). United States Patent and Trademark Office, US.
Final Office Action for U.S. Appl. No. 16/830,686, dated Oct. 20, 2022 (11 pages), United States Patent and Trademark Office, US.
NonFinal Office Action for U.S. Appl. No. 16/830,534, dated Aug. 10, 2022, (17 pages), United States Patent and Trademark Office, US.
NonFinal Office Action for U.S. Appl. No. 17/455,261, dated Oct. 27, 2022, (10 pages), United States Patent and Trademark Office, US.
NonFinal Office Action for U.S. Appl. No. 17/558,653, dated Nov. 3, 2022, (23 pages), United States Patent and Trademark Office, US.
Notice of Allowance for U.S. Appl. No. 16/830,671, dated Nov. 3, 2022, (9 pages), United States Patent and Trademark Office, US.
NonFinal Office Action for U.S. Appl. No. 17/650,256, dated Nov. 18, 2022, (35 pages), United States Patent and Trademark Office, US.
Notice of Allowance and Fee(s) Due for U.S. Appl. No. 16/830,597, dated Nov. 23, 2022, (21 pages), United States Patent and Trademark Office, US.

\* cited by examiner

Tenoretic50equivalentTo
    Tablet
        thatcontainsActiveIngredient
            (Atenolol
                thatinAmount
                    (Quantity
                        that hasUnit mg
                        and hasMagnitude value 50.0))
        and containsActiveIngredient
            (Chlorthalidone
                thatinAmount
                    (Quantity
                        that hasUnit mg
                        and hasMagnitude value 12.5))
        and hasRoute (MedicationRoute and
            (hasMedicationDosingProcess IngestingDosingProcess)
            and (hasMedicationRouteSite OralSite))
        and hasProductProvider AstraZenica

FIG. 4

- 'obstructive lung disease [CDN2866]'
  and (hasPathology some
    ('airflow limitation [BIO86]'
    and ((('elastoid degeneration [MOR3281]'
    or (hasMorphology some 'chronic destructive inflammation [MOR4751]'))
    and (hasFindingSite some 'alveolus structure [BDY404]')
    and (hasClinicalCourse some 'chronic clinical course [QLR1769]'))
    or (hasFindingSite some
      ('bronchiole structure [BDY196]'
      and ('chronic hypertrophy [MOR545]'
      or (hasMorphology some 'chronic exudative inflammation [MOR3818]')))))
    and (dueTo some 'inflammatory response abnormality [BIO87]'))

SubClass Of ⊕
- 'chronic clinical course [QLR1769]'
- 'shortness of breath [CDN3857]'

SubClass Of (Anonymous Ancestor)
- 'disease by finding site [CDN119]'
  and (hasFindingSite some 'thoracic structure [BDY5651]')
- 'condition [CDN177]'
  and (hasPathology some 'pathological process [BIO464]')
- 'disorder by body system [CDN4875]'
  and (hasPathology some
    ('pathological process [BIO464]'
    and (hasFindingSite some 'respiratory system structure [BDY8754]')))
- 'finding [CDN300]'
  and (hasFindingSite some 'respiratory system structure [BDY8754]')
  and (interprets some 'physical exam observation [OBS2473]')
- 'respiratory system disorder [CDN172]'
  and 'thoracic disease [CDN2209]'
  and (hasPathology some
    ('pathological process [BIO464]'
    and (hasFindingSite some 'lung structure [BDY8920]')))
- 'lung disease/disorder [CDN373]'
  and (hasDefinitionalSymptom some 'shortness of breath [CDN3857]')
  and (hasPathology some
    ('airflow limitation [BIO86]'
    and (hasFindingSite some 'lung structure [BDY8920]')))
- 'disease/disorder [CDN207]'
  and (hasPathology some
    ('pathological process [BIO464]'
    and (hasFindingSite some 'body system structure [BDY6287]')))
- 'breathing quality abnormality [CDN2801]'
  and (((hasInterpretation some 'uncomfortable [QLR1125]')
  or (hasInterpretation some 'difficult [QLR16712]'))
  and (interprets some 'shortness of breath survey [OBS23741]'))

FIG. 6

```xml
<?xml version="1.0" encoding="UTF-8"?>
<OPDO xmlns="http://.../OPDO">
    <observations>
        <observation>
            <observable>OX249</observable>
            <value>OX6396</value>
        </observation>
        <observation>
            <observable>OX1083</observable>
            <value>PRC19</value>
        </observation>
        <observationGroup>
            <observation>
                <observable>OX2629</observable>
                <value>20171215082300-0600</value>
            </observation>
            <observation>
                <observable>OX2628</observable>
                <value>F</value>
            </observation>
            <observationGroup>
                <observation>
                    <observable>OX779</observable>
                    <value>NOT GIVEN</value>
                </observation
                <observation>
                    <observable>OX2474</observable>
                    <value>F</value>
                </observation>
            </observationGroup>
        </observationGroup>
    </observations>
</OPDO>
```

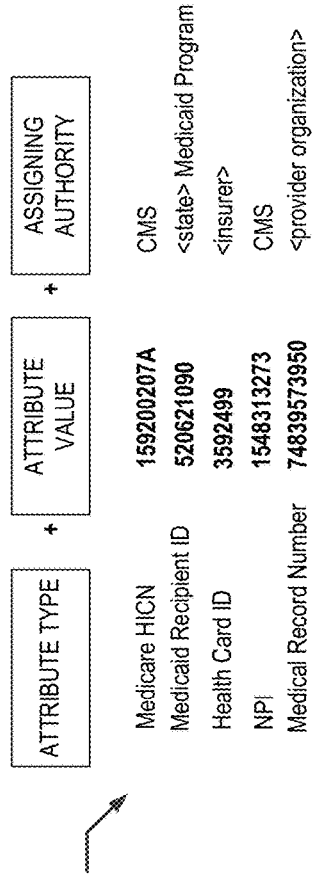
1102

| ATTRIBUTE TYPE | ATTRIBUTE VALUE | ASSIGNING AUTHORITY |
|---|---|---|
| Medicare HICN | 159200207A | CMS |
| Medicaid Recipient ID | 520621090 | <state> Medicaid Program |
| Health Card ID | 3592499 | <insurer> |
| NPI | 1548313273 | CMS |
| Medical Record Number | 74839573950 | <provider organization> |

OX21265 - Related ACO - Identifier Care Coordination Organization ID, String (2 PRACTICE_ID) = PHNL160122
OX21537 - Attributed Provider - Identifier MPIN, String (4 MPIN) = 299668
OX211 - Patient - Name - First, String (7 MEMBER_FIRST_NAME) = PATIENTIFIRST
OX254 - Patient - Name - Last, String (8 MEMBER_LAST_NAME) = PATIENTLAST
OX9904 - Patient - Date Birth (DOB) (ISO), Date/Time (11 MEMBER_BIRTH_DATE) = 1948-08-23 00:00:00.000
OX12518 - Patient - Gender Code 1.1, UHG Gender Key (12 MEMBER_GENDER) = M
OX21261 - Patient - Identifier 6 - Value, String (20 CARD_ID) = 96887387
OX21272 - Attributed Provider - Identifier NPI, String (28 NPI) = 1972697498
OX21324 - Attributed Provider - Date Effective (ISO), Date/Time (38 START_DATE) = 2018-02-01 00:00:00.000
OX21323 - Attributed Provider - Date End (ISO), Date/Time (39 END_DATE) = 2018-03-31 00:00:00.000
OX21536 - Patient - Identifier 6 - Assigning Authority, Custom Key (40 CARD_ID_TYPE) = MEDICARE
OX5909 - Data Packet - Interface ID, String (Interface ID) = interface:ACO_MEMBER_ROSTER_CDW
OX192 - Data Packet - Source Application, Concept Key (Interface Source App) = SYS284
OX186 - Data Packet - Data Source Organization 3 - ER Actor Key, String (Interface Source Org) = ACT30200
OX1076 - Data Packet - Custodian Organization - ER Actor Key Default from Interface Definition, String (Interface Custodian Org) = ACT30200
OX249 - Data Packet - Event Type, Concept Key (Interface Packet) = OX21266
OX15116 - Data Packet - Default Insurer Identifier Assigning Authority - ER Actor Key, String (Interface Assigning Authority) = ACT30001
OX1083 - Care Activity Procedure Default, Concept Key (Interface Default Top Level Procedure) = PRC513

```
<rule xmlns:ch="urn:er.com:ns:rules_engine"
    xmlns:xsi="http://www.w3.org/2001/
XMLSchema-instance"
    xsi:schemaLocation=".....xsd">
    <selection/> <!-- Optional -->
    <condition/> <!-- Required -->
    <actions/> <!-- Required -->
</rule>
```

FIG. 25A

```
<condition>
    <!-- Requires exactly one of the following -->
    <conditionPhrase/> <!-- Single boolean expression -->
    <and/> <!-- Compound boolean expression where all enclosed
    sub-phrases must evaluate to true -->
    <or/> <!-- Compound boolean expression where some
    enclosed sub-phrase must evaluate to true -->
    <not/> <!-- Negation of enclosed sub-phrase must evaluate to
    true -->
</condition>
```

FIG. 25B

```
<conditionPhrase>
<!-- Requires exactly one of the following -->
<conditionClause/> <!-- Single boolean expression -->
<and/> <!-- Compound boolean expression where all enclosed sub-clauses must evaluate to true -->
<or/> <!-- Compound boolean expression where some enclosed sub-clauses must evaluate to true -->
<not/> <!-- Negation of enclosed sub-clause must evaluate to true -->

<!-- May specify one of the following occurrence count restrictions -->
<occurrenceCount/>
<rangeOccurrenceCount/>

<!-- May specify one of the following time interval restrictions -->
<periodTimeInterval/>
<rangeTimeInterval/>

<!-- May specify the following -->
<order/>
</conditionPhrase>
```

FIG. 25C

```
<conditionClause>
    <ruleCondition/> <!-- Required -->

<!-- Requires one of the following -->
    <ruleConditionValue/>
    <ruleConditionValues/>

<operator/> <!-- Required -->
    <clauseType/> <!-- Optional -->

<!-- Requires exactly one of the following -->
    <target/>
    <and/> <!-- Collection of values, all of which must be compared by the operator as true -->
    <or/> <!-- Collection of values, one of which must be compared by the operator as true -->
    <values/> <!-- Same as <or/> -->
    <value/> <!-- Single value which must be compared by the operator as true -->
    <quantity/> <!-- Single value including a unit which must be compared by the operator as true -->
</conditionClause>
```

FIG. 25D

```
<occurrenceCount>
    [count : integer] <!-- Required -->
</occurrenceCount>
```

FIG. 25E

```
<rangeOccurrenceCount>
  <!-- Either begin or end must be specified -->
  <beginRange> <!-- Optional -->
    [range begin : integer] <!-- Required -->
  </beingRange>
  <endRange> <!-- Optional -->
    [range end : integer] <!-- Required -->
  </endRange>
</rangeOccurrenceCount>
```

FIG. 25F

```
<periodTimeInterval>
  <value/> <!-- Required -->
  <unit/> <!-- Required -->
</periodTimeInterval>
```

FIG. 25G

```
<rangeTimeInterval>
  <!-- Either begin or end must be specified -->
  <rangeBegin> <!-- Optional -->
    <value/> <!-- Required -->
    <unit/> <!-- Required -->
  </rangeBegin>
  <rangeEnd> <!-- Optional -->
    <value/> <!-- Required -->
    <unit/> <!-- Required -->
  </rangeEnd>
</rangeTimeInterval>
```

FIG. 25H

```
<ruleCondition>
  [rule condition concept : RCL observable packet data object identifier] <!--
  Required -->
</ruleCondition>
```

FIG. 25I

```
<ruleConditionValue>
  [value : string] <!-- Required -->
</ruleConditionValue>
```

FIG. 25J

```
<ruleConditionValues>
  <ruleConditionValue> <!-- Required. May be multiple -->
    [value : string] <!-- Reqired -->
  </ruleConditionValue>
</ruleConditionValues>
```

FIG. 25K

```
<operator>
  [operator concept : MTH observable packet data object identifier] <!-- Required -->
</operator>
```

FIG. 25L

```
<clauseType>
  [clause type : string] <!-- Required -->
</clauseType>
```

FIG. 25M

```
<target> <!-- Requires any of the following -->
  <amount/> <!-- May be multiple -->
  <value/> <!-- Only one allowed -->
  <unit/> <!-- Only one allowed -->
</target>
```

FIG. 25N

```
<amount> <!-- May be multiple -->
  <value/> <!-- Required -->
  <unit/> <!-- Optional -->
</amount>
```

FIG. 25O

```
<quantity>
  <value/> <!-- Required -->
  <unit/> <!-- Optional -->
</quantity>
```

FIG. 25P

```
<value>
  [value : string]
</value>
```

```
<unit>
  [unit concept : UOM observable packet data object identifier]
</unit>
```

FIG. 25S

```
<action>
  [action uuid : content UUID] <!-- The UUID of an action observable packet data object -->
</action>
```

FIG. 25T

```
<actions> <!-- At least one of the contained tags must exist -->
  <conditionTrue/> <!-- Optional. May not exist in conjunction with <action/> -->
    <action/> <!-- May be multiple -->
  </conditionTrue>
  <conditionFalse> <!-- Optional -->
    <action/> <!-- May be multiple -->
  </conditionFalse>
  <action/> <!-- Optional. May be multiple. May not exist in conjunction with <conditionTrue/>; implies <conditionTrue/> -->
</actions>
```

MANAGING DATA OBJECTS FOR GRAPH-BASED DATA STRUCTURES

CROSS-REFERENCE TO RELATED APPLICATIONS

This application claims priority to U.S. Application No. 62/828,517 filed Apr. 3, 2019; U.S. Application No. 62/828,526 filed Apr. 3, 2019; U.S. Application No. 62/845,084 filed May 8, 2019; U.S. Application No. 62/845,109 filed May 8, 2019; U.S. Application No. 62/845,085 filed May 8, 2019; U.S. Application No. 62/845,089 filed May 8, 2019; U.S. Application No. 62/860,031 filed Jun. 11, 2019; U.S. Application No. 62/860,047 filed Jun. 11, 2019; U.S. Application No. 62/860,050 filed Jun. 11, 2019; U.S. Application No. 62/873,217 filed Jul. 12, 2019; and U.S. Application No. 62/874,638 filed Jul. 16, 2019, the contents of which are hereby incorporated by reference in their entireties.

TECHNICAL FIELD

Various embodiments relate to the management, updating, and/or retrieving of information/data from an electronic record (ER) data store based at least in part on a graph-based domain ontology. Various embodiments relate to various technical solutions for technical challenges with regard to the managing, ingesting, monitoring, updating, and/or extracting/retrieving of information/data from an ER data store storing ERs comprising a plurality of single best record objects (SBROs).

BACKGROUND

Various systems for managing information/data (e.g., medical and/or health information/data) are known. However, in the healthcare context, for example, various technical challenges prevent current systems from being patient-centric and/or patient-focused. For example, a single healthcare event may result in tens of messages (e.g., thirty messages) being generated/created by various systems (e.g., an ER system, a clinic system, a claims processing system, and/or the like). However, traditional systems for managing, ingesting, monitoring, updating, and/or extracting/retrieving such information/data fail to streamline these tens of messages into a single set of information/data corresponding the health event. Further, traditional systems fail to provide computationally efficient and accurate processes that reduce the strain on system resources and provide a simple user experience that combines several sets of information/data (which may be inconsistent) in a transparent manner.

BRIEF SUMMARY OF SOME EXAMPLE EMBODIMENTS

Various embodiments provide methods, systems, apparatus, computer program products, and/or the like for managing, ingesting, monitoring, updating, and/or extracting/retrieving information/data associated with an ER data store and/or accessing information/data from the ER data store, wherein the ERs are generated, updated/modified, and/or accessed via a graph-based domain ontology. In various embodiments, a graph-based domain ontology defines a plurality of concepts corresponding to the domain and the relationships between and among the concepts. The examples described herein generally relate to the healthcare domain; however, various embodiments of the present invention may relate to and/or be used in a variety of domains.

In various embodiments, the disclosed system comprises a unique graph-based healthcare ontology to overcome limitations of the prior art in representing knowledge and information/data in a uniform and unifying way of dealing with health information/data. Most prior art systems comprise some type of coding scheme, internal or external. Some of the more popular schemes include the Standardized Nomenclature of Medicine (SNOMED), and ICD-9 or ICD-10 (the International Classification of Disease, including the clinical modification variations). While these coding schemes have long been proposed as needed for health IT systems, and have been adopted and used by many systems, they have been used primarily in retrospective studies, and have not had the desired impact on real-time information/data delivery.

In accordance with one aspect, methods, systems, apparatus, computer program products, and/or the like are provided. In one embodiment, these may include receiving an observable packet data object or a data artifact packet data object, wherein (a) the data artifact packet data object is generated based at least in part on the observable packet data object, (b) the observable packet data object is an XML document generated based at least in part on parsing a message received from a source system, (c) the data artifact packet data object comprises an entity identifier identifying a subject entity and a plurality observable-value pairs, and (d) each observable in a corresponding observable-value pair is identifiable by an ontology concept identifier defined by a graph-based domain ontology; automatically generating a container tree data structure comprising a data artifact packet container node as a root node, wherein (a) the container tree data structure is generated based at least in part on the data artifact packet data object, (b) the container tree data structure comprises a plurality of container nodes that are descendants of the root node based at least in part on the data artifact packet data object, and (c) each container node of the plurality of container nodes corresponds to one pair of the plurality of observable-value pairs; automatically identifying an entity associated with the container tree data structure based at least in part on the entity identifier; automatically traversing the container tree data structure in a depth-first traversal to generate a data transfer object for each of container node of the plurality of container nodes, wherein each data transfer object corresponds to one pair of the plurality of observable-value pairs; and automatically providing at least one of the plurality of data transfer objects for use in performing a database update function.

In various embodiment, these may further include, wherein a value of at least one observable-value pair of the plurality observable-value pairs comprises at least one of a source vocabulary description, a source vocabulary code, or a text description of an observable; wherein, during the depth-first traversal of the container tree data structure, an aggregator method resolves the at least one of the source vocabulary description, the source vocabulary code, or the text description of the observable; and wherein a hierarchy of container nodes of the container tree is determined based at least in part on the graph-based domain ontology.

In additional embodiments, these may yet include, wherein automatically generating the container tree data structure comprises: determining a type of container node for an observable-value pair of the plurality of observable-value pairs based at least in part on the graph-based domain ontology; determining whether a container node having the determined type is present in the container tree data structure; and responsive to determining that a container node having the determined type is present in the container tree data structure, storing the observable-value pair in the container node.

In some embodiments, these may include, wherein automatically generating the container tree data structure comprises: determining a type of container node for an observable-value pair of the plurality of observable-value pairs based at least in part on the graph-based domain ontology; determining whether a container node having the determined type is present in the container tree data structure; and responsive to determining that a container node having the determined type is not present in the container tree data structure: (a) constructing the container node having the determine type, (b) inserting the container node into an appropriate position in the container tree data structure, wherein the appropriate position in the container tree data structure is determined based at least in part on the graph-based domain ontology, and (c) storing the observable-value pair in the container node.

In particular embodiments, these may also include, wherein the depth-first traversal of the container tree data structure comprises comparing a value of an observable-value pair of the plurality of observable-value pairs to at least one requirement corresponding to an observable of the observable-value pair to determine whether the value satisfies the at least one requirement; and further comprise determining a confidence score for each of the plurality of observable-value pairs.

In accordance with one aspect, methods, systems, apparatus, computer program products, and/or the like are provided. In one embodiment, these may include automatically receiving an extractable packet data object, wherein (a) the extractable packet data object is an XML document, (a) a data artifact packet data object is generated based at least in part on the extractable packet data object, (b) the data artifact packet data object comprises an entity identifier identifying a subject entity, (c) the data artifact packet data object comprises one or more ontology concept identifiers corresponding respectively to one or more concepts defined within a graph-based domain ontology, and (d) the graph-based domain ontology comprises a specific set or hierarchy of concepts and relationships among those concepts related to a domain; automatically generating a container tree data structure comprising a data artifact container node as the root node based at least in part on the data artifact packet data object, wherein (a) the container tree data structure comprises a plurality of container nodes that are descendants of the root node based at least in part on the data artifact packet data object, (b) each container node of plurality of container nodes comprises an observable and an empty value for the corresponding observable, (c) each empty value is to be retrieved from a database or aggregated from retrieved empty values; automatically traversing each of the plurality of container nodes of the container tree data structure in a depth-first traversal, wherein (a) at each container node that is a leaf node in the traversal, a method is executed to retrieve a non-empty value from the database for the corresponding observable, and (b) at the completion of the traversal, each of the plurality of container nodes comprises a non-empty value for the corresponding observable; after the depth-first traversal, automatically processing the container tree data structure to generate at least one observable group, wherein the at least one observable group comprises each observable and the corresponding non-empty value; and generating, based at least in part on the observable groups, an information message comprising the observable group.

In various embodiment, these may further include, wherein a hierarchy of container nodes of the container tree data structure is determined based at least in part on the graph-based domain ontology.

In a particular embodiment, these may also include, wherein automatically generating the container tree data structure comprises: determining a type of container node that should contain an observable corresponding to an ontology concept identifier in the data artifact packet data object; determining whether a container node having the determined type is present in the container tree data structure; and responsive to determining that a container node having the determined type is present in the container tree data structure, storing the observable and a corresponding empty value in the container node.

In yet another embodiment, these may also include, wherein automatically generating the container tree data structure comprises: determining a type of container node that should contain an observable corresponding to an ontology concept identifier in the data artifact packet data object; determining whether a container node having the determined type is present in the container tree data structure; and responsive to determining that a container node having the determined type is not present in the container tree data structure: (a) constructing the container node having the determine type, (b) storing the observable and a corresponding empty value in the container node, and inserting the container node into an appropriate position in the container tree data structure, wherein the appropriate position in the container tree data structure is determined based at least in part on the graph-based domain ontology.

In still another embodiment, these also include, wherein the depth-first traversal of the container tree data structure comprises aggregating two or more values of a subcontainer node to generate a value of container comprising the subcontainer; wherein the requested information message is configured to be provided, at least in part, via a portlet for user consumption; and wherein the depth-first traversal of the container tree data structure comprises retrieving the originating source vocabulary corresponding to the values.

And in one embodiment, these include retrieving a confidence score corresponding to at least a portion of an observable group from the database, wherein the information message comprises the confidence score.

In accordance with one aspect, methods, systems, apparatus, computer program products, and/or the like are provided. In one embodiment, these may include automatically receiving a plurality of messages via one or more communications interfaces, each message comprising data corresponding to a subject entity; for each message of the plurality of messages, generating an application programming interface (API) request to an identity matching service, wherein the API request comprises a first attribute and a second attribute; for each message of the plurality of messages, receiving an API response comprising an entity identifier corresponding to the subject entity, for each message of the plurality of messages, automatically generating a data artifact packet data object, wherein (a) the data artifact packet data object is generated based at least in part on an observable packet data object, and (b) the observable packet data object is an XML document generated based at least in part on parsing a message received from a source system; automatically storing each data artifact packet data object in a database, wherein each data artifact packet data object is identifiable by the corresponding entity identifier; automatically detecting a user interaction event corresponding to a first entity identifier; responsive to detecting the user interaction event corresponding to the first entity identifier, automatically retrieving a plurality of data artifact packet data objects corresponding to the first entity identifier; and providing each of the plurality of data artifact packet data objects corresponding to the first entity identifier to an ingestion processing module for processing.

In various embodiments, these may also include, wherein (a) the user interaction event authenticates a user by a portal via which the user may access data corresponding to the first entity identifier and (b) the user is an owner corresponding to the first entity identifier; wherein the one or more relationships are identified based at least in part on a graph data structure (e.g., relationship graph) based at least in part on the graph-based domain ontology; wherein the user interaction event is detected based at least in part on historical behavior of one or more users having access to data corresponding to the first entity identifier; wherein (a) the user interaction event authenticates a user by a portal via which the user may access data corresponding to the first entity identifier and (b) the user has a relationship defined within a graph-based domain ontology with an entity that is an owner corresponding to the first entity identifier; wherein the ingestion processing module processes each of the plurality of data artifact packet data objects corresponding to the first entity identifier to generate data transfer objects for use in performing a database update function.

In a particular embodiment, these also include, wherein detection of the user interaction event comprises: determining that the user has been authenticated by the portal; identifying one or more relationships of which the user is a participant based at least in part on an entity identifier corresponding to the user; and determining, based at least in part on the one or more relationships, that the user has access to data corresponding to the first entity identifier.

In yet another embodiment, these may further include for each of the plurality of data artifact packet data objects: automatically generating a container tree data structure comprising a data artifact packet container node as a root node, wherein (a) the container tree data structure is generated based at least in part on the data artifact packet data object, (b) the container tree data structure comprises a plurality of container nodes that are descendants of the root node based at least in part on the data artifact packet data object, and (c) each container node of the plurality of container nodes corresponds to one pair of a plurality of observable-value pairs; automatically traversing the container tree data structure in a depth-first traversal to generate a data transfer object for each of container node of the plurality of container nodes, wherein each data transfer object corresponds to one pair of the plurality of observable-value pairs; and automatically providing at least one of the plurality of data transfer objects for use in performing a database update function.

In still another embodiment, these may also include, wherein automatically generating the container tree data structure comprises: determining a type of container node for an observable-value pair of the plurality of observable-value pairs based at least in part on a graph-based domain ontology; determining whether a container node having the determined type is present in the container tree data structure; and responsive to determining that a container node having the determined type is present in the container tree data structure, storing the observable-value pair in the container node.

And in still another embodiment, these may further include, wherein automatically generating the container tree data structure comprises: determining a type of container node for an observable-value pair of the plurality of observable-value pairs based at least in part on a graph-based domain ontology; determining whether a container node having the determined type is present in the container tree data structure; and responsive to determining that a container node having the determined type is not present in the container tree data structure: (a) constructing the container node having the determine type, (b) inserting the container node into an appropriate position in the container tree data structure, wherein the appropriate position in the container tree data structure is determined based at least in part on the graph-based domain ontology, and (c) storing the observable-value pair in the container node.

In accordance with one aspect, methods, systems, apparatus, computer program products, and/or the like are provided. In one embodiment, these may include receiving, by a data store management layer in communication with a primary program, a request, wherein the request is to (a) load a primary software object instance from a database, or (b) persist a primary software object instance in the database; identifying, by the data store management layer, one or more database objects corresponding to the primary software object; determining, by a persistence manager of the data store management layer, a mapping of the one or more database objects to storage locations within the database based at least in part on the one or more database objects, wherein (a) the data store management layer comprises a plurality of persistence managers 248, and (b) the persistence manager is associated with an entity class for the primary software object; and automatically generating, by the persistence manager of the data store management layer and based at least in part on the determined mapping, an executable code portion configured to cause (a) a load request to be performed, or (b) a write request to be performed; executing, by the data store management layer, the executable code portion to cause: (a) in an instance of the load request, one or more database objects stored at the storage locations within the database to be loaded as a functional primary software object instance, or (b) in an instance of the write request, one or more values corresponding to the primary software object instance to be written to the database at the storage locations.

In one embodiment, these may also include executing, by the data store management layer, a connect method to connect to the database; and executing, by the data store management layer, a disconnect method to disconnect from the database.

In yet another embodiment, these may further include, wherein the connect and disconnect methods comprise at least one of (a) opening a session and closing the session or (b) opening a transaction within a session and closing the transaction within the session; wherein (a) the primary program is database agnostic, and (b) the executable code portion is an SQL statement; and wherein (a) the request to load the primary software object instance from the database was generated and provided by one of a rules engine or an extraction processing module, or (b) the request to persist the primary software object instance in the database was generated and provided by a single best record object process.

In a particular embodiment, these may also include updating a change log based at least in part on (a) the loading of the one or more database objects from the storage locations, or (b) the writing of the one or more values corresponding to the primary software object instance at the storage locations; returning the functional primary software object instance to the primary program; and generating a data artifact packet data object based at least in part on the extractable packet data object, wherein the data artifact data object (a) comprises a subject entity identifier identifying a subject entity, and (b) one or more ontology concept identifiers corresponding respectively to one or more concepts defined within a graph-based domain ontology.

In still another embodiment, these may include, wherein (a) at least a portion of the executable code portion was automatically inserted into a database object class definition corresponding to a class associated with at least one of the one or more database objects, and (b) generating the executable code portion comprises accessing the inserted executable code portion and populating one or more entity identifiers therein; wherein: (a) in an instance of the load request, loading the one or more database objects stored at the storage locations within the database as a functional primary software object instance comprises performing a deserialization function on the one or more database objects stored at the storage locations, or (b) in an instance of the write request, writing the one or more values corresponding to the primary software object instance to the database at the storage locations comprises performing a serialization function on the primary software object instance; and wherein, in an instance of the load request, the request is received from an extractable packet data object.

In still another embodiment, these may also include automatically generating a container tree data structure comprising a data artifact container node as the root node based at least in part on the data artifact packet data object, wherein (a) the container tree data structure comprises a plurality of container nodes that are descendants of the root node based at least in part on the data artifact packet data object, (b) each container node of plurality of container nodes comprises an observable and an empty value for the corresponding observable, (c) each empty value is to be retrieved from a database or aggregated from retrieved empty values; automatically traversing each of the plurality of container nodes of the container tree data structure in a depth-first traversal, wherein (a) at each container node that is a leaf node in the traversal, a method is executed to retrieve a non-empty value from the database for the corresponding observable, and (b) at the completion of the traversal, each of the plurality of container nodes comprises a non-empty value for the corresponding observable; and after the depth-first traversal, automatically processing the container tree data structure to generate at least one observable group, wherein the at least one observable group comprises each observable and the corresponding non-empty value.

In a particular embodiment, these may further include, wherein, in an instance of the write request, the request is received from an observable packet data object and a data artifact packet data object is generated based at least in part on the observable packet data object, wherein the data artifact data object (a) comprises a subject entity identifier identifying a subject entity, and (b) one or more ontology concept identifiers corresponding respectively to one or more concepts defined within a graph-based domain ontology.

And in another embodiment, these also include automatically generating a container tree data structure comprising a data artifact packet container node as a root node based at least in part on the data artifact packet data object, wherein (a) the container tree data structure comprises a plurality of container nodes that are descendants of the root node based at least in part on the data artifact packet data object, (b) each container node of the container tree data structure corresponds to one pair of a plurality of observable-value pairs in the data artifact packet data object; and automatically traversing the container tree data structure in a depth-first traversal to generate a data transfer object for each of container node of the plurality of container nodes, wherein each data transfer object corresponds to one pair of the plurality of observable-value pairs.

In accordance with one aspect, methods, systems, apparatus, computer program products, and/or the like are provided. In one embodiment, these may include automatically identifying an XML rule document comprising a rule to be applied to data stored in one or more database objects, wherein the XML rule document (a) is identified based at least in part on a rule identifier, (b) defines one or more selection criteria for the rule, (c) defines one or more condition criteria for the rule, (d) identifies an action to be performed, and (e) identifies an observable packet data object based at least in part on an observable packet data object identifier; responsive to receiving, from a data store management layer in communication with a primary program, the data stored in the one or more database objects associated with an electronic record, programmatically evaluating the data using the one or more selection criteria defined by the rule; responsive to the one or more selection criteria of the rule being satisfied, evaluating the data using the one or more condition criteria defined by the rule; and responsive to the one or more condition criteria of the rule being satisfied by the data: identifying the observable packet data object based at least in part on the observable packet data object identifier, automatically populating one or more fields in the observable packet data object with data associated with the electronic record, providing the populated observable packet data object to an ingestion processing module, and generating a data artifact packet based at least in part on the populated observable packet data object.

In one embodiment, these may also include automatically generating a container tree data structure comprising a data artifact packet container node as a root node based at least in part on the data artifact packet data object, wherein the container tree data structure comprises a plurality of container nodes that are descendants of the root node based at least in part on the data artifact packet data object; automatically traversing the container tree data structure in a depth-first traversal to generate a data transfer object for each container node; and automatically providing at least one of the plurality of data transfer objects for use in performing a database update function.

In a particular embodiment, these further include, wherein the rules engine optimizes execution by (a) collapsing logical operators, and (b) reordering logical operators; wherein a rules engine scheduler automatically executes the XML rule document at specific frequencies or in response to certain other criteria; wherein the certain other criteria comprises a write function or an update function being performed to at least one of the one or more database objects by the data store management layer; wherein at least one of the one or more fields is populated with an entity identifier associated with the electronic record; and wherein each identifier is a universally unique identifier or a globally unique identifier.

In still another embodiment, these may also include, wherein the XML rule document further (a) identifies a second action to be performed when the condition criteria is not satisfied and (b) identifies a second observable packet data object based at least in part on a second XML observable packet data object identifier; and responsive to the one or more condition criteria of the rule not being satisfied by the data: identifying the second observable packet data object based at least in part on the second observable packet data object identifier, automatically populating one or more fields in the second observable packet data object with data associated with the electronic record, providing the second populated observable packet data object to the ingestion processing module, and generating a second data artifact packet based at least in part on the second populated observable packet data object.

In accordance with one aspect, methods, systems, apparatus, computer program products, and/or the like are provided. In one embodiment, these may include automatically receiving a message via one or more communications interfaces, wherein the message (a) comprises data corresponding to the subject entity, and (b) is received from a source system; identifying a first attribute and a second attribute for the subject entity from the message; generating an application programming interface (API) request to an identity matching service, wherein (a) the API request comprises the first attribute and the second attribute, and (b) responsive to the API request, the identity matching service: accesses a rule set from a plurality of rule sets based at least in part on the source system, generates a first query based at least in part on the rule set and the first attribute, queries a database, using the first query, for an electronic record stored in the database corresponding to the first attribute, responsive to an electronic record not being identified based at least in part on the first attribute, generates a second query based at least in part on the rule set and the second attribute, queries the database, using the second query, for an electronic record stored in the database corresponding to the second attribute, wherein the electronic record comprises an entity identifier corresponding to the subject entity, and responsive to an electronic record being identified based at least in part on the second attribute, generates an API response comprising the entity identifier corresponding to the subject entity; receiving the API response comprising the entity identifier corresponding to the subject entity; and automatically generating a data artifact packet data object, wherein (a) the data artifact packet data object comprises the entity identifier, (b) the data artifact packet data object is generated based at least in part on an observable packet data object, and (b) the observable packet data object is an XML document generated based at least in part on parsing a message received from a source system.

In another embodiment, these may also include automatically storing the data artifact packet data object in a database, wherein the data artifact packet data object is identifiable by the corresponding entity identifier; automatically detecting a user interaction event corresponding to a first entity identifier; responsive to detecting the user interaction event corresponding to the first entity identifier, automatically retrieving the data artifact packet data object corresponding to the first entity identifier; providing the data artifact packet data object corresponding to the first entity identifier to an ingestion processing module for processing; automatically generating a container tree data structure comprising a data artifact packet container node as a root node based at least in part on the data artifact packet data object, wherein (a) the container tree data structure comprises a plurality of container nodes that are descendants of the root node based at least in part on the data artifact packet data object, (b) each container node of the container tree data structure corresponds to one pair of a plurality of observable-value pairs in the data artifact packet data object; automatically traversing the container tree data structure in a depth-first traversal to generate a data transfer object for each of container node of the plurality of container nodes, wherein each data transfer object corresponds to one pair of the plurality of observable-value pairs; and automatically providing at least one of the plurality of data transfer objects for use in performing a database update function, wherein at least one container node comprises at least one of a source vocabulary description, source vocabulary code, or text description of an observable, and (c) during the depth-first traversal of the container tree data structure, an aggregator method resolves the at least one of the source vocabulary description, the source vocabulary code, or the text description of the observable.

In still another embodiment, these may still include, wherein automatically generating the container tree data structure comprises: determining a type of container node for each of the plurality of observable-value pairs based at least in part on the graph-based domain ontology; determining whether a container node having the determined type is present in the container tree data structure; and responsive to determining that a container node having the determined type is present in the container tree data structure, storing the observable-value pair in the container node.

In yet another embodiment, these may also include, wherein automatically generating the container tree data structure comprises: determining a type of container node for each of the plurality of observable-value pairs based at least in part on the graph-based domain ontology; determining whether a container node having the determined type is present in the container tree data structure; and responsive to determining that a container node having the determined type is not present in the container tree data structure: (a) constructing the container node having the determine type, (b) inserting the container node into an appropriate position in the container tree data structure, wherein the appropriate position in the container tree data structure is determined based at least in part on the graph-based domain ontology, and (c) storing the observable-value pair in the container node, and wherein the electronic record is identified based at least in part on the second attribute when the electronic record comprises a record attribute that (a) corresponds to the second attribute and (b) has a same value as the second attribute.

In accordance with one aspect, methods, systems, apparatus, computer program products, and/or the like are provided. In one embodiment, these may include automatically identifying a first container node of a container tree data structure by traversing the container tree data structure in a depth-first traversal, wherein (a) the container tree data structure comprises a data artifact packet container node as a root node, (b) the container tree data structure is generated based at least in part on a data artifact packet data object, (c) the container tree data structure comprises a plurality of container nodes that are descendants of the root node based at least in part on the data artifact packet data object, (d) the plurality of container nodes comprises the first container node, and (e) the first container node comprises an observable; generating a data transfer object for the first container node; invoking programmatic reasoning logic to determine an ontology concept identifier for the observable of the first container node based at least in part on a graph-based domain ontology; querying, using the programmatic reasoning logic, a data store to identify the ontology concept identifier for the observable of the first container node; and receiving, using the programmatic reasoning logic, a response to the query, wherein the response to the query comprises one of (a) the ontology concept identifier, or (b) a false response; and in an instance in which the response to the query comprises the ontology concept identifier, providing, using the programmatic reasoning logic, the ontology concept identifier for storage in the data transfer object.

In one embodiment, these may also include, in an instance in which the response to the query comprises the false response, generating a description for the observable; determining a relationship between the description and a first class of the graph-based domain ontology based; and inserting a new node in the graph-based domain ontology based for the observable based at least in part on the description.

In yet another embodiment, these may further include, wherein the query is submitted to one of (a) a cache data store, or (b) the graph-based domain ontology, wherein the programmatic reasoning logic is invoked from another process, and wherein each of the plurality of container nodes comprises an observable-value pair.

In another embodiment, these may further include, wherein generating the container tree data structure comprises: determining a type of container node for an observable-value pair of a plurality of observable-value pairs based at least in part on the graph-based domain ontology; determining whether a container node having the determined type is present in the container tree data structure; and responsive to determining that a container node having the determined type is present in the container tree data structure, storing the observable-value pair in the container node.

And in still another embodiment, these may include, wherein generating the container tree data structure comprises: determining a type of container node for an observable-value pair of a plurality of observable-value pairs based at least in part on the graph-based domain ontology; determining whether a container node having the determined type is present in the container tree data structure; and responsive to determining that a container node having the determined type is not present in the container tree data structure: (a) constructing the container node having the determine type, (b) inserting the container node into an appropriate position in the container tree data structure, wherein the appropriate position in the container tree data structure is determined based at least in part on the graph-based domain ontology, and (c) storing the observable-value pair in the container node.

In accordance with one aspect, methods, systems, apparatus, computer program products, and/or the like are provided. In one embodiment, these may include receiving a request indicating at least a function to be performed on an electronic record or an access requested to the electronic record, wherein (a) the request originates from a requesting entity identifiable by a requesting entity identifier, (b) the electronic record is associated with a subject entity identifiable by a subject entity identifier; responsive to receiving the request: determining a relationship type between the requesting entity and the subject entity, wherein the relationship type is a direct relationship or an indirect relationship, and determining a relationship status between the requesting entity and the subject entity, wherein the relationship type is (a) an active relationship, or (b) an inactive relationship; response to determining that (a) the relationship type is a direct relationship, and the (b) the relationship status is an active relationship: identifying a user role for the requesting entity with respect to the electronic record of the subject entity, and identifying a rights group associated with the user role, wherein (a) the rights group comprises one or more rights stored in a rights group data object, (b) the one or more rights allow the function to be performed on the electronic record or the access requested to the electronic record, and (c) the rights data object comprises a corresponding key; and enabling the function to be performed on the electronic record or the access requested to the electronic record based at least in part on the corresponding key. These may also include providing the corresponding key to a code module that enables the function to be performed on the electronic record or the access requested to the electronic record based at least in part on the corresponding key.

In one embodiment, these may include, wherein the requesting entity is represented as a node defined within a graph-based domain ontology that is identifiable by the requesting entity identifier, and (d) the subject entity is represented as a node defined within the graph-based domain ontology that is identifiable by the subject entity identifier; wherein the relationship type is (a) a direct relationship in an instance in which the node representing the requesting entity is connected to the node representing the subject entity by one edge, and (b) an indirect relationship in an instance in which the node representing the requesting entity is connected to the node representing the subject entity by at least one intermediate node; and wherein the relationship type is determined by a preferred path between the node representing the requesting entity and the node representing the subject entity, wherein the preferred path comprises the least number of intermediate nodes.

In another embodiment, these may include, wherein (a) the requesting entity is associated with a requesting entity relationship data object that is stored in a relationship table and that represents a relationship to the subject entity, (b) the requesting entity relationship data object is identifiable based at least in part on the requesting entity identifier, (c) the subject entity is associated with a subject entity relationship data object that is stored in the relationship table and that represents a relationship to the requesting entity, and (d) the subject entity relationship data object is identifiable based at least in part on the subject entity identifier. Additionally, these may include querying a database index for the relationship table for entity relationship data object and the subject entity relationship data object, wherein the relationship type and the relationship status are determined based at least in part on the requesting entity relationship data object and the subject entity relationship data object.

In still another embodiment, these may include, wherein the relationship status is associated with a future end date, and wherein (a) the user role corresponds to a class of data in the electronic record, and (b) the class of data is defined by a graph-based domain ontology.

In in yet another embodiment, these may include (a) generating an extractable packet data object, and (b) generating a data artifact packet data object based at least in part on the extractable packet data object, wherein the data artifact data object comprises (a) the subject entity identifier identifying a subject entity, and (b) one or more ontology concept identifiers corresponding respectively to one or more concepts defined within a graph-based domain ontology.

And in another embodiment, an extraction processing module: automatically generates a container tree data structure comprising a data artifact container node as the root node based at least in part on the data artifact packet data object, wherein (a) the container tree data structure comprises a plurality of container nodes that are descendants of the root node based at least in part on the data artifact packet data object, (b) each container node of plurality of container nodes comprises an observable and an empty value for the corresponding observable, (c) each empty value is to be retrieved from a database or aggregated from retrieved empty values; automatically traverses each of the plurality of container nodes of the container tree data structure in a depth-first traversal, wherein (a) at each container node that is a leaf node in the traversal, a method is executed to retrieve a non-empty value from the database for the corresponding observable, and (b) at the completion of the traversal, each of the plurality of container nodes comprises a non-empty value for the corresponding observable; after the depth-first traversal, automatically processes the container tree data structure to generate at least one observable group, wherein the at least one observable group comprises each observable and the corresponding non-empty value; and generates, based at least in part on the observable groups, an information message comprising the observable group for the function.

In yet another embodiment, automatically generating the container tree data structure comprises: determining a type of container node that should contain an observable corresponding to an ontology concept identifier in the data artifact packet data object; determining whether a container node having the determined type is present in the container tree data structure; and responsive to determining that a container node having the determined type is present in the container tree data structure, storing the observable and a corresponding empty value in the container node, wherein (a) the depth-first traversal of the container tree data structure comprises aggregating two or more values of a subcontainer node to generate a value of container comprising the subcontainer, and (b) wherein the extractable packet data object is an XML document.

BRIEF DESCRIPTION OF THE SEVERAL VIEWS OF THE DRAWING(S)

Having thus described embodiments of the present invention in general terms, reference will now be made to the accompanying drawings, which are not necessarily drawn to scale, and wherein:

FIG. 4 illustrates an example ontology definition in accordance with certain embodiments of the present invention;

Figure 2A:
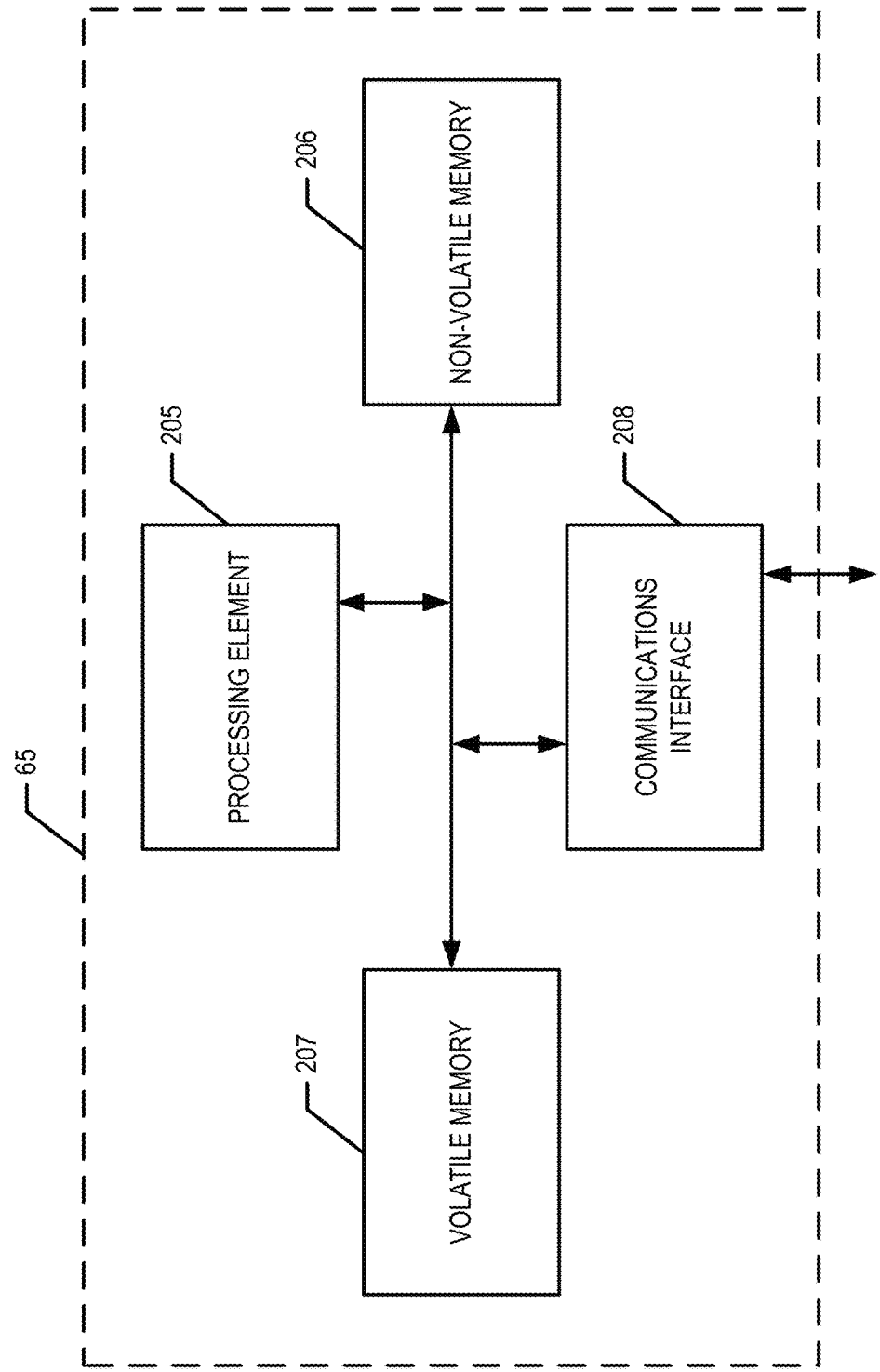
FIG. 2A is a schematic of a server in accordance with certain embodiments of the present invention.
Figure 2B:
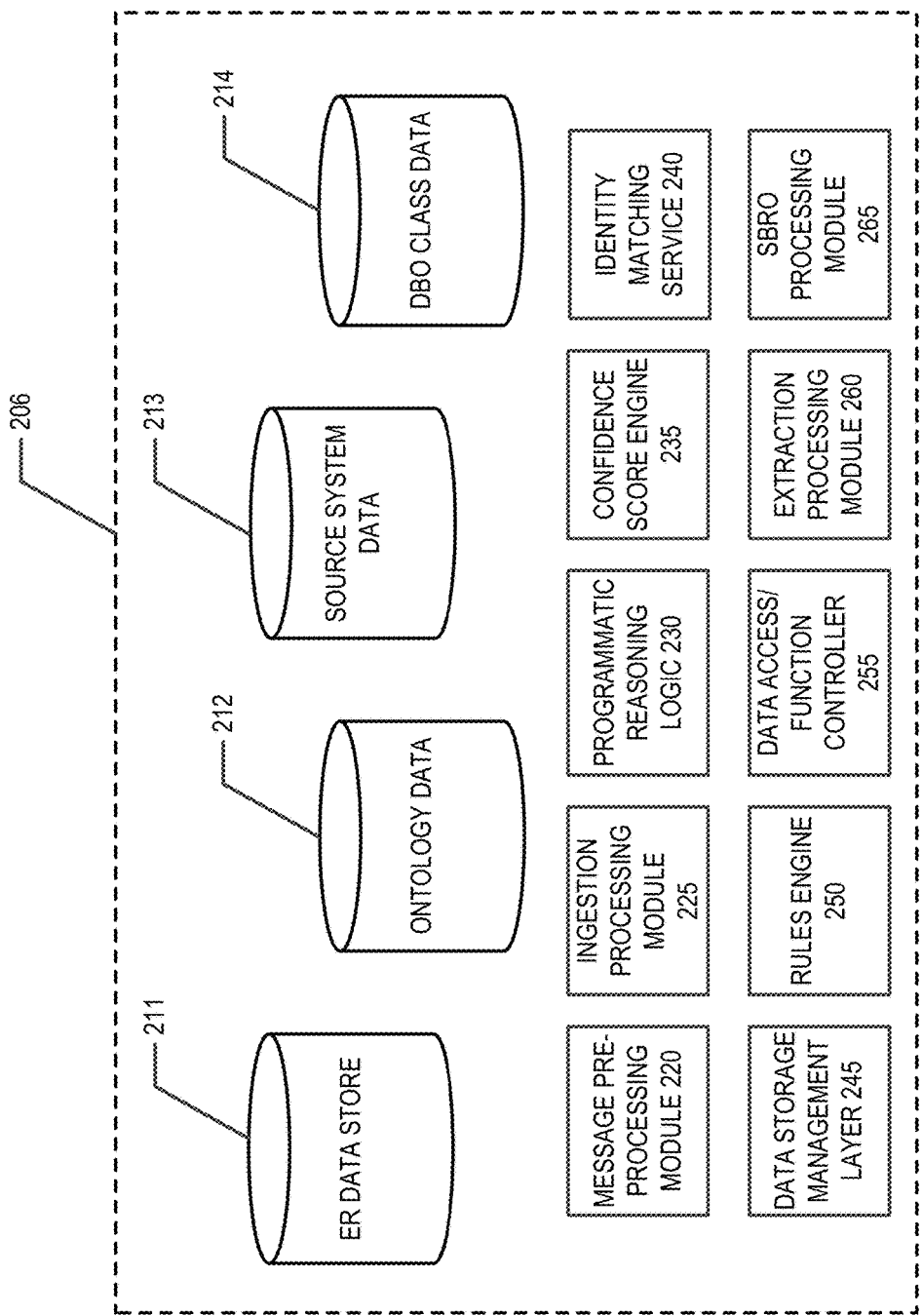
FIG. 2B is a schematic representation of a memory media storing a plurality of data assets.
Figure 5A:
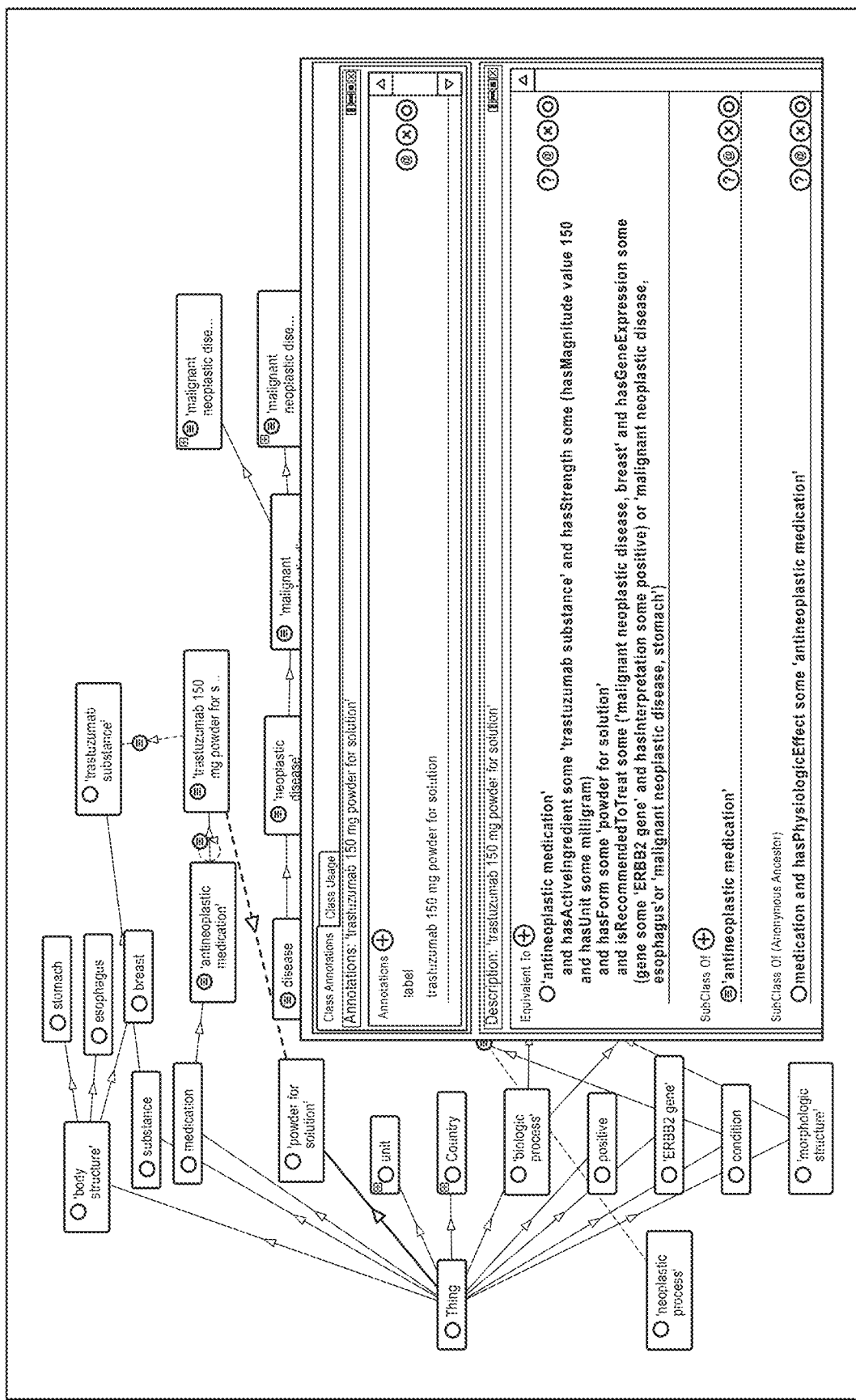
Figure 5B:
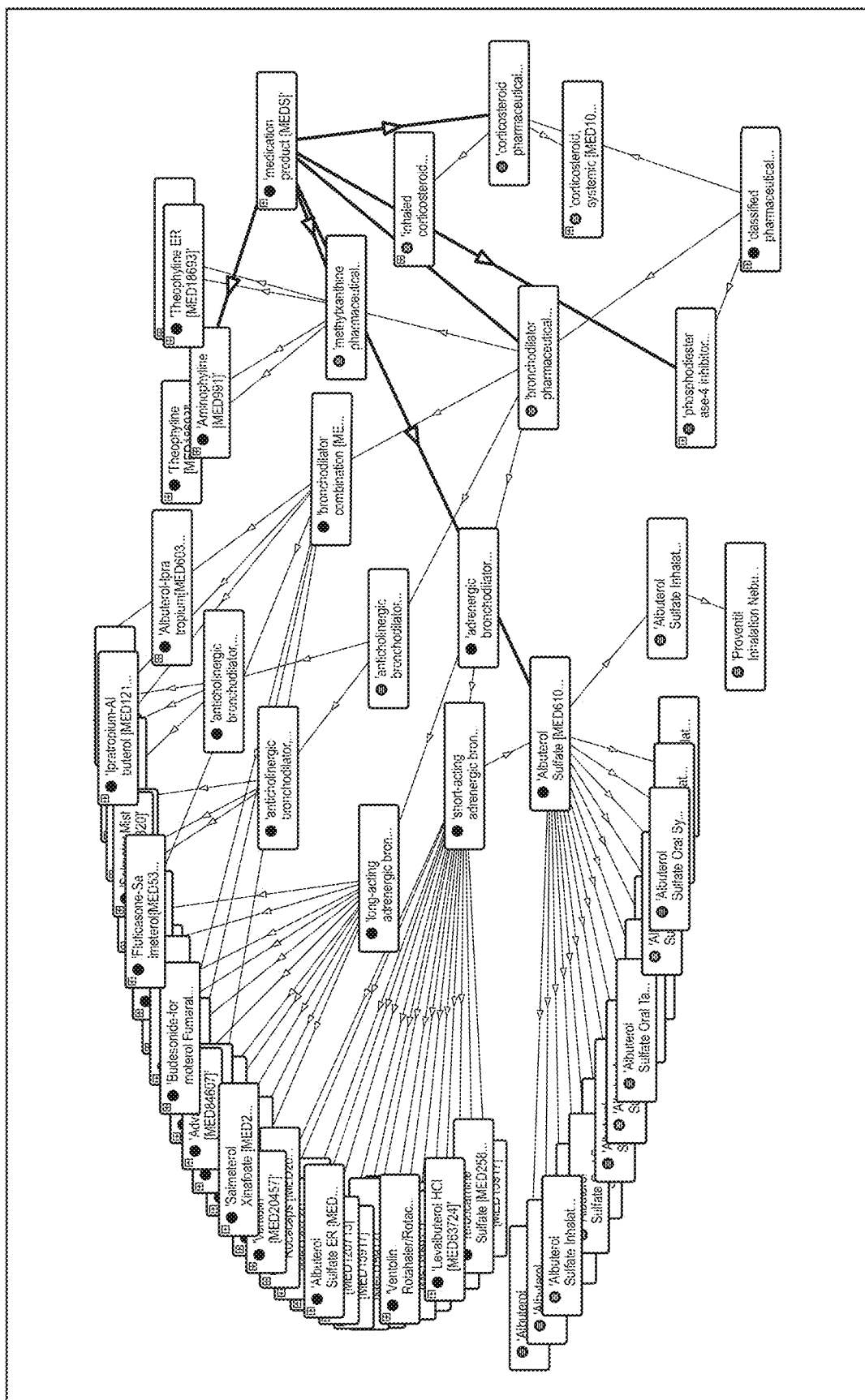
Figure 5C:
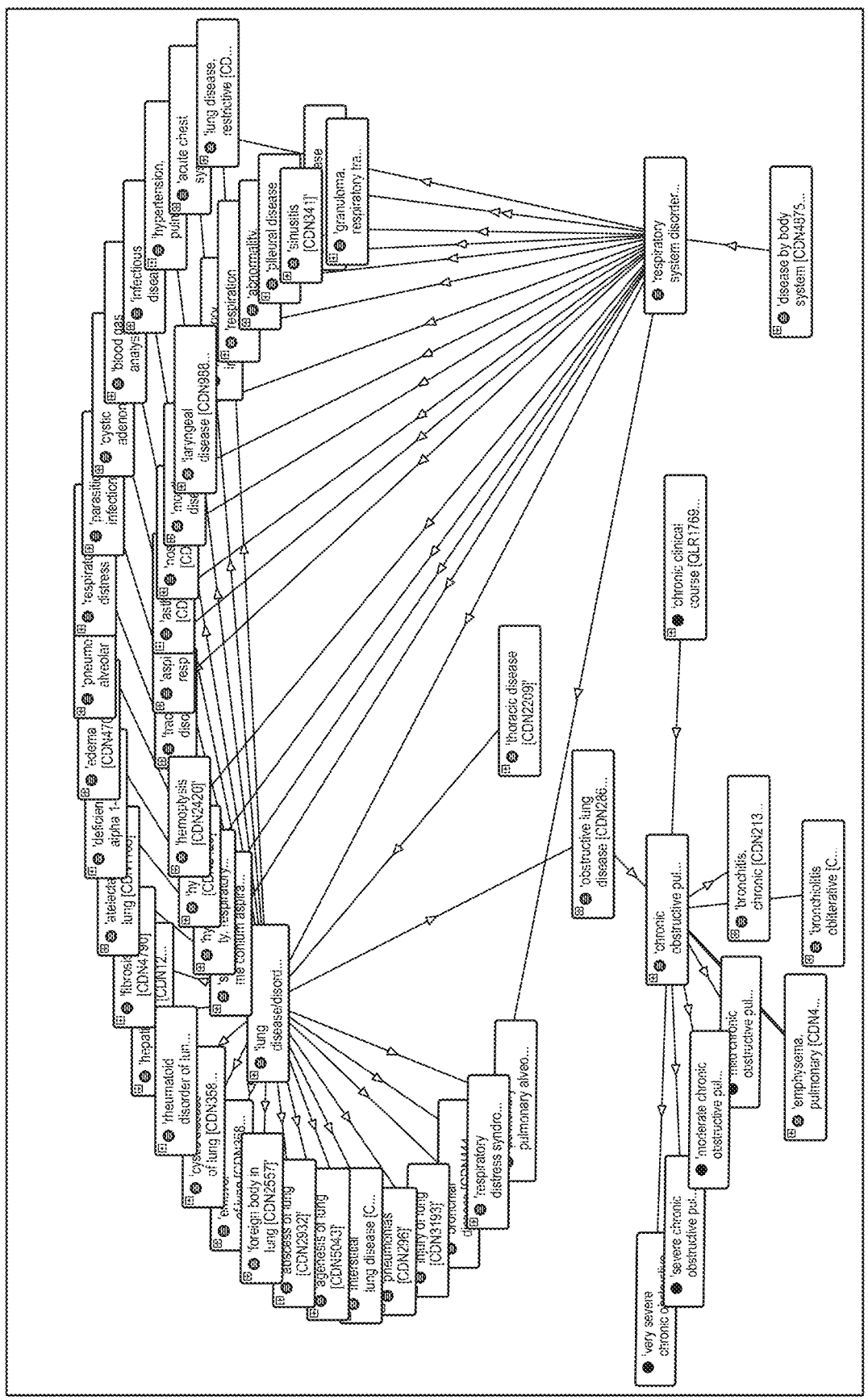
Figure 7A:
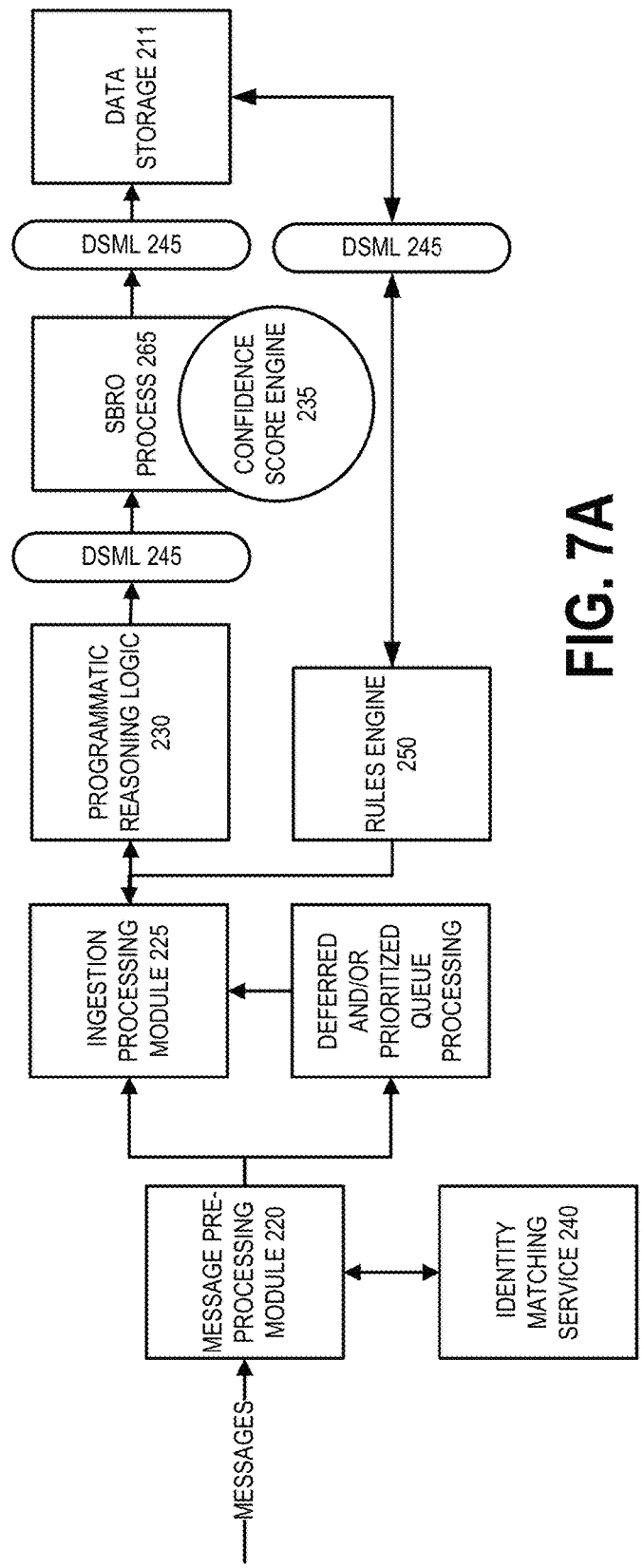
Figure 7B:
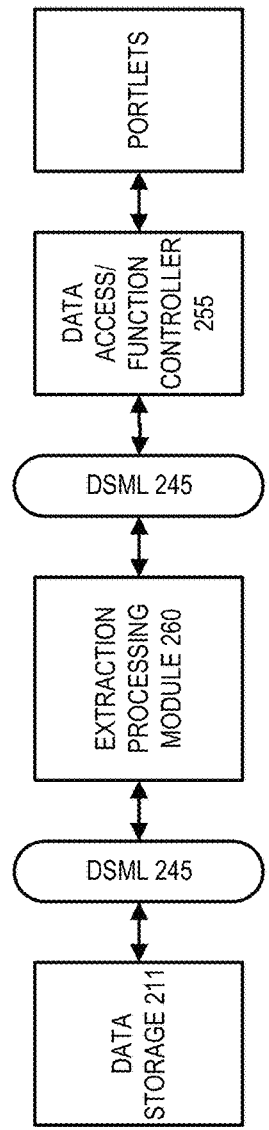
Figure 8:
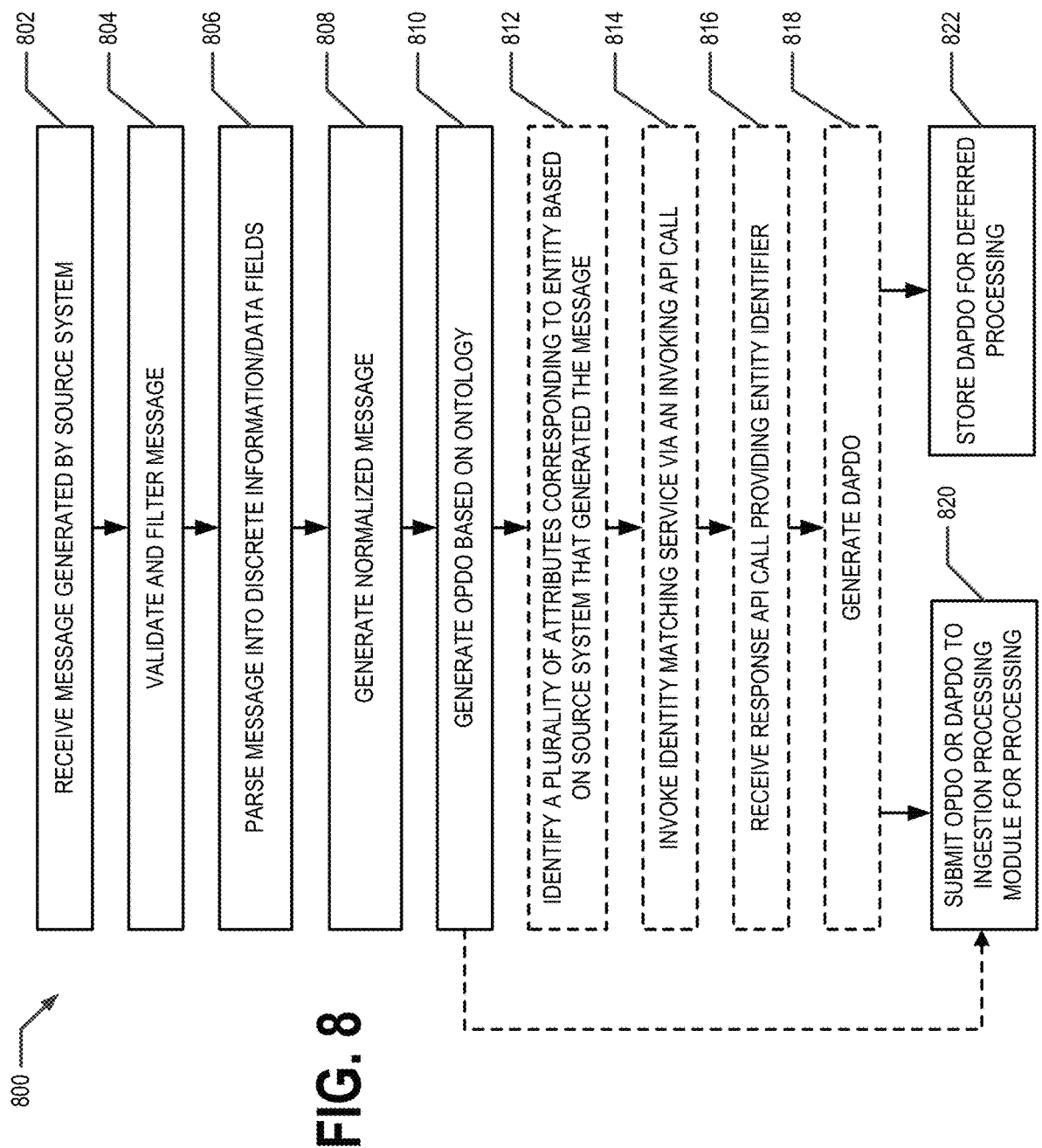
Figure 9:
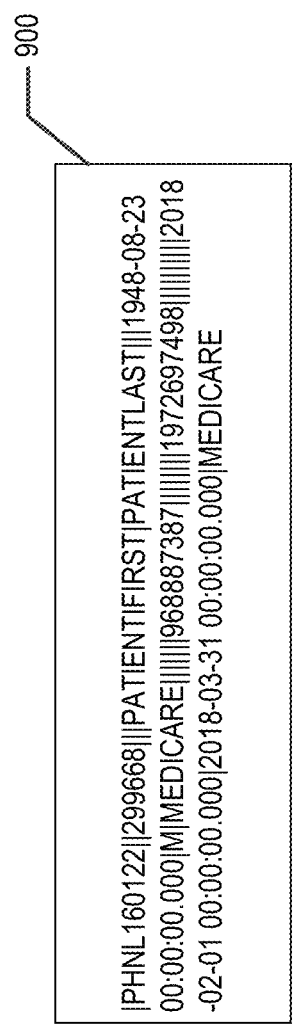
Figure 10B:
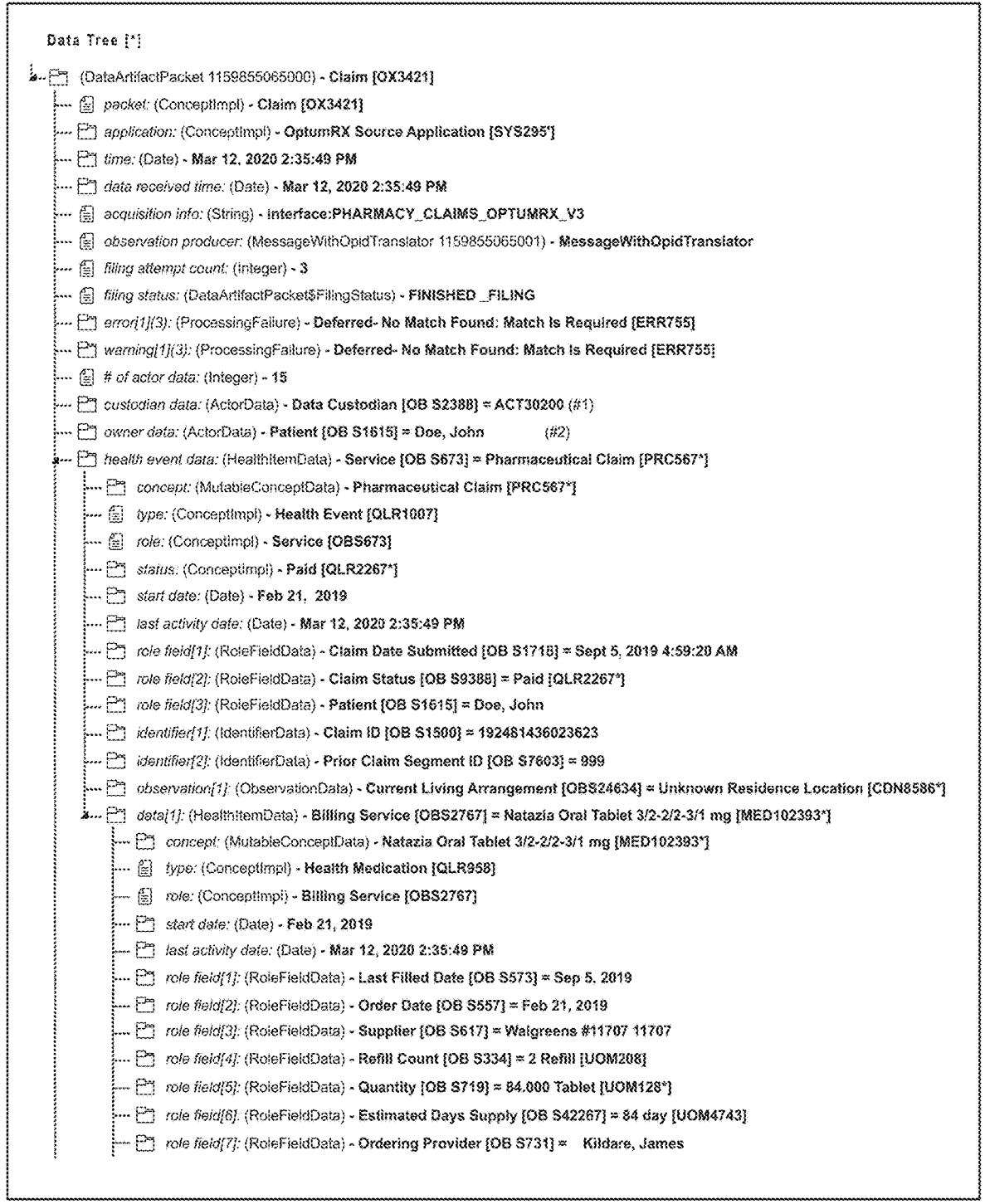
Figure 10C:
Figure 12:
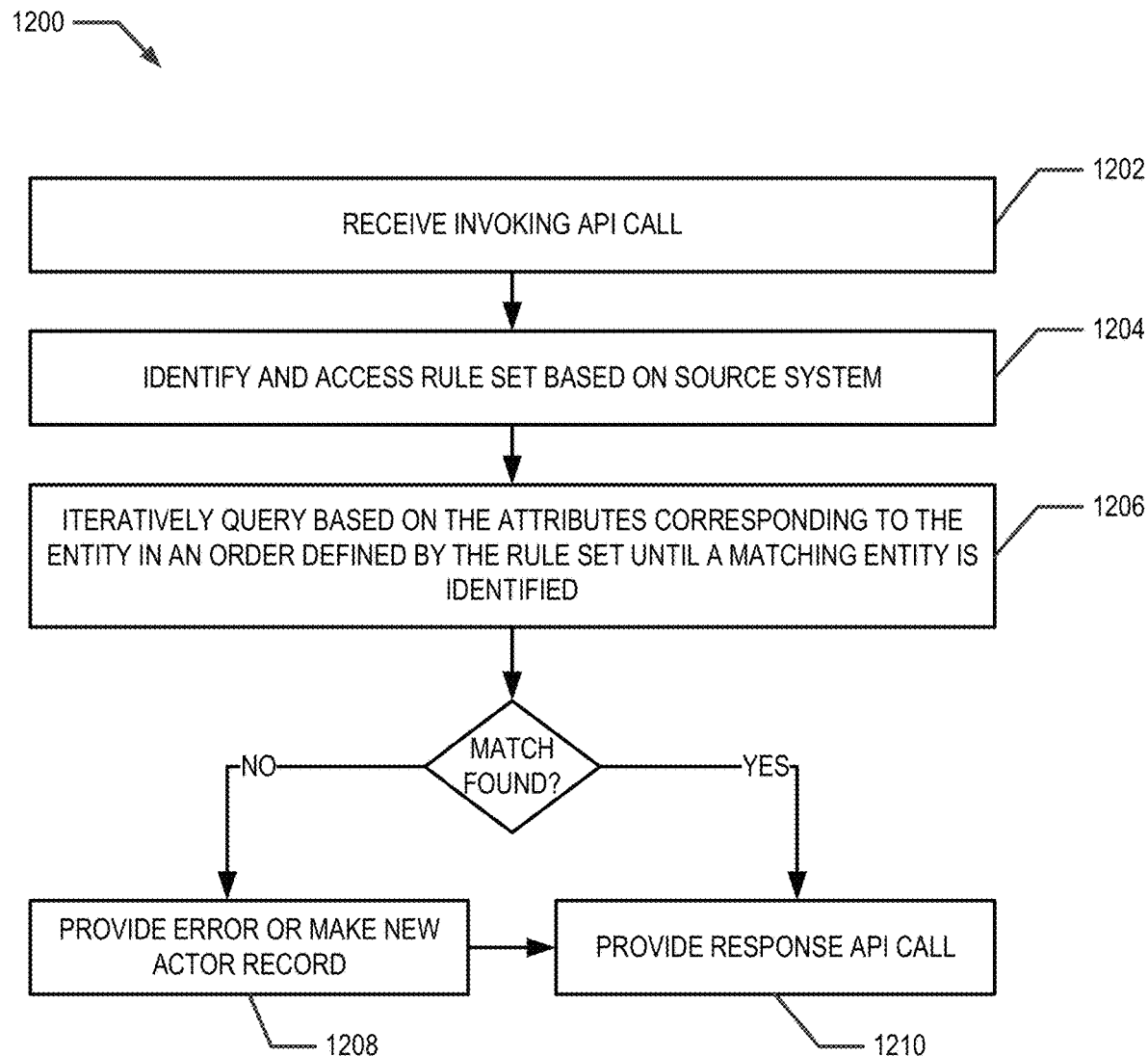
Figure 13:
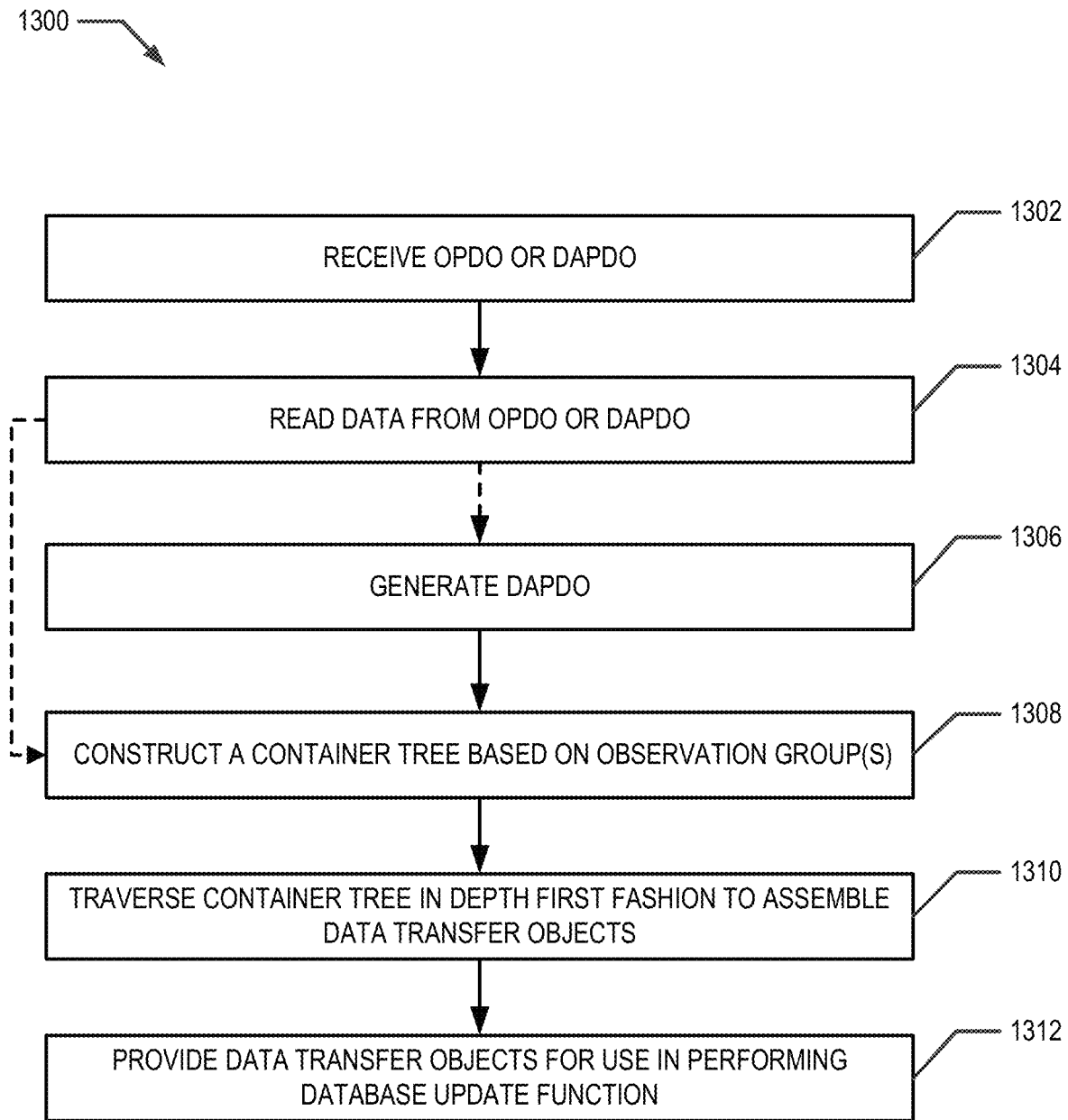
Figure 14:
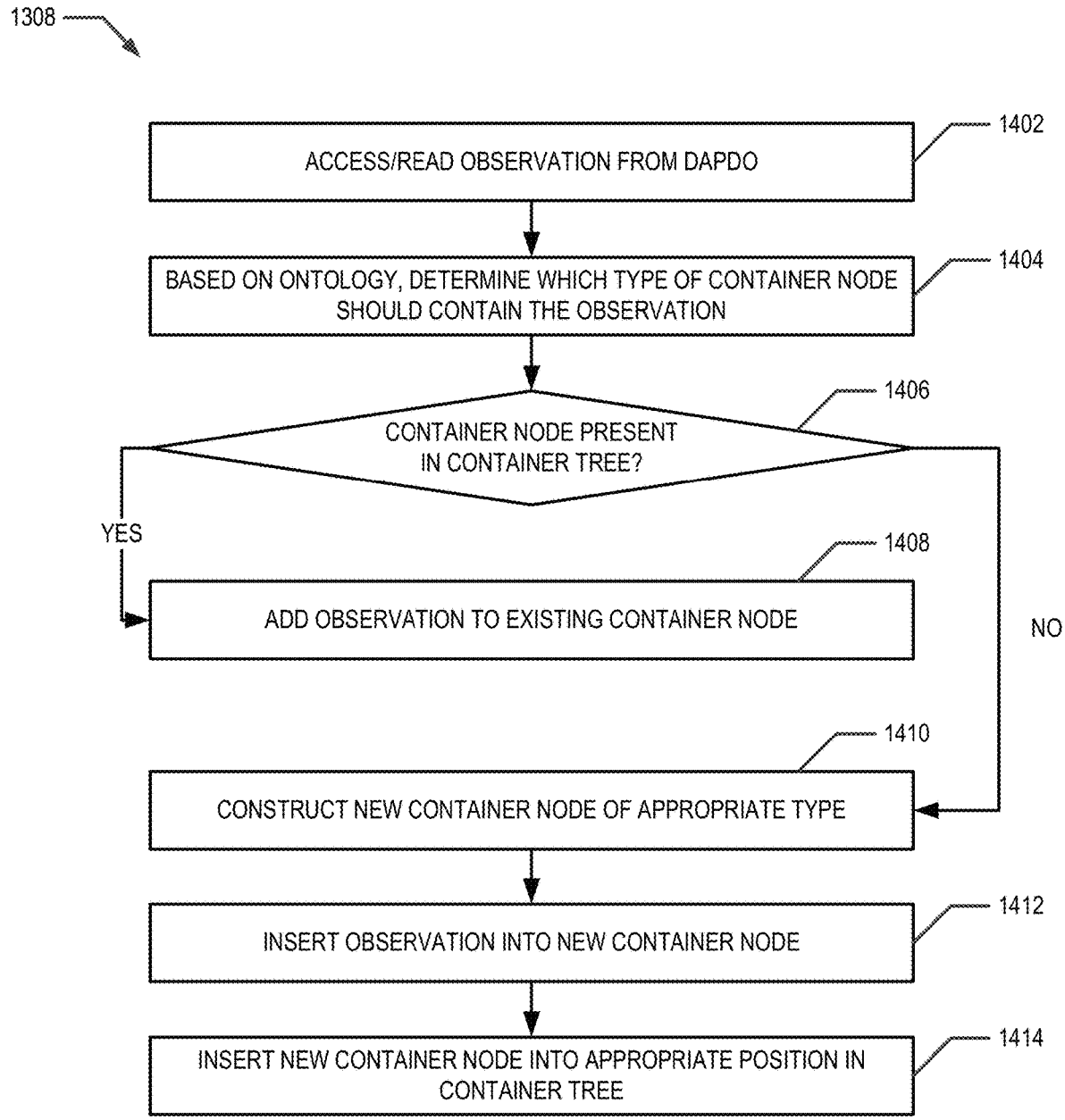
Figure 15:
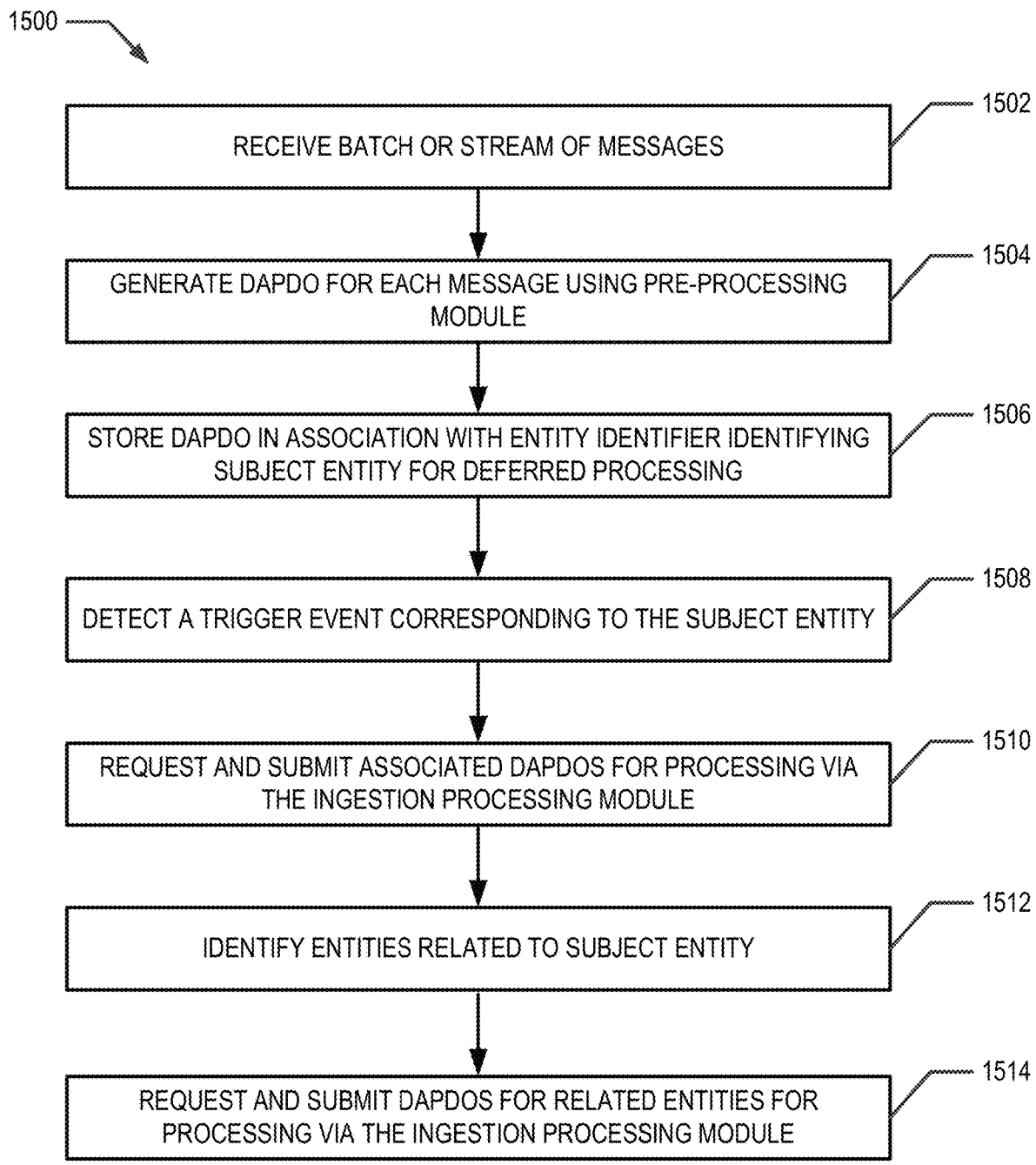
Figure 16:
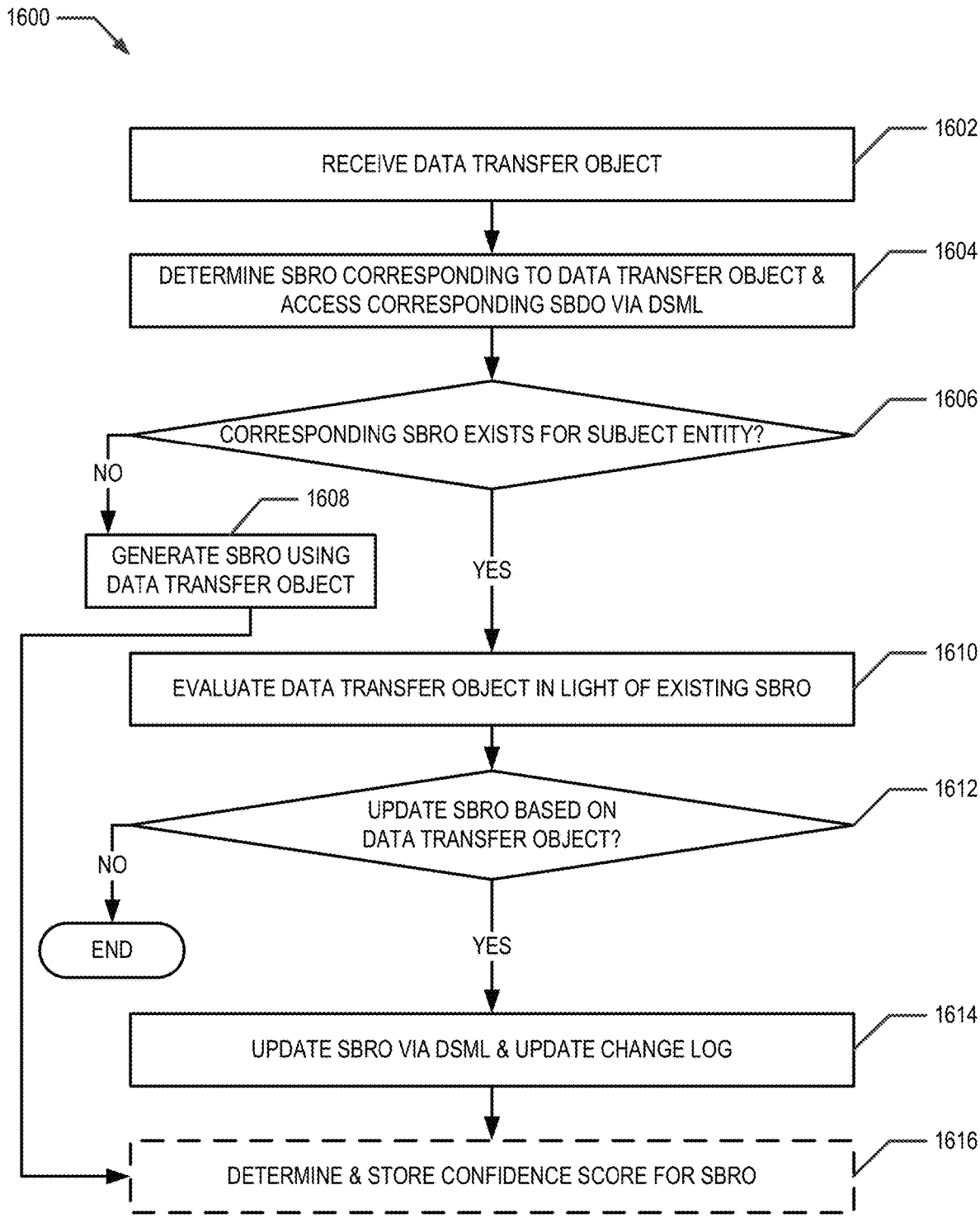
Figure 17A:
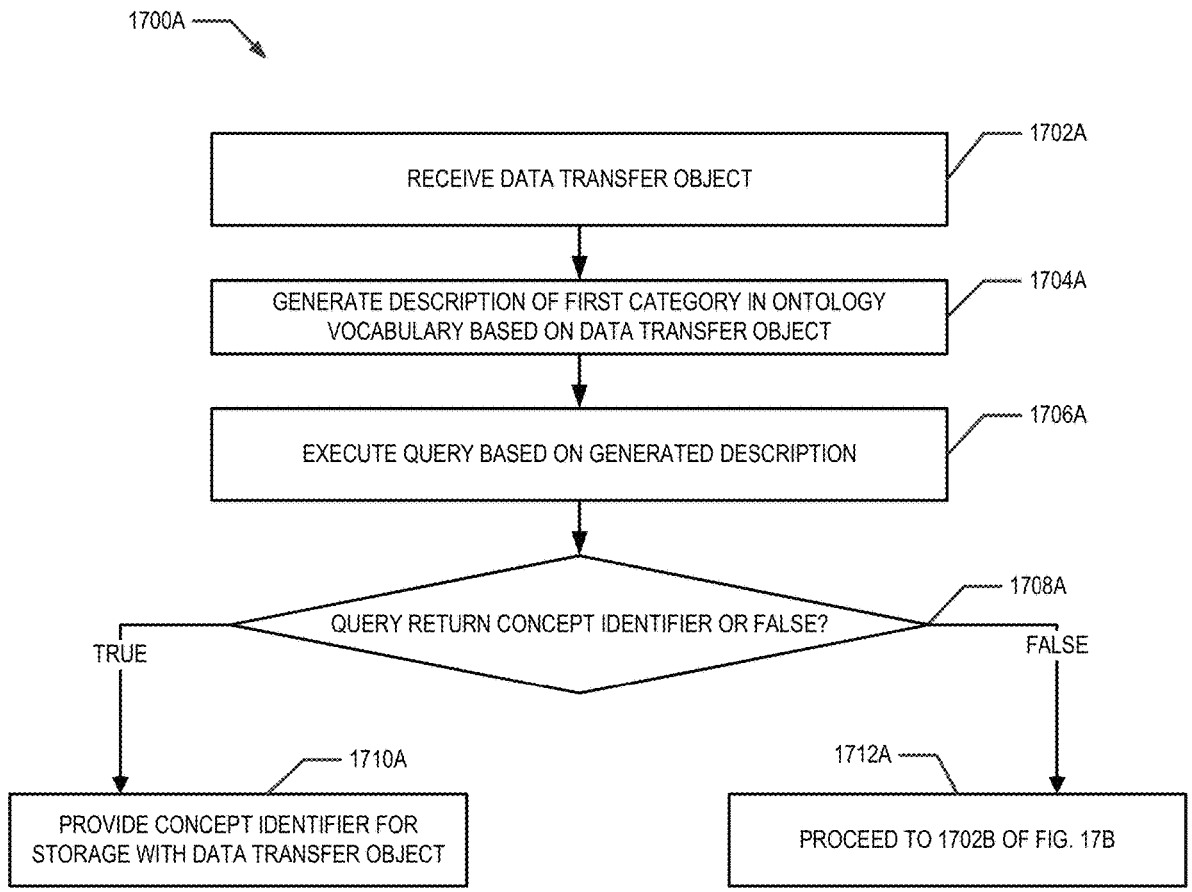
Figure 17B:
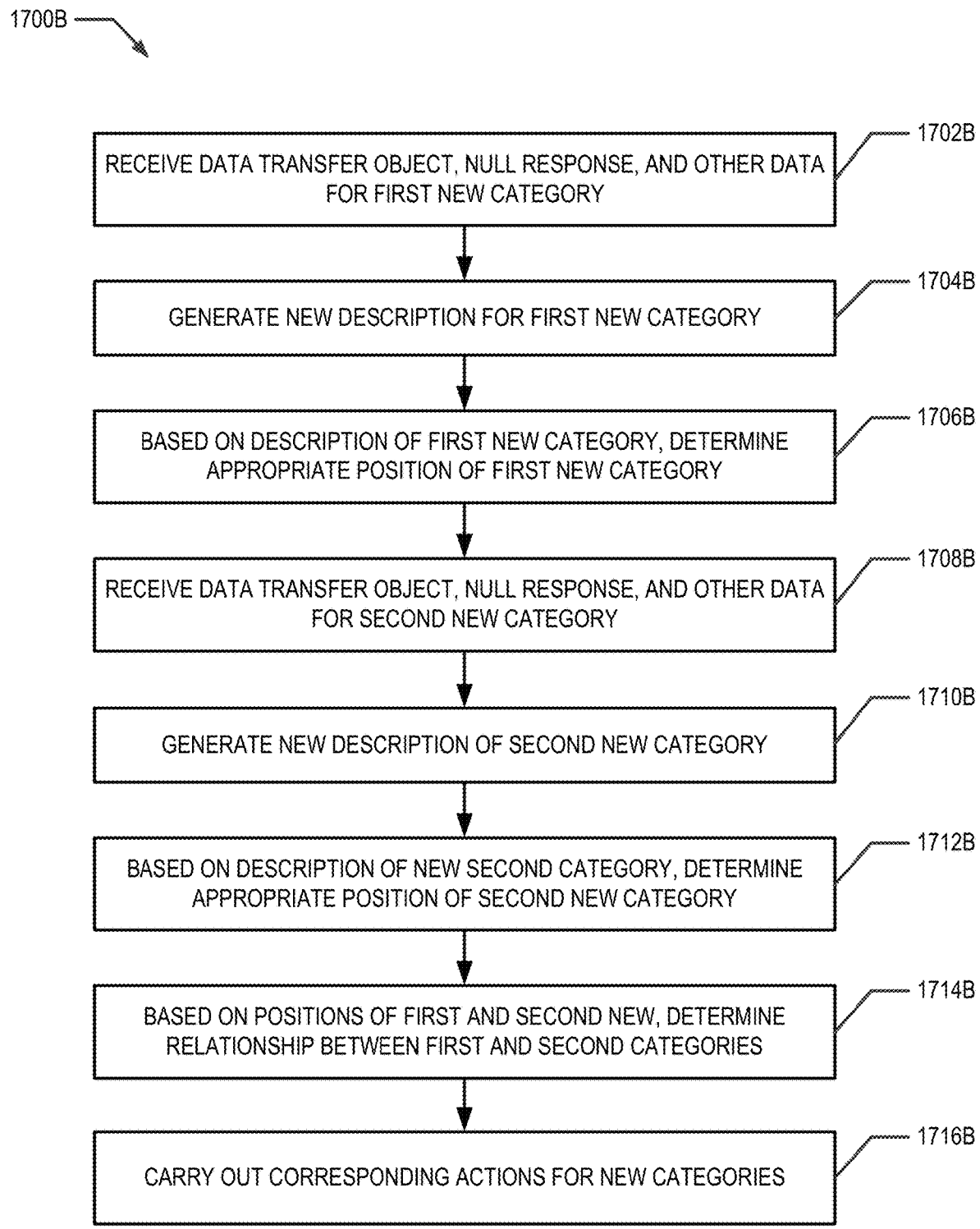
Figure 18:
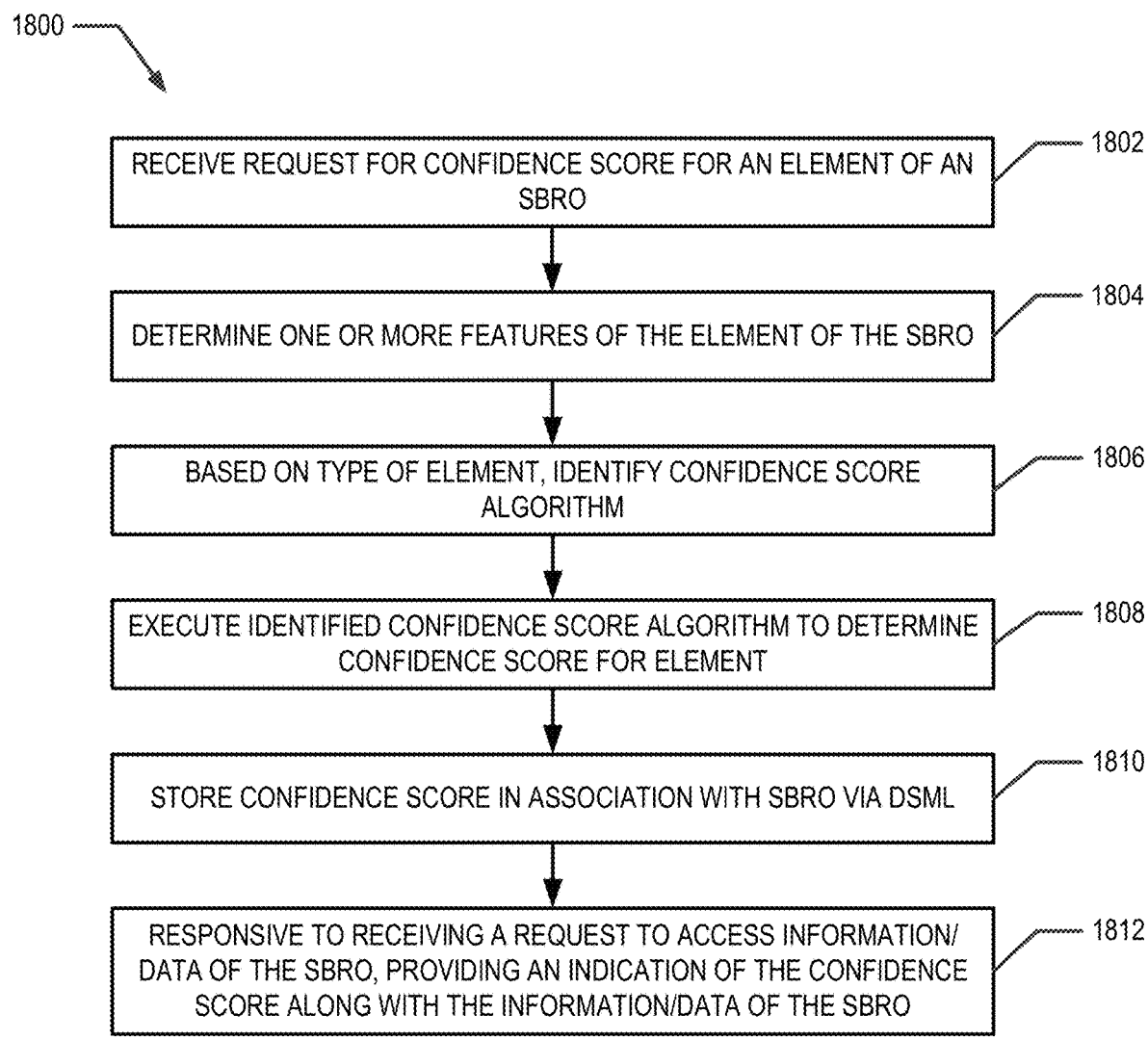
Figure 19:
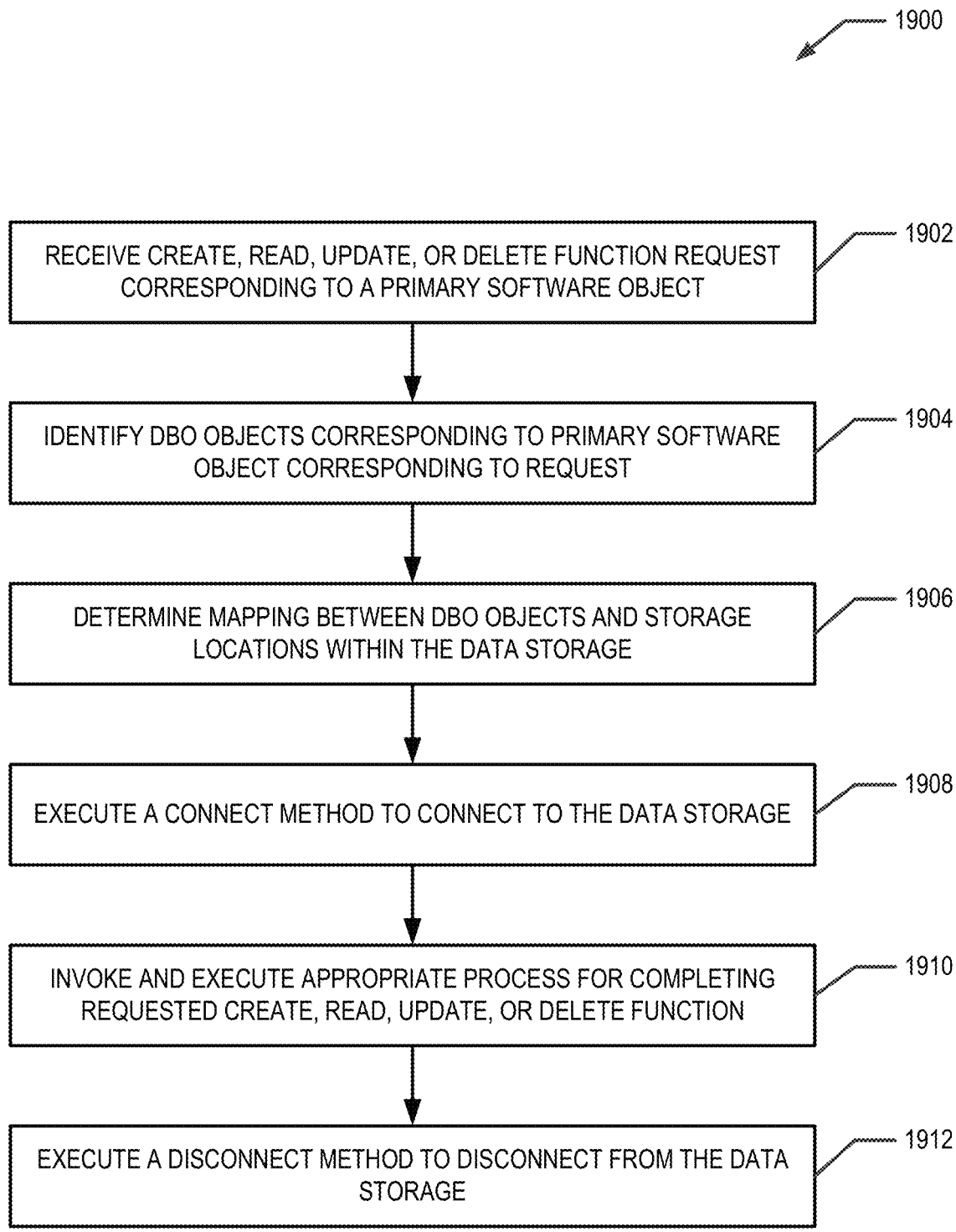
Figure 20:
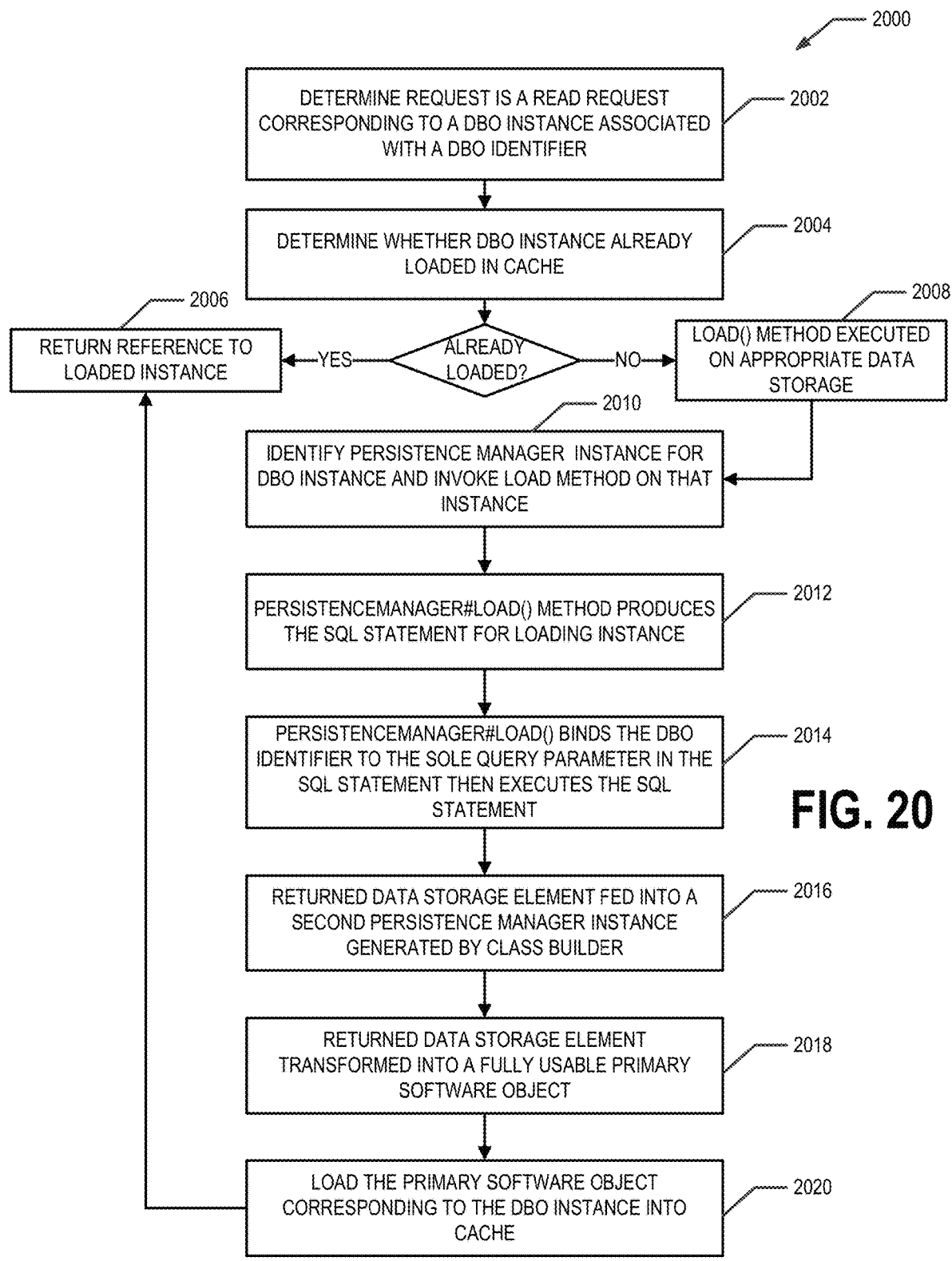
Figure 21:
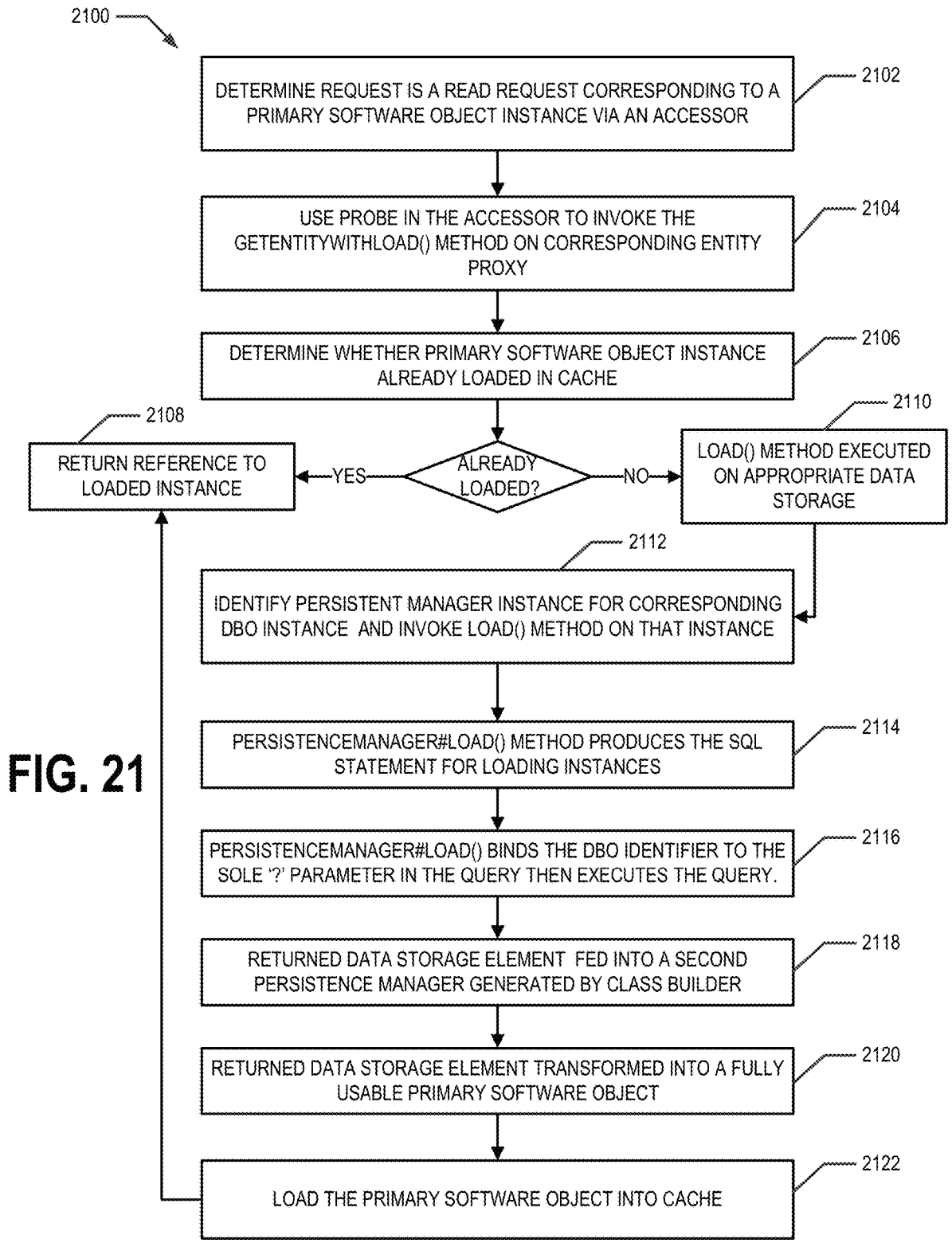
Figure 22:
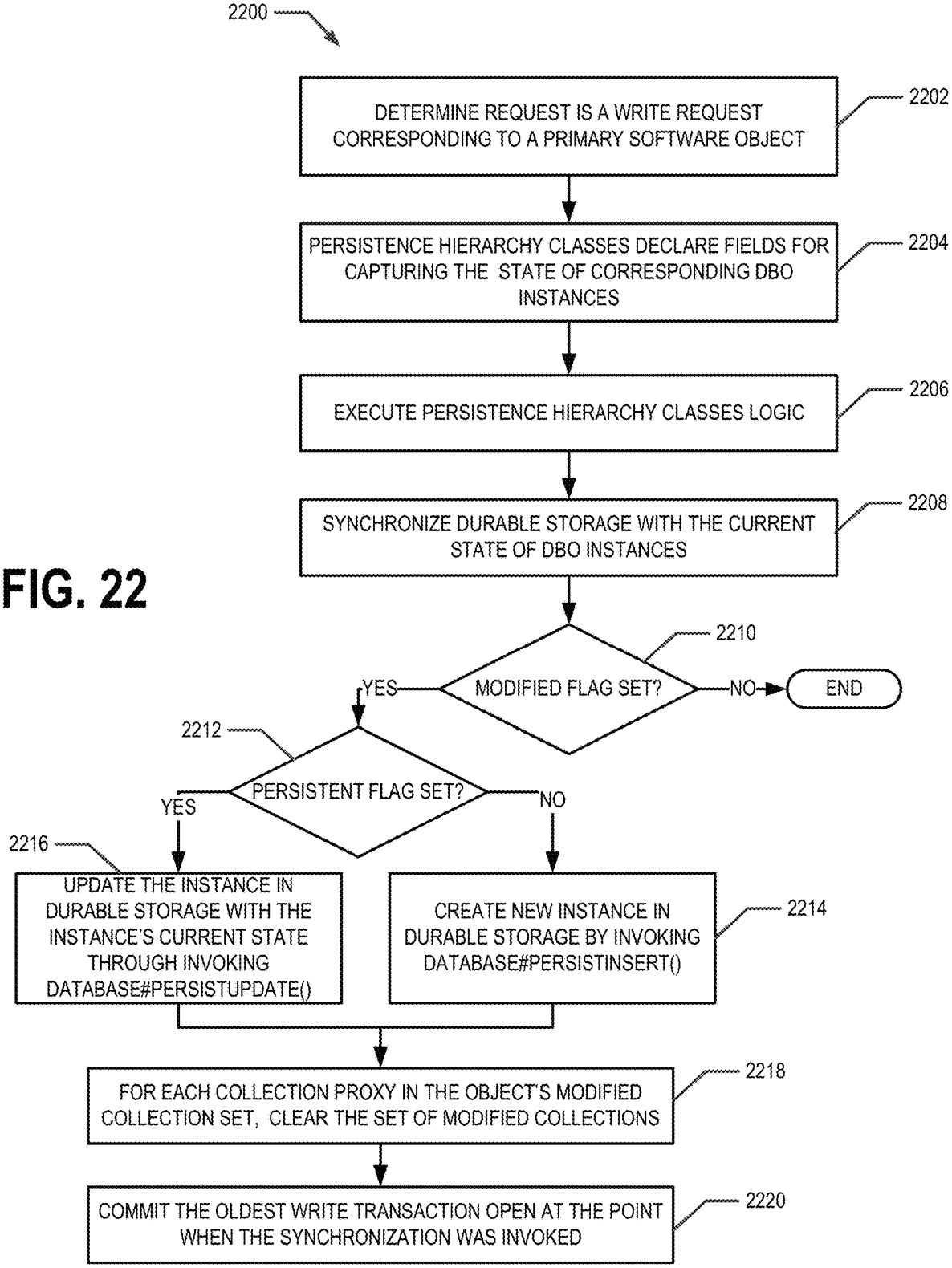
Figure 23:
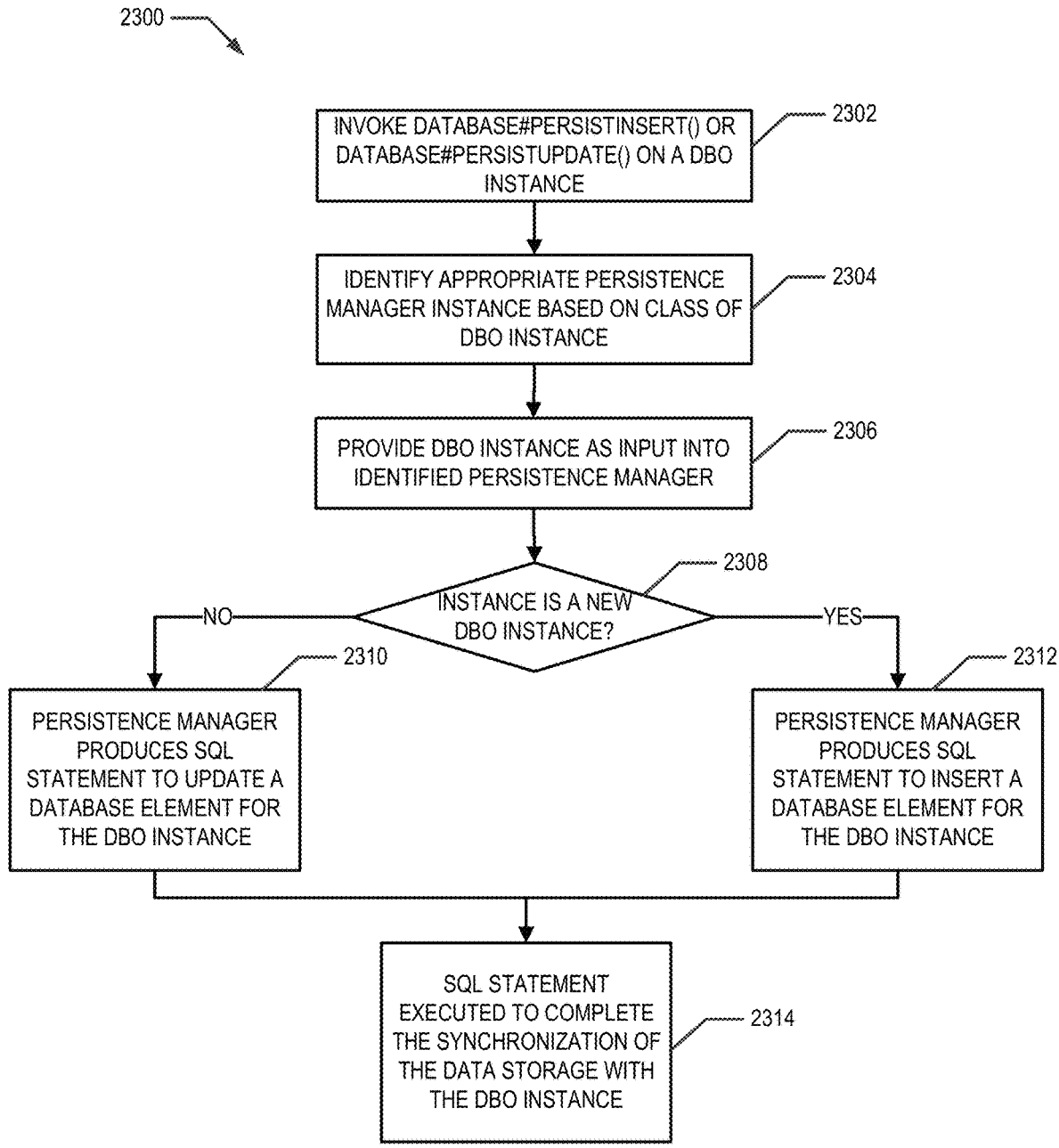
Figure 24:
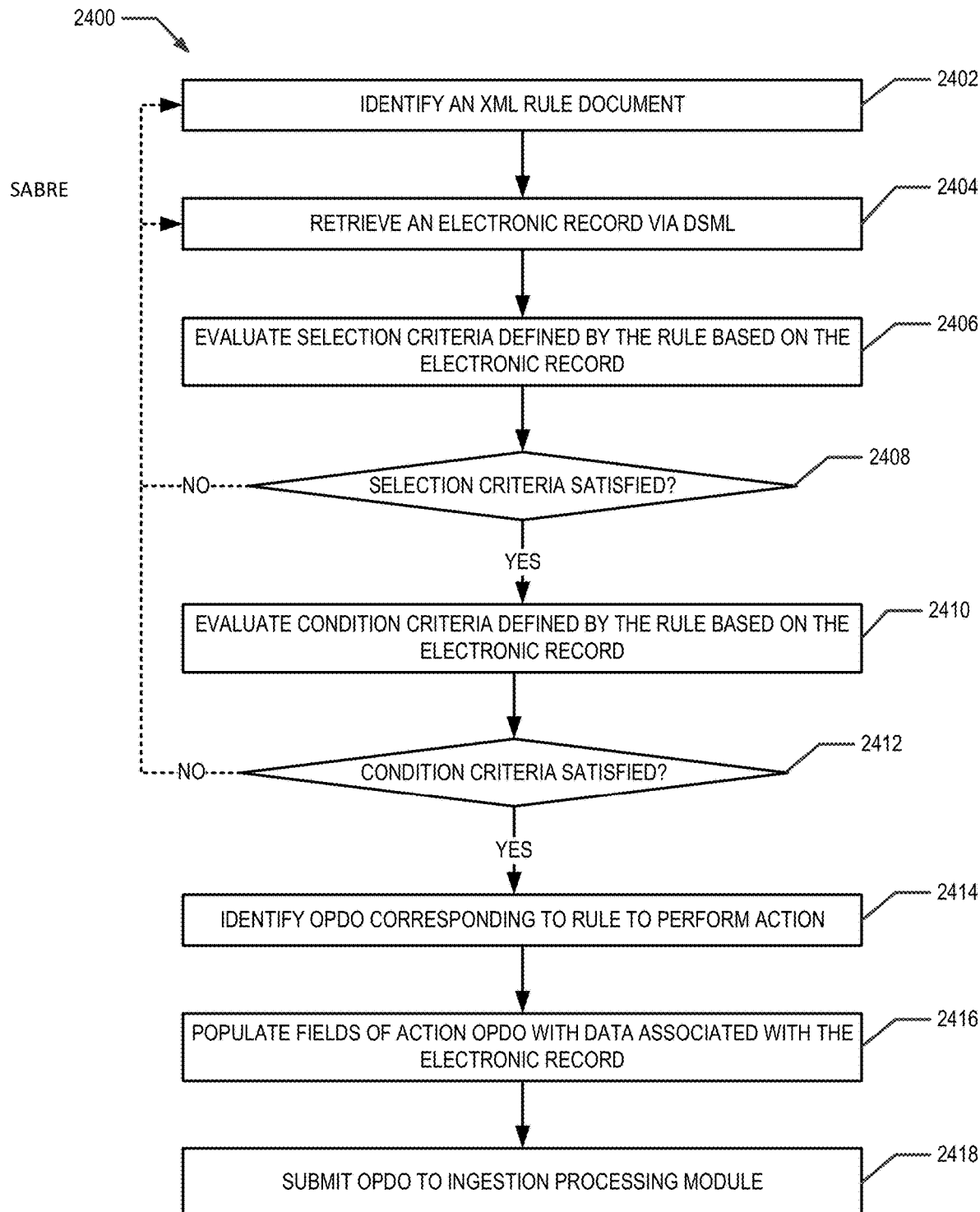
Figure 26:
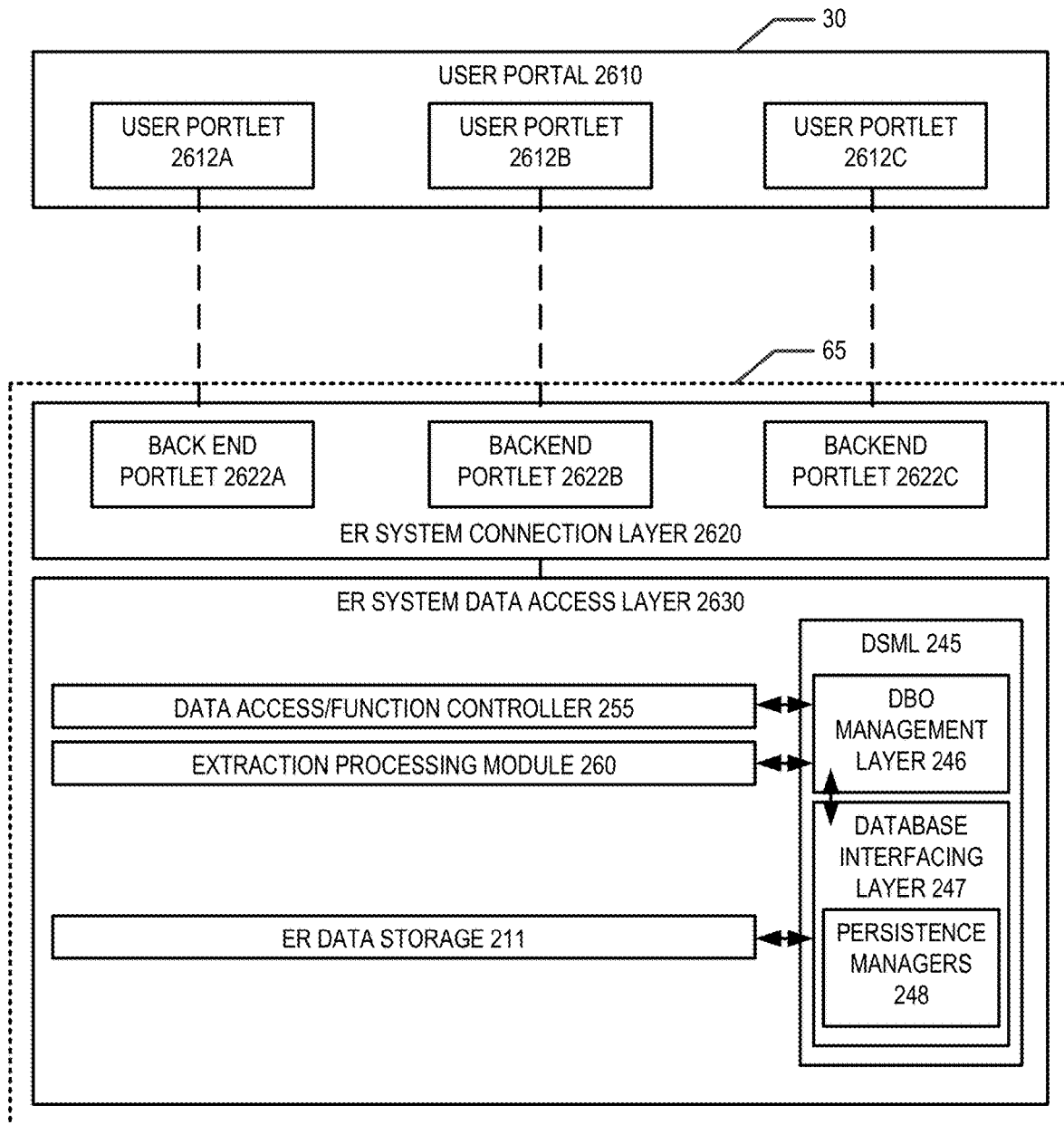
Figure 27:
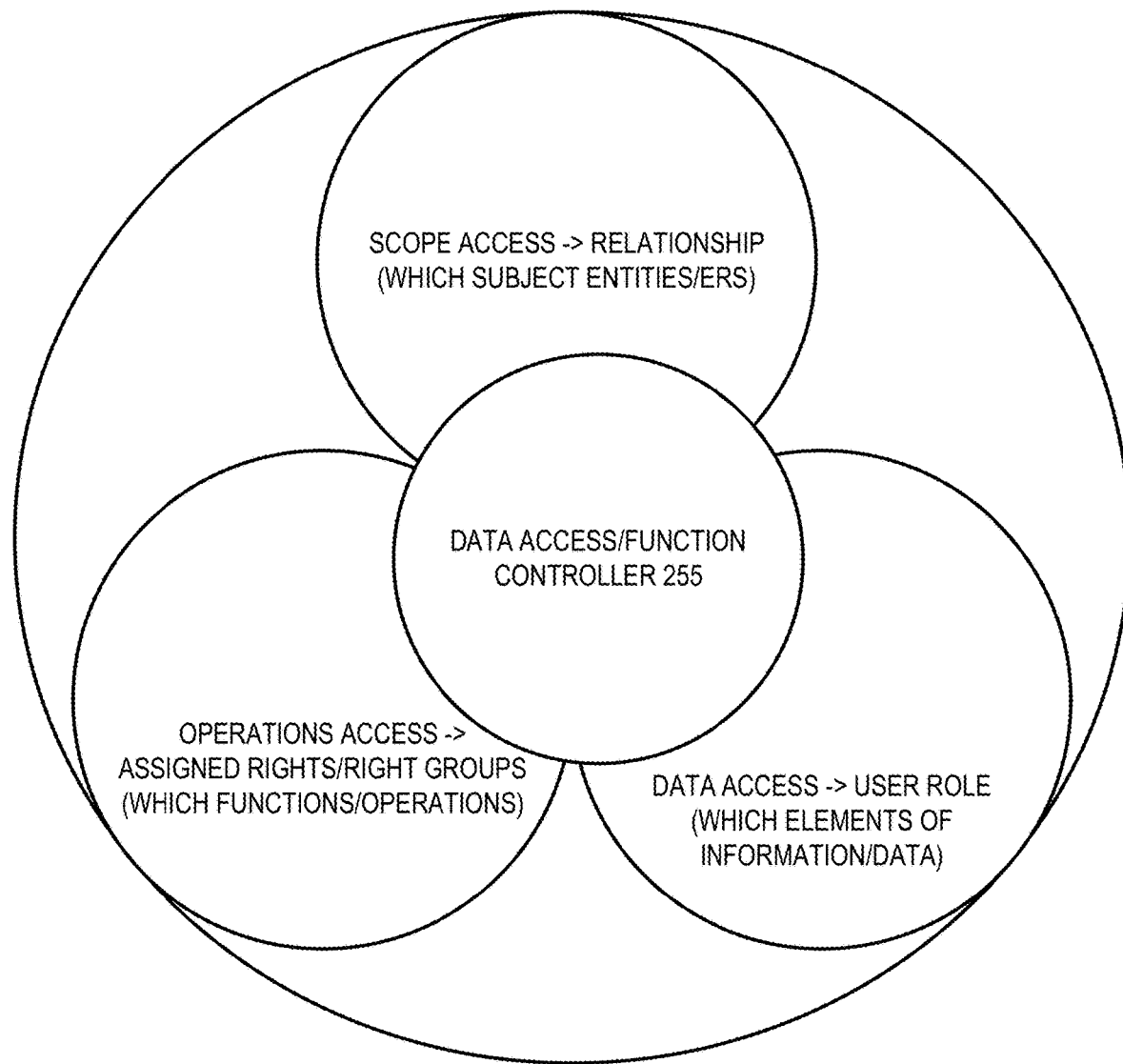
Figure 28:
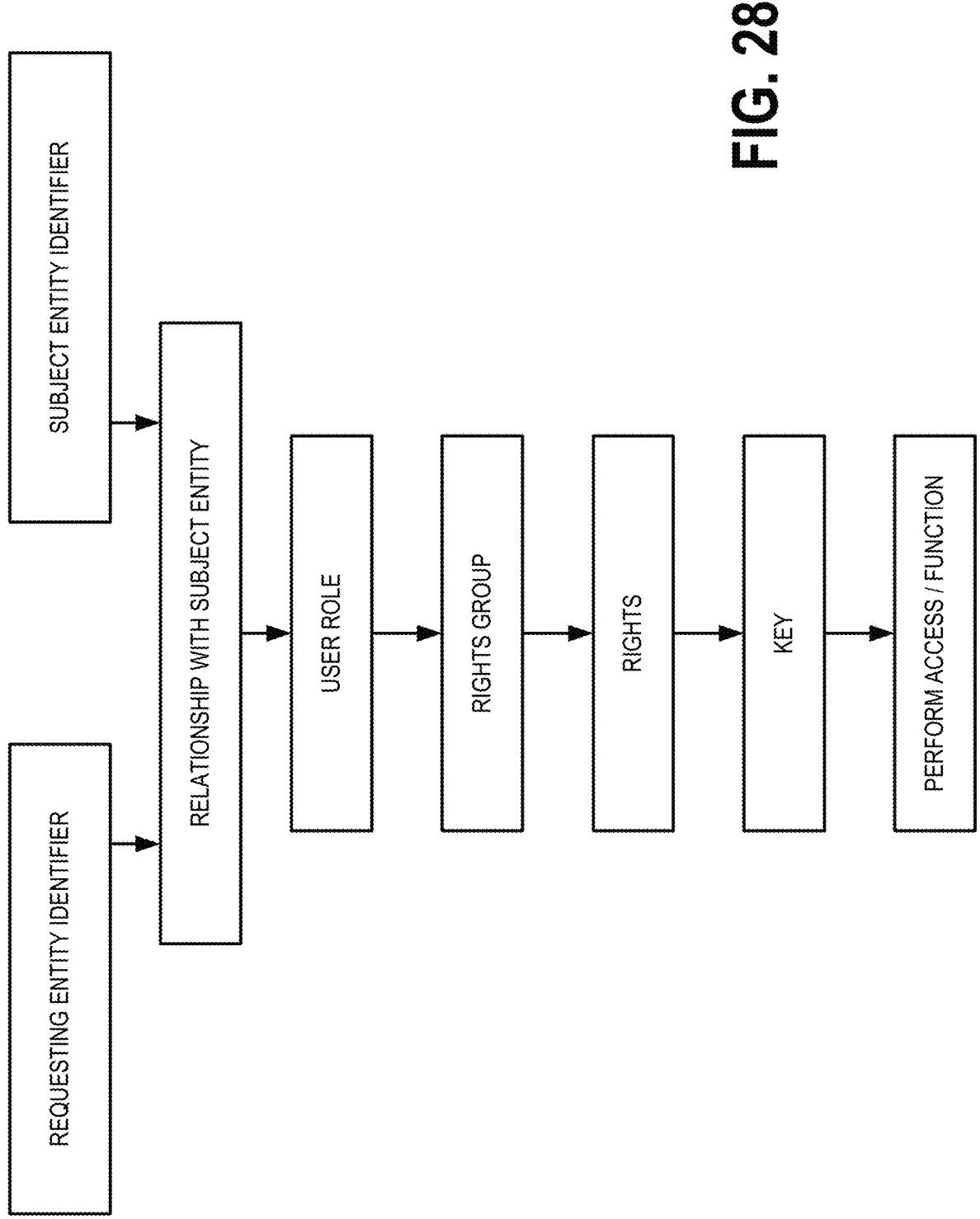
Figure 29:
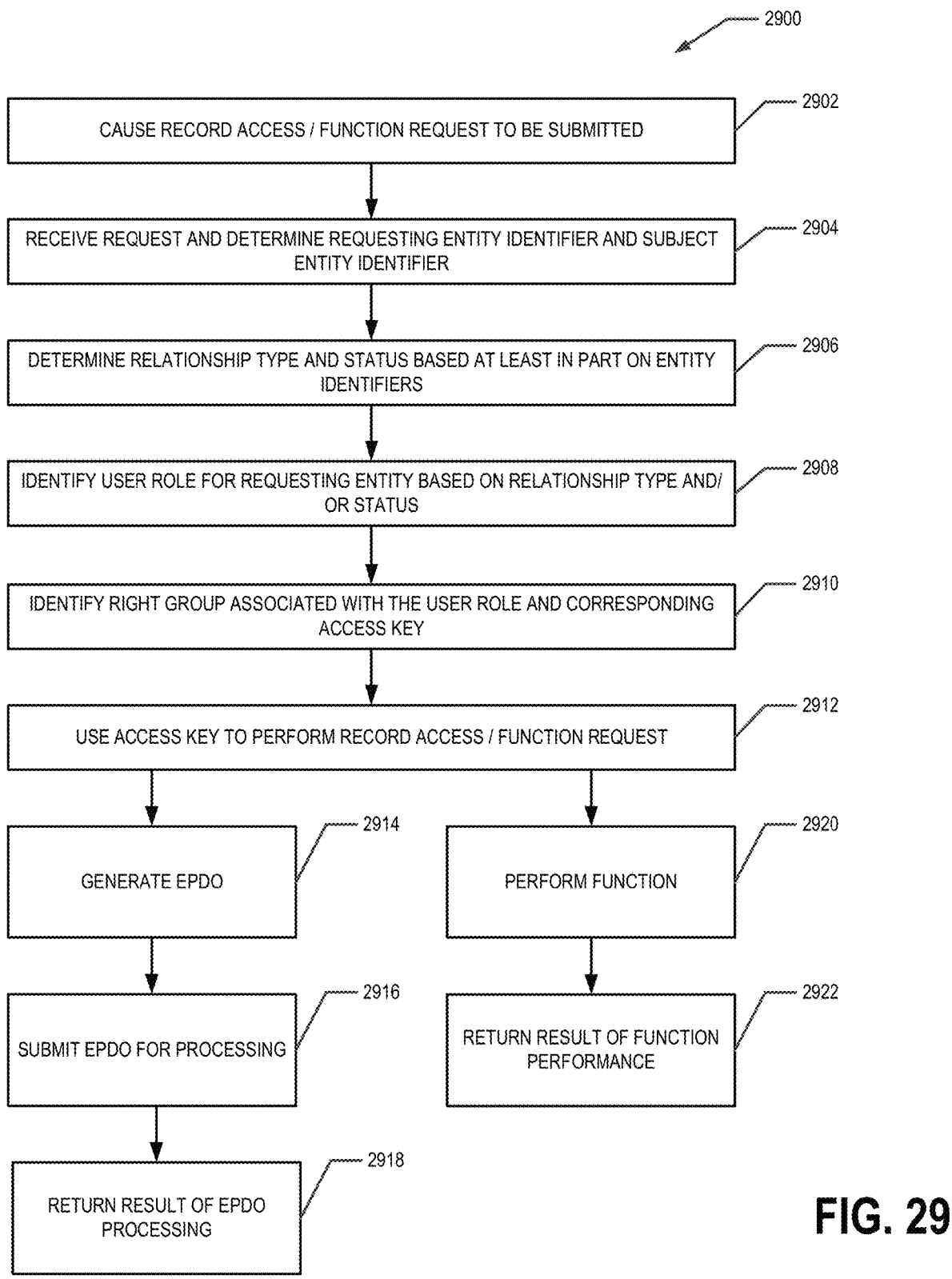
Figure 30A:
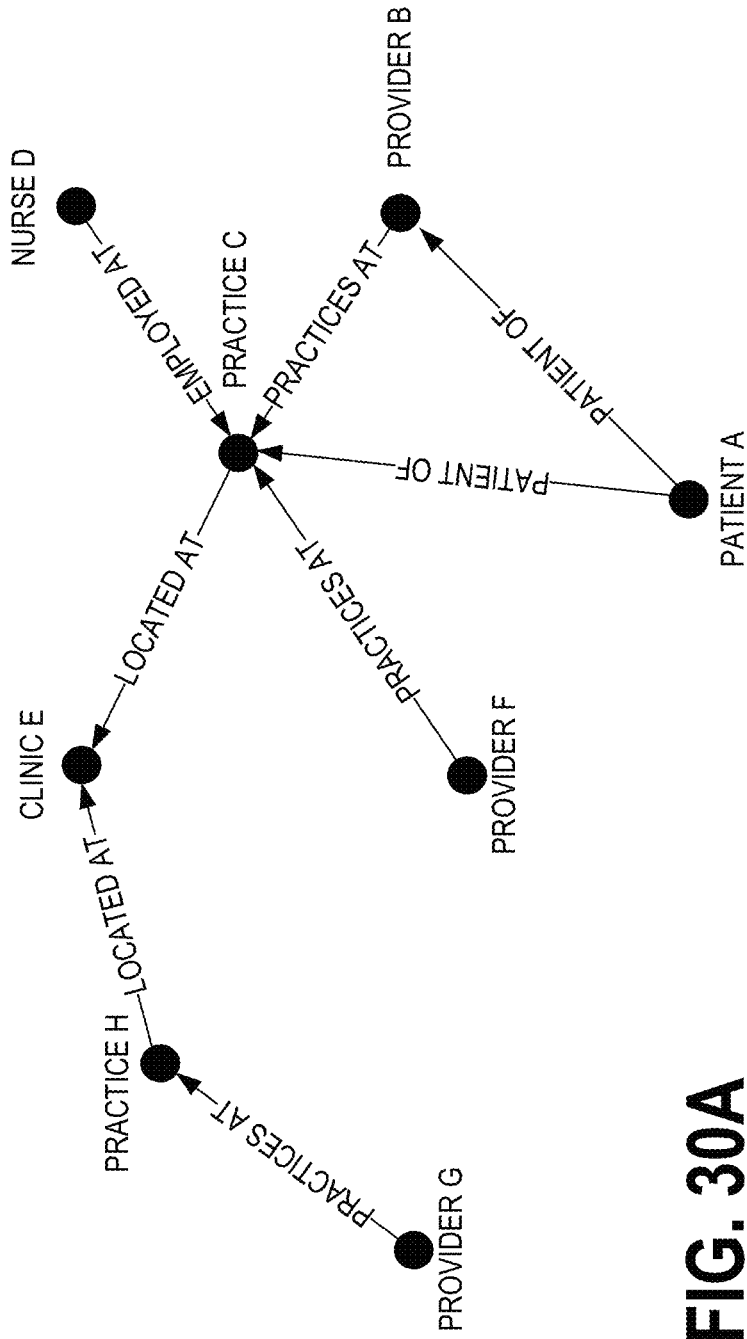
Figure 30B:
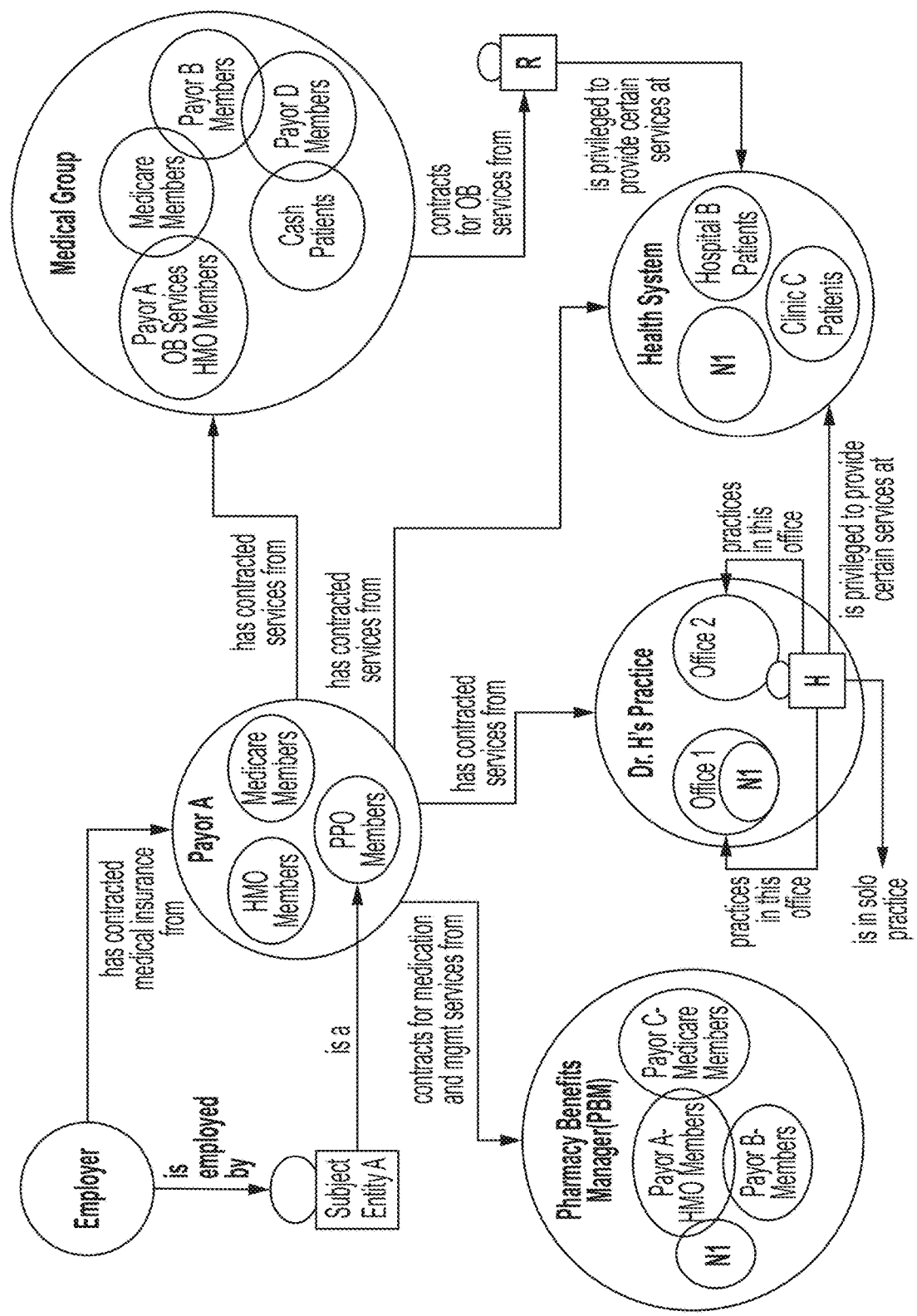
Figure 31:
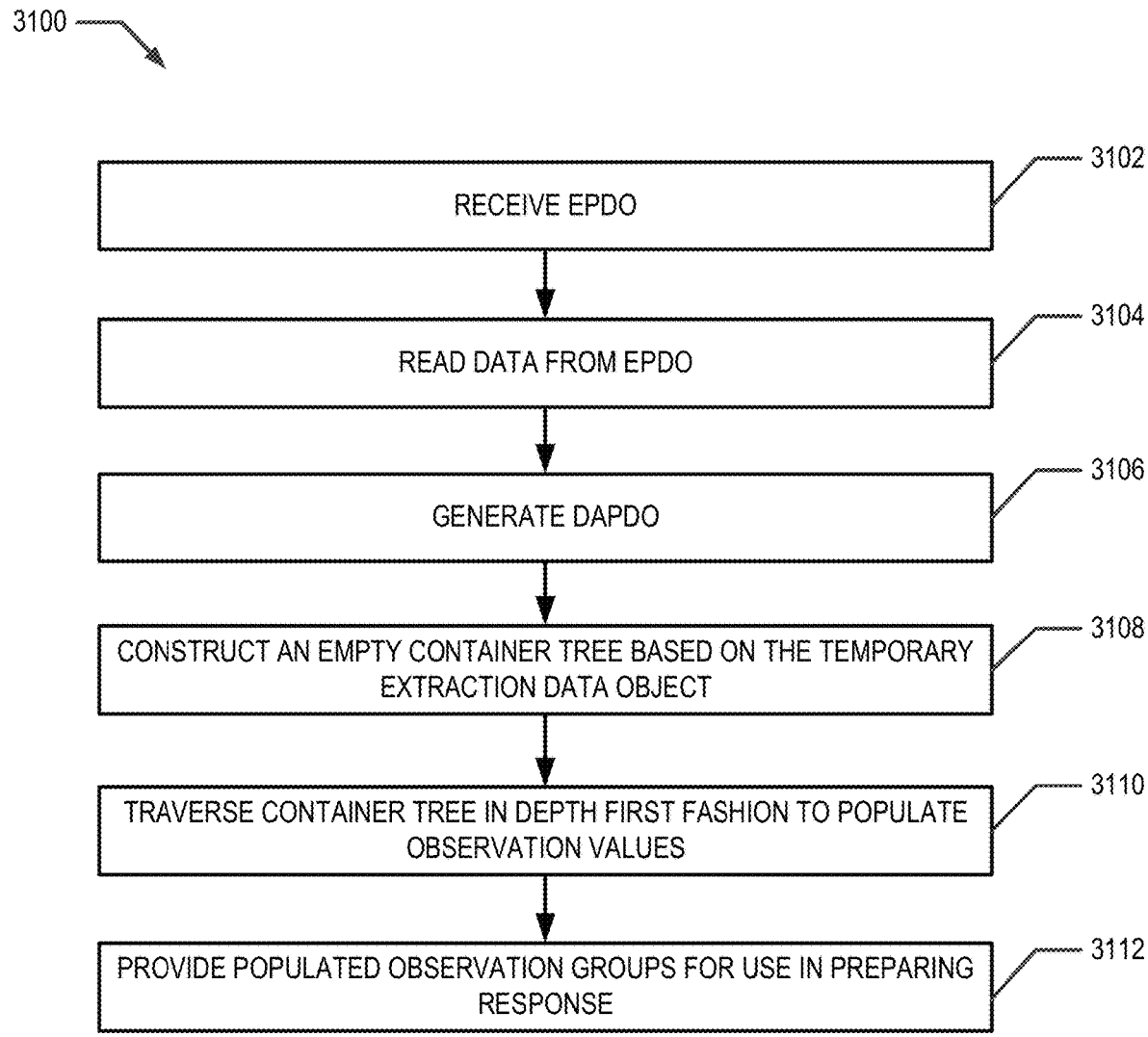
Figure 37:
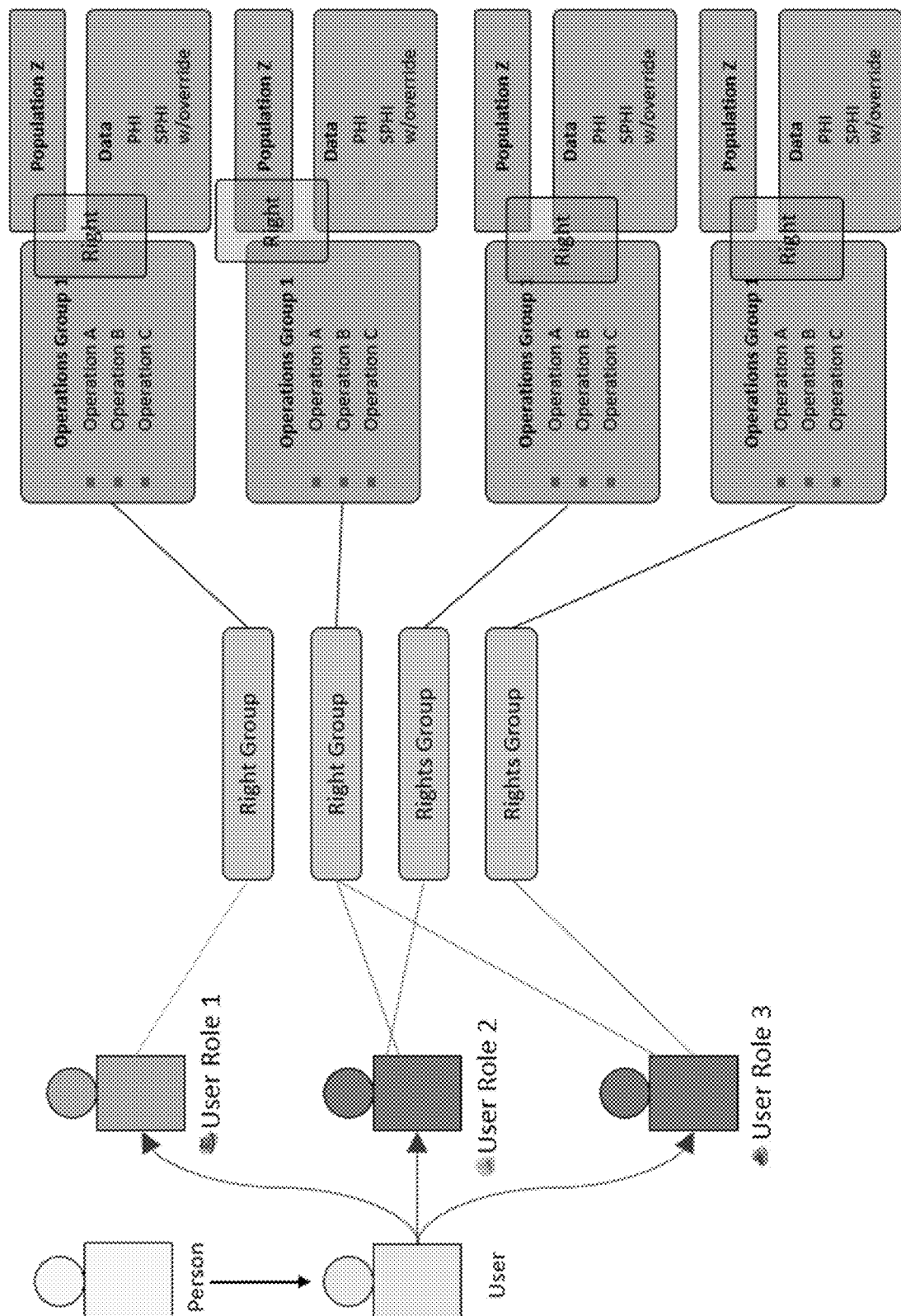

FIGS. 5A, 5B, and 5C each illustrate a slice of a graph data structure representing a portion of a graph-based domain ontology in accordance with certain embodiments of the present invention;

FIG. 6 illustrates a portion of an example ontology definition of the class "obstructive lung disease" and corresponding relationships to other classes in accordance with certain embodiments of the present invention;

FIG. 7A is a data flow diagram illustrating an information/data flow for various processes for managing, ingesting, monitoring, updating, and/or extracting/retrieving one or more ERs stored in the ER data store in accordance with certain embodiments of the present invention;

FIG. 7B is a data flow diagram illustrating an information/data flow for carious processes for retrieving information/data from one or more ERs stored in the ER data store in accordance with certain embodiments of the present invention;

FIG. 8 is a flowchart illustrating various processes, procedures, and/or operations performed, for instance, by a server of FIGS. 2A and 2B, to perform pre-processing of a message, in accordance with certain embodiments of the present invention;

FIG. 9 illustrates an example message in accordance with certain embodiments of the present invention;

FIG. 10A illustrates an example observable packet data object (OPDO) in accordance with certain embodiments of the present invention;

FIG. 10B illustrates an example data artifact packet tree data structure in accordance with certain embodiments of the present invention;

FIG. 10C illustrates an example extractable packet data object (EPDO) in accordance with certain embodiments of the present invention;

FIGS. 11A and 11B are schematic diagrams illustrating the extraction of attributes corresponding to entities from message data, in accordance with certain embodiments of the present invention;

FIG. 12 is a flowchart illustrating various processes, procedures, and/or operations performed, for example, by a server of FIGS. 2A and 2B, to perform entity matching, in accordance with certain embodiments of the present invention;

FIG. 13 is a flowchart illustrating various processes, procedures, and/or operations performed, for instance, by a server of FIGS. 2A and 2B, to perform processing of a message data artifact packet data object to update one or more ERs stored in an ER data store, in accordance with certain embodiments of the present invention;

FIG. 14 is a flowchart illustrating various processes, procedures, and/or operations performed, for example, by a server of FIGS. 2A and 2B, to construct a container tree data structure, in accordance with certain embodiments of the present invention;

FIG. 15 is a flowchart illustrating various processes, procedures, and/or operations performed, for instance, by a server of FIGS. 2A and 2B, to perform deferred processing (e.g., user interaction event processing) and/or prioritized processing, in accordance with certain embodiments of the present invention;

FIG. 16 is a flowchart illustrating various processes, procedures, and/or operations performed, for example, by a server of FIGS. 2A and 2B, to update an SBRO of an ER, in accordance with certain embodiments of the present invention;

FIGS. 17A and 17B are flowcharts illustrating various processes, procedures, and/or operations performed, for instance, by a server of FIGS. 2A and 2B, to reason against a graph-based domain ontology, in accordance with certain embodiments of the present invention;

FIG. 18 is a flowchart illustrating various processes, procedures, and/or operations performed, for example, by a server of FIGS. 2A and 2B, to determine a confidence score for an SBRO, in accordance with certain embodiments of the present invention;

FIG. 19 is a flowchart illustrating various processes, procedures, and/or operations performed, for instance, by a server of FIGS. 2A and 2B, to interact with the persistent storage of the ER data store, in accordance with certain embodiments;

FIG. 20 is a flowchart illustrating various processes, procedures, and/or operations performed, for example, by a server of FIGS. 2A and 2B, to complete an access request corresponding to the ER data store in various scenarios, in accordance with certain embodiments;

FIG. 21 is a flowchart illustrating various processes, procedures, and/or operations performed, for instance, by a server of FIGS. 2A and 2B, to complete an access request corresponding to the ER data store in other scenarios, in accordance with certain embodiments;

FIG. 22 is a flowchart illustrating various processes, procedures, and/or operations performed, for example, by a server of FIGS. 2A and 2B, to complete a write request corresponding to the ER data store, in accordance with certain embodiments of the present invention;

FIG. 23 is a flowchart illustrating various processes, procedures, and/or operations performed, for instance, by a server of FIGS. 2A and 2B, to synchronize an ER stored in the ER data store with a persistent object, in accordance with certain embodiments of the present invention;

FIG. 24 is a flowchart illustrating various processes, procedures, and/or operations performed, for example, by a server of FIGS. 2A and 2B, to update an ER record based at least in part on evaluation of a rule based at least in part on the ER record, in accordance with certain embodiments of the present invention;

FIGS. 25A-25T illustrates example formats for defining various portions of a rule, in accordance with certain embodiments of the present invention;

FIG. 26 is a block diagram illustrating various components related to a user accessing information/data of an ER stored in the ER data store, in accordance with certain embodiments of the present invention;

FIGS. 27 and 28 are schematic diagrams illustrating how access to information/data stored in the ER data store is controlled in accordance with certain embodiments;

FIG. 29 is a flowchart illustrating various processes, procedures, and/or operations performed, for example, by a server of FIGS. 2A and 2B, to control access to information/data of an ER stored in the ER data store, in accordance with certain embodiments of the present invention;

FIGS. 30A and 30B each illustrate an example portion of a graph data structure (e.g., relationship graph) defined by a graph-based domain ontology, in accordance with certain embodiments;

FIG. 31 is a flowchart illustrating various processes, procedures, and/or operations performed, for instance, by a server of FIGS. 2A and 2B, to process an extractable packet data object to generate/create one or more observation groups comprising information/data from an ER stored in the ER data store, in accordance with certain embodiments of the present invention;

FIGS. 32, 33, 34A, 34B, 35, and 36 illustrate exemplary screenshots of interfaces and outputs, in accordance with certain embodiments; and FIG. 37 illustrates exemplary relationships for data access and function control, in accordance with certain embodiments.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require a conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data store construct. Software components of a similar type or functionally related may be stored together such as, for instance, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like executing instructions, operations, steps, and similar words used interchangeably (e.g., the executable instructions, instructions for execution, program code, and/or the like) on a computer-readable storage medium for execution. For instance, retrieval, loading, and execution of code may be performed sequentially such that one instruction is extracted/retrieved, loaded, and executed at a time. In some exemplary embodiments, retrieval, loading, and/or execution may be performed in parallel such that multiple instructions are extracted/retrieved, loaded, and/or executed together. Thus, such embodiments can produce specifically-configured machines, performing the steps or operations specified in the block diagrams and flowchart illustrations. Accordingly, the block diagrams and flowchart illustrations support various combinations of embodiments for performing the specified instructions, operations, or steps.

II. Exemplary Platform/System Architecture

Figure 1:
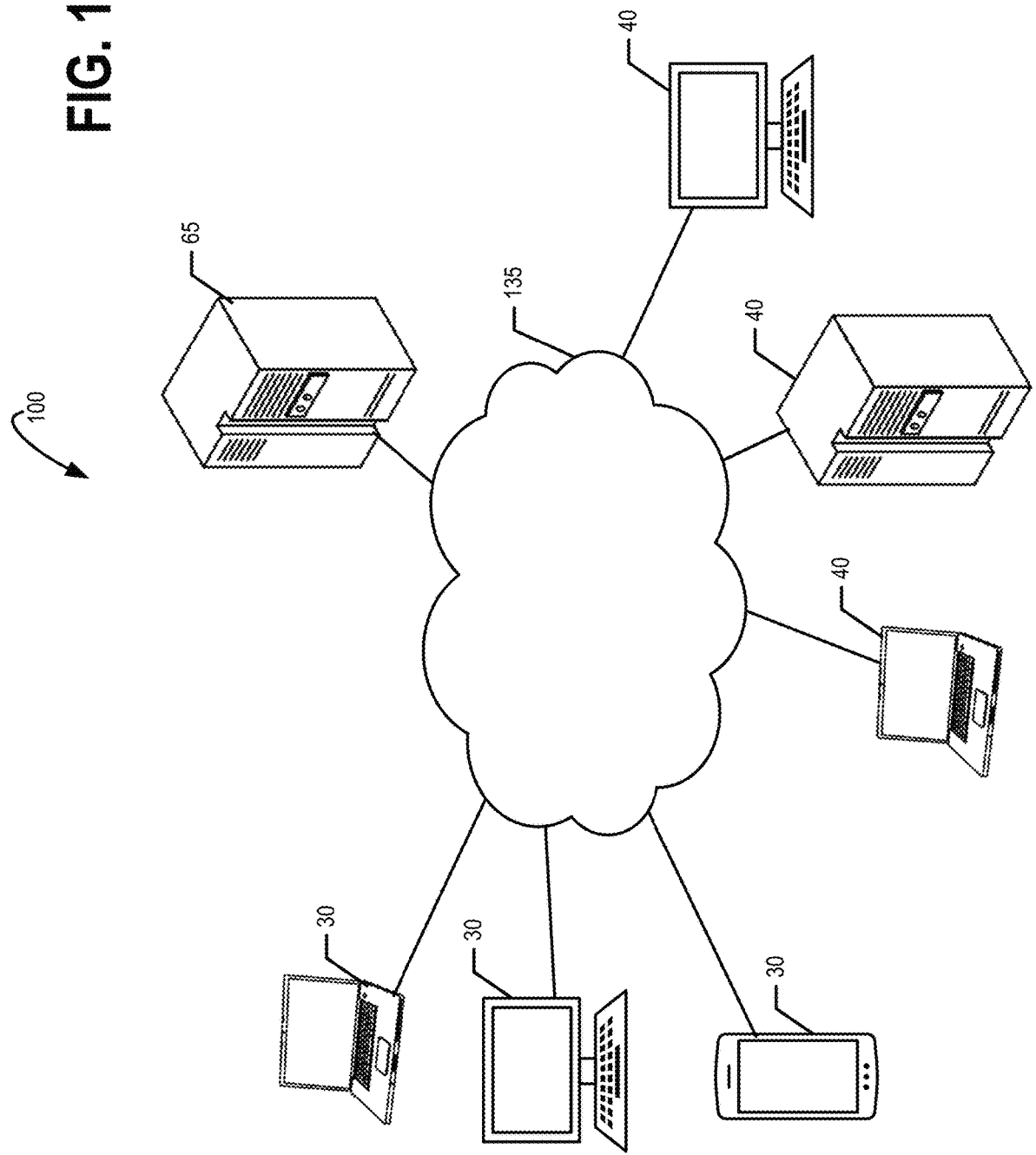
FIG. 1 is a diagram of a system that can be used in conjunction with various embodiments of the present invention.

FIG. 1 provides an illustration of a platform/system architecture 100 (also referred herein as the ER system 100) that can be used in conjunction with various embodiments of the present invention. As shown in FIG. 1, the ER system 100 may comprise one or more servers 65, one or more source systems 40, one or more user computing entities 30, one or more networks 135, and/or the like. In various embodiments, the one or more user computing entities 30 may comprise provider computing entities, patient/member computing entities, and/or computing entities operated by and/or on behalf of other entities. In various embodiments, the source systems 40 comprise claims processing systems, laboratory computing entities, user computing entities 30, and/or the like. Each of the components of the ER system 100 may be in electronic communication with, for example, one another over the same or different wireless or wired networks 135 including, for instance, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

Exemplary Server

FIG. 2A provides a schematic of a server 65 according to one embodiment of the present invention. In various embodiments, the server 65 (e.g., one or more servers, server systems, computing entities, and/or similar words used herein interchangeably) executes one or more program modules, application program code, sets of computer executable instructions, and/or the like to receive and process messages based at least in part on a graph-based domain ontology, generate/create, update, and/or manage an electronic record (ER) database, provide and/or control user access to information/data stored in the ER data store 211 (e.g., database), and/or the like. In general, the terms server, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for instance, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the server 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 65 may communicate with other computing entities, one or more user computing entities 30, one or more source systems 40, and/or the like.

As shown in FIG. 2A, in one embodiment, the server 65 may include or be in communication with one or more processing elements 205 (also referred to as processors, processing circuitry, and/or similar terms used herein interchangeably) that communicate with other elements within the server 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. As noted in the definitions, the term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the server 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, metadata repositories database instances, database management system entities, data, applications, programs, program modules, scripts, source code, object code, byte code, compiled code, interpreted code, machine code, executable instructions, and/or the like. For instance, as shown in FIG. 2B, the memory media 206 may store computer executable code that, when executed by the processing element 205, causes the operation of a message pre-processing module 220, ingestion processing module 225, programmatic reasoning logic 230, confidence score engine 235, identity matching service 240, data store management layer (DSML) 245, the rules engine 250, data access/function controller 255, extraction processing module 260, SBRO processing module 265, and/or the like, which are described in detail elsewhere herein. Though described as modules herein, the message pre-processing module 220, ingestion processing module 225, programmatic reasoning logic 230, confidence score engine 235, identity matching service 240, the DSML 245, rules engine 250, data access/function controller 255, extraction processing module 260, and/or SBRO processing module 265 may be embodied by various forms of computer-executable instructions, program/application code, and/or the like, in various embodiments. The terms "database," "database instance," "database management system," and/or similar terms used herein interchangeably and in a general sense to refer to a structured or unstructured collection of information/data that is stored in a computer-readable storage medium.

Memory media 206 (e.g., metadata repository) may also be embodied as a data store device or devices, as a separate database server or servers, or as a combination of data store devices and separate database servers. Further, in some embodiments, memory media 206 may be embodied as a distributed repository such that some of the stored information/data is stored centrally in a location within the ER system 100 and other information/data is stored in one or more remote locations. Alternatively, in some embodiments, the distributed repository may be distributed over a plurality of remote storage locations only. An example of the embodiments contemplated herein would include a cloud data store system maintained by a third party provider and where some or all of the information/data required for the operation of the ER system 100 may be stored. As a person of ordinary skill in the art would recognize, the information/data required for the operation of the ER system 100 may also be partially stored in the cloud data store system and partially stored in a locally maintained data store system.

Memory media 206 (e.g., metadata repository) may include information/data accessed and stored by the ER system 100 to facilitate the operations of the ER system 100. More specifically, memory media 206 may encompass one or more data stores configured to store information/data usable in certain embodiments. For example, as shown in FIG. 2B, metadata for data assets may be stored in metadata repositories encompassed within the memory media 206. The metadata for the data assets in the metadata data stores, metadata repositories, and similar words used herein interchangeably may comprise ER data store 211, ontology data 212, source system data 213, DBO class data 214, and/or various other types of information/data. In an example embodiment, the memory media 206 may store patient/member data repositories (ERs), provider data repositories, care standard data repositories, and/or the like. As will be recognized, metadata repositories are inventories data assets in an organization's environment.

In one embodiment, the server 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for instance, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the server 65 with the assistance of the processing element 205 and operating system.

As indicated, in one embodiment, the server 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the server 65 may communicate with computing entities or communications interfaces of other servers 65, user computing entities 30, and/or the like. In this regard, the server 65 may access various data assets.

As indicated, in one embodiment, the server 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the server 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The server 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the server's components may be located remotely from other server 65 components, such as in a distributed system. Furthermore, one or more of the components may be aggregated and additional components performing functions described herein may be included in the server 65. Thus, the server 65 can be adapted to accommodate a variety of needs and circumstances.

Exemplary User Computing Entity

Figure 3:
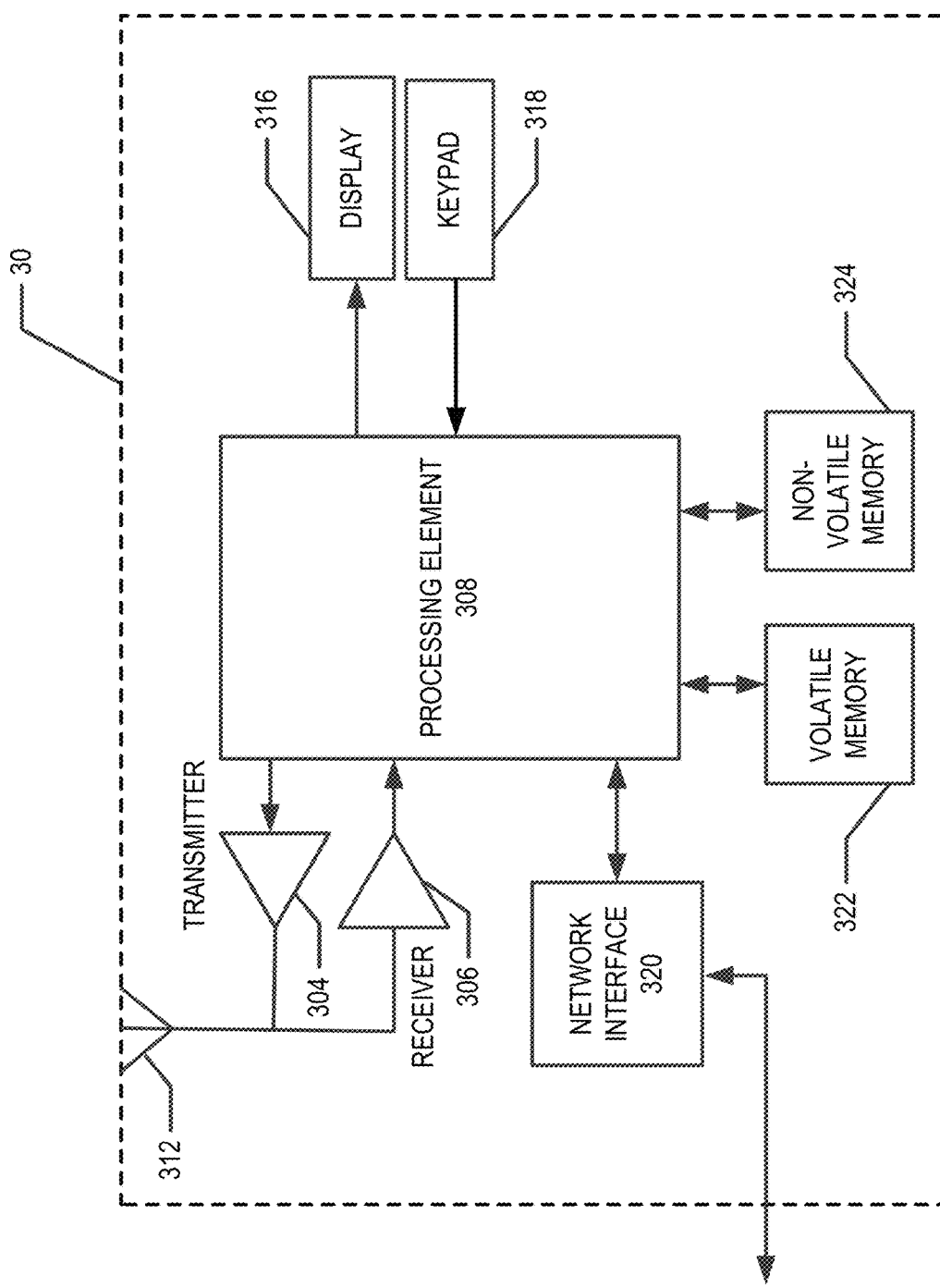
FIG. 3 is a schematic of a user computing entity in accordance with certain embodiments of the present invention.

FIG. 3 provides an illustrative schematic representative of user computing entity 30 that can be used in conjunction with embodiments of the present invention. In various embodiments, a user computing entity 30 may be a provider computing entity operated by and/or on behalf of a provider. In various embodiments, a provider is a service provider. For instance, in an example embodiment, a provider is a healthcare provider; clinic; hospital; healthcare provider group; administrative and/or clinical staff associated with a healthcare provider, clinic, hospital, healthcare provider group, and/or the like; and/or other provider of healthcare services. In various embodiments, a user computing entity 30 is a patient/member computing entity. In various embodiments, a user computing entity 30 operates and/or is in communication with (e.g., is a client, thin client, and/or the like) a computing entity operating a front end and/or user-facing program. For example, a user computing entity 30 may provide a user with access to a portal, one or more portlets, and/or the like for causing one or more messages to be generated/created and provided such that the messages are received and processed by a server 65 and/or to access information/data stored in the ER data store (e.g., database) 211.

As will be recognized, the user computing entity 30 may be operated by an agent and include components and features similar to those described in conjunction with the server 65. Further, as shown in FIG. 3, the user computing entity may include additional components and features. For instance, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a server 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the position in connection with a variety of other systems, including cellular towers, Wi-Fi access points, and/or the like. Similarly, the user computing entity 30 may include indoor positioning aspects, such as a location module adapted to acquire, for instance, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output devices/interfaces (e.g., a display 316 and/or speaker/speaker driver coupled to a processing element 308 and a touch screen, keyboard, mouse, and/or microphone coupled to a processing element 308). For instance, the user output device/interface may be configured to provide an application, browser, interactive user interface (IUI), dashboard, webpage, Internet accessible/online portal, and/or similar words used herein interchangeably executing on and/or accessible via the user computing entity 30 to cause display or audible presentation of information/data and for user interaction therewith via one or more user input devices/interfaces. The user output interface may be updated dynamically from communication with the server 65. The user input device/interface can comprise any of a number of devices allowing the user computing entity 30 to receive information/data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input device/interface can be used, for example, to activate or deactivate certain functions, such as screen savers and/or sleep modes. Through such inputs, the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

Exemplary Source System

In various embodiments, source systems 40 are systems that generate/create and provide messages such that the messages are received and processed by the server 65. For instance, source systems are computing entities that provide information/data (e.g., via one or more messages) used to update one or more ER data stores 211 (e.g., databases). In various embodiments, a source system 40 comprises one or more components similar to components of a server 65 and/or user computing entity 30. For example, a source system 40 may comprise one or more processing elements, volatile memory, non-volatile memory, one or more communications interfaces, one or more network interfaces, one or more antennae, one or more receivers, one or more transmitters, one or more user interfaces, and/or the like.

Exemplary Networks

In one embodiment, the networks 135 may include, but are not limited to, any one or a combination of different types of suitable communications networks such as, for instance, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary Definitions

The term "or" is used herein in both the alternative and conjunctive sense, unless otherwise indicated. The terms "illustrative," "example," and "exemplary" are used to be examples with no indication of quality level. Like numbers refer to like elements throughout.

The terms "comprising" means "including but not limited to" and should be interpreted in the manner it is typically used in the patent context. Use of broader terms such as comprises, comprises, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The terms "system," "platform," and/or the like refer to a software platform and associated hardware that is configured to enable computing entities associated with user accounts of the ER system 100 to transmit communication resources associated with the user accounts and receive communication resources associated with the user accounts. Examples of systems include email systems, messaging systems, group-based systems, and/or the like. For example, an email system may communicate with a first computing entity associated with an email user account to receive a first email communication resource intended to be sent by the email user account to a recipient entity, transmit the first email communication to a second computing entity associated with the recipient entity (e.g., associated with a system of the recipient entity), receive a second email communication resource intended to be sent to the email user account from a third computing resource associated with a sender entity, and transmit the second email communication resource to the first computing entity associated with the email user account.

The terms "program layer," "layer," and/or the like may refer to an independent operating component of a software program. In some embodiments, a layer may only have an interface to the layer above it and the layer below it.

The terms "module," "programming module," "engine," and/or the like may refer to a software program that is independent, such that each contains (or has access to) what is necessary to execute the desired functionality.

The terms "data store," "data storage," and/or the like may refer to a repository for persistently storing collections of data, such as a database, a file system or a directory.

The terms "electronic medical records," "EMRs," and/or the like may refer to records that contain medical information/data of the patients.

The terms "electronic record," "ER," and or the like may refer to a digital tool that provides an all-in-one record of a domain of interest for an individual. For example, in the healthcare context, an ER may be for an individual's health, enabling a person and a care team to help improve collaboration and care (in this context the ER may also be referred to as an electronic health record "EHR"). The ER comprises various data objects (e.g., SBROs) and their corresponding information/data that can be stored, accessed, updated, and used to present the data information/data contained there via a user interface or communicated to or within systems.

As used herein, the terms "data," "content," "digital content," "digital content object," "information," "object," "data object," "file," "packet," and similar terms may be used interchangeably to refer to information/data capable of being transmitted, received, and/or stored in accordance with embodiments of the present disclosure. Thus, use of any such terms should not be taken to limit the spirit and scope of embodiments of the present disclosure. Further, where a computing entity is described herein to receive information/data from another computing entity, it will be appreciated that the information/data may be received directly from another computing entity or may be received indirectly via one or more intermediary computing entities, such as, for example, one or more servers, relays, routers, network access points, base stations, hosts, and/or the like (sometimes referred to herein as a "network"). Similarly, where a computing entity is described herein to send information/data to another computing entity, it will be appreciated that the information/data may be sent directly to another computing entity or may be sent indirectly via one or more intermediary computing entities, such as, for example, one or more servers, relays, routers, network access points, base stations, hosts, and/or the like.

The terms "data transfer object" and/or the like may refer to an object that carries information/data between processes, such as a class to transfer information/data between tiers in a multi-tiered architecture. In a particular embodiment, each data transfer object comprises a key-value pair (e.g., ontology concept identifier and its associated/corresponding value) and metadata associated with the same. The key-value pair of the data transfer object is compared to the key-value pair of an SDBO, if one exists. Otherwise, the key-value pair of the data transfer object is used to generate/create an SDBO with the key-value pair and its metadata.

The terms "ingestion," "importation," and/or the like may refer to the automated processing and storage of information/data.

The terms "extraction," "retrieval," and/or the like may refer to the automated retrieval of information/data.

The terms "single best record object," "SBRO," and/or the like may refer to a data object storing the "single most accurate information/data," "single most fit information/data," "single most best information/data," and/or the like for a particular ontology concept, such as an observable. In a particular embodiment, each SBRO comprises a key-value pair (e.g., ontology concept identifier and its associated/corresponding value) and/or corresponding metadata. The information/data is stored into each SBRO by the ingestion processing module 225. Similarly, the information/data is extracted/retrieved from each SBRO by the extraction processing module 260. In the healthcare context, an SBRO may store information associated with conditions, services, results, products, care relationships, and/or the like. For example, conditions may include medical problems, medical history, family history, allergies, findings, and/or the like.

The terms "identifier" and/or the like may refer to an identifier that uniquely identifies information/data stored that is related to an ontology concept, an entity, a user, a user profile, a user account, a user group, an actor, and/or the like.

The terms "circuitry" should be understood broadly to include hardware, and in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The terms "user" and/or the like may refer to an individual (e.g., patient/member, physician, provider, provider team member, and/or the like), business, organization, and the like. The users referred to herein may have user access privileges or user access levels for the ER system 100.

The terms "user group" and/or the like may refer to a group of users or individuals, a group of businesses, a group of organizations, and the like. The group of users referred to herein may have user group access privileges or user group access levels for the ER system 100.

The terms "access privilege," "access level," and/or the like may refer to a variable whose value denotes a nature and/or extent of access by a computing entity (e.g., a computing entity associated with a recognized entity and/or user profile) to information/data associated with an external database. An access privilege may define which information/data stored by an external database a computing entity associated with a recognized entity may access. For example, a first access privilege may enable a computing entity associated with a recognized entity to access all information/data associated with one or more data objects within one or more databases. As another example, a second access privilege may enable a computing entity associated with a recognized entity to access metadata associated with one or more data objects within one or more databases. As a further example, a third access privilege may enable a computing entity associated with a user account to access all information/data associated with the user account. As yet another example, a fourth access privilege may enable a computing entity associated with a user account to access metadata associated with the user account.

The terms "concept" and/or the like may refer to ideas associated with synonymous linguistic expressions of the concept. Each concept is described in direct or indirect relationship to the root node of the ontology, e.g., thing. A concept description must reference some another concept to serve as its anchor and then specify or redefine additional attributes (commonly referred to as "extra bits") to distinguish it from the concept to which it is anchored. These attributes may specify membership in additional sets (some) or specify constraint to specific values (min, max, value). Additionally the specification may specify the intersection of two or more descriptions (and) or the union of two or more descriptions (or). In one embodiment, each incoming source vocabulary, source vocabulary code, and/or description can be converted to an ontology concept and stored along with the originating vocabulary and identifier. Similarly, each outgoing ontology concept and identifier can be converted to the originating (source) vocabulary and code.

The terms "compound concept" and/or the like may refer to a set of concepts that represent a single concept. A compound can be used to create a more granular concept (e.g., fracture of the left ulna).

The terms "ontology concept identifier" and/or the like may refer to a concept identifiable via an ontology, such as an observable. The ontology concept identifier may comprise an alphanumeric code, such as 2-3 uppercase letters forming a prefix, followed by a set of integers unique to that prefix.

The terms "ontology code" or "ontological code" is a machine-usable and machine-readable term that represents a concept (e.g., left ulna, fracture, or facture of the left ulna). An ontological code can be mapped one-to-one to a corresponding concept.

The terms "code set" and/or the like may refer to a list of terms and their corresponding codes. A code set covers a defined knowledge domain, such as healthcare.

The terms "semantic network" is a set of concepts and a defined set of named relationships. The semantic network expresses the known or relevant relationships between concepts for a specific domain of knowledge. A semantic network contains links that describe semantic relationships among concepts.

The terms "observable" and/or the like may refer to a thing which can be observed with an associated/corresponding value. Such things may be physically perceivable and/or measurable elements. For example, eye-color may be an observable with an associated/corresponding value of blue. Similarly, blood-pressure may be an observable with an associated/corresponding of 140/80. In a particular embodiment, each observable is identifiable by an ontology concept identifier and has associated/corresponding value. Thus, each observable comprises a key-value pair (e.g., ontology concept identifier and its associated/corresponding value). FIG. 10A includes exemplary observations. An "observation" and/or the like may refer a thing that has been observed with an associated/corresponding value.

The terms "observation group," "observation groups," and/or the like may refer to a collection of observables or observations related to one another as part of a single data object. The observables or observations in the observation group are organized in a tree data structure representing the relationship between information/data elements that encapsulate the information/data intended to be stored in particular data objects. And each observable or observation in an observation group comprises a key-value pair (e.g., ontology concept identifier and its associated/corresponding value). Further, the observations in the observation group can be organized in a tree data structure representing the relationship between data elements and which encapsulate the information/data intended to be stored in particular ER objects. FIG. 10A includes exemplary observation groups.

The terms "portal," "user interface," and/or the like may refer to information/data encoding any combination of one or more visual representations configured to be displayed to a user of a computing entity by a display device of the computing entity. In some embodiments, a user interface may include one or more visual representations that represent a state of a system at a particular time. For example, at least one of the one or more visual representations may render an email communications resource transmitted to a computing entity of a user account by an email system on or before a particular time. As another example, at least one of one or more visual representations may render a group-based communication resource transmitted to a computing entity of a user account by a group-based system.

The terms "interface display indication" and/or the like may refer to information/data transmitted to a computing entity that, when processed (e.g., executed) by the computing entity, causes the computing entity to display a user interface on a display device of the computing entity. For example, the interface display indication may be Hyper-Text Markup Language (HTML) code configured to be executed by a web browser software framework executing on the computing entity. As another example, the interface display indication may be information/data configured to be used by a mobile application software framework (e.g., an email communication application software framework) executing on a computing entity to cause display of a user interface associated with the mobile application software framework.

The terms "user interaction event" and/or the like may refer to one or more of transmission of a communication resource by a system to a computing entity associated with a user account, transmission of a communication resource from a computing entity associated with a user account to a system, and/or performance of an action by a user account with respect to a communication resource. Examples of user interaction events include receiving communication resources, posting (e.g., transmitting for rendering) communication resources (e.g., to group-based communication channels), logging on to a system, activating a user interface, launching an application, requesting access to a data object, sending communication resources, viewing body of communication resources, viewing attachment files for communication resources, deleting communication resources, marking communication resources as spam, and/or the like.

The terms "past user interaction event" and/or the like may refer to a user interaction event whose timestamp indicates or is representative of that the user interaction event has occurred at a time prior to retrieval of information/data recording the user interaction event.

The terms "historical information/data" for a system may refer to information/data that represents an event whose timestamp indicates or is representative that the event has occurred at a time prior to retrieval of information/data.

The terms "natural language processing" and/or the like may refer to a software framework that processes natural language information/data (e.g., human language data, such as unstructured human language data) to extract one or more features from the natural language information/data and/or to perform one or more predictions based at least in part on the natural language information/data. For example, a natural language processing module may use one or more syntactic processing techniques and/or one or more semantic processing techniques. For example, a natural language processing module may use one or more of the following techniques: grammar induction, lemmatization, morphological segmentation, part-of-speech tagging, parsing, sentence boundary disambiguation, word segmentation, terminology extraction, lexical semantic determination, named entity recognition, optical character recognition, textual entailment recognition, relationship extraction, sentiment analysis, topic segmentation, word sense disambiguation, automatic segmentation, speech segmentation, text-to-speech conversion, and/or the like.

The terms "portlet" and/or the like may refer to user interface components that are managed and displayed in a web portal, dashboard, user interface, browser, and/or the like. Portlets can be pluggable aggregate (integrate) and personalize content from different sources within a web page.

The terms "programmatic reasoning logic" may be a classifier that is responsible for examining an ontology and inferring additional relationships based at least in part on the descriptions of the ontology concepts. In embodiments of the present invention, the programmatic reasoning logic may compare two arbitrary concepts described in the language of the ontology and determine relationship. The programmatic reasoning logic may perform incremental reasoning, programmatically adding concepts to an existing ontology without having to recompute all inferences. The programmatic reasoning logic may also be able generate its internal graph directly from a pre-reasoned ontology.

The terms "tree data structure," "container tree data structure," "container tree," and/or the like may refer to a non-linear data structure where data objects are organized in terms of hierarchical relationships with a root value and subtrees of children with a parent node, represented as a set of linked nodes. For example, in a tree data structure, a node is a data object that may contain a value, condition, method for execution, reference, or represent a separate data structure or data object. The top node in a tree data structure may be referred to as the "root node." A "child node" may be a node directly connected to another node when moving away from the root node, an immediate descendant. Similarly, a "parent node" may be the converse a child node, an immediate ancestor. A "leaf node" and/or the like may refer to a node with no children. An "internal node" and/or the like may refer to a node with at least one child. And "edge" and/or the like may refer to a connection between one node and another node. The "depth" of a node may refer to the distance between the particular node and the root node.

The terms "subtree data structure" and/or the like may refer to data structure that is descendant of the root node and itself has multiple descendants.

The terms "relationship," "relations," and/or the like may refer to a named, directed (one way) association between two concepts. A relationship establishes a semantic link between the respective concepts. Any given concept may function as both the source and destination of numerous relationships by establishing various named relationships. Thus, it is possible to have a variety of different structures-such as hierarchies, networks, and unstructured groups, superimposed on the same concepts. The ontology (represented as a directed acyclic graph data structure, a graph-based data structure, and/or the like) has the ability to be dynamically updated to modify relationships. Relationships are connections between objects (e.g., nodes, entities (actors), such as primary care physician ←→ patient, employer ←→ employee, subscriber ←→ payer, employer ←→ payer, patient ←→ service provider, and/or the like.

In one embodiment, the terms "direct relationship" and/or the like may refer to a relationship type in which two nodes are connected by one edge. In another embodiment, the terms "direct relationship" and/or the like may refer to a relationship type that is defined as being a direct relationship by two separate relationship data objects.

The terms "indirect relationship" and/or the like may refer to a relationship type in which two nodes are connected over a path through at least one intermediate relationship nodes. In another embodiment, the terms "indirect relationship" and/or the like may refer to a relationship type that is defined as being an indirect relationship by two separate relationship data objects.

The terms "active relationship" and/or the like may refer to a relationship status in which there is or may be an ongoing interaction between two entities.

The terms "inactive relationship" and/or the like may refer to a relationship status in which there is not or is not expected to be ongoing interaction between two entities.

The terms "traversal" and/or the like may refer to a tree traversal. A traversal is a form of a graph traversal and indicates the process of visiting (checking, updating, executing methods, and/or the like) each node in a tree data structure, exactly once. Such traversals are classified by the order in which the nodes are visited. Such traversals include depth-first searches/traversals (e.g., preorder, inorder, postorder,), breadth-first searches/traversals, and/or the like.

The terms "data artifact packet data object," "DAPDO," and/or the like may refer to a Java data object that is generated from an OPDO or an EPDO. In the context of an OPDO, the OPDO is transformed from an XML document used for storage and transmission to a Java object that is executable or used for execution, such as via unmarshalling. Thus, the DAPDO comprises the structure of the OPDO with additional information/data that allows for the construction of a container tree data structure to ingest information/data identified in the OPDO. In one embodiment, each DAPDO comprises a DAPDO identifier, information/data from the corresponding OPDO, a DAPDO type (indicate the information/data it contains), an owner, a reference (e.g., a GUID) to the corresponding message, and a reference to the source system. In such a case, the DAPDO comprises information/data from and/or metadata about the message. The message, for example, may be an HL7 message, and the metadata may include the context of the message, e.g., the type of information/data in the message, the source system of the data, and the author of the information/data at the source system. In one embodiment, upon receipt of a message, a message data artifact packet data object is automatically generated to store the message (e.g., message data object) and its corresponding metadata may be automatically generated. In the context of an EPDO, the EPDO is transformed from an XML document used for storage and transmission to a Java object that is executable or used for execution, such as via unmarshalling. Thus, the DAPDO comprises the structure of the EPDO with additional information/data that allows for the construction of a container tree data structure to ingest information/data identified in the EPDO.

The terms "data artifact packet container," "data artifact packet container node," "data artifact packet tree data structure," "data artifact packet container tree data structure," "container tree data structure," "data artifact packet container tree," and/or the like may refer to the tree data structure that comprises all other containers, container nodes, and/or the like. The data artifact packet container node can define appropriate selectable observables to create the requested tree to be populated. In the OPDO context, each of the container nodes in the built tree data structure comprises observations used to populate data objects (in the EPDO context, tree data structure has empty values for the corresponding observations). Similar to the tree data structure itself, such nodes are recursive but dependent upon a defined hierarchical structure. For instance, an "actor" corresponds to an actor container node, and that actor's name corresponds to a subcontainer node of the actor container node, which is a type of actor name container. Actors may be people, places, organizations, locations—also referenced herein as entities.

The terms "containers," "container nodes," and/or the like may refer to nodes that aggregate related extractables, observables, or observations, such as those that pertain to a single object. For example, systolic blood-pressure and diastolic blood-pressure are related as a single blood-pressure reading. Thus, each container node specifies a specific assemble method (e.g., assemble( ) method) and specifies the specific data type as the return value (e.g., an <AssembledType> data object as its return value). The following is a non-limiting list of example container nodes an entity container node; entity name container node which may have subcontainer nodes discrete entity name container and/or composite entity name container; address container which may have subcontainer nodes discrete address container and composite address container; amount container; blob container; certification container; contract service plan container; contract services container; data correction container; data correction pairs container; email container; employment container; item (e.g., health item) container; health status evaluation container node; health task container node; identifier container node; language container node; language proficiency container node; location container node; message container node; note container node; observation element container node; occupation container node; plan descriptor container node; relationship container node; role field container node; specialty container node; specimen container node; system task container node; system task schedule container which may have subcontainer nodes interval task schedule container and/or singleton task schedule container node; telephone container which may have subcontainer nodes discrete telephone container and/or composite telephone container node; temporal container which may have subcontainer nodes ISO temporal container node; HL7 temporal container node; specified format temporal container node; test container node; value container node; website container node; and/or the like.

An Extensible Markup Language (XML) document (e.g., in an XML file) may refer a basic unit of XML information/data composed of elements and other markup in an orderly package. An XML document (e.g., in an XML file) may contains wide variety of information/data.

The terms "raw message," "message," "message data object," and/or the like may refer to a formal exchange of information/data, such as events, communications, notifications, requests, acknowledgements, replies, information/data exchanges, and/or the like. In the healthcare context, messages may be Digital Imaging and Communications in Medicine (DICOM®) messages, Health Level Seven International (HL7) messages, Electronic Data Interchange (EDI) messages, National Council for Prescription Drug Programs (NCPDP) messages, X12 messages, XML messages, and/or the like. In one embodiment, messages may be processed and stored by the ER system 100 may be stored as message "data artifact packet data objects" (DAPDOs), which are Java objects containing the relevant message information/data (e.g., source of the message, author of the message, and/or the like).

The terms "application programming interface," "API," and/or the like may refer to an interface or communication protocol between systems, components of a system, and/or the like. An API may be for a web-based system, operating system, database system, computer hardware, software library, and/or the like.

The terms "observable packet data object," "OPDO," and/or the like may refer to an object that is used as a data object to generate/create a data artifact packet data object from a message. In a particular embodiment, the OPDO is an XML document (e.g., in an XML file) specifying a set of observations organized into a hierarchy. Nesting in the hierarchy represents repeated elements of the same type. In one embodiment, each OPDO comprises an OPDO identifier.

The terms "observable packet data object identifier," "OPDO identifier," and/or the like may refer to an identifier that uniquely identifies a type of OPDO or a specific OPDO. In one embodiment, OPDO identifiers may be UUIDs or GUIDs.

The terms "aggregators," "aggregator nodes," "aggregator container nodes," and/or the like may refer to container nodes containing multiple elements into a single element. For example, an aggregate may aggregate a systolic blood-pressure reading (stored in a first data object) and a diastolic blood-pressure (stored in a second data object) into a single blood-pressure reading.

Further, a container may represent a concept via a source vocabulary, vocabulary code, and description. An aggregator assembles these pieces into a single ontology concept.

The terms "assemble," "assembly," "assemble method," and/or the like may refer to a method for container nodes. For example, container nodes assemble( ) method and have an <AssembledType> data object as its return value. To assemble, each observation in that container is individually, without respect to order, evaluated to identify the information/data it's value attribute holds. Once identified individually, the information/data can be assembled and evaluated for minimum requirements in order to create a viable data object. In one embodiment, to prevent recursions and attempts to assemble container nodes with errors, during assembly, a container exists in one of four states. The terms "not assembled" and/or the like may refer to assembly of a container that has not yet been attempted. The terms "undergoing disassembly" and/or the like may refer to a container is currently being disassembled. The terms "assembled" and/or the like may refer to a container has been successfully assembled. The terms "unable to assemble" and/or the like may refer to the attempt to assemble a container that has resulted in an exception.

The terms "extractable," "retrievable," and/or the like may be considered the equivalent of the observables. That is, extractables represent data elements stored with respect to a specific actor that were stored as observables or observations. Extractables may represent either singletons or collections. For example, the associated/corresponding value of eye-color may be extracted. Similarly, the associated/corresponding value of blood-pressure may be extracted. In a particular embodiment, each extractable is identifiable by an ontology concept identifier.

The terms "extractable packet data object," "EPDO," and/or the like may refer to an object that is used as a data object to generate/create a data artifact packet data object that identifies information/data for extraction (e.g., retrieval). In a particular embodiment, the EPDO an XML document (e.g., in an XML file) specifying a set of observations organized into a hierarchy. Nesting in the hierarchy represents repeated elements of the same type.

The terms "extractable packet data object identifier," "EPDO identifier," and/or the like may refer to an identifier that uniquely identifies a type of EPDO or an EPDO. In one embodiment, OPDO identifiers may be GUIDs.

The terms "fit," "accurate," "best," "better," and/or the like may refer to information/data that is considered the most recent, most specific, from the most reliable source, and/or the like. Thus, the SBRO processing module 265 information/data fitness determines what the "best" information/data. For example, if an existing SBRO object is storing Joe Smith's date of birth as Jan. 3, 1955, but the ER system 100 then receives a message identifying his date of birth as Jan. 3, 1956. The SBRO processing module 265 determines whether the new information/data is more "fit," "accurate," "better," than the existing information/data. The decision is encapsulated in a SBRO processing module 265 that considers various factors specific to the type of element, such as (1) which version is newer, (2) which version comes from the more reliable source, and/or (3) which version is the more specific/complete. It is also important to understand that an SBRO exists as a collection of individual elements and that information/data fitness is applied to the individual elements rather than to the SBRO as a whole. Continuing the above example, suppose that we also believed that Joe Smith's weight was 160 lbs. and then within the same record that we were informed of the alternate birth date we were also informed that his weight was really 155 lbs., it is perfectly possible (though perhaps unlikely) to accept the new birth date while rejecting the new weight. This is because each element is evaluated independently evaluated for fitness based at least in part on its own merits. Thus the overall SBRO represents the accumulated best knowledge of a set of individual elements.

The terms "change log" and/or the like may refer to changes of a subject entity's ER logged in a specific table or database. For example, a change table may comprise data objects storing two attributes: a pointer to the modified actor and the time of the log entry. The change log is used by the information/data extract Processor.

The terms "container tree generation" for extractables may refer to the extraction processing module 260 generating a tree data structure comprising based at least in part on a data artifact packet container node and its subcontainer nodes EPDO (that initially contains no values or empty values (e.g., values that are not yet populated)). This tree data structure is a representation of the relationships between information/data elements within the ER system 100 and functions as the framework for aggregating information/data element pieces retrieved from the ER system 100.

The terms "disaggregators" and/or the like may refer to methods that decompose a particular ER element into multiple observations. For example, during ingestion processing, an incoming source vocabulary, vocabulary code, and optionally description can be converted to an ER ontology concept, which is stored along with the originating vocabulary and code. During extraction processing, the requesting entity is typically interested in the original vocabulary and code along with the ER information/data. Thus, a disaggregator produces the following triple: (1) ontology concept identifier, the originating source vocabulary concept identifier (if present), and the originating source vocabulary code (if present). Thus, when converting the container tree data structure to an observation group, the extraction processing module 260 includes the triple in a child observation group.

The terms "disassemble," "disassembly," "disassemble method," and/or the like may refer to a polymorphic method (e.g., a method that may, at different times, invoke different methods) for populating container nodes. Disassembly is the process by which the extraction processing module 260 acquires values for the extractables specified in an observation group and populates in the values in each container node of the container tree data structure. This process is referred to as disassembly and is the inverse of the ingestion processing module 225 assembly function. For example, the disassemble method acquires the value for the extractable represented by that container node. A container node either represents a specific element of information/data or it has subcontainer nodes that represent parts of the value represented by the container. The disassembly process is the inverse of the process performed by the ingestion processing module 225 via the assembly function. In one embodiment, to prevent recursions and attempts to disassemble container nodes with errors, during disassembly, a container exists in one of four states. The terms "not disassembled" and/or the like may refer to disassembly of a container that has not yet been attempted. The terms "undergoing disassembly" and/or the like may refer to a container is currently being disassembled. The terms "disassembled" and/or the like may refer to a container has been successfully disassembled. The terms "unable to dissemble" and/or the like may refer to the attempt to disassemble a container that has resulted in an exception or there is no persisted information/data to disassemble. In one embodiment, a container tree data structure is populated by invoking getDisassembledObject( ) on the DAPDO at the root node of the container tree data structure. The invocation initiates a cascade with each subcontainer node similarly evaluated down to the leaf nodes of the container tree data structure through which the container tree data structure is populated. When an extractable (or group of extractables) represents a collection, the extraction processing module 260 returns all elements of the collection in an observation group, with each element of the collection in its own child observation group. Thus, acquiring values for container nodes consists either of extracting/retrieving a value directly from the actor's ER or in aggregating the values from subcontainer nodes. There may also be additional observations to be populated in a particular container in addition to the persisted ER information/data.

The terms "queue" and/or the like may refer to a sequence of objects that are waiting to be processed.

The terms "durable storage" and/or the like may refer to a database that persists in spite of software failures, system shutdown, and with caveats, hardware failures.

The terms "persistence manager" and/or the like may refer to a class whose responsibility it is to create, read, and update information records and delete database records (e.g., DBOs). A persistence manager is generated for each entity class and database in the DSML 245.

As noted elsewhere, the terms "database" and/or the like may refer to where the program saves objects. Thus, the term database does not imply any particular kind of database as a system utilizing this program could use one of many products to store objects. For example, the database used could include Cassandra DB, PostgreSQL, Berkeley DB, etc.

The terms "transaction" and/or the like may refer to a group of permanent object operations that are grouped into a logical unit of work. Either all of the transaction's operations are applied to the database as an atomic unit or no operation is applied.

The terms "transaction cache" and/or the like may refer to a structure that tracks which entity objects are created, read, updated, or deleted during the course of a particular transaction.

The terms "class" and/or the like may refer to a Java class or interface.

The terms "object" and/or the like may refer to a Java object. When an object of a particular class is referenced, the class's name may be used in place of the word "object" altogether. When several objects of that class are relevant, the plural form of the class's name may be used. Unless noted otherwise, if an object is said to be an instance of a particular class, the object may also be an instance of any subclass of that class.

The terms "subdatabase," "sub-database," and/or the like may refer to a portion of the database which stores instances of a single DBO class. A subdatabase is created for every entity class in the DSML 245.

The terms "database record," "database object," "DBO," and/or the like may refer to an object that is specific to a particular kind of durable storage with the proper knowledge to interact with the corresponding persistence manager.

The terms "health item" and/or the like may refer information/data that corresponds to an instance of a health condition. In various scenarios, the health condition affects a person's health for a finite period of time (e.g., a broken bone, a stomach bug, and/or the like). In such scenarios, each instance of the health condition corresponds to a different health item. In various scenarios, the health condition may affect a person's health for an indefinite period of time (e.g., diabetes, epilepsy, and/or the like) and a single health item may capture evolving information/data corresponding to the health condition.

The terms "index," "database index," and/or the like may refer to a data structure that improves the speed of information/data retrieval operations on a database table. Indexes allow for the efficient location of information/data without having to search every row in a database table, for instance, every time a database table is accessed. Such indexes may include clustered indexes, non-clustered indexes, and/or the like. The indexes may be binary trees and/or the like.

The terms "collection" and/or the like may refer to a grouping of some variable number of data items (possibly zero) that have shared significance to a particular function, process, and/or the like, and that should be operated on together in some controlled fashion. For example, in various embodiments, in addition to storing DBOs, the DSML 245 is capable of storing two kinds of persistent collections as fields of DBOs. The two types of collections that the data store management layer is capable of storing, in various embodiments, are bags and lists. A bag is a collection that does not support ordering or indexing, and in some embodiments, which permits duplicate entries. A list is a collection that supports ordering and indexing, and in some embodiments, which permits duplicate entries.

The terms "primary key" and/or the like is a list of objects used to find an object's database record. The key may include an object's class and/or an integer that links an object to its database record. This key is generally a part of an object's metadata.

The terms "entity class," "entity object," and/or the like may refer to a database record with a particular primary key.

The terms "embedded class," "embedded object," and/or the like may refer to a database record that is part of another DBO.

The terms "persistent flag" and/or the like may refer to a state field indicating whether the current object has been written to durable storage.

The terms "persistent object" and/or the like may refer to a database object in durable storage.

The terms "persistent collection" and/or the like may refer to a collection in durable storage.

The terms "connectoid" is a data object that indicates a relationship between two ontology concepts. In the graph data structure representation of the graph-based domain ontology, a connectoid is represented by an edge of the graph. In various embodiments, the connectoid may be associated with a direction (e.g., unidirectional or bi-directional), with a relationship type, and/or the like.

The terms "modified flag" and/or the like may refer to a state field indicating whether the current object has changed since durable storage was last synchronized with persistent objects.

The terms "modified collections" and/or the like may refer to a set that contains all of an instance's modified standard collections.

The terms "modified collection set" and/or the like may refer to a set that contains references to child collection proxies that have been modified since the last synchronization.

The terms "commit" and/or the like may refer to the termination of a transaction in the database system that makes durable and visible to observers the effects of the transaction's operations.

The terms "flush" and/or the like may refer to a command used to synchronize durable storage with the state of persistent objects in a database at that point.

The terms "entity proxy," "entity proxies," and/or the like may refer to an object with the necessary information to load an entity object. This proxy is used in place of the object to delay the loading of some objects until they are requested.

The terms "collection proxy," "collection proxies," and/or the like may refer to a collection whose primary purpose is to delay the loading of Collection elements until requested.

The terms "health item" and/or the like may refer to drugs, procedures, goals, medications, conditions, tests, ailments, or other related objects/terms but not including actors or relationships.

The terms "collection" and/or the like may refer to a grouping of data items with a shared significance. The use of this term does not denote any particular type of collection.

In the context of the data store, the terms "entity" and/or the like may refer to an independent item of which information or data can be stored in a database. In one embodiment an entity may comprise various elements, attributes, or parts. However, outside of the data store context, the terms "entity," "actors," "person actors," "organization actors," "location actors," and/or the like. Thus, entities, subject entities, requesting entities, and/or the like refer to these types of "actors," and the reverse is also true.

The terms "DBO class" and/or the like may refer to a class which is defined in such a way that the DSML 245 is able to manage the lifecycle of its instances.

The terms "primary index" and/or the like may refer to a mapping from primary keys to the DBOs of a subdatabase. There can only be one primary index for each DBO class.

The terms "user role" and/or the like may refer to a role given to an entity of which is assigned one or more rights groups.

The terms "rights group" and/or the like may refer to a group of which comprises one or more rights defined in a rights group data object, such as an XML document. The rights provide the entity the ability to access the calling of particular functions/operations.

The terms "owner" and/or the like may refer to the person, individual, actor, and/or entity who owns the information/data in an ER associated with a subject entity identifier that corresponds to the owner. In other words, the subject entity associated with the ER, is the owner of the information/data stored in the ER.

The terms "owner roles" and/or the like may refer to a role that allows the owner of an ER to control who has access to what information/data and/or who can perform what functions with regard to the information/data stored in the ER corresponding to the owner.

The terms "requester role" and/or the like may refer to a requestor/requesting entity/acting entity is a user/entity requesting that a function be performed to an ER stored in the data storage of the ER system 100. The requestor role is the user role corresponding to the requestor based at least in part on the relationship between the requestor/requesting entity/acting entity and the subject entity of the ER the requestor/requesting entity/acting entity is requesting to act upon.

The terms "scope access," "population access," and/or the like may refer to who can access information/data (e.g., sensitive, protected, authored protected, and/or the like).

The terms "data access" may refer to which information/data a user (e.g., entity may access).

The terms "operation access" and/or the like may refer to which functions and/or operations a requesting/acting entity may perform (and/or cause the performance of) on an ER corresponding to a subject entity. In various embodiments, the operations access of a requesting/acting entity corresponding to a particular ER corresponding to a subject entity is determined based at least in part on the rights group(s) assigned to a user role that matches the user role of the requesting/acting entity in the relationship between the requesting/acting entity and the subject entity.

The terms "ontology class" and/or the like may refer to a concept defined within the graph-based domain ontology. In various embodiments, an ontology class is associated with an ontology concept identifier, one or more relationships indicating how the ontology class is related to one or more other ontology classes and/or ontology concepts, and/or the like.

The terms "ontology category" and/or the like may refer to a concept that is not defined in the graph-based domain ontology. In particular, a category may be identified (e.g., in a message) that is distinct and/or different from each ontology class and/or concept defined by the graph-based domain ontology. In various embodiments, programmatic reasoning logic may be used to determine and/or reason relationships between a category and one or more ontology classes and/or concepts.

IV. Exemplary System Operation

Various embodiments provide methods, apparatus, systems, computer program products and/or the like for automatically managing, ingesting, monitoring, updating, and/or extracting/retrieving information/data in an ER data store (e.g., database) and/or providing and/or controlling access to information/data stored in the ER data store (e.g., database) based at least in part on a graph-based domain ontology. As previously noted, the term "ontology" and/or the like may refer to a recursive data structure comprising various nodes (e.g., a directed acyclic graph data structure, a graph-based data structure, and/or the like). In one embodiment, the ultimate root node of the graph-based ontology is "thing." The root node can be divided into various configurable levels (e.g., conditions, devices, and/or the like). For example, FIG. 5A shows the root of the graph-based ontology with configurable levels (and some exemplary description logic). Each configurable level may be a "domain of interest" or a "domain of knowledge." In a particular embodiment, the graph-based ontology is a terminological component (TBox) ontology. Ontologies represented as directed acyclic graph data structures have various technical benefits, including improved interoperability, improved reasoning, reduced errors, improved information/data mining, improved analytics, and/or the like.

As will be recognized, an ontology (in the context of computerized information systems) is a formal way of representing what things are or what they mean. The graph-based ontology is used to represent concepts in a graph-based data structure. The concepts are then used to store the information/data via an ER data store (e.g., database). In the graph-based ontology, description logic uses formal descriptions to represent concepts. These descriptions (e.g., class expressions) are constructed from less complex class expressions and relationships using formal operations such as AND, OR, SOME, and/or ALL. This process is analogous to how more complex phrases are constructed in natural language using simpler phrases, words, and grammar. The description logic language, however, has formal rigor given by a precise interpretation of the operators (AND, OR, and/or the like) that allows computing entities to process the information/data.

FIG. 4 shows a portion of an ontology concept (Tenoretic 50) represented as being constructed from things such as the active ingredients, the formulation, dose strength, route of administration, and/or the like. Thus, all the constituent parts are independently accessible to computing entities so they can execute useful actions with the formal meaning.

In various embodiments, the concepts defined within the graph-based ontology (referred to herein as concepts or classes) are defined, at least in part, on the relationships between and among various classes. For instance, in various embodiments, the graph-based ontology is represented by a graph-based data structure. FIG. 5B illustrates one slice through a medications portion of the graph-based data structure represented in the graph-based domain ontology. The illustrated graph-based data structure represents one slice through medications useful for obstructive breathing conditions, including not only albuterol, but also inhaled corticosteroids, methylxanthines, and/or the like. Each medication has its own different slice (in a different dimension), not shown here. In this dimension, a number of dose and delivery forms are shown for albuterol, but in a different view, similar "explosions" exist for each of the short-acting and long-acting bronchodilators shown in the figure. And similar explosions of different kinds of medications could be made for the steroids, xanthines, and/or the like.

Similarly, FIG. 5C shows a portion of an ontology concept for respiratory system disorders, some of which are lung disorders, some of which are obstructive, some of which are COPD. Each of these may have a range of severities and incorporates the "older" terms of emphysema and chronic bronchitis—both now subsumed to COPD. As previously noted, each constituent part is independently accessible to computing entities so they can execute useful actions with the formal meaning along with the relationship paths. FIG. 6 illustrates a portion of a definition of an ontology concept for obstructive lung disease.

In one exemplary embodiment, the graph-based ontology may comprise any discrete number of vocabulary terms, referencing a set number of distinct concepts represented as ontology concept identifiers. There are relationships among the graph-based ontology concept identifiers as represented by the graph-based data structure that can become more mature and meaningful as additional use cases are examined and incorporated into the ER system 100. Concepts can be mapped bidirectionally to and from various source vocabularies.

As noted above, embodiments of the present invention provide technical solutions to technical problems related to the automated managing, ingesting, monitoring, updating, and/or extracting/retrieving of information/data of a data store (e.g., a database or other data store) and/or accessing information/data from the automatically managed and updated data store 211. In particular, the use of the graph-based ontology to define concepts and relationships between and among concepts enables the ER system 100 to interpret information/data received by the ER system 100 (e.g., via messages provided by source systems 40) such that multiple messages corresponding to the same event and/or transaction may be identified, even when the multiple messages refer to the event and/or transaction using disparate vocabularies. Moreover, the information/data provided by the multiple messages and referring to the same event and/or transaction may be combined so as to provide a single best collection of information/data (e.g., an SBRO) corresponding to the event and/or transaction. Embodiments of the present invention therefore overcome the technical problems of identifying messages of disparate vocabularies that correspond to a same event and/or transaction and distilling those identified messages down to a single best collection of information/data corresponding to the event and/or transaction in an automated fashion. Embodiments of the present invention therefore provide improvements in the field of automated data store managing, ingesting, monitoring, updating, and/or extracting/retrieving of information/data.

General Overview

In various embodiments, to manage and/or update the database, a message is generated/created and provided by a source system 40 such that the server 65 receives the message via one or more communications interfaces, as shown in FIG. 7A. The message may be in a source format and/or source vocabulary that is used by the source system 40. The server 65 may pre-process the message (e.g., by the message pre-processing module 220 operating on the server 65) to translate the information/data from the message into a normalized format and into an ontology vocabulary. The graph-based ontology vocabulary comprises class and/or ontology concept identifiers corresponding to concepts defined in the graph-based ontology. In an example embodiment, the graph-based ontology vocabulary further comprises descriptions corresponding to concepts of the graph-based ontology. In one embodiment, an OPDO is a data object generated/created that comprises the meaningful information/data from the message in the normalized format and in the graph-based ontology vocabulary. The result of pre-processing the message may vary. In one embodiment, the result of the pre-processing an OPDO. In another embodiment, the result of the pre-processing is a DAPDO. One or more entities, organizations, locations, individuals, and/or the like referenced in the message may be identified (e.g., by an identity matching service 240 operating on the server 65). The DAPDO may be updated to include entity identifiers configured to identify the one or more entities, organizations, locations, individuals, and/or the like within the ER system 100.

The OPDO or DAPDO may then be provided to the ingestion processing module 225 for processing. In one embodiment, the OPDO or DAPDO may be provided to the ingestion processing module 225 with the entity identifiers (e.g., in real-time or near real-time with respect to the generation of the OPDO or DAPDO and/or updating of the OPDO or DAPDO to include the entity identifiers). In another embodiment, the DAPDO is stored for deferred processing (e.g., user interaction event processing) and/or prioritized processing. For example, DAPDOs may be processed at a later time responsive to a trigger being identified based at least in part on user interaction event (e.g., a user logging into the ER system 100) and/or based at least in part on a priority scheme. In various embodiments, the ingestion processing module 225 processes the DAPDO to generate/create one or more data transfer objects that are then used to update the ER data store 211 via a single best record object (SBRO) process, which may include the use of programmatic reasoning logic 230. A DSML 245 may be used as an interface between the ER data store 211 and the ingestion processing module 225, SBRO processing module 265, and/or other programs, processes, modules, engines, and/or the like of the ER system 100. For instance, in various embodiments, the ingestion processing module 225, SBRO processing module 265, and/or various other programs, processes, modules, engine, and/or the like of the ER system 100 are configured to process data objects (e.g., Java objects and/or the like). The ER data store 211 may be a database or other data store that does not support direct storage of data objects. The DSML 245 may therefore act as an intermediary and/or interface for persisting/storing and/or extracting/retrieving the data objects in the ER data store 211.

In various embodiments, after and/or responsive to one or more data objects of the ER system 100 being updated based at least in part on the processing of one or more messages, a rules engine 250 may analyze various ERs to determine if the at least one of the ERs satisfies one or more conditions. In various embodiments, when the at least one of the ERs triggers an action (e.g., by satisfying or not satisfying one or more conditions in accordance with rules applied by the rules engine 250), the rules engine 250 generates an OPDO, and the OPDO is provided to the ingestion processing module 225 for processing, such that the ER data store 211 is updated based at least in part on the triggering of the action.

In various embodiments, a user may wish to access information/data stored in the ER data store 211. FIG. 7B provides a schematic diagram illustrating components of the ER system 100 that may be used to receive a request to access information/data stored in the ER data store 211 and to provide a response to the request. In various embodiments, the user may operate a user computing entity 30 to access an online portal and/or other interactive user interface (IUI). Via the online portal and/or other IUI, the user may cause the user computing entity 30 to generate/create and provide a request for information/data such that the request is received by the server 65. The server 65 may access whether the user has appropriate user rights to access the requested information/data (e.g., via the data access/function controller 255 operating on the server 65). After and/or responsive to determining that the user has appropriate user rights to access the requested information/data, the extraction processing module 260 may process the request and access the requested information/data from the ER data store 211. In various embodiments, the DSML 245 may act as an intermediary and/or interface between the extraction processing module 260 and the ER data store 211. The computing entity may generate/create a response comprising the accessed information/data in a format and language corresponding to the online portal and/or other IUI and/or the user computing entity 30 that generated/created and provided the request.

Various components of the ER system 100 will now be described in further detail.

Message Pre-Processing

In one embodiment, each message, regardless of source, undergoes pre-processing. The pre-processing may include validating, filtering, parsing, and transforming/normalizing the message and/or generating/creating corresponding OPDO or DAPDO. In one embodiment, the ER system 100 may comprise various communications interfaces for receiving, filtering, transforming, storing, and/or the like messages. For example, the ER system 100 may receive DICOM® messages, HL7 messages, EDI messages, NCPDP messages, X12 messages, XML messages, and/or the like via a variety of communications interfaces. For instance, various source systems 40 may generate/create messages and provide the messages such that the server 65 of the ER system 100 receives the messages (e.g., via the communications interfaces). These interfaces may allow for interaction and communication with disparate source systems 40 using different technologies and protocols, including File Transfer Protocol (FTP), SFTP (SSH File Transfer Protocol), File, Hypertext Transfer Protocol (HTTP), Java Message Service (JMS), Lower Layer Protocol (LLP), Open DataBase Connectivity, Transmission Control Protocol (TCP), Simple Object Access Protocol (SOAP), JavaScript, and/or the like. Transformation tools include, but are not limited to, Java, JavaScript, Tcl, Python and Extensible Stylesheet Language Transformations (XSLT).

FIG. 8 provides a flowchart of exemplary process 800 (e.g., pre-processing and/or transformation process 800) illustrating various processes, procedures, steps, operations, and/or the like performed, for instance, by a message pre-processing module 220 operating on and/or being executed by a server 65. In various embodiments, the pre-processing and/or transformation process 800 is configured to generate/create an OPDO and/or DAPDO for each message (e.g., one OPDO and one DAPDO for each message) based at least in part on incoming messages, such that OPDOs or DAPDOs may be processed by the ingestion processing module 225.

Starting at step/operation 802, a message is received and assigned a message identifier. The message identifier allows the message to be stored in the system for various purposes. For example, the server 65 may receive a message via the communications interface 208, and/or the like. For instance, a source system 40 may generate/create a message and provide (e.g., transmit) the message such that the server 65 receives the message via a communications interface. In various embodiments, the message may be provided in a source vocabulary and/or source format. For example, the source system 40 may generate/create the message using a source vocabulary and/or source format that is used by the source system 40, for example, for internal processes. Upon receipt of the message, the communications interface 208 and/or processing element 205 may pass the message to the message pre-processing module 220.

Upon receipt of a message, the processing element 205 validates, filters, parses, and transforms/normalizes the message (e.g., information/data stored therein) as part of generating/creating an OPDO or a DAPDO for the message. As part of this process, the message is first validated and filtered at step/operation 804. For example, the validation may be a syntactic validation, e.g., to ensure that a given message is complete and properly formed. Similarly, the filtering may identify messages that are high priority messages. For instance, rules can detect high priority messages to be submitted to the ingestion processing module first. Then, the message is parsed into discrete data fields at step/operation 806. For instance, the message 900 shown in FIG. 9 shows a flat message (e.g., HL7 message) with delimited fields. In one embodiment, each of the following are parsed into discrete fields: PHNL160122, 299668, PATIENTIFIRST, PATIENTLAST, 1948-08-23 00:00:00.000, M, MEDICARE, 968887387, 1972697498, 2018-02-01 00:00:00.000, 2018-03-31 00:00:00.000, MEDICARE. After parsing the message, the parsed information/data is transformed or normalized into ontology concepts.

At step/operation 808, information/data in the messages is transformed/normalized from the source vocabulary to the ontology vocabulary. Source vocabularies may include a number of code systems and sets, such as ANSI X.12 (standard for defining electronic information/data exchange of healthcare administrative transactions); ANSI HL7 versions 2 and 3 (standards for the exchange, management and integration of electronic healthcare information/data); CPT (Current Procedural Terminology); HCPCS (Healthcare Common Procedure Coding System); ICD-9-CM and ICD-10 (International Classification of Diseases and Procedures); ISO (Internal Standards Organization); LOINC (Logical Observation Identifiers, Names and Codes); NACIS (Northern American Industry Classification System); NCPDP (script ePrescribing standard); NDC (National Drug Codes); NUBC (National Uniform Billing Code); RxNom (nomenclature for clinical drugs); and SNOMED CT (Systematized Nomenclature of Medicine), and/or the like. To transform/normalize from the source vocabulary to the ontology vocabulary, the discrete data fields are mapped from the source vocabularies to ontology vocabulary (e.g., ontology concepts), such as "diagnosis" or "procedure." In particular, each discrete data field is transformed/normalized to an ontology concept and is assigned the corresponding ontology concept identifier. Continuing with the above example, the following are assigned ontology concept identifiers: PHNL160122>>OX21265, 299668>>OX21537, PATIENTIFIRST>>OX211, PATIENTLAST>>OX254, 1948-08-23 00:00:00.000>>OX9904, M>>OX12518, MEDICARE>>OX 21536, 968887387>>OX 21261, 1972697498>>OX21272, 2018-02-01 00:00: 00.000>>OX21324, 2018-03-31 00:00:00.000>>OX21323, MEDICARE>>OX21536, and/or the like. As will be recognized, this approach allows for the translation and normalization of the information/data. Further, each ontology concept identifier is defined within the graph-based ontology and indicates the relationship and attribute information/data for the corresponding concept (see FIGS. 5A, 5B, AND 5C). This allows the ER system 100 to automatically and programmatically understand each information/data element, including its integration in the graph-based ontology. For example, if a person has a Caesarean section, the ER system 100 (using the graph-based ontology and ontology concept identifiers) can automatically and programmatically infer that the individual is a female, has been pregnant (gravida>0), and has had a non-vaginal delivery of a child, and/or the like. Similarly, the directed acyclic graph structure of the graph-based ontology also can be used to represent inheritance classes. For instance, an elevated Hemoglobin A1C indicates that the individual has diabetes, but also the inheritance of an entire class of characteristics of people that have diabetes.

After translating/normalizing from the source vocabulary to the ontology vocabulary, an OPDO is generated/created based at least in part on an "observable packet definition" for the message, which is communications-interface specific (step/operation 810). The observable packet definition uses the parsed and transformed/normalized information/data to generate/create an OPDO comprising the information/data values and their associated observables. Additionally, corresponding event/activity sets provide the context of the information/data comprised in the messages. Each event/activity has its own set of observables uniquely related to its context (a one to many mapping). For example, the context of a subject entity who is the subject of an eligibility event/activity message is an "insured" person, whereas the context of a subject entity who is the subject of a visit event/activity message is a "patient." The event/activity selected for a given interface definition limits the observables available for data field-defining, so only those concepts with the appropriate context are available for selection. Thus, the definition of an observable comprises the event/activity to which it is related, the type of entity it observes, the role of that entity, the aspect of the entity observed, the data type that describes the format of the information/data, and/or the like.

In various embodiments, generating/creating an OPDO comprises identifying observation groups from the observations provided in the message. As described above, an observation comprises a concept identifier (e.g., an observable identifier) and a corresponding value (e.g., the value determined and/or measured when the observable was observed). An observation group is a collection of observations that are related to one another as part of a single object. For example, a diastolic blood pressure measurement and a concurrently captured systolic blood pressure measurement are each observations that may be determined to be an observation group corresponding to blood pressure. In various embodiments, the observations may be organized into a hierarchical within the observation group, such that the relationships between observations within the observation group are indicated by the hierarchy. FIG. 10A illustrates an example OPDO 1000. In various embodiments, an OPDO is an XML document. As seen from the OPDO 1000, this particular OPDO 1000 comprises both observations and observation groups. After generation/creation of an OPDO, processing can continue to either step/operation 812 or step/operation 820.

If continue to step/operation 812, the message 900 may identify or refer to one or more entities. As will be recognized, the message 900 may comprise attributes corresponding to various entities that have various user roles corresponding to the event and/or transaction associated with the message 900. For example, the message 900 may reference a subject entity who is the subject of the event and/or transaction corresponding to the message. For instance, if the message 900 corresponds to a medical/healthcare event and/or transaction, the subject entity may be a patient receiving treatment, care, therapy, medication, advice, testing, and/or the like referenced in the message 900. Continuing with the medical/healthcare event and/or transaction example, the message 900 may further reference a treating physician, a lab technician who measured biometric information/data of the patient, a phlebotomist who drew blood from the patient, and/or the like as appropriate for the event and/or transaction corresponding to the message 900. At step/operation 812, attributes corresponding to entities referenced in the message 900 may be determined, identified, and/or the like. In various embodiments, the attributes corresponding to entities that are provided by the message 900 is dependent on the source system 40 that generated/created the message. For example, if the source system 40 is operated by and/or on behalf of a physician, the message 900 may comprise different, though possibly overlapping, attributes corresponding to entities than if the source system 40 is a claims processing system.

FIG. 11A illustrates some exemplary attributes 1102 that may be determined and/or identified for an entity (e.g., person actor, organization actor, location actor). In various embodiments, an attribute 1102 comprises (1) an attribute type (e.g., Medicare health insurance claim number (HICN), Medicaid recipient ID, healthcare ID, national provider identifier (NPI), medical record number), (2) attribute value (e.g., an alphanumeric code providing a value corresponding to the attribute type), and (3) an assigning authority (e.g., the source assigning attribute values for the particular attribute type). Information from a message 900 and/or an OPDO 1000 may be analyzed to identify attributes corresponding to various entities referenced in the message 900. As will be recognized, attributes may be other pieces of information/data, such as gender, birthdate, name, address, relationships to one or more known entities, and/or the like. For instance, panel 1104 of FIG. 11B identifies multiple entities (e.g., entities having different roles) corresponding to the event and/or transaction, as shown by the double underlined terms. Attributes corresponding to these entities are determined. For example, the attribute type is shown in all capitals, and the corresponding attribute values are shown singly underlined in panel 1104. And for a given message, there may be any number of entities.

Returning to FIG. 8, at step/operation 814, an identity matching service 240 is invoked to identify an entity (e.g., person actor, organization actor, location actor) known to the ER system 100 based at least in part on the attributes corresponding to the entity determined from the processing of the message (e.g., via process 1200 of FIG. 12). For instance, the message pre-processing module 220 may generate/create and provide an invoking API call (e.g., an API request) passing one or more attributes corresponding to an entity referenced in a message to the identity matching service 240. At step/operation 816, an entity identifier corresponding to the entity may be received via an API response. For example, the identity matching service 240 may identify an entity (e.g., person actor, organization actor, location actor) known to the ER system 100 based at least in part on the one or more attributes corresponding to the entity and passed to the identity matching service 240, and may return an API response comprising an entity identifier for the entity (e.g., person actor, organization actor, location actor). In various embodiments, the message pre-processing module 220 may generate/create and provide a plurality of invoking API calls (e.g., API requests) or a composite API call, such that each entity referenced in the message may be identified. For instance, an entity identifier may be determined for each of a plurality of entities referenced in the message. As will be recognized, process 1200 of FIG. 12 could occur before, during, as part of, and/or after the generation of the OPDO or the DAPDO. Although steps/operations 812, 814, and 816 are described in the context of the message pre-processing module 220, these steps/operations may also be executed by the ingestion processing module 225 in certain embodiments.

At step/operation 818, a DAPDO is generated/created based at least in part on the OPDO and other information/data, such as information/data in the message referenced by message identifier. For example, the OPDO (along with other information/data) is transformed from an XML document used for storage and transmission to a Java object that is executable or used for execution, such as via unmarshalling. Thus, the DAPDO comprises the structure of the OPDO with additional information/data that allows for the construction of a container tree data structure to ingest information/data identified in the OPDO. For example, each DAPDO comprises a DAPDO identifier, information/data from the corresponding OPDO, a DAPDO type (indicate the information/data it contains), an owner, a reference (e.g., a GUID) to the corresponding message, and a reference to the source system. This allows the DAPDO to be generated/created with the necessary information/data. Continuing with this example, the message pre-processing module 220 may generate/create a DAPDO for each received message. Generally, for each message, the ER system 100 generates one DAPDO. The DAPDO typically comprises information/data (including metadata) from the message and is structured based at least in part on the corresponding OPDO that was previously generated. In various embodiments, the metadata for the message may comprise a source identifier configured to identify the source system 40 that generated/created the message, an entity identifier for the subject entity (e.g., person actor, organization actor, location actor) of the event and/or transaction corresponding to the message, a timestamp indicating when the message was received and/or generated, and/or the like. As will be recognized, there may be any discrete number of entities that are identified as being associated with a message. And as previously noted, process 1200 of FIG. 12 could occur before, during, as part of, and/or after the generation of the OPDO or the DAPDO. Similarly, process 1200 may be executed by the message pre-processing module 220 or the ingestion processing module 225.

At step/operation 820, once created, an OPDO or DAPDO can be provided directly to the ingestion processing module 225 for final processing and filing based at least in part on various prioritization criteria. In this embodiment, the message OPDO or DAPDO is assigned to an electronic message processing queue for processing by the ingestion processing module 225. Alternatively, at step/operation 822, once created, a DAPDO can be stored in a data store for deferred processing in a manner that allows for extraction/retrieval of the same using entity identifiers.

Identity Matching Service

As previously referenced, as part of the process of generating a DAPDO (by the message pre-processing module 220 or the ingestion processing module 225), the ER system 100 generates an API request to an identity matching service 240 to identify at least one entity (e.g., person actor, organization actor, location actor) associated with the message. After the identity matching service 240 determines an identity of the entity for the message, it provides an API response to the ER system 100 to store the identity of the entity as part of the DAPDO.

The identity matching service 240 allows for the matching of any entity (e.g., person actors (patients, providers), organization actors (provider groups, insurance companies), location actors)) using matching criteria to determine whether the entities are already known to the ER system 100—e.g., associated with an existing ER or data object or whether a new ER or data object should be generated/created for the entity. In one embodiment, the matching criteria evaluated are specific to the source system 40 (e.g., hospital laboratory system, payor claim adjudication system) that generated/created and provided the message. Any information/data in the ER system 100 can be used for matching evaluation. Based at least in part on the information/data received by a given interface, and the information/data existing in the ER system 100, the multi-variable, multi-criteria set of matching rules may yield a match or no match. When a match is detected, the new information/data event can be used to persist the information/data into the ER system 100 for the entity (e.g., person actor, organization actor, location actor) that is a subject of the event. For instance, the DAPDO is updated to include one or more entity identifiers configured to identify the entities. As will be recognized, in this context, entities may be person actors (patients, providers), organization actors (provider groups, insurance companies), and/or location actors. By identifying the appropriate entity or entities, the information/data can be stored in the ER data store 211 corresponding to the same. If a match is not found, then a new entity record is generated/created and the information/data event is attached to the newly generated/created data object (e.g., via a newly generated/created entity identifier corresponding to the newly generated/created data object). The references to the other persons indicated in the message (e.g., physician, subscriber, guarantor, next of kin) and any organizations indicated in the message are likewise evaluated using the matching criteria processed the same way—that is (1) if matched, the entity identifier is returned for the existing entity (e.g., person actor, organization actor, location actor); if multiple matches, the entity identifiers are returned for the existing entities (e.g., person actors, organization actors, location actors) for further evaluation; and (3) if not matched, a new entity identifier is generated/created for the entity (e.g., person actor, organization actor, location actor), along with an ER and/or corresponding data object.

The identity matching service 240 allows for disparate information/data about an entity to be received from multiple sources and stored in an SBRO. The entities (e.g., person actors, organization actors, location actors) indicated within a message are matched to the entities known to the ER system 100 (or new data objects for the entities are generated/created if none previously exists). The identity matching process 1200 returns an ontology concept identifier that has been assigned to the entity (e.g., person actor, organization actor, location actor) and referred to herein as an entity identifier. Alternatively, criteria matching may also be used, such as demographic information (e.g., name, birth date, gender, address, telephone number, email address, mother's maiden name), identifiers (e.g., medical record number, social security number, member number, provider ID, driver's license ID), relationship information/data (e.g., family data, service provider relationship), and/or the like.

In one exemplary embodiment, all demographic source information/data is treated like any other data object; any demographic source information/data received in a message, form or web service input will generate/create an event. This permits the ER system 100 to display the demographic date in the relevant event, and be able to "rematch" the entity (e.g., person actor, organization actor, location actor) and/or re-execute as needed. In another embodiment, when two entities (e.g., person actors, organization actors, location actors) are recognized by the ER system 100 as being the same entity, they can be merged (e.g., via merge process), if necessary, by creating a third entity. The information/data and events from the two entities are merged. Likewise, entities (e.g., person actors, organization actors, location actors) may be unmerged (e.g., linked entities are separated). Audit histories may be generated/created for each entity involved in the unmerging, and formerly merged entities can be accessed through the audit history. In the unmerging process, any events for the merged entity are assigned to the appropriate lower level entity.

FIG. 12 provides a flowchart for exemplary process 1200 (e.g., identity matching process 1200) illustrating various processes, procedures, and/or the like for identifying an entity via the identity matching service 240 (e.g., operating on the server 65). For example, in one embodiment, the message pre-processing module 220 may be pre-processing a message to generate/create a DAPDO corresponding to the message and invoke the identity matching service 240 (e.g., via an API call (e.g., API request)). In another embodiment, the ingestion processing module 225 may be processing an OPDO to generate a DAPDO and invoke the identity matching service 240 (e.g., via an API call (e.g., API request)). And in yet another embodiment, the extraction processing module 260 may be processing an EPDO to generate a DAPDO and invoke the identity matching service 240 (e.g., via an API call (e.g., API request)). The API request is a request for the identity matching service 240 to identify one or more entities (e.g., person actors, organization actors, location actors) indicated in the message. In an example embodiment, one of the entities is the subject entity—the entity that is the subject of the event, such as a patient-corresponding to the message. In an example embodiment, the message may indicate other entities (e.g., person actors, organization actors, location actors) that have various roles in the event corresponding to the message. For instance, the other entities may include providers, retailers, suppliers, physicians, lab technicians, nurses, locations, and/or the like. As described above, a message is analyzed to identify and/or determine a plurality of attributes corresponding to one or more entities. In various embodiments, each of the attributes may be a value or a string that is associated with a class and/or ontology concept identifier. For example, the server 65 may determine a plurality of attributes corresponding to the entity. For instance, a first attribute and a second attribute corresponding to the entity may be identified and/or determined from the message (e.g., via a reference from an OPDO or a DAPDO) and/or the like. For example, at least first and second attributes are identified and/or determined by processing the message using an ontology concept identifier defined by a graph data structure corresponding to the graph-based domain ontology. Such attributes may include (1) an attribute type (e.g., Medicare health insurance claim number (HICN), Medicaid recipient ID, healthcare ID, national provider identifier (NPI), medical record number), (2) attribute value (e.g., an alphanumeric code providing a value corresponding to the attribute type), and (3) an assigning authority (e.g., the source assigning attribute values for the particular attribute type). The message pre-processing module 220 may then generate/create and provide an invoking API call (e.g., an API request) passing attributes (for each attribute, the attribute type, value, and assigning authority (e.g., the source assigning attribute values for the particular attribute type)) corresponding to an entity referenced in a message to the identity matching service 240. This API request invokes the identity matching service 240 to determine and/or identify an entity identifier corresponding to an entity (if known) to the ER system 100 that is the same entity referenced by the message.

At step/operation 1202, the identity matching service 240 is invoked by receiving an invoking API call (e.g., an API request). For instance, the server 65 (e.g., message pre-processing module 220, the ingestion processing module 225, and/or the extraction processing module 260) may generate/create and provide an invoking API call (e.g., an API request) invoking the identity matching service 240. In various embodiments, the invoking API call (e.g., API request) provides the plurality of attributes (for each attribute, the attribute type, value, and assigning authority (e.g., the source assigning attribute values for the particular attribute type)) corresponding to the entity that were identified and/or determined from the message. In various embodiments, assigning authority may be identified by a source identifier configured to identify the source system 40 that generated/created the message. In various embodiments, the invoking API call (e.g., API request) may also comprise the entity role indicating the role of the entity in the event corresponding to the message to the identity matching service 240.

At step/operation 1204, a rule set is identified and accessed based at least in part on the source identifier and/or entity role. For example, the server 65 may store and/or have access to a plurality of rule sets. The server 65 (e.g., via operation of the identity matching service 240) selects and/or identifies a rule set and accesses the rule set from the plurality of rule sets. In various embodiments, the rule set is selected and/or identified from the plurality of rule sets based at least in part on the source identifier and/or entity role passed to the identity matching service 240 (e.g., as part of the invoking API call (e.g., API request) in an example embodiment). In various embodiments, each rule set defines a sequence of attributes and/or attribute groups to be used to identify the entity. For instance, an attribute group may comprise two or more attributes. For instance, the rule set may define a sequence of attributes and/or attribute groups that are used, in sequence, to iteratively query the ER data store 211 to identify the entity. For example, the attributes may comprise entity names, entity identifiers, addresses, member identifiers, and/or the like. Similarly, the attributes or attribute groups may comprise (a) first names, last names, and middle initials; and (b) birthdates, genders, races, cities of residence, and/or the like. For instance, different source systems 40 may include different information/data corresponding to an entity of a particular entity role of an event. For example, different source systems 40 may be known to provide various types of information/data with more or less accuracy. In one embodiment, the rule set defines may be used to determine (a) which of the first attribute and the second attribute should be used to generate/create a first query used in a first attempt to identify an entity known to the ER system 100 that corresponds to the first and second attributes, (b) which of the first and second attributes should be used to generate/create a second query used in a second attempt to identify an entity known to the ER system 100 that corresponds to the first and second attributes, (c) the structure and format of the queries, and/or the like. Using the rules, the various queries can be generated/created at once or generated/created in sequence based at least in part on whether or not they will be used. That is, if the first query is successful, the second query would not need to be generated/created.

At step/operation 1206, the ER data store 211 is iteratively and/or sequentially queried based at least in part on at least a portion of the sequence of attributes and/or attribute groups. For example, the identity matching service 240 (e.g., operating on the server 65) may iteratively and/or sequentially query the ER data store 211 based at least in part on at least a portion of the sequence of attributes and/or attribute groups. For instance, a first query may be generated/created based at least in part on the first attribute and/or attribute group of the sequence of attributes and/or attribute groups. The ER data store 211 may be queried using the first query. In an example embodiment, the server 65 determines that a match is made and/or an entity is identified based at least in part on the first query when an entity that is known to the ER system 100 (e.g., is associated with an entity identifier) is associated with a corresponding attribute that matches the first attribute or group of attributes.

In an example embodiment, if the first attribute is an attribute group comprising first name "Jane" and last name "Doe," and an entity known to the ER system 100 is associated with the first and last name attributes "Jane" and "Doe," it is determined that a match is made and/or the entity is identified. In an example embodiment, if the first attribute is an attribute group comprising first name "Jane" and last name "Doe," and an entity known to the ER system 100 is associated with the first and last name attributes "Jan" and "Doe" or "J." and "Doe," it is determined that a match is not made and/or the entity is not identified. For example, in an example embodiment, the first attribute determined from the processing of the message and the corresponding attribute of the entity known the ER system 100 must match 100% for the entity known to the ER system 100 to be identified as being a match to the entity corresponding to the first attribute determined from the processing of the message.

If the first query successfully identifies a match (e.g., identifies an entity corresponding to first attribute), the match (e.g., the entity identifier for the identified entity known to the ER system 100) is returned to the message pre-processing module 220, the ingestion processing module 225, and/or the extraction processing module 260 (e.g., via an API response). If the first query does not successfully identify a match (e.g., does not identify an entity corresponding to the first attribute), a second query may be generated/created based at least in part on the second attribute and/or attribute group of the sequence of attributes and/or attribute groups. The ER data store 211 may be queried using the second query. In an example embodiment, the server 65 determines that a match is made and/or an entity is identified based at least in part on the second query when an entity that is known to the ER system 100 (e.g., is associated with an entity identifier) is associated with a corresponding attribute that matches the second attribute or group of attributes, such as date of birth and gender and/or date of birth a known relative. If the second query successfully identifies a match (e.g., identifies an entity corresponding to second attribute), the match (e.g., the entity identifier for the identified entity known to the ER system 100) is returned to the message pre-processing module 220, the ingestion processing module 225, and/or the extraction processing module 260 (e.g., via an API response). If the second query does not successfully identify a match, a third query may be generated/created based at least in part on a third attribute and/or attribute group, as indicated by the selected rules set. This process continues until there is a match or until all queries have been exhausted. And as previously noted, any iteration may also return multiple matches.

When it is determined (e.g., by the identity matching service 240 operating on the server 65) that the queries defined by the rule set have been exhausted without a match, it is determined that no match is found, and the process continues to step/operation 1208. At step/operation 1208, it is determined (e.g., by the identity matching service 240 operating on the server 65) that the ER system 100 does not know the entity referenced in the message, and in various embodiments, various actions may be taken. In an example embodiment, an error and/or exception is generated/created and provided to a user (e.g., administrative user) via a user interface of a user computing entity 30 and/or the like. In an example embodiment, a new entity/entity record is generated/created in the ER system 100, and a new entity identifier is generated/created and associated with the new entity/entity record. The new entity/entity record may be populated with the attributes determined from the processing of the message that correspond to the entity referenced in the message. The new entity identifier may then be returned to the message pre-processing module 220 or the ingestion processing module 225 (e.g., via an API response at step/operation 1210).

When it is determined (e.g., by the identity matching service 240 operating on the server 65) that an entity (or entities) known to the ER system 100 and that corresponds to the entity referenced in the message, the process continues to step/operation 1210. At step/operation 1210, the entity identifier configured to identify the entity known to the ER system 100 and that corresponds to the known entity is provided and/or passed to the message pre-processing module 220, the ingestion processing module 225, and/or the extraction processing module 260. In an example embodiment, the entity identifier configured to identify the entity known to the ER system 100 and that corresponds to the entity referenced in the message is provided and/or passed to the message pre-processing module 220 or the ingestion processing module 225 via an API response. For instance, the message pre-processing module 220 or the ingestion processing module 225 may receive the API response, and based thereon and/or responsive thereto, update or modify the DAPDO for the corresponding message to include the identified entity identifier in association with the corresponding user role. For example, receiving the API response may cause the message pre-processing module 220 to update, modify, and/or generate/create the DAPDO corresponding to the message to include the entity identifier in association with the corresponding user role.

As described herein, the message pre-processing module 220, the ingestion processing module 225, and/or the extraction processing module 260 can invoke the identity matching service 240 and receive a response from the identity matching service 240. For example, in some embodiments, the message pre-processing module 220, the ingestion processing module 225, and/or the extraction processing module 260 may pass an invoking API call (e.g., an API request and/or otherwise invoke) to the identity matching service 240 and receive a corresponding API response from the identity matching service 240.

As noted previously, OPDOs and DAPDOs can be stored in processing queues and/or passed to the ingestion processing module 225 for prioritized processing, at step/operation 820. Similarly, DAPDOs can be stored for deferred processing (e.g., user interaction event processing), at step/operation 822. In deferred processing (e.g., user interaction event processing), the DAPDO is stored in a data store in manner that allows for extraction/retrieval of the same using entity identifiers.

Various embodiments provide technical solutions to the technical problem of identifying an entity known to the ER system 100 based at least in part on information/data corresponding to the entity provided by a source system 40 (e.g., as part of message). For instance, by using a rules set that is particular to the source system 40 that provided the message, attributes corresponding to the entity extracted from the message may be used to query the ER data store 211 in an efficient manner such that the attributes most likely to provide a dependable match (based at least in part on the past behavior of the source system 40) are used before attributes that are less likely to provide a dependable match (based at least in part on the past behavior of the source system 40). Embodiments of the present invention therefore reduce the computational resources required to identify an entity known to the ER system 100 based at least in part on information/data corresponding to the entity provided by a source system 40. This allows the ER system 100 to allocate processing resources, memory resources, and/or other computational resources to other tasks while executing the identity matching services in parallel. Thus, various embodiments of the present invention therefore provide improvements to the technical field of identity matching services.

Deferred Processing of Messages

As noted previously, in prioritized processing, OPDOs and DAPDOs can be assigned to an electronic message processing queues for processing by the ingestion processing module 225. This allows for OPDOs and DAPDOs to be ingested by the ingestion processing module 225 in accordance with the prioritization rules and definitions of the corresponding electronic message processing queue.

In deferred processing (e.g., user interaction event processing), DAPDOs can be stored in a data store in manner that allows for extraction/retrieval of the same using entity identifiers (for the corresponding person actors, organization actors, location actors). In this embodiment, at a later point in time, a trigger corresponding to a stored DAPDOs may be identified, and the DAPDOs may be processed responsive thereto to update one or more ERs stored in the ER data store 211. In various embodiments, the trigger corresponding to a stored DAPDO is a trigger to process any DAPDOs corresponding to a subject entity or other entity having a relationship with the subject entity identified by the trigger, for instance. In one embodiment, the trigger may be a user interaction event, such as a member/patient logging into a user portal 2610 (see FIG. 26). For example, the member/patient (e.g., subject entity) may log into a user portal 2610 to view information/data corresponding to the user's (e.g., subject entity's) ER stored in the ER data store 211. In this example, a query for all DAPDOs associated with the member/patient (e.g., comprising the corresponding entity identifier) is generated and the corresponding DAPDOs are returned for processing by the ingestion processing module 225. In another example, the user interaction event may be that of a provider or other entity. In this example, a query for all DAPDOs for the provider or for members/patients of the provider (e.g., using any necessary entity identifiers) is generated, and the corresponding DAPDOs are returned for processing by the ingestion processing module 225. For instance, a physician or staff member at the practice where the physician practices and that has an active attending physician relationship, for instance, with the subject entity may log in to a portal 2610. The logging in to the portal by the physician or staff member may cause a trigger corresponding to subject entities to be identified based at least in part on corresponding entity identifiers (for the corresponding person actors, organization actors, location actors). For example, when the physician or staff member logs into the portal 2610 via a user profile (comprising an entity identifier), each subject entity having an active relationship with the physician of one or more relationship types is identified. In response, one or more queries for any DAPDOs is generated and the corresponding DAPDOs are returned for processing by the ingestion processing module 225.

In other embodiments, triggers may be identified based at least in part on predicted or anticipated user interaction events. For instance, a scavenger process may operate to identify subject entities for which the stored DAPDOs exist and trigger the processing of those stored DAPDOs in a prioritized manner, based at least in part on past user interaction events using one or more machine learning models. For example, if a subject entity generally logs into a portal 2610 on Wednesday morning, the one or more machine learning models may identify this pattern and predict that the subject entity will access the ER system 100 on Wednesday morning and consequently trigger the processing of the corresponding DAPDOs on Tuesday night. In another example, the scavenger process may be configured to select subject entities having stored DAPDOs based at least in part on a user priority paradigm. In an example embodiment, the user priority paradigm takes into account (a) if a subject entity has ever logged in to a portal 2610, (b) if an individual that has access to the subject entities ER (e.g., physician or other entity who a relationship that would permit them with access to the subject entity's ER) has ever logged into a portal 2610, (c) how frequently the subject entity logs in to the portal 2610, (d) how frequently an individual that has access to the subject entity's ER logs in to the portal 2610, and/or the like. Once all of the stored DAPDOs corresponding to higher priority subject entities are processed, the stored DAPDOs corresponding to lower priority subject entities are processed (possibly in a random order). In various embodiments, a variety of priority schemes may be used to cause triggers corresponding to one or more subject entities to be identified and thereby causing DAPDOs corresponding to the one or more subject entities to be processed by the ingestion processing module 225.

In an example embodiment, this form of deferred data ingestion processing and/or prioritized data ingestion processing (e.g., message processing) may be an alternate form of data ingestion. For instance, a primary form of data ingestion for the ER system 100 may include the complete processing of each message as the message is received via the stream of messages. For example, when a message is received, the message may be pre-processed by the message pre-processing module 220 to generate/create DAPDOs for provision to the ingestion processing module 225 for processing (and/or queuing for processing) in real-time or near real-time with respect to the generation of the DAPDO. However, when the incoming message volume is too high and/or the availability system resources are too low (insufficient memory resources, processing resources, network resources, and/or the like), the form of data ingestion used by the ER system 100 may be dynamically changed from the primary form of data ingestion (e.g., real-time or near real-time data ingestion) to the alternate deferred data ingestion processing. Thus, when configurable resource thresholds are satisfied, the deferred data ingestion processing may be dynamically initiated. Further, when the configurable resource thresholds are satisfied (e.g., the incoming message volume is sufficiently low and/or the availability system resources are sufficiently available), the primary form of data ingestion may again be initiated.

FIG. 15 provides a flowchart for exemplary process 1500 illustrating various processes, procedures, steps, operations, and/or the like for performing deferred processing (e.g., user interaction event processing), according to an example embodiment. Starting at step/operation 1502, a batch or stream of messages are received via one or more communications interfaces. For instance, a server 65 (e.g., via communications interface 208) may receive a batch or stream of messages. In various embodiments, each message may correspond to an event and/or transaction. For example, a plurality of source systems 40 may generate/create messages and provide the messages such that the server 65 receives the messages as a stream of messages.

At step/operation 1504, each message in the batch or stream is pre-processed in accordance with process 800. For instance, each message received by the server 65 may be passed to the message pre-processing module 220. The message pre-processing module 220 may then generate a DAPDO for each message. At step/operation 1506, DAPDOs can be stored for deferred processing (e.g., user interaction event processing). For instance, the server 65 may store the DAPDOs in non-volatile memory 206 and/or volatile memory 207 for deferred processing (e.g., user interaction event processing).

At step/operation 1508, a triggering event corresponding to at least one subject entity identifier is automatically detected, identified, and/or the like. For instance, the processing element 205 of the server 65 may automatically detect and/or identify a triggering event corresponding to at least one subject entity identifier. For example, as described above, the triggering event may correspond to a user interaction event—a user (e.g., associated with an entity identifier) logging into a user portal 2610. The user logging in may be a (a) patient/member, (b) physician, provider, or provider staff member having relationships with one or more patients/members or organizations, and/or the like. Similarly, the triggering event may be a scavenger process and/or a prioritized scavenger process selecting the subject entity, and/or the like. In an example embodiment, a triggering event may be associated with one or more subject entity identifiers (e.g., via a user profile). For instance, the triggering event may comprise various information/data corresponding to the subject entity and/or another entity having a relationship with the subject entity (e.g., a physician or other provider or provider staff) and the triggering event may be processed to identify one or more subject entities for which messages should be processed. For instance, the triggering event may be processed to cause the identity matching service 240 to be invoked to determine one or more corresponding entity identifiers (for the corresponding person actors, organization actors, location actors). In an example embodiment, the detection of a triggering event may include invoking a data access/function controller 255 to determine which subject entities have a relationship with a physician, provider, or provider staff member that allows the same to access one or more parts of the ERs corresponding to the subject entities. In the provider example, one or more queries for all DAPDOs for the provider or for members/patients of the provider (e.g., using any necessary entity identifiers) is generated (e.g., via a getMessageDAPDO( ) method) and the corresponding DAPDOs are returned for processing by the ingestion processing module 225. Similarly, in the patient/member context, a query for all DAPDOs for the member/patient is generated and the corresponding DAPDOs are returned for processing by the ingestion processing module 225.

At step/operation 1510, the DAPDOs corresponding to the subject entities are provided for processing to the ingestion processing module. For example, the server 65 may execute the ingestion processing module 225 to complete the processing of the DAPDOs as described with regard to process 1300.

At step/operation 1512, after any returned DAPDOs are provided for processing to the ingestion processing module 225 for processing, the server 65 can identify active relationships or related entities associated with the user (e.g., relationships in which a member/patient user has access to a spouse's ER or a child's ER)—e.g., via a getAccessibleEntities( ) method. At step/operation 1514, for active relationships or related entities associated with the user, the server 65 can generate one or more queries for any DAPDOs (using the respective entity identifiers) associated with the entities identified by the active (direct or indirect) relationships (e.g., via a getMessageDAPDOOfAccessibleEntities( ) method), such as described with regard to process 2900. And in response, any corresponding DAPDOs are returned for processing by the ingestion processing module 225. Thus, this process provides for deferred processing of DAPDOs directly associated with a user (e.g., patient/member, physician, provider, caregiver) and DAPDOs indirectly associated with a user.

As will be recognized, various embodiments provide technical solutions to the technical problem of efficiently submitting DAPDOs to the ingestion processing module 225 based at least in part on system resource availability and allocation. In particular, the deferred processing of DAPDOs to the ingestion processing module 225 in the described prioritized manner is transparent to the user and allows the ER system 100 to dynamically allocate resources based at least in part on need and availability, instead of creating a processing bottleneck. This approach also ensures that a user's information/data is the most up-to-date available.

Ingestion Processing

In various embodiments, the ingestion processing module 225 is configured to receive OPDOs or DAPDOs, process the same to generate/create one or more data transfer objects, and provide the one or more data transfer objects that may be then used to generate/create, update, and/or manage one or more ERs stored in the ER data store 211. In various embodiments, the ingestion processing module 225 generates a container tree data structure based at least in part on information/data of each DAPDO. FIG. 10B represents an exemplary container tree data structure. The ingestion processing module 225 may then traverse the container tree data structure in a depth-first traversal (e.g., working from the leaf nodes to the root node) to generate/create the data transfer objects to generate/create, update, and/or manage one or more ERs.

FIG. 13 provides a flowchart for exemplary process 1300 (e.g., ingestion process 1300) illustrating various processes, procedures, steps, operations, and/or the like performed by an ingestion processing module 225 operating on and/or being executed by a server 65 to process an OPDO or a DAPDO to generate/create data transfer objects that may be applied to an ER stored in the ER data store 211 to update and/or modify one or more data objects (e.g., SBROs) of the ER. Starting at step/operation 1302, the ingestion processing module 225 receives an OPDO or a DAPDO. For example, the message pre-processing module 220 may generate/create an OPDO or a DAPDO by performing pre-processing of a message generated/created and provided by a source system 40. The message pre-processing module 220 may then provide the OPDO or the DAPDO such that the ingestion processing module 225 receives the same.

At step/operation 1304, the ingestion processing module 225 reads the information from the OPDO or DAPDO.

If an OPDO is received, at step/operation 1306, the ingestion processing module generates/creates a DAPDO based at least in part on the OPDO, as described with regard to steps/operations 812, 814, 816, and 818 of FIG. 8. For example, the OPDO (along with other information/data) is transformed from an XML document used for storage and transmission to a Java object that is executable or used for execution, such as via unmarshalling. Thus, the DAPDO comprises the structure of the OPDO with additional information/data that allows for the construction of a container tree data structure to ingest information/data identified in the OPDO. For example, each DAPDO comprises a DAPDO identifier, information/data from the corresponding OPDO, a DAPDO type (indicate the information/data it contains), an owner, a reference (e.g., a GUID) to the corresponding message, and a reference to the source system. This allows the DAPDO to be generated/created with the necessary information/data. Additionally, this may include invoking the identity matching service 240 and its corresponding steps/operations to identify the message owner and any other entities referenced by the message. The steps/operations of these processes are not repeated here, but are incorporated by reference. If a DAPDO is received, step/operation 1306 is bypassed.

In that regard, either after reading the DAPDO and/or generating/creating a DAPDO, the ingestion processing module has the information/data to generate/create a tree data structure based at least in part on the DAPDO. The information/data may comprise one or more observation groups and a message identifier configured to identify the raw message. In various embodiments, the information/data in the DAPDO may also comprise entity identifiers (for the corresponding person actors, organization actors, location actors) associated with role identifiers; timestamps corresponding to when the measurements and/or determinations resulting in the values provided by the observations of the observation group were taken; a status corresponding to a treatment, lab work, test, and/or the like referenced in the DAPDO (e.g., whether the test has been ordered, test results have been returned, a claim corresponding to the test has been processed, and/or the like); a source identifier identifying the source system 40 that generate/create the message; and/or the like. In various embodiments, the observation group(s) were previously extracted from the OPDO provided as part of the DAPDO. In an example embodiment, a data object is generated/created for each observation group. In an example embodiment, a data object may comprise a plurality (e.g., two or more) observation groups.

At step/operation 1308, the ingestion process 1300 constructs a container tree data structure based at least in part on the DAPDO. In various embodiments, a data artifact packet container node is generated/created. The data artifact packet container node is the receptacle that holds all other container nodes of the container tree data structure and is the root node of the container tree data structure. See FIG. 10B. The graph-based domain ontology defines ontology concepts with appropriate selectable observables to generate/create the container tree data structure and to cause the container tree data structure to be populated. For instance, container nodes of the container tree data structure are populated with the concept identifiers and their observation values provided by the observations of the observation group(s) of the DAPDO. Each of the container nodes in the container tree data structure contains concept identifiers and their observation values used to populate data transfer objects. Container nodes are recursive but dependent upon the graph data structure representing the graph-based ontology. For example, the container tree data structure comprises a plurality of nested container nodes held within the root node (e.g., the data artifact packet container node). The leaves of the container tree data structure comprise concept identifiers and their observation values corresponding to the graph-based ontology concept of the parent container containing the leaf node. For instance, the observables in an observable group are related to one another in a manner described in the graph data structure representing the graph-based ontology. This graph data structure defines which container nodes can be subcontainer nodes of other container nodes. For example, an entity referenced in the DAPDO corresponds to an entity container node in the container tree data structure and the entity's name(s) corresponds to a subcontainer node of the entity container node (e.g., an entity name container). However, the reverse is not true. In particular, an entity name container cannot be a subcontainer node of an entity container node because this structure is not supported by the graph-based ontology or the graph data structure representing the graph-based ontology.

As noted above, at step/operation 1308, a container tree data structure is constructed based at least in part on the DAPDO. FIG. 14 provides additional detail of process 1308 (e.g., the container tree data structure construction process 1308) illustrating various processes, procedures, steps, operations, and/or the like performed (e.g., by the ingestion processing module 225 executed by the processing element 205 of the server 65) to construct the container tree data structure, in an example embodiment. Starting at step/operation 1402, an observation is read from the DAPDO. For instance, the ingestion processing module 225 may read an observation from the DAPDO. As described above, an observation comprises an ontology concept identifier and a corresponding value.

At step/operation 1404, based at least in part on the graph-based ontology, the type of container which should contain the observable is determined. For example, the ingestion processing module 225 (being executed by the processing element 205 of the server 65) may determine which type of container should contain the observable based at least in part on the graph-based ontology. Some non-limiting examples of container types include an entity container node; entity name container node which may have subcontainer nodes discrete entity name container and/or composite entity name container; address container which may have subcontainer nodes discrete address container and composite address container; amount container; blob container; certification container; contract service plan container; contract services container; data correction container; data correction pairs container; email container; employment container; item (e.g., health item) container; health status evaluation container node; health task container node;

identifier container node; language container node; language proficiency container node; location container node; message container node; note container node; observation element container node; occupation container node; plan descriptor container node; relationship container node; role field container node; specialty container node; specimen container node; system task container node; system task schedule container which may have subcontainer nodes interval task schedule container and/or singleton task schedule container node; telephone container which may have subcontainer nodes discrete telephone container and/or composite telephone container node; temporal container which may have subcontainer nodes ISO temporal container node; HL7 temporal container node; specified format temporal container node; test container node; value container node; website container node; and/or the like. Various embodiments may use a variety of types of container nodes appropriate for the domain being considered.

In various embodiments, an ontology concept is associated with a particular type of container. For instance, an entity identifier may correspond to container having the type entity container node. In another example, ontology concepts corresponding to items (e.g., health items) may correspond to container nodes having a type heath item container. Thus, the ingestion processing module 225 may determine which type of container corresponds to the read observation. To do so, the ingestion processing module 225 may query the graph-based ontology to identify the container type that should contain the corresponding items (e.g., observables).

At step/operation 1406, it is determined if a container node of the type of container determined to correspond to the read observation is present in the container tree data structure. For example, the ingestion processing module 225 may determine whether a container node of the type of container determined to correspond to the read observation is present in the container tree data structure. For instance, the ingestion processing module 225 may review and/or analyze the container tree data structure to determine whether a container node of the type of container determined to correspond to the read observation is present in the container tree data structure.

If, at step/operation 1406, it is determined that a container node of the type of container corresponding to the read observation is present in the container tree data structure, the process continues to step/operation 1408. At step/operation 1408, the observation is added to the container node of the type of container corresponding to the read observation. For example, the ingestion processing module 225 may add the read observation to the container within the container tree data structure that has the type determined to correspond to the read observation.

If, at step/operation 1408, it is determined that a container node of the type of container corresponding to the observation is not present in the container tree data structure, the process continues to step/operation 1410. At step/operation 1410, a new container node of the type of container corresponding to the read observation is constructed. For instance, the ingestion processing module 225 may construct, build, generate, and/or similar words used herein interchangeably a new container node that has the type that corresponds to the read observation. At step/operation 1412, the read observation is added to the new container node. For example, the ingestion processing module 225 may add the read observation to the new container node that has the type determined to correspond to the read observation. At step/operation 1414, the new container node is inserted into the appropriate location in the container tree data structure. For instance, the ingestion processing module 225 may determine the appropriate location for the new container node within the container tree data structure and insert the new container node into the container tree data structure at the determined appropriate location. For example, the container node may be a type that is a subcontainer node of another container (e.g., a discrete entity name container may be a subcontainer node of an entity name container but not a sub container node of a composite entity name container). In various embodiments, the appropriate location of the new container node is determined based at least in part on the graph-based ontology. In various embodiments, step/operation 1414 may be performed prior to step/operation 1412.

Once each of the observations of the DAPDO has been read and added to the container tree data structure, the ingestion processing module 225 may proceed to assembling (performing an assembly process via an invoked assembly method) the container tree data structure to generate/create the data transfer objects. In other words, once the container tree data structure has been constructed and populated based at least in part on the observation group(s) of the DAPDO, the container nodes of the container tree data structure are assembled, at step/operation 1310. The assembly process may generate/create one or more data transfer objects based at least in part on the container tree data structure. For instance, each container node may be assembled and return an assembled data transfer object as its return value. To assemble, each observation in the corresponding container node is individually, and without respect to order, evaluated to identify the data its value attribute holds. Once identified individually, the value of the container node can be assembled and evaluated for minimum requirements in order to generate/create a viable data transfer object. For example, it may be determined whether the value of the container is a reasonable and/or meaningful value for the container. For instance, if the container is an entity first name container node, the value of the container is expected to be a string of letters. If the value of the entity first name container is a string including numbers, the value of the container node does not satisfy the minimum requirements for creating a viable data transfer object, in an example embodiment. In another example, if the container node is a blood pressure container node, the container is expected to have a diastolic blood pressure value in the range of 0 to 110, for instance, and a systolic blood pressure value in the range of 0 to 200, for example. If the value of the blood pressure container node comprises one or more numbers that are outside of the corresponding range, the container node does not satisfy the minimum requirement for creating a viable data transfer object, in an example embodiment.

In various embodiments, an ontology concept has three persistable attributes: the source vocabulary, source vocabulary code, and an optional text description. In order to cull the desired information from the message and the three attributes of source vocabulary, source vocabulary code, and optional text description, three separate observations (key-value pairs consisting of a concept identifier (e.g., observable identifier) and a corresponding value) are resolved to a single ontology concept. For example, a triplet of observations may be defined based at least in part on the corresponding source vocabulary, source vocabulary code, and the optional text description provided by the message. For instance, during the assembly process, aggregators may resolve the triplet of observations into a single ontology concept.

Additionally, a message sometimes contains a primary and alternate set of source vocabulary or vocabulary codes that represent the same information/data. The graph-based ontology concepts resolved for the primary set and the alternate set of source vocabulary or vocabulary codes that represent the same data may be compared (e.g., by the aggregators of the ingestion processing module 225) to select the more specific ontology concept. For example, the primary set of vocabulary or vocabulary codes may be resolved to the graph-based ontology concept of broken left arm and the alternate set of vocabulary or vocabulary codes may be resolved to the graph-based ontology concept of broken left humerus. The graph-based ontology concept of broken left humerus is selected as the more specific ontology concept and used in further processing.

In various embodiments, to prevent recursions and attempts to assemble container nodes with errors, during assembly, a container node exists in one of four states: not assembled (assembly of the container node has not yet been attempted), undergoing assembly (the container node is currently being assembled), assembled (the container node has been successfully assembled), and unable to assemble (the attempt to assemble the container node has resulted in an exception). For instance, if, during assembly, it is determined that the value of a container node does not meet the minimum requirements for creating a viable data transfer object (e.g., a blood pressure value is negative, an entity first name is a string of numbers, and/or the like), the assembly of the container node may be halted and the state of the container node may be set to unable to assemble. Any exceptions or warnings encountered during this process are added to the appropriate collections (e.g., a warnings collection, an exceptions collection, and/or the like). For example, when a container is assigned the state unable to assemble, an exception or warning may be logged such that the container and/or the value of the container node may be manually reviewed. In various embodiments, exceptions are used to associate a Java exception with an ontology concept. This allows further information/data such as expanded descriptions and suggested resolutions.

In various embodiments, the ingestion processing module 225 is executed (e.g., by the processing element 205 of the server 65) to assemble one or more data transfer objects based at least in part on the container tree data structure by traversing the container tree data structure in a depth-first traversal. For instance, the container tree data structure may be traversed starting at a leaf node (e.g., a value of a container node) upward (e.g., via a depth-first traversal) to the root node of the container tree data structure. In the healthcare context, each data transfer object corresponds to a particular health item. For example, each data transfer object corresponds to one or more elements of an event and/or transaction. For instance, a data transfer object corresponding to blood pressure may be generated/created. The data transfer object comprises an entity identifier that may be used to identify the ER corresponding to the subject entity (e.g., the person whose blood pressure measurement is provided by the data transfer object), an ontology concept identifier identifying the health item to which the data transfer object corresponds (e.g., blood pressure), pairs of ontology concept identifiers and corresponding values indicating the observations (e.g., an ontology concept identifier for diastolic blood pressure and the measure diastolic blood pressure value, an ontology concept identifier for systolic blood pressure and the measured systolic blood pressure value), a timestamp indicating when the blood pressure measurement was taken, one or more provider entity identifiers (e.g., identifying the hospital/clinic where the measurement was taken, the physician and/or physician practice where the measurement was taken, the nurse/technician who took the measurement, and/or the like), and/or the like. For example, the data transfer object may comprise information/data that may be used to update an ER record, perform an SBRO process 1600, determine a confidence score for an SBRO element, and/or the like.

After completing the assembly process (e.g., once all the container nodes have a status of one of assembled and/or unable to assemble) and/or responsive to completing the assembly process, the ingestion processing module 225 is executed (e.g., by the processing element 205) to provide the one or more data transfer objects generated/created by assembling the container tree data structure to an SBRO process 1600, at step/operation 1312. For instance, the ingestion processing module 225 may provide the one or more generated/created data transfer objects for use in performing a database update function. In various embodiments, the database update function may be used to modify one or more ERs and/or SBROs of an ER stored in the ER data store 211 and/or perform a database insert function (e.g., insert one or more new ERs and/or insert one or more new SBROs of an ER). For example, the ingestion processing module 225 may pass the one or more generated/created data transfer objects to the SBRO processing module 265. The SBRO processing module 265 may then be executed to apply the data transfer objects to corresponding SBRO of the subject entity's ER. In various embodiments, a data transfer object may be used to update SBROs that are not part of the subject entity's ER. For instance, a data transfer object may be used to update an SBRO corresponding to a provider entity (e.g., an attending physician). In an example embodiment, a data transfer object may be used to update a relationship SBRO (e.g., that indicates a relationship between the subject entity and the provider entity, for instance). The SBRO process 1600 is described in more detail elsewhere herein.

The ingestion processing module 225 provides technical solutions to the technical problem of how to efficiently and effectively generate/create data transfer objects for use in the automated managing, ingesting, monitoring, updating, and/or extracting/retrieving of information/data of a 211 data store. In particular, the generation of the container tree data structure and the assembling of the container tree data structure to generate/create the data transfer objects provides a streamlined provides for an efficient method of generating data transfer objects that are applied to elements of an ER (e.g., via an SBRO process). This provides for a simplified approach for processing complex information/data. Additionally, the generation of the container tree data structure and the assembling of the container tree data structure to generate/create the data transfer objects takes advantage of the improvements provided through the use of the graph-based ontology. Additionally, after ingestion, each DAPDO is stored in a data store archive that allows for a complete audit history of all changes to information information/data in the ER system 211. In other words, by persisting a copy of each DAPDO, the source of any change can be traced to a corresponding DAPDO and consequently message and source system. Thus, various embodiments provide technical improvements in the field of data ingestion and processing, for example, for the automated managing and updating of a 211 data store.

SBRO Processing

As described above, the ingestion processing module 225 assembles a data artifact packet tree data structure to generate/create one or more data transfer objects. Once the data artifact packet tree data structure is assembled, the single best record object (SBRO) process 1600 is initiated.

In various embodiments, the ER data store 211 may comprise a plurality of ERs corresponding to subject entities. In various embodiments, each ER comprises a plurality of SBROs. In one embodiment, each ontology concept (as identified by its ontology concept identifier) may be associated with an SBRO or a plurality of SBROs. The SBRO comprises a data object comprising the "best" information/data known about the graph-based ontology concept corresponding to a subject entity (or pair of entities in the case of a relationship SBRO). For instance, a mammogram might first be reported via an appointment request, then subsequently by a visit summary when the patient checks in, then a report of the exam several days later, followed by a claim submission for payment, and finally the payment for the exam. SBRO allows each of these events to refer to the same event using an SBRO. For an entity (also referred to herein as an actor, subject entity, and/or the like) various types of information/data can be processed through the SBRO process 1600. For example, items (e.g., health items), relationships, observations, and/or the like can all be processed as described herein.

To account for the multiple messages and/or pieces of information/data, the SBRO process 1600 involves at least two steps/operations: (1) determining the appropriate ontology concept for the information/data in the SBRO process 1600 (using the programmatic reasoning logic 230) and (2) determining the fitness of the information/data. Once the appropriate ontology concept for the information/data of a data transfer object is determined (e.g., using the programmatic reasoning logic 230), the SBRO process 1600 evaluates the information/data from the data transfer object with that of the stored data object for the same ontology concept (based at least in part on the concept identifier). The SBRO process 1600 then evaluates the information/data from the data transfer object with that of the stored data object for semantic resolution, temporal resolution, and resolution of provenance and reliability (e.g., possibly based at least in part on the source system 40 that generated/created the message resulting in the data transfer object and/or information/data stored in the SBRO). With regard to semantic resolution, the SBRO processing module 265 determines whether the information/data elements are disparate events or a related event. For temporal resolution, the SBRO processing module 265 evaluates whether the sequence of events and the dates and times reported are consistent with a single event or multiple occurrences of the same type of event. For instance, the SBRO processing module 265 can determine whether two information/data elements relate to a single persistent chest infection or two distinct cases of chest infection in the same individual. And for the resolution of provenance and reliability, the SBRO processing module 265 evaluates the reliability of the information/data elements (e.g., based at least in part on the corresponding source system 40). For example, an indirect patient report of a laboratory result has a different level of imputed reliability than that same information/data directly reported by the laboratory system. The SBRO processing module 265 transforms partial, overlapping, elementary information/data transactions into a coherent ER of an individual's healthcare events and state of health. For instance, a single healthcare event, such as a procedure can easily give rise to thirty or more information/data transactions spread across various source systems. However, the SBRO processing module 265 enables those thirty or more transactions to be represented via a single SBRO of the subject entity's ER.

FIG. 16 provides a flowchart for exemplary process 1600 (e.g., SBRO process 1600) illustrating various processes, procedures, steps, operations, and/or the like performed, for example, by an SBRO processing module 265 executing on a processing element 205 of a server 65, to determine which information/data to include in an SBRO and to update the SBRO appropriately. Starting at step/operation 1602, a data transfer object is received. For instance, the ingestion processing module 225 may generate/create a data transfer object and pass the data transfer object to the SBRO processing module 265. The SBRO processing module 265 may then receive the data transfer object.

At step/operation 1604, the SBRO type corresponding to the data transfer object is determined based at least in part on the graph-based ontology. For example, the server 65 may determine the SBRO type corresponding to the data transfer object. For instance, the SBRO processing module 265 may invoke programmatic reasoning logic 230 and/or otherwise cause programmatic reasoning logic 230 to determine an SBRO type corresponding to the data transfer object. For example, the programmatic reasoning logic 230 (e.g., via processes 1700A and/or 1700B) may analyze ontology concept identifiers present in the data transfer object to identify and/or determine an SBRO type corresponding to the data transfer object. In various embodiments, an SBRO may correspond to an item (e.g., a health item), a relationship (e.g., between two entities), subject entity identifying information/data (e.g., name, birthdate, social security number, insurance member identification number, and/or the like), subject entity contact information/data (e.g., address, telephone number, email, and/or the like), and/or other ontology concepts and the SBRO type indicates the ontological concept corresponding to the SBRO. For instance, the data transfer object may correspond to the ontological concept of a fractured left humerus. The SBRO processing module 265 may determine, based at least in part on the ontological concept corresponding to the data transfer object that the SBRO type corresponding to the data transfer object is a broken arm SBRO type.

At step/operation 1606, it is determined whether an SBRO of the determined SBRO type (e.g., the SBRO type determined to correspond to the data transfer object) exists in the ER corresponding to the subject entity. For example, the SBRO processing module 265 may invoke the DSML 245 (e.g., via one or more API calls (e.g., API requests), in an example embodiment) to access at least a portion of ER corresponding to the subject entity. In an example embodiment, the SBRO processing module 265 may request that the DSML 245 return any SBRO of the ER corresponding to the subject entity and having the determined SBRO type (e.g., the SBRO type determined to correspond to the data transfer object).

When the DSML 245 returns a null response, it is determined that an SBRO of the determined SBRO type does not exist in the ER corresponding to the subject entity and the process continues to step/operation 1608. Similarly, when the DSML 245 returns a response comprising one or more SBROs of the determined SBRO type from the ER corresponding to the subject entity, the DSML 245 loads the SBROs into cache memory from the ER data store 211. The SBRO processing module 265, via use of the programmatic reasoning logic 230 as described herein, may determine whether any of the SBROs of the determined SBRO type and read/loaded from the ER corresponding to the subject entity correspond to the same health item, event, and/or transaction as the data transfer object. For instance, if the data transfer object is associated with the ontological concept fractured left humerus and the determined SBRO type is broken arm, an SBRO may be returned that corresponds to a fractured right ulna, it is determined that existing SBRO read/loaded from the ER corresponding to the subject entity does not correspond to the same health item, event, and/or transaction as the data transfer object. In another example, the SBRO returned from the ER corresponding to the subject entity may correspond to a fractured left humerus that was diagnosed six years ago, and it may be determined that the existing SBRO read/loaded from the ER corresponding to the subject entity does not correspond to the same health item, event, and/or transaction as the data transfer object. In yet another example, the SBRO returned from the ER corresponding to the subject entity may correspond to a fractured left humerus that was diagnosed one month ago and it may be determined that the existing SBRO read/loaded from the ER corresponding to the subject entity does correspond to the same health item, event, and/or transaction as the data transfer object. When it is determined that the SBRO of the determined SBRO type corresponds to the same health item, event, and/or transaction as the data transfer object, the process continues to step/operation 1610. In various embodiments, programmatic reasoning logic 230 may be used to perform steps/operations 1604 and/or 1606. For example, the SBRO processing module 265 may invoke programmatic reasoning logic 230 (e.g., via one or more API calls (e.g., API requests), in an example embodiment) to complete various portions of steps/operations 1604 and/or 1606.

At step/operation 1608, since there is not an existing SBRO corresponding to the same health item, event, and/or transaction as the data transfer object in the ER corresponding to the subject entity, a new SBRO corresponding to the health item, event, and/or transaction corresponding to the data transfer object and corresponding to the subject entity is generated/created. For instance, the SBRO processing module 265 may generate/create a new SBRO of the determined SBRO type (e.g., the SBRO type determined to correspond to the data transfer object) and populate the new SBRO based at least in part on the data transfer object. For example, a new SBRO may be initialized having a plurality of empty and/or null data fields and/or elements. For instance, the information/data in the data transfer object may be used to populate one or more data fields and/or elements of the new SBRO. For example, the subject entity identifier data field and/or element of the new SBRO may be populated with the subject entity identifier of the data transfer object. Various other information/data and/or metadata contained in and/or provided by the data transfer object may be used to populate various other data fields and/or elements of the new SBRO. The SBRO processing module 265 may then provide the new SBRO to the DSML 245 and request the DSML 245 to store the new SBRO in the ER data store 211 in association with the ER corresponding to the subject entity. In an example embodiment, the SBRO processing module 265 may pass an API call (e.g., API request) comprising and/or identifying the new SBRO and requesting the new SBRO be written to persistent storage (e.g., in the ER data store 211). The SBRO processing module 265 may also cause one or more change logs, update logs, and/or the like to be updated with metadata corresponding the new SBRO and the storing of the new SBRO to the ER data store 211 in association with the ER corresponding to the subject entity.

At step/operation 1610, since there is an existing SBRO corresponding to the same health item, event, and/or transaction as the data transfer object in the ER corresponding to the subject entity, the SBRO processing module 265 evaluates the data transfer object in light of the SBRO and/or the information/data currently stored/contained by the SBRO. The SBRO process 1600 evaluates the semantic resolution, temporal resolution, and resolution of provenance and reliability (e.g., possibly based at least in part on the source system 40 that generated/created the message resulting in the data transfer object and/or information/data stored in the SBRO) of the information/data of the data transfer object compared to the information/data of the existing SBRO. For instance, with respect to the resolution of provenance and reliability, the SBRO processing module 265 evaluates the reliability of the information/data elements (e.g., based at least in part on the corresponding source system 40). For example, an indirect patient report of a laboratory result has a different level of imputed reliability than that same information/data directly reported by the laboratory system. In various embodiments, the SBRO processing module 265 may determine and/or evaluate whether the information/data of the data transfer object is more complete, more detailed, more reliable, and/or otherwise "better" than the information/data of the existing SBRO.

At step/operation 1612, it is determined whether the SBRO (e.g., one or more data fields and/or elements of the SBRO) is to be updated based at least in part on the information/data of the data transfer object, based at least in part on the evaluation of the information/data of the data transfer object, based at least in part on the existing SBRO. For instance, the SBRO processing module 265 may determine, based at least in part on the evaluation of the information/data of the data transfer object based at least in part on the existing SBRO, whether the SBRO is to be updated based at least in part on the information/data of the data transfer object. For example, if one or more elements of the information/data of the data transfer object is determined to be "better" (e.g., more detailed, more complete, more reliable, and/or the like) than the corresponding one or more elements of information/data of the SBRO, then the SBRO processing module 265 may determine that the SBRO (e.g., the one or more elements of information/data of the SBRO) should be updated based at least in part on the corresponding one or more elements of information/data of the data transfer object. When, at step/operation 1612 it is determined that SBRO should not be updated based at least in part on the data transfer object, the SBRO processing module 265 instance that received the data transfer object ends and the SBRO is not updated. In an example embodiment, the SBRO processing module 265 may cause a change log to be updated to indicate that the SBRO was not updated based at least in part on the data transfer object.

At step/operation 1612, when it is determined that the SBRO should be updated based at least in part on the data transfer object, the process continues to step/operation 1614. At step/operation 1614, the SBRO is updated and the updates to the SBRO are written to persistent storage by the DSML 245 as described herein. For instance, the SBRO processing module 265 may update one or more elements of the SBRO accessed from the ER data store 211 (e.g., loaded into cache) and/or cause the one or more elements of the SBRO accessed from the ER data store 211 (e.g., loaded into cache) to be updated. In an example embodiment, updating the SBRO may include updating and/or modifying one or more persistent flags, persistent collections, modified flags, and/or modified collections associated with the updated and/or modified elements of the SBRO. For example, the persistent flag corresponding to each data field and/or element of the SBRO may indicate whether or not the data field and/or element of the SBRO has already been written to persistent storage or not. For instance, the persistent collection may indicate which of the data fields and/or elements of the SBRO have already been written to persistent storage. For example, the modified flag corresponding to each data field and/or element of the SBRO may indicate whether or not the data field and/or component of the SBRO has been updated and/or modified based at least in part on the corresponding information/data element of the data transfer object. For instance, the modified collection may indicate which of the data fields and/or elements of the SBRO have been updated and/or modified based at least in part on the corresponding data fields and/or elements of the data transfer object. The SBRO processing module 265 may then invoke the DSML 245 (e.g., via one or more API calls (e.g., API requests)) to cause any changes and/or modifications to the SBRO to be stored in persistent storage (e.g., in the ER data store 211). In various embodiments, the SBRO processing module 265 may update a change log and/or cause a change log to be updated to indicate the changes and/or modifications made to the SBRO.

At step/operation 1616, the SBRO processing module 265 may optionally cause a confidence score for one or more elements of the SBRO to be determined or predicted and stored in association with the SBRO. For example, the SBRO processing module 265 may cause a confidence score engine 235 to determine a confidence score (as discussed with regard to process 1800) for one or more elements of the SBRO (e.g., one or more data fields and/or elements). The SBRO processing module 265 and/or the confidence score engine 235 may cause the DSML 245 to store the confidence score in association with the SBRO in the persistent storage of the ER data store 211.

After the SBRO processing module 265 finishes processing a data transfer object, the data transfer object may either be stored in some embodiments and discarded in other embodiments.

Embodiments of the present invention provide technical improvements to automated managing, ingesting, monitoring, updating, and/or extracting/retrieving of information/data of an ER data store 211 by enabling the ER system 100 to determine the best (e.g., most complete, most reliable, and/or the like) information/data available to the ER system 100 corresponding to an event and/or transaction and storing that best information/data for user access.

Programmatic Reasoning Logic

Once the expressions (e.g., descriptions/definitions/relationships) of the graph-based ontology concepts and/or classes defined by the graph-based ontology have been created, programmatic reasoning logic 230 can take the expressions and arrange them in the correct multi-dimensional classification based at least in part on their structures (properties). For instance, the programmatic reasoning logic 230 may generate/create (or access thereafter) a graph data structure representing the expressions of the graph-based ontology concepts and/or classes. For example, FIGS. 5A, 5B, and 5C illustrate example slices of the graph data structure. In the albuterol case, the programmatic reasoning logic 230 (rather than a human modeler) deals with all aspects of the albuterol concept, such as the active ingredients, formulation, administration route, and/or the like.

The programmatic reasoning logic 230 can consider all of the detail to extract/retrieve all relevant information/data about a concept currently involved in an ER operation, such as in the ingestion process 1300 and/or SBRO process 1600, for example. In the regard, the programmatic reasoning logic 230 can be used to determine whether an assigned ontology concept code in an OPDO and/or a DAPDO is accurate. Additionally or alternatively, the programmatic reasoning logic 230 can be used to determine an assigned ontology concept code from an OPDO and/or a DAPDO when one is not provided.

FIG. 5C shows some of the "anonymous ancestors," parents, and associated axes that inherit into "chronic obstructive pulmonary disease"-different dimensions that automatically attach every time the concept of COPD is invoked. Not surprisingly, one finds association with Shortness of Breath; the disease occurs in the lungs and in the thorax; there is an association with a patient-reported or provider-described discomfort or difficulty in breathing, and/or the like. The beauty of the environment is that none of these things need to be remembered or referenced by a human every time COPD is considered—with the graph-based ontology, this happens automatically. In short, the modularization of the human task, coupled with the mathematical rigor of the programmatic reasoning logic's 230 examination of every possible connectoid in the graph-based domain ontology creates deep stability. Concepts and class expressions that are reasoned appropriately and named can be reused safely and indefinitely. Parts of the ER system 100 that have been settled can be left alone—this is why changes to the core tend to be infrequent after processing a large number of messages (e.g., a hundred thousand to one billion or more messages). Thus, in various embodiments, the programmatic reasoning logic 230 is executed prior to the processing of a particular message and the results of processing the programmatic reasoning logic 230 are stored (e.g., in cache) and used to interpret and/or perform reasoning tasks with relation to the processing of a particular message and the updating of an ER based thereon. For example, the programmatic reasoning logic 230 may execute to generate/create (or access thereafter) a graph data structure, and the graph data structure may be stored (e.g., in cache) such that the graph data structure does not need to be re-generated during the processing of each message. For example, the ER system 100, prior to runtime, may execute every possible query to the ontology and store the corresponding responses in a cache for increased efficiency.

Further, an importantly for large, complex users, principled, safe extensions to the graph-based domain ontology can be made to deal with unusual cases without causing any erosion of other already-tested components of the environment. For instance, relationships between ontology categories and/or concepts not defined in the graph-based domain ontology and classes and/or concepts defined in the graph-based ontology may be reasoned and/or determined by the programmatic reasoning logic 230 (e.g., using the cached responses and/or the pre-generated graph data structure).

Having the programmatic reasoning logic 230 perform the task of generating the graph data structure and reasoning against the same provides significant technical advantages. It is now possible to make generalized statements about concepts and have the computing entity deal with all the consequences of those statements. For example, from a single statement that an active ingredient has a certain therapeutic effect, the programmatic reasoning logic 230 will ensure that all medications comprising that active ingredient are placed in the appropriate therapeutic group. This results from the application of description logic by the programmatic reasoning logic 230 and does not require a person to attempt to do it by hand for each of thousands of concepts. One consequence of this is that the traditional notion of "level" (such as level of a hierarchy) as a fixed thing is neither required nor supported. Rather, each concept is classified in as many dimensions as it has properties. Rather than ask about locations in hierarchies, we ask 'what is known about this concept' both directly stated and inferred by the programmatic reasoning logic 230. The information system can choose to "view" the concept from a particular perspective at any instant in time, but every such view pulls through the relationships to all other views simultaneously. As importantly, the choices of such views or operational states are no longer frozen at construction.

In several embodiments, the present invention includes the genericization of canonicity. In the context of ontology work, "canonical" means the "canonical form of an expression." It is concerned with how things are represented in formal systems of logic, such as those used in the present system, and canonicity can be pivotal to the proper performance of such environments. Canonical means the single form to which an expression may canonize. It does not necessarily mean that form is "correct" in any external, human sense of meaning.

The "Canonical Form" arises in representations that allow concepts to be combined through relationships to generate/ create formal definitions of other concepts. It comprises how to deal with there being multiple ways of expressing what is the same thing. For instance, if there are concepts for Fracture and Humerus, and a relationship hasLocation, and there are rules for combining them, then the combination can be generated/created (Fracture that hasLocation Humerus). This could be defined as "meaning" fracture of the humerus. In this example, Fracture and Humerus are primitive concepts. By defining things, they can now have a set of richer formal meanings which can be more useful.

If concepts are now added for severity and other parts of long bones such as "shaft," then more formally defined concepts can be generated/created:

| Expression | Interpretation |
|---|---|
| Shaft that isPartOf Humerus | "shaft of the humerus" |
| Fracture that hasSeverity severe | "severe fracture" |
| Fracture that hasSeverity severe and hasLocation Humerus | "severe fracture of the humerus" |

The issue of "canonical" arises when there are multiple ways of expressing the same thing, including elements of a description that are redundant. For example, Fracture that hasLocation Humerus and hasLocation Bone clearly has a redundant element if, in the graph-based ontology, Humerus is a kind of Bone. The canonical form is derived using rules that embody this type of situation. Thus, one would expect the canonical form of: Fracture that hasLocation Humerus and hasLocation Bone to be Fracture that hasLocation Humerus. The situation gets more complex, however, when complex expressions are embedded in other expressions. For instance, "fracture of the shaft of the humerus" could be: Fracture that hasLocation (Shaft that isPartOf Humerus) or Fracture that hasLocation Humerus and hasLocation (Shaft that is Part Of Humerus). Further, Fracture that hasLocation Shaft and hasLocation Humerus would be expected to resolve all to a canonical form Fracture that hasLocation (Shaft that isPartOfHumerus). Likewise, when introducing concepts of left and right laterality, a "left-sided fracture of the humerus" must end up the same as "a fracture of the left humerus." Dealing with such issues is non-trivial and requires sophisticated information/data science.

These examples are practical, and arise, for instance, when dealing with information/data entry. A user may select the condition (fracture) first and then the site, or the site and then the condition, or (because users are human) some mix of the two. In a graph-based ontology, there are several "routes" to the same concept, so it is imperative that the same concept eventuates irrespective of the route taken to get there (e.g., traversal of nodes and edges in the directed acyclic graph data structure). Current systems and environments do not consider these issues or do not treat them with formal rigor, resulting in a multiplicity of ways the same information/data is stored. This creates the well-recognized issues in attempting to query or act intelligently on such information. Thus, previous systems fail or do not attempt an individual patient focus.

Almost all attempts to be truly "canonical" are flawed by not understanding the above. SNOMED is an example of this. For example, SNOMED began by creating a separate SNOMED code for every definition it intended to be used, thereby hoping to avoid the canonical form issue. However, if separate codes are generated/created for every possible combination, the graph-based ontology becomes so large that it defeats the purpose of having a compositional scheme.

Embodiments of the present invention comprise a fully modeled concept for every kind of unit/numeric value and are dealt with generically and with minimal computational requirements. To be comparable, information/data must be expressed in a canonical form. Any kind of measurement information/data, such as concentration of substance in a specimen (e.g., glucose 100 mg/dL), physiological function measurements (e.g., diastolic blood pressure 93 mmHg), currency observations (e.g., paid amount $100 USD), strength of a medication (e.g., amoxicillin 500 mg) or administered dose (e.g., 2 tablets) is expressed in the ER system 100 in canonical form. Such information/data is represented as a measurement data object composed of a "role" (what) and a quantity which is expressed as a discrete numeric value and unit of measure.

A model example of some measurements expressed in the formal-description-logic-based canonical form (role-value-unit) is:
311668 Metoclopramide 5 MG Oral Tablet
TabletDoseForm
and (hasActiveingredient some
   (MetoclopramideHydrochloride
   and (hasStrength some
      (Quantity
      and (hasUnit some milligram)
      and (hasMagnitude value 5.00))))
   and (hasDoseQuantity some
      (Quantity
      and (hasUnit some TabletForm)
      and (hasMagnitude value 1.00))
   and (hasMedicationRoute some OralingestionRoute)
   and (hasUnitDoseMeasure some TabletForm)
   and (hasActiveingredient only
   (MetoclopramideHydrochloride
   and (hasNumerator some
      (Quantity
      and (hasUnit some milligram)
      and (hasMagnitude value 5.0f)))))
In this example, the canonical representation is important. However, it is difficult to determine the appropriate values from patient information/data received when the information/data is incomplete. In the healthcare context, the standard of practice in medicine is to include the unit of measurement along with any clinical measurement. Whether a result is associated with a glucose value on a blood sample, a blood pressure taken in the doctor's office, a bone length measured by imaging, or even an age, there is an expectation that the information/data value associated with the observation will comprise its corresponding unit of measure as it is required to accurately understand the meaning of the information/data.

Unfortunately, not all clinical settings and not all systems report an observation's unit of measure. Often, no unit of measurement is provided, the unit of measure is asserted in the observation concept itself (e.g., the name of the result) instead of in the unit's field, or the unit does not correlate to the information/data value. People reading information/data on a handwritten record or a computing entity screen display often infer the unit based at least in part on their knowledge of what is sensible or physiologically possible. While they may be right, often they are not. Unfortunately, current systems cannot de novo make those kinds of inferences and cannot subsequently process the information/data value in the ways desired. Such non-categorized information/data cannot be correlated to other like information/data values for display purposes, such as trending and graphing. Similarly, it appropriately be used in automated decision support processes (e.g., rules) or in accurate reporting.

The ER system 100 can perform unit inference based at least in part on value characteristics. For some information/data values, the unit of measurement corresponds to a mutually exclusive set of value ranges if the characteristics of the information/data elements are known. For example, analyte observations are most commonly seen in the lab and typically measure the amount of a substance in a specimen. If the numeric analyte value falls within a certain range, the unit can be inferred. For instance, a unit mg/dL can be inferred for a glucose value of 101 (valid range >=25), whereas mmol/L can be inferred for a value <10. This kind of modeling requires an understanding of the kinds of testing that can be done for glucose and the potential range of results and the modeling of the measurement concepts to deal with them automatically and appropriately. Similarly, body temperatures in a clinical setting are typically reported in Fahrenheit and/or Celsius. The scales of these two measurement schemes are mutually exclusive relative to the values observed for living persons; therefore, the measurement concepts "understand" that if <45 infer the unit as Celsius and if >85 infer the value as Fahrenheit (assuming the patient/subject entity is alive).

The ER system 100 also can perform unit inference based at least in part on age and gender-specific value considerations. For some information/data values, the unit of measurement is modeled to incorporate a set of age-specific value parameters. The age of the patient is a factor to help determine which set of values apply; this is similar to the mechanism used for age-adjusted reference ranges of which there are often many, especially in pediatric populations. Two examples are weight and height.

Weights are commonly reported in kilograms and/or pounds in a clinical setting. Thus, for example, the ER system 100 may receive weight values of 25.25 and 11.48, both without any units, on a 19-month old patient from two visits (to different offices) on the same day. Using gender-specific and situation-specific growth chart information/data incorporated in the model as a reference to provide age-gender related ranges, the 11.48 value fits within the male 18 month age range of 9.5 kgs. (20.9 lbs.) to 14.3 kgs (31.5 lbs.), and thus would infer a unit of kgs. The measurement of 25.25 would infer a unit of lbs., also within the appropriate range.

Similarly, heights are commonly reported in inches and/or centimeters in a clinical setting. Thus, for instance, the ER system 100 may receive height values of 32.5 and 82.5 for the 19-month old patient on the same day. Based at least in part on age-gender growth chart information/data for males, the 82.5 measure is tagged as centimeters, and the 32.5 value as inches.

The ER system 100 can also perform unit inference based at least in part on observable definition of unit inclusion. In some cases, the unit is part of the description of the information/data label such as "Weight (lbs.)." In these cases, the interface definition uses the "observable" that includes the unit in its definition. This provides all of the appropriate parsing and definition of the incoming information/data to the proper concepts; thus, all of the rest of the proper management of the unit-of-measure from that point forward is handled automatically across all operations. Everything becomes a modeled concept, including units and measures. They then can be fully incorporated into the knowledge model (e.g., the graph-based domain ontology).

As described, observables provide a simplified, external view used for ingesting information/data (e.g., items) into the ER system 100. They provide a simple, real-world link from things that can be seen directly to the complete knowledge base of the present invention, including but not limited to the information/data model, the knowledge model (e.g., the graph-based domain ontology), and the SBRO model. The modules and services described herein provide the services to accept inbound information/data from various source systems 40, including source systems with pre-existing information/data. The modules and services manage the processing of the source system information/data, in conjunction with OPDOs linkage and/or DAPDO linkage (relationship) definition to generate/create OPDOs and/or DAPDOs to be processed for persisting the information/data stored therein. As described previously, OPDOs and/or DAPDOs may comprise observations, which are key-value pairs (e.g., an observable and a source information/data value). Each observable may have connections and relationships to many concepts and information/data model (e.g., graph-based domain ontology) components. Observables minimize the amount of the underlying infrastructure that must be known when completing a connectoid.

From a process perspective, once a message (e.g., message 900) is received by the ER system 100, the message's observable packet definition is used to parse the message and generate/create an OPDO comprising the information/data values and their associated observable, which is then used to generate/create a corresponding DAPDO (either by the message pre-processing module 220 or the ingestion processing module 225)ss. As previously described, corresponding event/activity sets provide the context of the information/data comprised in the messages. Each event/activity has its own set of observables uniquely related to its context (a one to many mapping). For example, the context of a subject entity who is the subject of an eligibility event/activity message is an "insured" person, whereas the context of a subject entity who is the subject of a visit event/activity message is a "patient." The event/activity selected for a given interface definition limits the observables available for data field-defining, so only those concepts with the appropriate context are available for selection. Thus, the definition of an observable comprises the event/activity to which it is related, the type of entity it observes, the role of that entity, the aspect of the entity observed, the data type that describes the format of the information/data, and/or the like.

The ER system 100 begins the process by using the DAPDO to generate/create a container tree data structure. As discussed with regard to the ingestion processing module 225, the arrangement of observations (e.g., key-value pairs or observable-value pairs) into groupings of container nodes (e.g., having a data artifact packet container node as the root of the container tree data structure) and/or subtree data structures. Each container node comprises a collection of related observations (e.g., all demographic observations about the subject entity who is the patient, all observations about the person/entity who is the attending provider, all observations about a given procedure performed, and the like). The container tree data structure is an ordered arrangement of observation container nodes based at least in part on the definition of each observable. The observable definition identifies what entity it observes (e.g., a person/entity who is the patient/subject entity, a person who is the attending physician). The entity and role are interpreted to generate/create a container.

The ER system 100 then starts the transformation (e.g., assembly of container nodes of the container tree data structure to form data transfer objects) by processing each container node in the container tree data structure. Each observation in a container is interpreted based at least in part on the definition of the observable. The definition of the observation role in the observable's definition further elaborates the meaning of the information/data associated with an observable. Each observation role's class/ontology concept expression comprises information/data used to describe the information/data associated with its related observable. The observation role identifies the relationships and characteristics used to both represent and express the information/data received in a message. Two message data fields may be combined to generate/create a single observation; for example, separate date and time fields each mapped to separate observables, one with a data type of date and another with a data type of time are combined to generate/create the value of a "health item" timestamp (e.g., date/time). Cardinality characteristics of the observation role may affect the behavior of the SBRO processes causing multiple values to be associated with an instance of a multicardinality observation and may replace an existing value of a single-cardinality observation role of an existing SBRO. The observation type of a given observation role identifies the aspect being observed, and in turn, identifies other characteristics and expected relationships of the information/data.

For instance, an observation type of substance concentration defines an expectation of a semi-quantitative or quantitative value, with the latter being a measurement (e.g., composed of number and associated unit). The observable data type is used to process the information/data value. For example, telephone string fields invoke telephone validation protocols, vocabulary code designations are used to invoke code lookup in a given code set, and identifier value data types allow the identifier formats to be consistently normalized. Separate observations are related to one another based at least in part on the observation role's definition. For instance, independent systolic blood pressure, diastolic blood pressure, body position during blood pressure measurement, procedure site of blood pressure measurement, and blood pressure method are related to one another to generate/create a composite multi-element observation of blood pressure. This allows any information/data about an instance of a blood pressure measurement to be easily obtained, eliminating the need to compare the timestamps of individual elements to determine which are related.

In one embodiment, and as described above, the programmatic reasoning logic 230 is configured to generate/create a graph data structure that can then be used in processing of a DAPDO (e.g., by the message pre-processing module 220 and/or ingestion processing module 225), evaluating the data transfer object (e.g., via the SBRO processing module 265), and/or the like. In various embodiments, a category or concept may be identified in a message, DAPDO, and/or data transfer object that is or is not defined in the graph-based domain ontology. For example, the category or concept may not be present in the graph data structure. For instance, an aggregator may be assembling container nodes of a container tree data structure and identify a category or concept not defined in the graph-based ontology and/or not present in the graph data structure. The programmatic reasoning logic 230 may be configured to determine and/or generate/create a description of the category in the terms of classes defined in the graph-based ontology (also referred to as ontology concepts herein). For example, based at least in part on the source vocabulary, source vocabulary code, and source description of a category and/or a value associated with a category, the programmatic reasoning logic 230 may determine and/or generate/create a description of the category in terms known and/or defined by the graph-based domain ontology. Based at least in part on the description of the category, the programmatic reasoning logic 230 may then determine an appropriate location within the graph data structure for the category. For instance, the programmatic reasoning logic 230 may determine one or more relationships between the category and classes defined by the graph-based domain ontology such that the category may be, at least provisionally, added to the graph data structure. In various embodiments, multiple ontology classes and/or ontology categories may be identified through the processing of messages (e.g., by the message pre-processing module 220, ingestion processing module 225, SBRO processing module 265, and/or the like). The programmatic reasoning logic 230 is capable of determining a relationship between two of these ontology categories that are not defined within the graph-based domain ontology.

FIGS. 17A and 17B provide flowcharts for exemplary processes 1700A and/or 1700B (e.g., programmatic reasoning processes 1700A and/or 1700B) illustrating various processes, procedures, steps, operations, and/or the like performed by the programmatic reasoning logic 230 executed by the processing element 205 of the server 65 to determine and provide relationships between and among categories defined within a graph-based domain ontology, based at least in part on the graph data structure representing the graph-based domain ontology. FIG. 17A represents the programmatic reasoning logic 230 providing a concept identifier as a result of reasoning for a concept defined in the graph-based domain ontology. FIG. 17B represents the programmatic reasoning logic 230 providing information/data about a concept not defined in the graph-based domain ontology.

Starting at step/operation 1702A of process 1700A, the programmatic reasoning logic 230 receives a data transfer object from the ingestion processing module 225 and/or the SBRO processing module 265. As described, the data transfer object may comprise a key-value pair for an observation. The ingestion processing module 225 and/or the SBRO processing module 265 may also pass the source vocabulary, source vocabulary code, and/or source description associated with the data transfer object.

At step/operation 1704A, the programmatic reasoning logic 230 generates an ontology-based description for the observation to identify the appropriate ontology class/concept. For example, based at least in part on the source vocabulary, source vocabulary code, and/or source description corresponding to the ontology class/concept, the programmatic reasoning logic 230 may generate/create a description the observation. For instance, based at least in part on the source vocabulary, source vocabulary code, and/or source description corresponding to the ontology class/concept, the programmatic reasoning logic 230 may determine whether the observation corresponds to a procedure, equipment, a diagnosis, therapeutic, and/or the like. If the observation is a procedure or diagnosis, for instance, the programmatic reasoning logic 230 may use the source vocabulary, source vocabulary code, and/or source description corresponding to the observation to determine a body part or portion of the body corresponding to the observation. Thus, through analyzing the source vocabulary, source vocabulary code, and/or source description corresponding the observation in light of ontology classes/concepts defined by the graph-based ontology, a description for the observation is generated/created.

In one embodiment, at step/operation 1706A, the programmatic reasoning logic 230 determines an appropriate ontology class/concept based at least in part on the description of the observation. To do so, the graph-based ontology may be queried at runtime. For example, the programmatic reasoning logic 230 may determine the ontology class/concept for the observation. In that regard, the programmatic reasoning logic 230 executes efficient "matching" logic. To perform the matching, the programmatic reasoning logic 230 defines relatedness and defines what questions should be asked (e.g., queried) or considered of the graph-based ontology. To that end, the programmatic reasoning logic 230 uses the terms "equivalent" (two descriptions that refer to the same concept regardless of how they are individually stated), "subsumes" (the first concept is a broader concept than the second, such as myocardial infarction is a broader concept than is myocardial infarction due to occlusion of the left coronary artery), "subsumed" (the reverse of subsumes), and "unrelated" (two concepts are unrelated in any way which is meaningful within the problem domain). Further, the programmatic reasoning logic 230 asks (queries) at least the following. How is concept A related to concept B? What are all of the members of the set of medically meaningful events which are related to A in a particular way (this question relies on a repetitive use of the first question)?

Once the programmatic reasoning logic 230 has a set of candidates based at least in part on concept relatedness, it filters the set based at least in part on secondary considerations such as date of onset, resolution status, acuteness, and/or the like. Additionally, the programmatic reasoning logic 230 also asks (e.g., queries) at least the following. What are all the defined children/descendants of a specific concept? What are all of the variants of a specific concept with respect to a particular axis or axes?

In order to meet complex matching needs, the programmatic reasoning logic 230 possess at least the following language elements: subclassOf, AND, OR, SOME, MIN, MAX, VALUE, optionally ONLY. With the above, the programmatic reasoning logic 230 is able to draw inferences based at least in part on the above language elements. Additionally, the programmatic reasoning logic 230 supports least the following features: the ability to determine relationship status of two arbitrary concept descriptions with respect to a given ontology; the ability to perform "incremental" reasoning (e.g., the ability to add concepts to an existing ontology without having to recomputed all inferences); the ability to construct its internal graph directly from a pre-reasoned ontology; computational efficient (e.g., the ability to find all elements of a set matching a particular concept in a very small number of milliseconds).

Because of the deficiencies in existing systems, the programmatic reasoning logic 230 supports class reasoning, not necessarily individual or property reasoning. For example, a "simple class" is an ontology class or an intersection ("and") or union ("or") which flattens to a single ontology class. An "undefined class" is a simple class that has no equivalent or subclass expressions. A primitive class is an undefined class or a simple class that has only defining class expressions which are subclasses of primitive classes. An "expanded form" is a description that is completely expanded such that all declared references to other classes are replaced with the corresponding descriptions and attributes merged so that the description appears in its most primitive possible form. For example, if A=ER_Concept and hasX some X, and B=A and hasY some Y, then the expanded form of B=ER_Concept and hasX some X and hasY some Y. And "singleton" is a single expression element or if the expression element is an "intersection" or a "union" and has a single operand which is a singleton.

In one embodiment, the programmatic reasoning logic 230 arranges a set of concepts as declared in an ontology into the graph data structure such that each node in the graph contains concepts that are more specific than—or are subsumed by—those in the nodes above and that are less specific than—or subsumes—those in the nodes below.

In one embodiment, the graph searching (querying) process relies on the ability of the programmatic reasoning logic 230 to compare the descriptions of two concepts. The comparison process is the resolution of two separate one-way equivalence—or—subsumption comparisons. For example, assume that A and B represent two concept descriptions. Let R1 be true if A is equivalent to or subsumes B; otherwise false. Let R2 be true if B is equivalent to or subsumes A; otherwise false. If R1 and R2 are both true, then A and B are equivalent. If R1 is true but R2 is false, then A subsumes B. If R1 is false but R2 is true, then B subsumes A. If R1 and R2 are both false, then A and B are unrelated.

The equivalence—or—subsumption comparison begins with an ontology class and proceeds briefly as follows. If A and B are both classes and are the same class, then return true. If the ontology from which the concepts are derived asserts that A subsumes B, then return true. If A and B are both primitive, then return false. If A is directly or indirectly referenced as a by a <class> clause of B's description, then return true. If A is equivalent of subsumes B by manual inspection of the descriptions, then return true. Return false.

Continuing with the above, assume that P1 is a piece of the expanded description of A and that P2 is a piece of the expanded description of B, then satisfaction by P1 piece type is determined as follows for subclassOf: (1) If P2 is simple then: If P1 is equivalent to or subsumes P2 converted to simple form then return true. Return false. (2) If P2 is of type "intersection" then: Decompose P2 into "and" pieces. If any piece of P2 satisfies P1 then return true. Return false. (3) If P2 is of type "union" then: Decompose P2 into "or" pieces. If all pieces of P2 satisfy P1 then return true. Return false.

Continuing with the above example, the following is a non-limiting example comparison for MIN: (1) If P2 is of type "min" then: If the property associated with P1 is not equivalent to and does not subsume the property associated with P2 then return false. If the value associated with P1 is less than or equal to the value associated with P2 other pieces value, then return true. Return false. (2) If P2 is of type "intersection" then: Decompose P2 into "and" pieces. If any piece of P2 satisfies P1 then return true. Return false. (3) If P2 is of type "union" then: Decompose P2 into "or" pieces. If all pieces of P2 satisfy P1 then return true. Return false.

Continuing with the above example, the following is a non-limiting example comparison for MAX: (1) If P2 is of type "max" then: If the property associated with P1 is not equivalent to and does not subsume the property associated with P2 then return false. If the value associated with P1 is greater than or equal to the value associated with P2 other pieces value, then return true. Return false. (2) If P2 is of type "intersection" then: Decompose P2 into "and" pieces. If any piece of P2 satisfies P1 then return true. Return false. (3) If P2 is of type "union" then: Decompose P2 into "or" pieces. If all pieces of P2 satisfy P1 then return true. Return false.

Continuing with the above example, the following is a non-limiting example comparison for VALUE: (1) If P2 is of type "value" then: If the property associated with P1 is not equivalent to and does not subsume the property associated with P2, then return false. If the value associated with P1 is equal to the value associated with P2 other pieces value, then return true. Return false. (2) If P2 is of type "intersection" then: Decompose P2 into "and" pieces. If any piece of P2 satisfies P1 then return true. Return false. (3) If P2 is of type "union" then: Decompose P2 into "or" pieces. If all pieces of P2 satisfy P1 then return true. Return false.

Continuing with the above example, the following is a non-limiting example comparison for SOME: (1) If P2 is of type "some" then: If the property associated with P1 is not equivalent to and does not subsume the property associated with P2, then return false. If the value associated with P1 is equivalent to or subsumes the value associated with P2, then return true. Return false. (2) If P2 is of type "intersection" then: Decompose P2 into "and" pieces. If any piece of P2 satisfies P1 then return true. Return false. (3) If P2 is of type "union" then: Decompose P2 into "or" pieces. If all pieces of P2 satisfy P1 then return true. Return false.

Continuing with the above example, the following is a non-limiting example comparison for INTERSECTION ("AND"): (1) If P2 is of type "intersection" then: Decompose P1 and P2 into "and" pieces. If every piece of P1 is equivalent to or subsumes some piece of P2 then return true. Return false. (2) If P2 is of type "union" then: Decompose P2 into "and" pieces. If any piece of P2 satisfies P1 then return true. Return false. If P1 is a singleton then: If P1 converted to singleton form is equivalent to or subsumes P2 then return true. Return false.

Continuing with the above example, the following is a non-limiting example comparison for UNION ("OR"): (1) If P2 is of type "union" then: Decompose P2 into "or" pieces. If P1 is equivalent to or subsumes all pieces of P2 then return true. Return false. (2) If P2 is of type "intersection" then: Decompose P2 into "and" pieces. If any piece of P2 satisfies P1 then return true. Return false. (3) Otherwise: Decompose P1 into "or" pieces. If some piece of P1 is equivalent to or subsumes P2 then return true. Return false.

As will be recognized then, based at least in part on the description of the observation, the programmatic reasoning logic 230 may identify ontology classes/concepts that are similar to and/or connected to the description of the observation. For example, based at least in part on the description of the observation, the programmatic reasoning logic 230 may determine and/or reason relationships between the description of the observation and one or more ontology classes/concepts defined by the graph-based ontology. If successfully identified, the programmatic reasoning logic 230 identifies the appropriate ontology class/concept along with its corresponding concept identifier and returns the same. If not successfully identified, the programmatic reasoning logic 230 returns false.

At step/operation 1708A, the programmatic reasoning logic 230 determines whether a concept identifier or "false" was returned as a result of the query. When a concept identifier is returned as a result of the query, at step/operation 1710A, the programmatic reasoning logic 230 provides the concept identifier for storage in association with the data transfer object (and/or to other processes and/or modules). When false is returned, at step/operation 1712A, the programmatic reasoning logic 230 proceeds to step/operation 1702B of process 1700B.

As discussed above, the programmatic reasoning logic 230 can be invoked at various times and by various modules and processes. For example, at step/operation 1604 of the SBRO process 1600, the SBRO type corresponding to the data transfer object needs to be determined based at least in part on the graph-based ontology. At this step/operation, the SBRO processing module 265 may invoke programmatic reasoning logic 230 and/or otherwise cause programmatic reasoning logic 230 to determine an SBRO type corresponding to the data transfer object. For example, the programmatic reasoning logic 230 (e.g., via process 1700A) may analyze ontology concept identifiers (and/or their corresponding descriptions and/or metadata) present in the data transfer object to identify and/or determine an SBRO type corresponding to the data transfer object. As previously described, an SBRO may correspond to an item (e.g., a health item), a relationship (e.g., between two entities), subject entity identifying information/data (e.g., name, birthdate, social security number, insurance member identification number, and/or the like), subject entity contact information/data (e.g., address, telephone number, email, and/or the like), and/or other ontology concepts and the SBRO type indicates the ontological concept corresponding to the SBRO. For instance, the data transfer object may correspond to the ontological concept (with a corresponding concept identifier) of diastolic blood pressure (with an appropriate value in the range of 0 to 110). In the case, the programmatic reasoning logic "reasons" against the ontology to determine that ontological concept corresponding to the data transfer object is for diastolic blood pressure. As a result, the programmatic reasoning logic 230 can return (to the SBRO processing module 265) the concept identifier for diastolic blood pressure, an allowable range of values, and/or a description for the ontology concept. With the concept identifier for diastolic blood pressure, an allowable range of values, and/or a description for the ontology concept, the ingestion processing module 225 and/or the SBRO processing module 265, can invoke the DSML 245 to request retrieval/loading of the SBRO for the entity stored in the ER data store 211. The DSML 245 will execute the request as described herein.

As will be recognized, the graph-based domain ontology can be queried at runtime. However, because queries against the graph-based ontology are resource intensive and time intensive, the programmatic reasoning logic 230 may pre-execute all possible queries and the corresponding results in a cache for efficient access during data ingestion processes. This allows the programmatic reasoning logic 230 to execute queries against the cache for increased computational efficiency.

If process 1700A returns false, the programmatic reasoning logic 230 can proceed to process 1700B. In process 1700B, at step/operation 1702B, the programmatic reasoning logic 230 provides the data transfer object, the null response, and/or information/data corresponding to the observation to a new process or a subprocess. Then, at step/operation 1704B, the programmatic reasoning logic 230 generates a new description for the observation. For example, based at least in part on the source vocabulary, source vocabulary code, and/or source description, the programmatic reasoning logic 230 may generate/create a new description for the observation to generate/create a first new ontology category for the observation in the graph-based ontology vocabulary as described herein previously.

At step/operation 1706B, the programmatic reasoning logic 230 determines an appropriate location/position for the first new ontology category within the graph data structure. For example, the programmatic reasoning logic 230 may determine that the appropriate location/position within the graph data structure for the first new ontology category is a first location/position. For instance, based at least in part on the description of the first new ontology category in the graph-based ontology vocabulary, the programmatic reasoning logic 230 may identify first ontology classes/concepts that are similar to and/or connected to the first new ontology category. For example, based at least in part on the new description of the first new ontology category in the graph-based ontology vocabulary, the programmatic reasoning logic 230 may determine and/or reason relationships between the first new ontology category and one or more ontology classes/concepts of the plurality of ontology classes/concepts defined by the graph-based ontology.

At step/operation 1708B, the programmatic reasoning logic 230 receives information/data corresponding to a second new ontology category. For instance, the ingestion processing module 225 (e.g., an aggregator) may identify a second new ontology category when assembling a container node, wherein the second new ontology category is not defined in the graph-based domain ontology. For example, the second new ontology category may be distinct from the ontology classes/concepts defined by the graph-based domain ontology.

At step/operation 1710B, the programmatic reasoning logic 230 generates a description of the second new ontology category. For example, based at least in part on the source vocabulary, source vocabulary code, and/or source description, the programmatic reasoning logic 230 may generate/create a description for the second new ontology category.

At step/operation 1712B, the programmatic reasoning logic 230 determines an appropriate location/position for the second new ontology category within the graph data structure. For instance, the programmatic reasoning logic 230 may determine that the appropriate location/position within the graph data structure for the second new ontology category is a second location/position. For example, based at least in part on the description of the second new ontology category in the graph-based ontology vocabulary, the programmatic reasoning logic 230 may identify second ontology classes/concepts that are similar to and/or connected to the second new ontology category. For instance, based at least in part on the description of the second new ontology category in the graph-based ontology vocabulary, the programmatic reasoning logic 230 may determine and/or reason relationships between the second new ontology category and one or more second ontology classes/concepts of the plurality of concepts/ontology classes defined by the graph-based ontology.

At step/operation 1714B, the programmatic reasoning logic 230 may reason and/or determine a relationship between the first new ontology category and the second new ontology category. For example, based at least in part on the first location/position in the graph data structure determined for the first new ontology category and the second location/position in the graph data structure determined for the second new ontology category, the programmatic reasoning logic 230 may infer, and/or determine a relationship between the first new ontology category and the second new ontology category. For instance, the programmatic reasoning logic 230 may determine if the first and second ontology categories have a parent-child relationship, sibling relationship, are similar, are different, a degree of difference (e.g., degree of separation between the first and second ontology categories), and/or the like.

At step/operation 1716B, the programmatic reasoning logic 230 may carry out several actions. For example, provide the relationship reasoned and/or determined between the first new ontology category and the second new ontology category. This may be referred to as "incremental" reasoning. Further, the programmatic reasoning logic 230 may cause one or more DBO definitions to be updated, based at least in part on the reasoned and/or determined relationship between the first new ontology category and the second new ontology category. For instance, the programmatic reasoning logic 230 may return the reasoned and/or determined relationship between the first new ontology category and the second new ontology category to the ingestion processing module 225 for use in assembling container nodes of a container tree data structure. In particular, the programmatic reasoning logic 230 may provide the reasoned and/or determined relationship between the first new ontology category and the second new ontology category to another component and/or process of the ER system 100 such that the reasoned and/or determined relationship may be used in the processing of messages, managing, ingesting, monitoring, updating, and/or extracting/retrieving of the ER data store 211, and/or the like. Further, the programmatic reasoning logic may insert the first new category and second new category in the graph data structure. To do so, the programmatic reasoning logic 230 performs a depth-first traversal of the graph searching for the lowest node in the graph at which each new category continues to subsume those classes/concepts under it. Second, when such a node is found, programmatic reasoning logic 230 determines if the corresponding new category is equivalent to classes/concepts at that point. If the corresponding new category is equivalent, programmatic reasoning logic 230 adds the corresponding new category to the found node. If the concept is not equivalent, programmatic reasoning logic 230 creates a new node and inserts it into the graph data structure. If a new graph node was created, programmatic reasoning logic 230 searches for any additional nodes in related branches of the graph which are properly children of the new node and adds them as children.

Various embodiments provide technical solutions to technical problems corresponding to reasoning logic and reasoners for ontologies. In particular, the execution of reasoning logic tends to be resource intensive and time intensive. For example, executing the programmatic reasoning logic 230 during the data ingestion processes to continually query the graph data structure would significantly slow down the data ingestion processes and/or would require significantly more computational resources. However, due to the stability of the graph-based ontology, the programmatic reasoning logic 230 may pre-execute all possible queries and the corresponding results in a cache for efficient access during data ingestion processes. Embodiments of the present invention therefore provide technical improvements such as a reduction in the computationally intensiveness and the time intensiveness needed to use reasoning logic as part of the automated managing, ingesting, monitoring, updating, and/or extracting/retrieving of information/data of the ER data store 211.

Confidence Score

In one embodiment, a confidence level may be programmatically determined for each information/data element of an SBRO. For instance, the confidence level may be driven by the source of the information/data element, how much processing was required for the information/data element, and/or the derivation history of the information/data element. For instance, a confidence level is based at least in part on the following information: the information/data source, identification reliability (e.g., social security number, medical record number, name, and/or the like), derivation of the information/data, and certainty of the derived information/data. The confidence level may be the aggregate, the composite, and/or a probabilistic prediction based at least in part on the same. As an example, an information/data element may directly imply another piece of information/data with absolute certainty. In this example, the confidence level of the derived information/data is identical to the confidence level of the source information/data. In another case, it might be that a particular information/data element implies another information/data element 95% of the time. In this case, the certainty of the derived information/data element would be 95% of that of the original information/data element. Finally, if an information/data element is derived from two or more pieces of information/data, then the confidence level may be the statistical aggregate of the confidence levels of its source multiplied by the confidence level of its derivation.

In one exemplary embodiment, a confidence level may be discrete for each information/data element. Accordingly, where a confidence level is associated an information/data element, it is possible to propagate confidence levels at each step/operation of information/data derivation. Further, this approach also enables the setting of a confidence threshold below which additional information/data no longer is derived.

In various embodiments, the confidence rating indicates how confident the ER system 100 is that the information/data stored within the element of the SBRO is truthful and/or accurate. Each element of an SBRO may correspond to a particular facet of an ER corresponding to a subject entity. When the ER system 100 receives new information/data corresponding to a particular element of an SBRO and/or the particular element of an SBRO is updated (e.g., based at least in part on the new information/data), a confidence rating for the particular element of the SBRO is determined.

The confidence rating is determined based at least in part on various features of the updated particular element and the information/data contained therein. For example, the features of the updated particular element may include the author of the new information/data (e.g., whether the new data was entered by the patient/subject entity, entered by a clinician/staff, electronically generated, and/or the like), the source of the new information/data (e.g., whether the new information/data was received directly from the patient/subject entity, directly from a provider, directly from a payor, from a data warehouse, and/or the like), and/or how far removed from the author the source is (e.g., information/data authored by the patient/subject entity and received directly from the patient/subject entity vs. data authored by the patient/subject entity and received via a data warehouse). The features of the updated particular element may include a status of the information/data (e.g., confirmed/verified or not), a status of an action corresponding to the information/data (e.g., a cancelled or voided lab work order vs. a lab work order vs. results of completed lab work), the number or percentage of instances of information/data received by the ER system 100 and corresponding to the subject entity that corroborate the new information/data (e.g., the consistency of the new/information/data with other information/data known about the subject entity), a ranking of the information/data (e.g., a particular diagnosis is Patient A's primary concern/diagnosis, secondary concern/diagnosis, and/or the like), the level of detail or specificity of information/data provided by the new information/data, and/or the like. The features of the particular element may include an amount of time elapsed since the occurrence of an event and/or transaction related to the new data (e.g., the performance of lab work resulting in the reported lab results, an office visit resulting in the reported diagnosis) and when the ER system 100 receives the new information/data.

The effect of a particular feature on the confidence rating of the particular element may depend on the type of the element. For instance, if the type of the element is demographic data (e.g., patient name, address, and/or the like), then the author of the new information/data being the patient/subject entity may positively affect the confidence rating. However, if the type of the element is a diagnosis or a lab result, then the author of the new information/data being the patient/subject entity may not positively affect the confidence rating. An algorithm (which may be element type dependent) may be used transform the information/data regarding the various features of the particular element and/or new information/data into a numerical confidence rating for the particular element. In various embodiments, a confidence score may be generated/created and/or determined for a particular element (e.g., a single data field) of an SBRO, a group and/or set of elements (e.g., a group or set of data fields) of an SBRO, and/or for an SBRO as a whole.

In various embodiments, the ER system 100 may provide a user interface (e.g., dashboard, portal 2610, and/or the like) that a user (e.g., a provider with an appropriate relationship with the subject entity or the patient/subject entity) may use to access information/data stored within the ER corresponding to the subject entity. When the particular element (and/or information/data accessed therefrom) is provided via the user interface, the confidence rating or an indication of the confidence rating (e.g., high, medium, low) may also be provided via the user interface.

FIG. 18 provides a flowchart for exemplary process 1800 (e.g., confidence scoring process 1800) illustrating various processes, procedures, steps, operations, and/or the like for generating and providing a confidence score for an element of an SBRO, in an example embodiment. Starting at step/operation 1802, a request for a confidence score for an element of an SBRO is received. For example, the SBRO processing module 265 may generate/create and provide a request for confidence score for an updated and/or modified element of an SBRO. For instance, as part of updating and/or modifying an element of an SBRO, the SBRO processing module 265 may generate/create and provide a request for a confidence score. The confidence score engine 235 may then receive the request for the confidence score. In various embodiments, the request for the confidence score comprises one or more features of the element of the SBRO and/or an element type corresponding to the type of the element and/or the type of the SBRO. In various embodiments, the one or more features of the element of the SBRO comprise one or more of (a) author of the data of the element, (b) the source of the data, (c) how far removed from the author the source, (d) a status of the data, (e) a status of an action corresponding to the data, (f) the number or percentage of instances of data received by the ER system 100 and corresponding to the user that corroborate the data, (g) a ranking of the data, (h) the level of detail or specificity of information/data provided by the new data, (i) an amount of time elapsed since the occurrence of an event related to the new data, (j) when the ER system 100 received the new data, and/or the like. In an example embodiment, at least one of the one or more features of the element of the SBRO is selected from the group of (a) author of the data of the element, (b) the source of the data, (c) how far removed from the author the source, (d) a status of the data, (e) a status of an action corresponding to the data, (f) the number or percentage of instances of data received by the ER system 100 and corresponding to the user that corroborate the data, (g) a ranking of the data, (h) the level of detail or specificity of information/data provided by the new data, (i) an amount of time elapsed since the occurrence of an event related to the new data, and ( ) when the ER system 100 received the new information/data.

At step/operation 1804, one or more features of the element of the SBRO are accessed and/or determined. In an example embodiment, the confidence score engine 235 receives one or more features of the element of the SBRO as part of the request for the confidence score and extracts the features from the request. In an example embodiment, the confidence score engine 235 analyzes the element of the SBRO and/or metadata corresponding thereto to determine one or more features of the element of the SBRO.

At step/operation 1806, a confidence score algorithm is determined, identified, and/or selected based at least in part on the element type of the element of the SBRO. For example, each element of an SBRO may be associated with an element type, based at least in part on the element type of the element of the SBRO provided and/or referenced by the request for the confidence score. The confidence score engine 235 may determine, identify, and/or select a confidence score algorithm from a plurality of confidence score algorithms based at least in part on the element type associated with the element.

At step/operation 1808, the determined, identified, and/or selected confidence score algorithm determines a confidence score for the element of the SBRO. For instance, one or more features of the element may be evaluated using the determined, identified, and/or selected confidence score algorithm. For example, the determined, identified, and/or selected confidence score algorithm may be executed based at least in part on at least one of the one or more features of the element to determine a confidence score for the element. For instance, the confidence score engine 235 may execute the determined, identified, and/or selected confidence score algorithm to determine a confidence score for the element.

At step/operation 1810, the confidence score is stored in association with the SBRO and/or the element of the SBRO. For example, the confidence score engine 235 may cause the DSML 245 to update the persistent storage of the ER data store 211 to store the confidence score and/or an indication thereof (e.g., high, medium, low, and/or the like) in association with the element of the SBRO and/or the SBRO. In an example embodiment, the confidence score engine 235 returns the confidence score and/or an indication thereof to the SBRO processing module 265 and the SBRO process 1600 may cause the DSML 245 to store the confidence score and/or an indication thereof in association with the element of the SBRO and/or SBRO in the persistent storage of the ER data store 211.

In various embodiments, at step/operation 1812, at a later point in time, a request to access and/or read information/data from the SBRO is received. For instance, an entity (e.g., the subject entity, provider with a relationship with the subject entity that enables the provider to view at least some information/data from the ER corresponding to the subject entity) logs into a user portal 2610 (e.g., via a user computing entity 30) and requests information/data from the ER corresponding to the subject entity, including the element of the SBRO. The ER system 100 may determine and/or confirm that the entity is allowed to access the requested information/data (e.g., via the data access/function controller 255) and access the requested information/data from the ER data store 211 (e.g., via the extraction processing module 260 and/or the DSML 245). When the information/data of the element of the SBRO is accessed, the confidence score corresponding thereto is also accessed. For example, the confidence score and/or an indication thereof may be provided alongside the information/data of the element of the SBRO. For instance, the server 65 may provide the requested information/data and the confidence score and/or indication thereof such that the user computing entity 30 receives the requested information/data and the confidence score and/or indication thereof. The user computing entity may then provide the requested information/data and the confidence score and/or indication thereof via the user portal 2610 for consumption (e.g., viewing, audible consumption, and/or the like) by the entity.

Various embodiments provide technical improvements by not only providing the best (e.g., most complete, most reliable, and/or the like) information/data available to the ER system 100 corresponding to an event and/or transaction, but also providing an indication of how reliable the information/data is and/or how confident the ER system 100 is that the information/data provides a true and/or accurate description of the event and/or transaction based at least in part on various features of the information/data. Thus, various embodiments, provide an improved user experience of accessing information/data from the ER system 100 that enables user confidence in the accessed information/data.

Data Store Management Layer (DSML)

In one exemplary embodiment, the ER system 100 comprises a DSML 245, also referred to as a Java enabled database interface. The DSML 245 comprises a full data object model in the application layer supported by data objects and relational mapping using object-relational mapping (ORM). ORM allows for the conversion of information/data between incompatible type systems using object-oriented programming languages. In one embodiment, the DSML 245 comprises a set of tools to enable Java data objects to be persisted in potentially disparate databases using Java-driven modifications, in a manner acceptable by Java. These tools include code parsers, code cleaners, class builders, schema builders, and/or the like.

The DSML 245 solves various technical challenges, including "collection add" and "cache flush" problems. In the "collection add," the ongoing operation of the ER system 100 requires adding elements to persistent information/data collections. Other tools designed to fulfill the function of the DSML 245 tend to load such collections entirely into memory, add elements to them, and re-persist them. As collections grow larger with time, this operation becomes increasingly inefficient. Thus, the DSML 245 allows elements to be added to collections without loading the entire collection. The DSML 245 does this by maintaining a "partially loaded" collection where some elements may be loaded while others remain only in persistent storage. The DSML 245 also maintains a set of operations performed against the collection while in this partially loaded state so that the collection as persisted can eventually be brought up to date.

The DSML 245 also maintains a memory cache of recently used data objects. This cache can comprise both modified and unmodified data objects. At various points in the life-cycle of the cache, it must be flushed to synchronize the persistent storage with it. Other tools, however, can have particularly inefficient caches in that when the cache must be flushed it is not readily known which data objects have been modified and a complex process of discovery must be undertaken to determined which data objects to flush. As the cache increases in size and frequency of flushing, this process can become extremely onerous. This is referred to as the "cache flush" technical problem. The DSML 245 is designed to know immediately when a data object is modified via the natural Java mechanisms and to record this in the cache for easy retrieval so that when the cache must be flushed, the DSML 245 does not have to engage in a discovery process; rather, the DSML 245 simply refers to the known list of modified data objects in the cache.

Part of the DSML 245 comprises a content repository that provides a storage mechanism for ER content items, such as binary large data objects and other typically non-data object oriented information/data (e.g., images, documents, rule definitions, message templates, information content, and help files), and may comprise standardized technology (e.g., Java). Content attributes or metadata associated with content items may be used for management and selection of discrete content items. Examples of attributes may include ontology classes, target age, target gender, usage context, effective time, expiration time, keywords, content publisher/manager (used to distinguish between system-provided content as opposed to content authored by a customer or other provider), status and location. The content repository may be viewed as a generic application information/data "super store" in which virtually any type of content can be handled, and that separates content from information/data storage technology. If content is received coded according to an external coding system, the content may be applied to appropriate related ontology concepts. Content may be XML exportable and importable. An API may be used to interact with a content repository, thereby providing technical advantages like the ability to access other standard content repositories, allowing external editing, and/or transporting content between Java content repositories.

In various embodiments, the DSML 245 is an application and/or program layer that interfaces and/or communicates with other components of the ER system 100. For example, the DSML 245 may interface and/or communicate with the programmatic reasoning logic 230, the SBRO processing module 265, the rules engine 250, the data access/function controller 255, the extraction processing module 260, identity matching service 240, and/or the like. The DSML 245 also interfaces and/or communicates with ER data store 211. For example, the DSML 245 acts as an intermediary between various processing and/or software components of the ER system 100 and the ER data store 211. As such, the processing and/or software components of the ER system 100 need not be aware and/or knowledgeable about the ER data store 211. This allows for changes to be made to the ER data store 211 (e.g., type, database model, organization thereof, and/or the like) without any changes being required for the message pre-processing module 220, ingestion processing module 225, programmatic reasoning logic 230, the confidence score engine 235, identity matching service 240, rules engine 250, the data access/function controller 255, the extraction processing module 260, the SBRO processing module 265, and/or other software components of the ER system 100. In particular, a new and/or modified DSML 245 may be generated that is configured to interface and/or communicate with the changed ER data store 211 without requiring any changes to the ER system 100 software components that interface with the (new and/or modified) DSML 245.

In various embodiments, the DSML 245 is specific to a particular 211 data store. For example, the DSML 245 may be particular to a database model of the ER data store 211. In various embodiments, the ER data store 211 may comprise two or more data stores. For example, the ER data store 211 may comprise a relational database and a key-value database; a first relational database and a different, second relational database; or SQL database and a key-value database. The ER system 100 may comprise a DSML 245 configured to interface with each of these databases. For example, a first DSML 245 may interface and/or communicate with the first database of the ER data store 211 and a second DSML 245 may interface and/or communicate with the second database of the ER data store 211.

In various embodiments, the DSML 245 defines a plurality of database objects (DBOs) and is able to map and/or translate between the defined DBOs and primary software objects. In particular, as used herein, the message pre-processing module 220, ingestion processing module 225, programmatic reasoning logic 230, the confidence score engine 235, identity matching service 240, rules engine 250, the data access/function controller 255, the extraction processing module 260, the SBRO processing module 265, and/or possibly other software components of the ER system 100 (e.g., a deferred and/or prioritized processing manager) are considered primary software programs and are configured to receive, generate, process, and/or provide primary software objects. In various embodiments, the primary software objects are Java data objects. For example, the primary software objects may be SBROs and/or components/elements thereof, data transfer objects, and/or the like.

The primary software programs may pass a primary software object (e.g., an SBRO or a pointer to an SBRO stored in cache) to the DSML 245 to cause the primary software object to be taken apart and/or decomposed and stored in a manner supported by the corresponding ER data store 211. For example, a primary software object may be taken apart and/or decomposed into elements that correspond to DBOs. In various embodiments, the DBOs defined by a DSML 245 are specific to the configuration of the durable storage (e.g., ER data store 211). For example, the DBOs are classes defined in a way that the DSML 245 can manage the lifecycle of their instances-they can be any Java object/class/data as long as it is defined accordingly. The DSML 245 may be configured to perform create, read, update, and delete functions (CRUD functions) for DBOs in the ER data store 211.

Once a primary software object has been taken apart and decomposed into elements that correspond to DBOs, the corresponding DBOs may be written to the ER data store 211. In various embodiments, writing the corresponding DBOs to the ER data store 211 comprises determining a mapping between of the corresponding DBOs to storage locations within the database. For example, if the ER data store 211 is a tabular database, the storage locations within the database may be a row or particular columns within the row of a particular table where components of the DBO should be stored within the database. In various embodiments, the DBOs may be written to the corresponding storage locations within the database and/or used to modify existing DBOs written to the corresponding storage locations as part of a flush and commit operation.

In various embodiments, a DBO is associated with a class. In various embodiments, a DBO may be associated with an entity class or an embedded class. In various embodiments, a DBO associated with an embedded class is (and/or can be) part of another DBO. For example, a DBO associated with an embedded class may be part of (e.g., embedded within) a DBO associated with an entity class. Each entity class is associated with a corresponding persistence manager. In one embodiment, an embedded DBO cannot be accessed directly; rather, embedded BDOs are only accessible through the field in the DBO that references it. An embedded DBO is retrieved from the database when its referencing DBO is retrieved; it is stored in the database when its referencing DBO is stored. That is, the DSML 245 comprises a persistence manager 248 for each entity class and database kind. Each persistence manager 248 is configured to determine the storage location within the database where a DBO is to be stored (or read from) for a corresponding class. In various embodiments, a persistence manager 248 corresponding to a particular entity class may be used to reassemble a primary software object from the information/data read from a DBO stored in the ER data store 211.

In various embodiments, the ER system 100 comprises a DBO class data. Various DBO classes may be defined and corresponding class definitions may be stored in the DBO class data. The DSML 245 may automatically insert automated source code into stored class definitions. For example, the DSML 245 may be configured to recognize a particular pattern to a line of source code within the class definition and based at least in part on recognizing the particular pattern of the line of source code, identify an insertion point within the class definition. The DSML 245 may then insert the automated source code into the class definition at the insertion point. In various embodiments, a class builder of the DSML 245 identifies the insertion points and inserts the automated source code at the insertion points. In various embodiments, the automated source code may provide access to an accessor and/or mutator for a class, for example, via a probe and/or backdoor. For example, the probe inserted into an accessor is configured to detect a request for a field's value. In another example, a probe inserted into a mutator detects the assignment of a new value to a field. For example, the access to a class's accessor and/or mutator methods provided by the automated source code inserted into a DBO class definition may grant the DSML 245 with access to fields without invoking any of the client's logic.

Continuing with the above, the mutator's single parameter must have a type and a name that are identical to those of the field being mutated. The DSML 245 requires that the header of a mutator or accessor method for a persistent field must be placed on a single source file line. By the method's header is meant the source text beginning with the method's <access> and ending with the right parenthesis terminating the method's formal parameter list. The behavior of the mutators and accessors of persistent fields whose multiplicity is collection is different from the usual behavior of mutators and accessors of fields in ordinary Java objects. Usually, in an ordinary Java object, if a field referencing a collection has never been initialized, then the field's accessor will return null. The accessor of a persistent collection field in a DBO will never return null: if the field has not been accessed (or set) since its parent DBO was created, the accessor will return an empty collection. Usually, in an ordinary Java object, when a collection field's mutator is invoked, the field is set to the collection referenced by the mutator's parameter; if the parameter is null, the field is set to null. When the mutator of a persistent collection field is invoked, any elements in the collection referenced by the field are removed, and the elements of the collection referenced by the mutator's parameter are copied to the collection referenced by the field; if the parameter is null, the collection referenced by the field left empty.

In various embodiments, the DSML 245 comprises two layers. For example, in an example embodiment, the DSML 245 comprises a DBO management layer 246 and a database interface layer 247. In various embodiments, the DBO management layer 246 manages the DBO class definitions, the insertion of automated source code into the DBO class definitions, the translating of primary software objects into DBOs, and/or the like. In various embodiments, the database interface layer 247 is the portion of the ER system 100 that interfaces and/or communicates directly with one or more databases and/or the like of the persistent ER data store 211. For example, the persistence managers 248 operate within the database interface layer 247. Similarly, the DBO management layer 246 is configured to interface and/or communicate with the primary software programs of the ER system 100 and the database interface layer 247 is configured to interface and/or communicate with the persistent ER data store 211. In various embodiments, to add a database of a new database type to the ER system 100, the database interface layer 247 may be updated (e.g., a new or modified database interface layer 247 may be created) and the remainder of the DSML 245 (e.g., the DBO management layer 246) and the primary software programs of the ER system 100 need not be updated and/or modified. In essence, the database interface layer 247 is "swappable." In this manner the DSML 245 enables modifications and/or changes to the persistent ER data store 211 without requiring substantial changes and/or modifications to the ER system 100 as a whole. From the perspective of the primary software programs, the primary software programs have methods for persisting primary software objects into a database and extracting/retrieving primary software objects from the database, without being aware of how the information/data is actually persisted and/or extracted/retrieved.

For example, the DBO management layer 246 presents a database abstraction to the primary software objects (e.g., via API calls and/or the like) and the database interface layer 247 takes that database abstraction and persists it to an underlying database. In various embodiments, the underlying database is a relational database, key value store, graph database, and/or other type of the persistent ER data store 211. In various embodiments, the database abstraction defines a plurality of DBOs, including entity class objects, entity class collections, embedded class objects, and embedded class collections. As noted above, the embedded class objects are portions of entity class objects. For example, an example entity class object of class "Individual" may contain the embedded class objects of classes "Name" and "Birthdate." In turn, the embedded class object of class "Name" may contain embedded class objects of classes "First Name" and "Last Name." In various embodiments, the DBO management layer 246 is configured to translate primary software objects into DBOs that can be provided to the database interface layer 247.

For example, the database interface layer 247 provides a mapping between DBOs and specific storage locations within the corresponding database. As noted above the database interface layer 247 is database specific and corresponds to one database. For example, the storage locations available within the database are specific to the database type and architecture. For example, if the corresponding database is tabular, the database interface layer 247 provides a mapping between a DBO and a particular table and a row of the particular table and/or a particular table, a row of the particular table, and one or more columns of the particular table that correspond to a DBO. For example, embedded class objects may be mapped to particular columns of a particular row of a particular table and entity class objects may be mapped to a particular row of a particular table. Continuing with the above example of an entity class object of "Name," the database interface layer 247 may identify an individual table for storing information/data corresponding to individuals known to the ER system 100. For example, an entity class object of class "Individual" may map to a particular row of the individual table, and the embedded class object of class "Name" may map to specific columns of that particular row. In various embodiments, the database interface layer 247 takes the DBOs apart and causes the corresponding storage locations (e.g., appropriate columns of the appropriate row of the appropriate table in a tabular database) to be read, written to, updated, and/or the like with the information/data and/or values taken from the DBO.

In various embodiments, the database interface layer 247 takes apart and/or decomposes DBOs. For example, the database interface layer 247 of the DSML 245 may receive a DBO and perform serialization of the DBO. Serialization comprises taking the information/data in the DBO (or other object) at its memory level and assembling it into a byte string. The byte string may then be written directly to the database, for example, because it has no formal structure to it. The serialization form has some internal structure with the byte string, so that when read back out from the database, the parts are identifiable via a deserialization function. For example, the deserialization function may use the internal structure of the byte string to regenerate the corresponding object.

In an example embodiment, the database interface layer 247 interfaces with the corresponding database through the execution of executable code. In various embodiments, if the corresponding database supports SQL queries, the executable code is an SQL statement. In various embodiments, each entity class object instance is assigned a unique identifier (e.g., a DBO identifier) configured to uniquely identify the entity class object instance within the database and/or globally. In various embodiments, the embedded class object instances are assigned unique identifiers (e.g., DBO identifiers) configured to uniquely identify the embedded class object instances. In an example embodiment, a DBO identifier (e.g., UUID or GUID) corresponding to an embedded class object instance may comprise the DBO identifier referencing the corresponding (e.g., the subsuming) entity class object instance and an indication of the embedded class object to which the embedded class object instance corresponds. For example, an instance of the embedded class object of class "Name" that corresponds and/or is subsumed by the entity class object instance having DBO identifier ABC123, may be assigned the DBO identifier ABC123Name, for example. When the instance of the entity class object of having DBO identifier ABC123 is to be read from the database, the database interface layer 247 may generate executable code (e.g., an SQL statement) configured to perform a query of the database to cause the row (or other database element) corresponding to the DBO identifier ABC123 to be returned. The database interface layer 247 can then use the returned row (or other database element) to rebuild the corresponding DBO(s), which is a primary software object abstracted based at least in part on the database abstraction.

In various embodiments, a primary software object may be a relationship SBRO. The relationship SBRO describes how two entities known to the ER system 100 are related (e.g., a patient and the dermatologist that the patient sees). Each relationship SBRO has two participants (e.g., the patient and the doctor, the insurance company and the member, the lab technician and the practice where the lab technician works, and/or the like) and the role assigned to each participant in the relationship. Thus, the relationship SBRO references both participants. When the relationship SBRO is stored in the persistent ER data store 211, the information/data taken and/or extracted from the relationship SBRO is stored in a relationship table (in an example tabular database), and the information/data corresponding to the participants is stored in the individual table (as described in the above example). A row of the relationship table will correspond to the entity class object instance into which the relationship SBRO was translated and/or abstracted. That row of the relationship table will include a pointer (e.g., the DBO identifier) corresponding to entries (e.g., rows) of the individual table that provide information/data corresponding to the participants of the relationship. For example, a first database element of a first table may be linked to a different, second database element of a different, second table via the inclusion of the DBO identifier identifying the second database element in the first database element. In various embodiments, when the persistent ER data store 211 comprises a tabular database, the tabular database may store a couple to several hundred tables, each corresponding to different types of primary software objects (e.g., entities/individuals, relationships, health items of a first type, health items of a second type, observations (e.g., X-ray results, medical observations), and/or the like).

In various embodiments, the writing and/or updating of DBOs in the ER data store 211 is associated with a session and a transaction with the session. In some embodiments, the reading of a DBO in the ER data store 211 is also associated with a session and a transaction with the session. A session identifier and/or a transaction identifier may be stored in association with the metadata corresponding to a DBO that was written, updated, and/or read during the session and/or transaction identified by the session identifier and/or transaction identifier. In various embodiments, the transactions are atomic, isolated, and/or durable.

The DSML 245 may provide a service, Database.flush( ), that operates as a commit( ) that is local to the transaction of the caller. When a "flush" is executed, all DBO modifications made in the current transaction are written to the database but are not made durable. In other words, these modifications are not visible to other DSML 245 clients but are visible to the caller of Database.flush( ). The DBOs that exist in the client's current transaction continue to behave as before the command had been called. However, an SQL command explicitly created and executed by the client will now see the state of DBOs at the time of the most recent Database.flush( ) call in the current transaction. If there have been no Database.flush( ) calls in the current transaction, then the client will see the state DBOs had when they were initially loaded.

The DSML 245 may provide a service, Database.commit( ), that may "commit" the current transaction and start a new transaction. When a transaction is "committed," all of the remembered modifications are made durable in the database. Database.commit( ) can cause the accumulated updates to be made durable in the database which may include the allocation of a new database record should the transaction include the creation of an entity class object creation.

The DSML 245 may make an object durable if certain conditions are met. For example, an object becomes durable if it is an entity class object or is reachable from an entity class object, and the transaction in which it was created successfully commits. If the object is already durable, a change to the object may be made durable if the transaction in which the change occurred successfully commits.

In an embodiment of DSML 245 a transaction allows the client to create a logical group of permanent object operations. The operations may then either atomically apply the group to the database or discard the entire group. The client may maintain invariants and consistency of the data stored in the database in the face of failures and concurrent activity through using transactions.

A transaction may exist in one of two states, open or closed. In one embodiment an open transaction collects operations to form a logical group of permanent object operations. A closed transaction may not collect any operations and may not be reopened. When the logical group of operations is complete or the client determines that a consistent logical group of operations cannot be made, the client may close the transaction by respectively committing or aborting the transaction.

In various embodiments, by invoking the commit service the client is indicating that the effects of the operations that occurred during the transaction result in a valid object state. At this point in certain embodiments the effects of the operations of the transaction are made durable and operations can no longer take place in the transaction.

FIG. 19 provides a flowchart illustrating various processes, procedures, steps, operations, and/or the like of an example method 1900 for receiving a CRUD access/function request and completing the requested CRUD function. For example, the DSML 245 may receive a CRUD access/ function request, process the request, and cause the requested CRUD function to be completed. Starting at step/operation 1902, the DSML 245 receives the CRUD access/function request. In various embodiments, the CRUD access/function request is generated and provide by a primary software program of the ER system 100 (e.g., message pre-processing module 220, ingestion processing module 225, programmatic reasoning logic 230, the confidence score engine 235, identity matching service 240, rules engine 250, the data access/function controller 255, the extraction processing module 260, the SBRO processing module 265, and/or the like). In an example embodiment, the primary software program of the ER system 100 provides the CRUD access/function request via an API call to the DSML 245. As a result, the DSML 245 receives the API call. In an example embodiment, the API call comprises the primary software object and/or a pointer to the primary software object in cache. In various embodiments, the CRUD access/function request corresponds to a primary software object instance and/or a component/element thereof. For example, the CRUD access/function request may correspond to a write request to write a new SBRO corresponding to a particular subject entity (e.g., identified by a subject entity identifier of the SBRO). In another example, the CRUD access/function request may correspond to updating an SBRO and/or component/element thereof corresponding to a particular subject entity (e.g., identified by a subject entity identifier of the SBRO).

At step/operation 1904, one or more DBOs corresponding to the CRUD access/function request are identified and/or determined. In particular, one or more DBOs corresponding to the primary software object and/or components/elements thereof are identified and/or determined. For example, the DSML 245 may, based at least in part on DBO class definitions stored in the DBO class data, identify and/or determine DBOs corresponding to the primary software object and/or components/elements thereof. For example, the identified and/or determined DBOs may be associated with one or more entity classes and one or more embedded classes. For instance, the primary software object may be translated from a primary software object into DBOs and/or data elements that may be stored in the ER data store 211. For example, a Java object cannot be persisted in a relational database as a fully functional Java object. Rather, the DSML 245 takes apart and/or decomposes the Java object into corresponding DBOs that may be persisted in the ER data store 211. The DSML 245 may further be configured to later put back together and/or combine DBOs to reform a fully functional Java object, for instance.

At step/operation 1906, the identified and/or determined DBOs corresponding to the primary software object instance are mapped to storage locations within the ER data store 211 (and/or a database of the ER data store 211). For instance, in an example embodiment, the ER data store 211 comprises (or is) a tabular database, and the storage location corresponding to a DBO indicates which table the DBO should be stored in, which row of the table the DBO should be stored in, which columns of which rows of the table the DBO should be stored in, and/or the like. In an example embodiment, the DSML 245 may call a persistence manager 248 corresponding to the entity class of the DBO to determine the storage location within the ER data store 211 for the DBO. As noted previously, the persistence manager 248 is particular to an entity class. For example, the entity class of an identified and/or determined DBO may be determined and used to identify and/or determine the appropriate persistence manager 248 for mapping the DBOs to storage locations within the ER data store 211.

At step/operation 1908, the DSML 245 uses a connect method to connect with the ER data store 211 (e.g., database). For example, the DSML 245 may initiate a session with a database, open a transaction, and/or the like. In an example embodiment, the DSML 245 may confirm that a session is open and a transaction is open. In certain embodiments, step/operation 1906 may be performed after step/operation 1908.

At step/operation 1910, the DSML 245 invokes and executes the processes required for completing the requested CRUD function. For example, a load process may be invoked and executed if the requested CRUD function is a read function. In another example, an update process may be invoked and executed if the requested CRUD function is an update function. In another example, an insert process may be invoked and executed if the request CRUD function is a write function. FIGS. 20-23 provide flowcharts illustrating the invoking and executing processes by the DSML 245 to cause the completion of exemplary CRUD functions.

Continuing with FIG. 19, at step/operation 1912, the DSML 245 executes a disconnect method to disconnect from the data store 211 (e.g., database). For example, the DSML 245 may close a session and/or a transaction of a session.

Various examples of the DSML 245 performing example CRUD functions will now be described with reference to FIGS. 20-23.

FIG. 20 provides a flowchart illustrating various processes, procedures, steps, operations, and/or the like of an example method 2000 for explicit loading of primary software object. As referred to herein, explicit loading corresponds to a read function where the unique identifier for a DBO instance corresponding to the primary software object is known (e.g., included in the request). In various embodiments, the processes, procedures, steps, operations, and/or the like illustrated in FIG. 20 are executed between the execution of the connect method at step/operation 1908 and the execution of the disconnect method at step/operation 1912.

Starting at step/operation 2002, the DSML 245 may determine that the CRUD access/function request is a read request corresponding to a DBO instance and that the CRUD access/function request comprises a unique identifier identifying the DBO instance. For example, the DSML 245 may process the CRUD access/function request, and determine, based at least in part on the processing, that the CRUD access/function request is a read request corresponding to a DBO instance and that it comprises the unique identifier identifying the DBO instance.

At step/operation 2004, the DSML 245 determines whether the DBO instance identified by the unique identifier is currently loaded into cache as a primary software object. For example, the DSML 245 may query the cache using the unique DBO identifier identifying the DBO instance to determine if the DBO is currently loaded into cache as a primary software object (and/or as a part of a primary software object).

When it is determined, at step/operation 2004, that the DBO instance is currently loaded into cache, the process continues to step/operation 2006. At step/operation 2006, the DSML 245 returns a reference and/or pointer to the loaded primary software instance in the cache. For example, the DSML 245 may provide a response to the primary software program that submitted the CRUD access/function request that includes a reference and/or a pointer to the loaded primary software instance in the cache.

When it is determined, at step/operation 2004, that the DBO instance is not currently loaded into cache, the process continues to step/operation 2008. At step/operation 2008, the DSML 245 executes a load method on the appropriate 211 data store. Execution of the load method on the appropriate data store (e.g., the database where the DBO instance identified by the unique identifier is stored) includes passing the class of the DBO instance and the unique identifier identifying the DBO instance to the load method corresponding to the appropriate 211 data store.

At step/operation 2010, a first persistence manager 248 instance corresponding to the class of the DBO is identified. For example, the DSML 245 may look up the first persistence manager 248 instance that corresponds to the class of the DBO and invoke the load method on that first persistence manager 248 instance. At step/operations 2012, the first persistence manager 248 obtains executable code (e.g., an SQL statement) for loading instances of DBOs of the class corresponding to the DBO. For example, the executable code (e.g., SQL statement) may be the value of the "LOAD-_CODE" (e.g., "LOAD_SQL") constant in the first persistence manager 248 instance. At step/operation 2014, the first persistence manager 248 binds the unique identifier identifying the DBO instance to the query and/or "?" parameter of the executable code (e.g., SQL statement). In various embodiments, the executable code (e.g., SQL statement) only includes one query and/or "?" parameter. The first persistence manager 248 may then execute and/or cause the execution of the executable code (e.g., SQL statement).

At step/operation 2016, the execution of the executable code (e.g., SQL statement) causes a corresponding element from the data store 211 (e.g., database) to be returned. For example, a data store element corresponding to the DBO instance may be returned. In an example embodiment, the database may be a tabular database and the data store element may be a row of a table corresponding to the DBO instance or select fields from a specific row. The returned data store element is fed into a second persistence manager 248 instance generated by the class builder. For example, the class builder may generate or call a second persistence manager 248 instance corresponding to the class of the DBO instance, and the returned data store element may be fed into and/or provided as input to the second persistence manager 248 instance.

At step/operation 2018, the returned data store element is transformed into a fully functional primary software object by the second persistence manager 248 instance, such as an SBRO or a portion of an SBRO. For example, the second persistence manager 248 instance may perform a deserialization function to regenerate and/or rebuild the primary software object. For example, one or more fields of a primary software object may be initialized and/or populated based at least in part on the returned data store element, the open session, open transaction, and/or the like. In an example embodiment, a construct method is used to transform the returned data store element into a fully functional primary software object and/or to construct a fully functional primary software object based at least in part on the returned data store element. At step/operation 2020, the fully functional primary software object is loaded into cache. For example, the DSML 245 may cause the fully functional primary software object constructed based at least in part on the returned data store element into cache. The process may then continue to step/operation 2006, where the DSML 245 returns a reference and/or pointer to the loaded primary software instance in the cache. For example, the DSML 245 may provide a response to the primary software program that submitted the CRUD access/function request that includes a reference and/or a pointer to the loaded primary software instance in the cache.

FIG. 21 provides a flowchart illustrating various processes, procedures, steps, operations, and/or the like of example method 2100 for implicit loading of a primary software object. As referred to herein, implicit loading corresponds to a read function where the request is generated via an accessor method based at least in part on a reference to a primary software object instance from some already loaded primary software object instance. For example, a probe in the accessor method may detect the request and load the desired primary software object instance if it is not already loaded (e.g., into cache). A reference and/or pointer to the desired primary software object instance (e.g., in the cache) is then provided to the requesting primary software program. In various embodiments, the processes, procedures, steps, operations, and/or the like illustrated in FIG. 21 are executed between the execution of the connect method at step/operation 1908 and the execution of the disconnect method at step/operation 1912.

Starting at step/operation 2102, the DSML 245 may determine that the CRUD access/function request has been received (e.g., via an accessor method) and is a read request corresponding to a primary software object instance and that the CRUD access/function request does not comprises a unique identifier identifying the corresponding DBO instance. For example, the DSML 245 may process the CRUD access/function request, and determine, based at least in part on the processing, that the CRUD access/function request is a read request corresponding to a DBO instance (e.g., that corresponds to the primary software object) that does not comprise the unique identifier identifying the DBO instance.

At step/operation 2104, a get function is executed to determine and/or identify a DBO instance identifier (e.g., a unique identifier identifying a DBO instance). In an example embodiment, the get function is executed using a corresponding entity proxy. For example, when an object is loaded from the data store 211 that references other DBO and/or primary software object instances, the DSML 245 may create and/or generate a corresponding entity proxy and place it in a special field in the referencing object. The entity proxy contains the information/data necessary to load the referenced other DBO and/or primary software object instance. For example, the entity proxy may include and/or have access to a DBO identifier and/or other unique identifier configured to identify the referenced other DBO and/or primary software object instance. Thus, the get function may cause the entity proxy to provide the unique identifier corresponding to the referenced DBO and/or primary software object instance for which the read function was requested.

At step/operation 2106, the DSML 245 determines whether the DBO instance identified by the unique identifier is currently loaded into cache as a primary software object. For example, the DSML 245 may query the cache using the unique DBO identifier identifying the DBO instance to determine if the DBO is currently loaded into cache as a primary software object (and/or as a part of a primary software object).

When it is determined, at step/operation 2106, that the DBO instance is currently loaded into cache, the process continues to step/operation 2108. At step/operation 2108, the DSML 245 returns a reference and/or pointer to the loaded primary software instance in the cache. For example, the DSML 245 may provide a response to the primary software program that submitted the CRUD access/function request that includes a reference and/or a pointer to the loaded primary software instance in the cache.

When it is determined, at step/operation 2106, that the DBO instance is not currently loaded into cache, the process continues to step/operation 2110. At step/operation 2110, the DSML 245 executes a load method on the appropriate data store 211. Execution of the load method on the appropriate data store (e.g., the table or database where the DBO instance identified by the unique identifier is stored) includes passing the class of the DBO instance and the unique identifier identifying the DBO instance to the load method corresponding to the appropriate 211 data store.

At step/operation 2112, a first persistence manager 248 instance corresponding to the class of the DBO is identified. For example, the DSML 245 may look up the first persistence manager 248 instance that corresponds to the class of the DBO and invoke the load method on that first persistence manager 248 instance. At step/operations 2114, the first persistence manager 248 obtains executable code (e.g., an SQL statement) for loading instances of DBOs of the class corresponding to the DBO. For example, the executable code (e.g., SQL statement) may be the value of the "LOAD-_CODE" (e.g., "LOAD_SQL") constant in the first persistence manager 248 instance. At step/operation 2116, the first persistence manager 248 binds the unique identifier identifying the DBO instance to the query and/or "?" parameter of the executable code (e.g., SQL statement). In various embodiments, the executable code (e.g., SQL statement) only includes one query and/or "?" parameter. The first persistence manager 248 may then execute and/or cause the execution of the executable code (e.g., SQL statement).

At step/operation 2118, the execution of the executable code (e.g., SQL statement) causes a data store element to be returned. For example, a data store element corresponding to the DBO instance may be returned. In an example embodiment, the database may be a tabular database and the data store element may be a row of a table corresponding to the DBO instance or select fields from a specific row. The returned data store element is fed into a second persistence manager 248 instance generated by the class builder. For example, the class builder may generate or call a second persistence manager 248 instance corresponding to the class of the DBO instance and the returned data store element may be fed into and/or provided as input to the second persistence manager 248 instance.

At step/operation 2120, the returned data store element is transformed into a fully functional primary software object by the second persistence manager 248 instance, such as an SBRO or a portion of an SBRO. For example, the second persistence manager 248 instance may perform a deserialization function to regenerate and/or rebuild the primary software object. For instance, one or more fields of a primary software object may be initialized and/or populated based at least in part on the returned data store element, the open session, open transaction, and/or the like. In an example embodiment, a construct method is used to transform the returned data store element into a fully functional primary software object and/or to construct a fully functional primary software object based at least in part on the returned data store element. At step/operation 2122, the fully functional primary software object is loaded into cache. For example, the DSML 245 may cause the fully functional primary software object constructed based at least in part on the returned data store element into cache. The process may then continue to step/operation 2006, where the DSML 245 returns a reference and/or pointer to the loaded primary software instance in the cache. For example, the DSML 245 may provide a response to the primary software program that submitted the CRUD access/function request that includes a reference and/or a pointer to the loaded primary software instance in the cache.

FIG. 22 provides a flowchart illustrating various processes, procedures, steps, operations, and/or the like of an example method 2200 for writing a primary software object instance to persistent data store (e.g., ER data store 211) and/or updating information/data stored in persistent data store corresponding to primary software object instance. Starting at step/operation 2202, the DSML 245 may determine that the CRUD access/function request has been received (e.g., via an accessor method) and is a write and/or update request corresponding to a primary software object. The primary software object has been translated and/or abstracted into one or more DBOs (e.g., entity class object instances and embedded class(es) object instances).

At step/operation 2, the DSML 245 causes persistence hierarchy classes fields declared for the capturing of the DBOs corresponding to the primary software object instance. For example, the persistence hierarchy classes may include a persistent flag and a modified flag. In various embodiments, a persistent flag indicates whether or not a DBO has already been stored to the persistent ER data store 211. For example, if the persistent flag is set to true, then the DBO has been previously stored in the persistent ER data store 211 and if the persistent flag is set to false, then the DBO has not been previously stored in the persistent ER data store 211. In various embodiments, the modified flag indicates whether the DBO has been modified or not since the DBO was written to the persistent ER data store 211. In an example embodiment, the modified flag indicates whether or not the persistent ER data store 211 should be updated (e.g., to include/insert a new DBO or to update an existing DBO) based at least in part on the corresponding DBO. For example, if the modified flag is set to true, then the persistent ER data store 211 should be updated and/or synchronized with the DBO; however, if the modified flag is set to false, then the persistent ER data store 211 need not be synchronized with the DBO because the DBO has not been modified. In an example embodiment, the persistence hierarchy classes may further include a DBO identifier and a set of modified collections. Similar to the modified flag, the set of modified collections contains references to child collection proxies that have been modified since the last synchronization. Similar to the entity proxies described above, collection proxies are references and/or pointers stored in one DBO instance (and/or a database element corresponding to the DBO) that point to or reference another DBO instance and/or a collection.

In an example embodiment, the persistent flag for a newly created entity class object instance that has not yet been stored in the persistent ER data store 211 is initially not set (and/or set to False) since the entity class object instance has not yet been written in the persistent ER data store 211. However, the new entity class object instance should be written to the persistent ER data store 211 as the next synchronization point, so the modified flag corresponding to the new entity class object instance is set (e.g., set to True). In an example embodiment, a newly created entity class object instance has no modified collections.

At step/operation 2206, the DSML 245 executes and/or causes execution of the persistent hierarchy classes logic. In various embodiments, execution of the persistent hierarchy classes logic causes the corresponding DBO instance to be added to the transaction cache (e.g., the cache corresponding to the open transaction). For example, a constructor may invoke a method on the current write transaction that causes the DBO instance to be added to the corresponding transaction cache. In an example embodiment, the transaction cache is used by the DSML 245 as a log of DBO instances that the DSML 245 must manage and/or take care of.

At step/operation 2208, the DSML 245 initiates a synchronization of the durable storage with the current state of the DBO instances stored in the transaction cache. For example, the DSML 245 may cause a flush and/or commit method to be invoked. In various embodiments, the flush and/or commit method is invoked responsive to the transaction cache reaching a certain level of fullness (e.g., at least 80-99% full), responsive to a periodic synchronization between the persistent ER data store 211 and the ER system 100 (e.g., a flush and/or commit method is invoked every ten seconds, every thirty seconds, every minute, every five minutes, every ten minutes, every half an hour, every hour, and/or the like), and/or responsive to other criteria being satisfied.

At step/operation 2210, for each DBO instance in the transaction cache, it is determined whether the modified flag is set (and/or set to True). If the modified flag is not set (and/or set to False) for a DBO instance, the process for that DBO instance is completed as there is no need to synchronize the persistent ER data store 211 with that DBO instance. For example, the DSML 245 may determine whether the modified flag is set (and/or set to True) for each DBO instance in the transaction cache. For the DBO instances having the modified flag set (and/or set to True), the process continues to step/operation 2212. At step/operation 2212, it is determined whether the persistent flag is set (and/or set to True). For example, if the persistent flag corresponding to a DBO instance is set (and/or set to True), the DBO instance has been previously written to the persistent ER data store 211 and an update function should be performed. In such a case the process continues to step/operation 2216. In another example, if the persistent flag corresponding to a DBO instance is not set (and/or set to False), the DBO instance has not been previously written to the persistent ER data store 211 and an insert function should be performed. In such a case the process continues to step/operation 2214.

At step/operation 2214, an insert function is executed and a new database element corresponding to the DBO instance is inserted into the persistent ER data store 211 is updated by the DSML 245. For example, an insert function may be executed to cause a new database element to be inserted into the persistent ER data store 211. The new database element may include values extracted and/or taken from (e.g., via a serialization function) the DBO instance. In an example embodiment wherein the persistent ER data store 211 comprises a tabular database, a new row may be inserted into the appropriate table of the database and one or more columns of the new row may be populated based at least in part on values extracted and/or taken from the DBO instance. After inserting the new database element into the persistent data store, the persistent flag for the DBO instance is set (and/or set to True) and the modified flag is unset (and/or set to False).

At step/operation 2216, and update function is executed and the existing database element corresponding to the DBO instance and stored in the persistent ER data store 211 is updated by the DSML 245. For example, values extracted and/or taken from (e.g., via a serialization function) the DBO instance are used to update the existing database element, and/or portions thereof, corresponding to the DBO instance. For example, the modified values extracted and/or taken from the DBO instance (e.g., via a serialization function) may be written to the existing database element and/or portion thereof corresponding to the DBO instance. After synchronizing the existing database element with the DBO instance in the transaction cache, the modified flag of the DBO instance is unset (and/or set to False).

At step/operation 2218, for each collection proxy in the DBO instance's modified collection set, the set of modified collections is cleared. For example, for each collection proxy in the DBO instance's modified collection set, a flush method may be invoked to synchronize the durable ER data store 211 with the current state of the collection. In an example embodiment, the synchronization is performed by obtaining and/or generating an SQL statement (or other executable code) suitable for adding an element of the collection to the appropriate table of the database (e.g., for a tabled-based database) and executing the SQL statement (or other executable code). Once the synchronization has been performed for each collection proxy of the DBO instance's modified collection set, the modified collection set is cleared.

At step/operation 2220, the oldest write transaction open at the point when the synchronization was invoked is committed. For example, after each inserting and/or updating database elements corresponding to the DBO instances having set (and/or set to True) modified flags, the oldest write transaction open at the point the synchronization was invoked is committed and/or closed. After the write transaction is committed, any new database elements that were inserted and any changes/updates/modifications made to existing database elements will be visible to other activities (e.g., CRUD functions) interacting with the persistent ER data store 211.

FIG. 23 provides a flowchart illustrating various processes, procedures, steps, operations, and/or the like of an example method 2300 for performing an insert or update function by the DSML 245. In various embodiments, the method 2300 corresponds to the processes, procedures, steps, operations, and/or the like performed during steps/operations 2214 and/or 2216. Starting at step/operation 2302, an insert or update function is invoked for a DBO instance. For example, the DSML 245 may invoke an insert or update function on a DBO instance.

At step/operation 2304, the DSML 245 identifies and/or determines the appropriate persistence manager 248 for the DBO instance on which the insert or update function is being invoked. For example, a persistence manager 248 instance corresponding to the class of the DBO instance is identified. For example, the DSML 245 may look up the persistence manager 248 instance that corresponds to the class of the DBO instance.

At step/operation 2306, the DBO instance is provided as input to the identified persistence manager 248 instance. For example, the DBO instance may be fed into the identified persistence manager 248 instance. In various embodiments, the persistence manager 248 instance is configured to take apart and/or decompose the DBO instance via a serialization function. In various embodiments, the persistence manager 248 is configured to generate executable code (e.g., an SQL statement) that, when executed causes the insert and/or update function to be completed. To determine whether an insert or update function is to be completed, at step/operation 2308, it is determined whether the DBO instance is a new instance (e.g., not yet written to the persistent ER data store 211). This determination may be made (e.g., by the persistence manager) based at least in part on the persistent flag of the DBO instance, as described above.

When it is determined at step/operation 2308 that the DBO instance is not a new DBO instance (e.g., that the DBO instance has already been written to the persistent ER data store 211), for example, based at least in part on the persistent flag of the DBO instance being not set (and/or set to False)), the process continues to step/operations 2310. At step/operation 2310, the persistence manager 248 instance produces and/or generates executable code (e.g., an SQL statement) to cause a database element corresponding to the DBO instance to be updated based at least in part on the modifications to the DBO instance since the DBO instance was last synchronized with the persistent ER data store 211. For example, the persistence manager 248 instance may produce and/or generate executable code (e.g., an SQL statement) configured to, when executed, cause the persistent ER data store 211 to be updated so as to be synchronized with the DBO instance. In an example embodiment, the executable code (e.g., SQL statement) only causes database element portions that correspond to portions of the DBO instance (e.g., embedded class object instances) that have been updated and/or modified since the persistent ER data store 211 was last synchronized with the DBO instance to be updated and/or modified. For example, in an example embodiment wherein the persistent ER data store 211 comprises a tabular database, the executable code (e.g., SQL statement) is configured to cause, when executed, one or more columns of a particular row of a particular table corresponding to the modified DBO instance to be updated.

When it is determined at step/operation 2308 that the DBO instance is a new DBO instance that has not yet been written to the persistent ER data store 211 (e.g., the persistent flag of the DBO instance is not set (and/or set to False)), the process continues to step/operations 2312. At step/operation 2312, the persistence manager 248 instance produces and/or generates executable code (e.g., an SQL statement) to cause a database element corresponding to the DBO instance to insert a new database element corresponding to the DBO instance into the persistent ER data store 211. For example, the persistence manager 248 instance may produce and/or generate executable code (e.g., an SQL statement) configured to, when executed, cause a database element to be inserted into the persistent ER data store 211 and populated with values taken and/or extracted from (e.g., via a serialization function) the DBO instance. For example, in an example embodiment wherein the persistent ER data store 211 comprises a tabular database, the executable code (e.g., SQL statement) is configured to cause, when executed, a row to be inserted into a particular table and one or more columns of the inserted row of the particular table to be populated with values taken and/or extracted from the DBO instance.

At step/operation 2314, the executable code (e.g., SQL statement) produced and/or generated by the persistence manager 248 instance at step/operation 2310 or 2312 is executed to cause the persistent ER data store 211 to be synchronized with the DBO instance. For example, the DSML 245 may cause the execution of the executable code (e.g., SQL statement) generated by the persistence manager 248 instance to be executed (e.g., by the processing element 205 of the server 65). For example, the execution of the executable code (e.g., SQL statement) may cause the insertion of a database element into the persistent ER data store 211 and the population of at least a portion of the inserted database element (alternatively, the database element may be inserted in an already populated manner, in an example embodiment). In another example, the execution of the executable code (e.g., SQL statement) may cause the updating and/or modifying of at least a portion of a database element stored in the persistent ER data store 211. In an example embodiment, after completion of step/operation 2314, the process may continue to step/operation 2218 of FIG. 22 and/or may be performed iteratively for various DBO instances to which the persistent ER data store 211 is to be synchronized.

Additionally, various embodiments of the DSML 245 support a multi-threaded and multi-process runtime environment. To accomplish this, the DSML 245 may employ concurrency control features including locks, advisory locks, and versioned objects.

As noted, various embodiments of the DSML 245 an entity class instance can be locked by passing it to Database#lock( ). This method may lock the object in durable storage for the duration of the current transaction. This lock has the same effect as updating the row in durable storage and will be held until the end of the transaction.

Further, in various embodiments of the DSML 245, an advisory lock may be implemented. An advisory lock is effectively a lock on a name meaningful to the application programmer. An advisory lock may be acquired by passing a name, which is a string, to Database#lockAdvisory( ). Advisory locks are held until the end of the transaction and are exclusive—meaning no two transactions may hold the same advisory lock at the same time. If a thread attempts to acquire an advisory lock currently held by some other transaction, the attempt will be blocked until the transaction holding the lock terminates. Advisory locks are implemented on top of durable storage mechanisms and thus may span threads and processes.

In various embodiment of the DSML 245, the DSML 245 has the ability to implement for versioned objects. Versioned objects, also known as optimistic locking, may be enabled for any entity class. For example, when utilizing versioned objects, the DSML 245 may prevent version conflicts. A version conflict occurs when two activities attempt to modify an instance that was concurrently read from two different activities. When any other conflicting activity attempts to commit its changes, the DSML 245 may throw an exception causing the activity to abort and retry. These versioned objects may be enabled through the inclusion of several pieces of state in the entity class instances. When an entity class instance is loaded from durable storage, the persistent version and version fields are both initialized to the instance's version number from durable storage. When a modification is made to some part of a versioned instance's persistent object tree, if the instance's modified flag is not set, the modification mechanism will increment the version field by one and the instance's modified flag is set (and/or set to True). When it is time to write the modified instance to durable storage, the DSML 245 will check that the version number in durable storage matches the value of the persistent version field. If these do not match, an exception may be thrown, and the transaction is aborted. If they do match, DSML 245 may write the object to durable storage using the outlined persistence manager 248 mechanisms. The version number in durable storage is then set to the instance's incremented version field, and DSML 245 sets the instances persistent version field to be the same as the version field.

As will be recognized, various embodiments of the DSML 245 solve technical problems corresponding to an application or program interfacing with a persistent 211 data store. In particular, applications and/or programs that store information/data in a database tend to be aware of the database and its structure that the information/data is being stored in. As such, if the database being used by the application and/or program is to be changed, large portions of the application and/or program have to be re-engineered and rebuilt. However, various embodiments of the DSML 245 provide technical solutions to the technical problem of switching which database is being used to store information/data by an application and/or program. For example, the primary software programs of the ER system 100 are not aware of the underlying structure of the persistent ER data store 211 and the structure and/or type of the persistent ER data store 211 may be changed without any changes being made to the primary software programs of the ER system 100. For example, the primary software programs of the ER system 100 are database agnostic. In particular, the DSML 245 provides the primary software programs of the ER system 100 with a database abstraction (e.g., a database agnostic model of a database) with which the primary software programs may interface while the database interface layer 247 of the DSML 245 provides a mapping between the database abstraction and the actual structure of the database. Thus, ER system 100 may switch to use of a different structure and/or type of database with only required changes being to the database interface layer 247 of the DSML 245. For example, only the mapping between the database abstraction and the actual structure of the database need be updated for a different database to be used. Moreover, the DSML 245 enables the ER system 100 to use multiple databases (e.g., various information/data may be stored in the most appropriate database type for that particular information/data) through the use of multiple DSMLs 245 and/or multiple database interface layers 247. Thus, various embodiments of the DSML 245 provide technical improvements to the field of application and/or program interactions with a database and/or other persistent 211 data store.

Rules Engine

In various embodiments, the ER system 100 uses a rules engine 250 to execute XML-based rules. In one embodiment, the rules engine 250 evaluates ERs and or SBROs to initiate "actions." Each rule may be a rule that (a) is identifiable by a rules identifier (e.g., via a universally unique identifier (UUID) or a globally unique identifier (GUID)), and (b) represents a condition to be tested with actions to be taken depending on the result (e.g., an action to be taken if the condition is satisfied and/or an action to be taken if the condition is not satisfied). Generally, rules are used to make inferences about additional ER states to be created. In one embodiment, rules are expressed as XML documents and comprise a rule "predicate" and one or more rule "actions." The predicate comprises a "selection" and a "condition."

The separation of the rule predicate into <selection/> and <condition/> should be thought of as selecting a population of actors via <selection/> upon which the rule <condition/> is to be tested. For example, the <selection/> determines whether the actor upon which the rule is currently operating is a member of the population upon which the <condition/> will be tested and the <actions/> will be executed. This has the technical benefit of allowing the rule to be written with <conditionFalse/> actions without always executing actions whenever the rules are tested because <selection/> also serves as a gate keeper to the <condition/> evaluation. FIG. 25A illustrates an example basic structure of a rule.

In one embodiment, the rules engine 250 flow of control evaluates <selection/>. If <selection/> is true, the rules engine 250 then evaluates <condition/>. If <condition/> is true, the rules engine 250 then executes actions specified by <conditionTrue/> or <action/>. If not, then the rules engine 250 executes actions specified by <conditionFalse/>. FIG. 25B illustrates some example Boolean operators that may be included in the conditions section of a rule, in accordance with an example embodiment.

As will be recognized, <selection/> and <condition/> have the same form; the difference between them is in their usage. For instance, <selection/> and <condition/> are single expressions yielding a Boolean value. These expressions may be either simple—involving a single <conditionPhrase/> or negation of a <conditionPhrase/>. Or the conditions may be compound involving <and/> and <or/> with enclosed tags of those same types. FIG. 25C illustrates an example structure and some possible operators that may be included in the <conditionPhrase/> portion of a rule.

In one embodiment, a condition phrase specifies a Boolean expression to be evaluated and may impose count, time, and order restrictions on the possible candidates to be examined.

In one embodiment, a condition clause specifies the elements for evaluating a specific rule expression: rule condition, operator, and value. The condition clause is an expression where the condition supplies a value that is compared to some constant value by the specified operator, as illustrated in FIG. 25D.

In one embodiment, an occurrence count specifies the specific number of occurrences of a match satisfying the rule condition, operator, and value which must be present for the condition phrase to be true. An example occurrence count is illustrated in FIG. 25E.

In one embodiment, a range occurrence count specifies the specific range of the number of occurrences of a match satisfying the rule condition, operator, and value which must be present for the condition phrase to be true. An example range occurrence count condition is illustrated in FIG. 25F.

In one embodiment, a period time interval specifies the time after which a match satisfying the rule condition, operator, and value must have occurred. An example of a period time interval condition is illustrated in FIG. 25G.

In one embodiment, a range time interval specifies the range of time during which a match satisfying the rule condition, operator, and value must have occurred. An example range time interval condition is illustrated in FIG. 25H.

In one embodiment, a rule condition is responsible for extracting ER information/data to be compared against constant value(s) using the operator for determining truth, an example format of which is illustrated in FIG. 25I. For instance, the DSML 245 may be used to access information/data from an ER such that the rule may be evaluated and/or applied to an ER.

In one embodiment, condition values are constants which may be used by the rule condition as parameters for extracting the appropriate ER information/data. FIG. 25J illustrates an example format for defining a condition value, in an example embodiment.

In one embodiment, a collection of rule condition values are values to be used by the rule condition. FIG. 25K illustrates an example format for defining a rule condition value, in an example embodiment.

In one embodiment, the operator compares the values extracted by the rule condition against the constant values specified by the rule to determine truth. FIG. 25L illustrates an example format for defining an operator of a rule condition.

In one embodiment, the clause type controls what fields are displayed for particular condition clauses on an eForm for defining rules and to restrict the acceptable selection values. FIG. 25M illustrates an example format for defining a clause type of a condition, in an example embodiment.

In one embodiment, the target encapsulates the value in various forms to be compared by the operator against the information/data extracted by the rule condition. FIG. 25N illustrates an example format of a target of a rule condition, in accordance with an example embodiment.

In one embodiment, an amount is a value combined with a unit for those rules which allow these. FIG. 25O illustrates an example format of an amount of a rule condition, in accordance with an example embodiment.

In one embodiment, a quantity is a value type combining a value with a unit. FIG. 25P illustrates an example format for defining a quantity of a rule condition, in accordance with an example embodiment.

In one embodiment, values are used for computation within the rules engine 250. In the rule language, values are untyped and converted to appropriate types at runtime based at least in part on usage. FIG. 25Q illustrates an example format for defining a value of a rule condition, in accordance with an example embodiment.

In one embodiment, a unit is a concept that represents a measurement unit. FIG. 25R illustrates an example format for defining a unit of a rule condition, in accordance with an example embodiment.

In one embodiment, a rule action identifier maps to an OPDO to be executed (e.g., provided to the ingestion processing module 225). The set of available OPDOs may be stored within the ER system 100 and be identifiable by one or more OPDO identifiers, such as UUIDs or GUIDs. Thus, each OPDO is referenced using its unique identifier. In such cases, the OPDO may have been partially populated prior to executing the corresponding action. Thus, when executed, any remaining portions of the OPDO are automatically populated and provided for execution. FIG. 25S illustrates an example format for designating a rule action, in accordance with an example embodiment.

In one embodiment, actions are the set of <action/> elements that are to be executed upon evaluation of the rule condition. If the rule condition evaluates to true, then the set of <action/> elements contained within <conditionTrue/> are executed. If the rule conditions evaluate to false, then the set of <action/> elements contained within <conditionFalse/> are executed. FIG. 25T illustrates an example format for defining an action of a rule, in accordance with an example embodiment.

In one embodiment, <and/> is used to aggregate <conditionPhrase/> and <conditionClause/> such the result of the <and/> is true if-and-only-if all of the sub-elements are true. Sub-elements may include additional levels of <and/> and <or/>. Similarly, <or/> is used to aggregate <conditionPhrase/> and <conditionClause/> such the result of the <or/> is true if any of the sub-elements are true. Sub-elements may include additional levels of <or/> and <and/>.

In one embodiment, the rule context specifies the information/data upon which the rule operates including the owning actor, and in the case of dynamic rule running, the specific object which has been modified. In the case of dynamic rule running, including the modified data object allows the rule to access a known modified data object rather than searching for a particular matching one.

In one embodiment, rules can be executed in two modes: (1) dynamic execution—where there is a currently modified data object, and/or (2) static execution—where the rule analyzes the current state of an ER. In dynamic execution, the rule operates on a particular data object that has been modified which is owned by a particular owner. In static execution, the rule operates on the entire actor's ER. Thus, the rules engine 250 analyzes the data object (e.g., the data) for current state and makes any inferences which are implied by that state.

In one embodiment, the rules engine 250 optimizes execution by (a) collapsing certain forms of logical operators that can be collapsed, and (b) reordering logical operators to achieve maximum computational performance. In general <and/> and <or/> are commutative with respect to one another. The rules engine 250 can also evaluate and monitor the cost (e.g., timing) of various logical operations at runtime and periodically reorder them to reduce the weighted average cost. For instance, value lookups can be cached and are regarded as constants for the duration of a rule execution event. In one embodiment, a rules engine 250 scheduler may also be used to automatically execute rules at specific frequencies or in response to certain other criteria, such as system resources being below a configurable threshold. The scheduler can automatically cause the rules engine 250 to execute rules evaluation for time-dependent criteria. This may include age-dependent rules and others.

Thus, the rules engine 250 may use rules to categorize individuals and users, update and notify users of the individual's health status, generate/create health maintenance actions, process action plans, generate/create information/data from other data, perform information/data entry business logic, protective monitoring, information/data entry edit checks, select appropriate ontology concept identifiers, the flow of applications, support subscription-publication services, and present personalized content. When a rule is true, an action may be triggered. Nonlimiting examples of rule applications and actions may include the following: generate/create content; display content; modify the display content; generate/create lists; generate/create health issue data objects; generate/create health services data objects; generate/create a health calendar entry; update status; update an action plan; generate/create an external system message, trigger a secure message; trigger a reminder; invoke a content display; list an entry; send a message to an external system; send a fax; supplement a list; complete a system task; add to the health calendar; and/or the like.

In one exemplary embodiment, the rules engine 250 manages rules independently of application code changes. This allows for non-programmers to be provided with the ability to generate/create and change rules—overcoming previous technical challenges. This ability may be provided through an add-on decision table support. Further, multiple rule types may be supported, and an audit trail of rule changes may be maintained.

FIG. 24 provides a flowchart for exemplary process 2400 (e.g., process 2400) illustrating various processes, procedures, steps, operations, and/or the like performed by a server 65 (e.g., via execution of rules engine 250 to automatically cause various actions to be performed). In various embodiments, the various actions correspond to updating and/or managing one or more ERs stored in the ER data store 211. Starting at step/operation 2402, an XML rule document corresponding to a rule to be applied to one or more ERs stored in the ER data store 211 is identified, selected, determined, and/or the like. For instance, a plurality of rules may be defined in the ER system 100 with each rule corresponding to an XML rule document. To apply a rule to one or more ERs stored in the ER data store 211, the server 65 (e.g., via rules engine 250 executing on the processing element 205) may select, identify, and/or determine an XML rule document.

At step/operation 2404, one or more ERs and/or portions thereof (e.g., one or more SBROs of the one or more ERs) may be extracted/retrieved from the ER data store 211. For example, the rules engine 250 may cause the DSML 245 to retrieve, load, and/or the like one or more ERs and/or portions thereof (e.g., one or more SBROs of the one or more ERs) from the ER data store 211.

At step/operation 2406, the selection criteria of the rule corresponding to the selected, identified, and/or determined XML rule document is evaluated based at least in part on an ER or portion of an ER (e.g., one or more SBROs of an ER) accessed, extracted/retrieved, and/or loaded from the ER data store 211 at step/operation 2404. For instance, as described above, the selection criteria of a rule may comprise an expression yielding a Boolean value. For example, the selection criteria may include demographic criteria (e.g., subject entity gender, age, age range, race, and/or the like). In another example, the selection criteria may include health circumstance criteria. Health circumstances may include diagnosis, having been prescribed and/or recommend a therapy and/or prescription, and/or the like. For instance, the selection criteria for a certain rule may be configured to only select ERs that indicate the corresponding subject entity has particular health circumstances (e.g., a diagnosis, been prescribed and/or recommended a therapeutic, has had one or more particular tests performed in a particular time period, and/or the like), is predisposed (e.g., based at least in part on family history, test results, and/or the like) to have particular health circumstances, and/or the like. For example, a particular rule may ask if a certain medication has improved a subject entity's A1C level. The selection criteria may therefore be configured to identify ERs corresponding to subject entities that have been prescribed the certain medication. In another example, the selection criteria may be configured to identify ERs corresponding to subject entities that have been prescribed the certain medication and had their A1C levels tested at least one month after being prescribed the certain medication. Thus, the selection criteria of the rule may be configured to select ERs corresponding to subject entities for which evaluating the condition of the rule is expected to be possible and/or for which the rule is relevant to demographics and/or health circumstances indicated by the ER corresponding to the subject entities.

At step/operation 2408, it is determined if the selection criteria are satisfied by the ER. For instance, the rules engine 250 may determine if the selection criteria are satisfied by the ER based at least in part on the evaluation of the ER based at least in part on the ER and/or portion of the ER. When it is determined, at step/operation 2408, that the selection criteria is not satisfied by the ER (e.g., <selection/> is not True), the process may return to step/operation 2402 or 2404 for the selection of another rule from the plurality of rules and/or for accessing and/or loading another and/or portion thereof from the ER data store 211.

When it is determined, at step/operation 2408, that the selection criteria are satisfied by the ER (e.g., <selection/> is True), the process continues to step/operation 2410. At step/operation 2410, the condition of the rule is evaluated. In various embodiments, evaluation of the condition of the rule results in a Boolean value (e.g., True/False). In various embodiments, evaluating the condition of the rule may determine whether one or more test results of the ER corresponding to the subject entity are within or outside of a particular range (e.g., greater than a maximum threshold level and/or less than a minimum threshold level), a combination of test results satisfies particular criteria (e.g., test result A is greater than threshold A, test result B is less than threshold B, and text result C is not less than threshold C), the ER indicates that the subject entity has been diagnosed with a particular diagnosis, and/or various combinations thereof.

At step/operation 2412, it is determined if the condition criteria are satisfied by the ER. For example, the rules engine 250 may determine if the condition criteria are satisfied by the ER based at least in part on the evaluation of the ER based at least in part on the ER and/or portion of the ER. When it is determined, at step/operation 2412, that the condition criteria is not satisfied by the ER (e.g., <condition/> is not True), the process may proceed to executing a <conditionFalse/> action indicated by the rule and/or return to step/operation 2402 or 2404 for the selection of another rule from the plurality of rules and/or for accessing and/or loading another and/or portion thereof from the ER data store 211. In various embodiments, executing a <conditionFalse/> action is similar to executing a <conditionTrue/> action described below. In particular, executing a <conditionFalse/> action may include identifying an OPDO (e.g., XML document) based at least in part on the <conditionFalse/> action, populating fields of the OPDO with data associated with the ER corresponding to the subject entity, and providing/submitting the populated OPDO to an ingestion engine for processing thereby. The ingestion engine may process the populated OPDO (e.g., XML document) to cause the ER corresponding to the subject entity to be updated and/or modified based at least in part on the ER (information/data stored in association with the ER) satisfying the selection of the rule and not satisfying the condition of the rule.

When it is determined, at step/operation 2412, that the condition criteria are satisfied by the ER (e.g., <condition/> is True), the process continues to step/operation 2414. At step/operation 2414, an OPDO (e.g., XML document) is identified based at least in part on the <conditionTrue/> action. For instance, the rule may indicate an action to be performed responsive to an ER (e.g., information/data stored in association with the ER) satisfying both the selection criteria and the condition criteria of a rule. Based at least in part on the action indicated, an OPDO is identified using an OPDO identifier. For example, the action of the rule may include an OPDO identifier (e.g., UUID or a GUID) corresponding to an OPDO. In one embodiment, the OPDO is identified based thereon.

To execute or perform the action, one or more fields of the OPDO are pre-populated in a manner to execute or perform the action corresponding to the rule. For example, the pre-population may identify the actions to be performed with regard to the rule in an XML structure. The pre-population is also for reducing computational resources for performing the action. Then, at step/operation 2416, any necessary unpopulated fields of the OPDO are populated based at least in part on information/data of the ER corresponding to the subject entity for which the action should be executed. For instance, the rules engine 250 may use information/data from the evaluated ER to populate one or more fields of the OPDO. For example, the rules engine 250 may extract/retrieve the subject entity identifier from the ER and populate a subject entity field of the OPDO (e.g., XML document) with the extracted subject entity identifier. Various other information/data may be used to extract/retrieve information/data from the ER and used to populate one or more fields of the OPDO. In an example embodiment, the OPDO indicates which fields of the OPDO should be populated and which information/data should be extracted from the ER to populate the indicated fields of the OPDO (e.g., XML document).

At step/operation 2418, the populated OPDO (e.g., XML document) is provided to the ingestion processing module 225. For instance, the rules engine 250 may provide and/or submit the OPDO to the ingestion processing module 225. The ingestion processing module 225 may then process the OPDO to generate/create a corresponding DAPDO as described herein with regard to FIGS. 8, 12, 13, and 14 and their corresponding steps/operations. These steps/operations are not repeated here, but are incorporated herein by reference. As will be recognized, the steps/operations include transforming the OPDO (XML document) to a Java object that is executable or used for execution, generating/creating a container tree data structure based at least in part on the DAPDO, assembling the container tree data structure to generate/create data transfer objects, and submitting the data transfer objects to the SBRO processing module 265 for updating the ER corresponding to the subject entity based thereon). Thus, the ER corresponding to the subject entity is updated based at least in part on the ER satisfying the selection of the rule and either satisfying or not satisfying the condition of the rule. For example, the ER corresponding to the subject entity may be updated to indicate that the subject entity should be added to a particular group (e.g., such that the subject entity receives information/data corresponding to the group, one or more flags are provided to a provider when the provider views at least a portion of the ER corresponding to the subject entity, and/or the like). For instance, if the ER corresponding to the subject entity is updated to indicate that the subject entity should be included in a group for patients that have recently had knee surgery (e.g., responsive to ER indicating that the subject entity is scheduled to have knee surgery and/or has recently had knee surgery) such that the subject entity receives information/data from the group for patients that have recently had knee surgery (e.g., exercises to do to help with recovery, things to watch out for, and/or the like). After completing step/operation 2418, the process may return to step/operation 2402 and/or 2404, in an example embodiment.

The embodiments described herein provide for efficient rules to be programmatically executed using a lightweight process via an XML document to any number of ERs and/or SBROs in a computationally efficient approach. To that end, because the <selection/> determines whether the actor upon which the rule is currently operating is a member of the population upon which the <condition/> will be tested and the <actions/> will be executed, it allows for the rules to be written with <conditionFalse/> actions without always executing actions whenever the rules are tested because <selection/> also serves as a gate keeper to the <condition/> evaluation. The rule context specifies the data upon which the rule operates, including the owning actor, and in the case of dynamic rule running, the specific object which has been modified. In the case of dynamic rule running, including the modified data object allows the rule to access a known modified data object rather than searching for a particular matching one. And finally, by prepopulating at least part of the action OPDO, processing time is increased for executing or performing the corresponding action.

Data Access/Function Controller

Various processes, procedures, steps, operations, and/or the like for updating and managing ERs stored in an ER data store 211 have been described. Various processes, procedures, steps, operations, and/or the like for performing functions on and/or accessing information/data from an ER stored in the ER data store 211 will now be described.

In one exemplary embodiment, the ER system 100 comprises a security architecture based at least in part on relationships that the ER system 100 has defined and/or can infer between and/or among entities (e.g., person to person, person to organization, and organization to organization). The information/data a user can access as defined by relationships and functions/operations he or she can perform on the same may be referred to as "scope." See FIG. 27. Scope is dynamic as more and more information/data is known about the user. In one embodiment, scope may be based at least in part on the requesting entity's relationship to the subject entity. FIGS. 30A and 30B illustrate some example relationships between a subject entity and various other entities. Only requesting entities with a "legitimate relationship" with the subject entity are allowed access to the ER of the subject entity. In the healthcare context, a legitimate relationship in the ER system 100 is a health relationship. The relationship-based approach allows security constraints and permissions to be defined as policies. For instance, one policy might be: "provider office staff can only write prescriptions on their patients or patients associated with their practice." Thus, as the care relationships are established, maintained or terminated, the appropriate access is automatically enforced. As information/data is received from messages and other sources, the relationships between entities are gleaned, codified, and used to maintain the best known information/data about that relationship. In that regard, all relevant relationships and connections can be stored and summarized into the SBRO of each relationship, for instance.

FIG. 27 provides a schematic diagram illustrating how the data access/function controller 255 evaluates relationships and determines which ERs a requesting entity may access information/data from, which information/data the requesting entity may access from the ERs the requesting entity is allowed to access, and which operations/functions a requesting entity is allowed to perform with respect to the information/data the requesting entity may access from the ERs the requesting entity is allowed to access. FIG. 28 illustrates how a requesting entity identifier and a subject entity identifier are used to control the requesting entity's access to information/data and the performance of functions/operations for the ER corresponding to the subject entity. For example, the requesting entity identifier and the subject entity identifier are determined (e.g., using the identity matching service 240) based at least in part on information/data provided in the ER access/function request. Based at least in part on the determined relationship between the requesting entity and the subject entity, a user role for the requesting entity with respect to the subject entity is determined. Once the user role for the requesting entity is determined, a rights group(s) assigned to the user role or user group are identified and/or determined. Each rights group includes one or more rights. Thus, once the rights group is assigned to the user role, the rights the requesting entity (e.g., requesting user) may exercise with respect to the ER corresponding to the subject entity may be identified and/or determined. Each rights group or right can provide an access/function key that is used to enable an access/function code module to cause the same to be performed with respect to the ER for the subject entity. FIG. 37 represents examples of this.

Additionally, the security architecture comprises a number of unique custodial services. For example, existing systems overlook that security should be performed at the information/data element level in health systems, not the record level. Accordingly, such systems either restrict complete access to a patient's information/data, or restrict access to a complete class of patient information/data (e.g., insurance information/data). However, embodiments of the present invention provide the ability to restrict to any element (e.g., medical concept) of patient information/data. In that regard, the ER system 100 security architecture is able to restrict around particular concepts (e.g., via ontology concept identifiers), the values of a field, information/data elements, and/or combinations thereof. This permits the ER system 100 to restrict access or the display of any attribute of a data object (e.g., SBRO) based at least in part on the attributes of an ontology concept identifier (or other value) defined in the graph-based ontology. As will be recognized, the information/data may include protected health information (PHI), sensitive health information, authored protected health information, and/or the like. The terms PHI and/or the like are used herein to refer to information/data that relates to the past, present, and/or future physical or mental health or conditions of a subject entity; information/data that relates to the provision of healthcare to a subject entity; information/data that relates to the past, present, or future payment for the provision of healthcare to a subject entity; and/or information/data that relates to that identifies or could reasonably be used to identify the subject entity. Sensitive PHI is used herein to refer to PHI that may pertain to (i) a subject entity's HIV status or treatment of a subject entity for an HIV-related illness or AIDS, (ii) a subject entity's substance abuse condition or the treatment of a subject entity for a substance abuse disorder, or (iii) a subject entity's mental health condition or treatment of a subject entity for mental illness. Authored PHI is information/data authored by a particular user as an event initiator or performer. In various exemplary embodiments, the treatment of individual health information/data complies with all regulations and laws, including but not limited to Health Insurance Portability and Accountability Act (HIPAA).

In various embodiments, the ER system 100 comprises a multi-tiered, non-hierarchical ability to restrict access or display based at least in part on the user role or user group of a requesting entity (e.g., with respect to the subject entity). As discussed above, in the healthcare context, a user role refers to the function or responsibility assumed by a person for a healthcare event (e.g., where the subject entity is the patient within the healthcare event). In this context, user role information/data documents a person's association with an identified healthcare activity. User roles and/or user groups include, but are not limited to, provider roles (e.g., admitting, attending, billing, consulting, collaborating, interpreting, performing, referring, servicing, supervising, treating), personal roles (self, next-of-kin, emergency contact, guarantor, guardian), organization roles (employee, employer, insured, subscriber), and/or the like. Further, a user can have multiple user roles and/or be associated with multiple user groups. For instance, a user role corresponding to a particular record access/function request is determined based at least in part on the relationship between the requesting entity and the subject entity of the particular record access/function request. Each user role and/or user group is assigned specific rights. When the user's role or "hat" changes, the user's authorization rights dynamically change. For example, a doctor in his/her practice has different access rights than the same doctor looking at his/her own records, or the same doctor acting as a health insurance company review physician. Such an example is described in greater detail below with regard to Dr. Smith. Similarly, a subject entity may grant or restrict access to any or all portions of his/her ER from any and all caregivers, based at least in part on a class of information/data (including sensitive personal health information, such as, but not limited to, psychiatric information, substance abuse information, HIV status, AIDS data, and the like). Authorized users may "break the seal" on restricted information/data in emergencies if that is the appropriate disposition.

Further, the ER system 100 may permit local security administration. Each practice or distinct business entity can add and inactivate staff, and assign user roles (e.g., based at least in part on relationships with providers of the business entity, patients of the business entity, the organization of the business entity, and/or the like). Further, an authorized user can delegate rights to other users, subject to the policies established by the custodian of the information/data.

Administrative services include the backing up of various components of the ER system 100, including but not limited to database files and journal queues. Backup may be performed in stages, with frequent backups to intermediate storage, and less frequent backups to long-term storage.

Disaster recovery operations and fail-over database servers also may be used for information/data and system security and continued operations.

The ER system 100 thus allows individuals to understand and participate in their healthcare and enables caregivers and consumers to collaborate and interact using the same record in different ways. This architecture embraces the emerging roles of custodian and healthcare advocate, and assists healthcare stakeholders, including but not limited to health systems, health plans, IPAs, RHIOs, employers, providers, and individuals, to meet the requirements and needs for healthcare systems going forward into the future. In one exemplary embodiment, the present invention does not replace existing data systems and infrastructure; instead, it provides a standards-based, service-oriented infrastructure that rapidly and easily provides health-related information/data and components that work with such existing systems.

Available functions/operations to users in various exemplary embodiments include, but are not limited to, identifying individuals, viewing an event list, filtering events, detailing events, editing events, printing events, viewing event details, managing users (e.g., adding users, editing users, editing user fields, deactivating users, identifying users), identifying individuals, manipulating health issues (e.g., filtering, viewing list, viewing detail, adding, editing, and printing health issues), and/or the like.

To implement these capabilities, various embodiments provide a variety of approaches to interact with the information/data in the ER system 100, including, but not limited to, health portals, portlets, web services, and/or the like. Thus, embodiments of the present invention provide a complete suite of information/data services and not just an end-user application. This allows embodiments of the present invention to support existing data systems in ways that were not previously available. In one exemplary embodiment, Java standard portlets and web services are used to provide a user interface (and user interaction) through a standard portal. A portal may be an application, a browser, mobile app, an IUI, a dashboard, a webpage, an Internet accessible/online portal, and/or similar words used herein interchangeably that serves as a starting point or gateway to other resources or applications. Portlets are user interface components or modules for a portal. Traditionally, portlets were custom applications for specific portals; although recently, portlet standards (such as JSR 168, which is the standard for portals running in Java) have been defined. All interaction can take place via a communications chain extending from the portal through a portlet through the ER system 100. This architecture promotes flexibility and broad, cross-platform ubiquity in terms of accommodating users.

In various embodiments, connections between the ER system 100 and ER portals and portlets may be encrypted. Such connections may be 128-bit, 256-bit, and/or the like SSL-encrypted connections. In addition, the support connection to all custodial sites may be a VPN using encryption and other security mechanisms to ensure that only authorized users can access the network, and that information/data cannot be intercepted.

FIG. 26 provides a block diagram illustrating various components related to controlling access to information/data and/or performing functions/operations on the same for one or more ERs stored in the ER data store 211. In various embodiments a user may be a requesting entity (e.g., the requesting user) or a subject entity (e.g., the owner of the information/data). A user may operate a user computing entity 30 to access a user portal 2610. In various embodiments, the user portal 2610 may comprise a plurality of user portlets 2612 (e.g., 2612A, 2612B, 2612C). For instance, each user portlet 2612 may correspond to a particular set of information/data. For instance, the user portlets 2612 may include a prescription/medication portlet, a lab work/test results portlet, and/or various other portlets.

Additionally, the server 65 may comprise and/or operate an ER system connection layer 2620. Within the ER system connection layer 2620, back-end portlets 2622 (e.g., 2622A, 2622B, 2622C) may be executed. For instance, for each user portlet 2612 available via the user portal 2610, a corresponding back-end portlet 2622 may be operated in the ER system connection layer 2620. In an example embodiment, user portlet 2612A corresponds to and/or communicates with back-end portlet 2622A, user portlet 2612B corresponds to and/or communicates with back-end portlet 2622B, and/or the like. For example, a prescription/medication user portlet 2612 may interface with a prescription/medication back-end portlet 2622. The ER system connection layer 2620 interfaces with the portion of the ER system data access layer 2630. For instance, a user may operate a user computing entity 30 to access a user portal 2610 and/or a particular user portlet 2612 (e.g., via the user portal 2610). The user portlet 2612 may communicate with a corresponding back-end portlet 2622, for instance, by generating and providing an ER access/function request indicating (a) a request to access information/data in one or more ERs, and/or (b) a request to perform a function/operation associated with information/data in one or more ERs-both of which may be referred to herein interchangeably. In one example, the ER access/function request may indicate that the requesting entity has requested to access information/data from an ER corresponding to a subject entity. Additionally or alternatively, the ER access/function request may indicate that the requesting entity has requested to perform one or more functions/operations for an ER corresponding to a subject entity.

In various embodiments, the ER access/function request may include information/data identifying the user (e.g., the requesting entity), information/data identifying the subject entity corresponding to the ER (e.g., the owner of the ER), an indication of what type or set of information/data is being requested, an indication of what type of function/operation is being requested, and/or the like. The back-end portlet 2622 may pass an ER access/function request to a data access/function controller 255. When the data access/function controller 255 determines that the user (e.g., requesting entity) is allowed to access the requested information/data and/or perform the requested function/operation, the ER access/function request is processed to allow the same. In that regard, a user role for the requesting entity (e.g., requesting user) is determined that corresponds to a rights group. The rights groups is associated with one or more rights (access to information/data and/or the ability to perform functions/operations). The ability to access information/data and/or perform one or more functions/operations is enabled via an access/function key. The access/function key is used to enable an access/function code module to perform the access/function request.

When a user (e.g., requesting entity) accesses an ER system 100 access point (e.g., via a user interaction event), such as a health portlet 2612, the scope defined in the requesting entity's set of rights is evaluated. When the requesting entity requests information/data, only those permitted by the relationship are allowed by the ER system 100. For example, a requesting entity may operate a user computing entity 30 to access a user portal 2610 (e.g., a user portlet 2612), which, based at least in part on and/or responsive to the requesting entity's interaction with the user portal 2610 (e.g., via a user interface of the user computing entity 30), causes the user computing entity 30 to generate/create and provide an ER access/function request. The ER access/function request may be received by a corresponding back-end portlet 2622 of the ER system connection layer 2620. The ER access/function request may be processed to extract/retrieve information/data identifying the requesting entity from the ER access/function request and to extract/retrieve information/data identifying the subject entity from the ER access/function request. The information/data identifying the requesting entity and the information/data identifying the subject entity (e.g., that was extracted from the ER access/function request) may then be passed to instances of the identity matching service 240 to determine and/or identify a requesting entity identifier corresponding to the requesting entity and a subject entity identifier corresponding to the subject entity. In such a case, the process 1200 may be invoked to identify the entity identifiers for any relevant entities. These steps/operations are not repeated here, but are incorporated by reference. Alternatively, at least one of the entity identifiers may be stored and provided from a user profile (triggered by a user interaction event). Based at least in part on the requesting entity identifier and the subject entity identifier, a relationship between the requesting entity and the subject entity is determined, examples of which are provided by at least FIGS. 30A and 30B. Based at least in part on the determined relationship between the requesting entity and the subject entity, a user role for the requesting entity with respect to the subject entity is determined. Each user role of the ER system 100 is assigned to one or more rights groups. Each rights group comprises one or more rights. A rights group or a right can be defined in a rights group data object, such as an XML document that comprises a corresponding access/function key for the rights group or the right. Each access/function associated with an ER may require the use of an access/function key to access the calling of the access/function code module. Thus, the requesting entity is only able to cause functions/operations to be performed that correspond to the rights in a rights group assigned to a user role that describes the role of the requesting entity in a relationship with the subject entity.

In one embodiment, FIG. 29 provides a flowchart for exemplary process 2900 (e.g., data access/function control process 2900) illustrating processes, procedures, steps, operations, and/or the like performed for a user (e.g., a requesting entity) to allow access to a set of information/data and/or the performance of one or more functions on an ER (e.g., of a subject entity) stored in the ER data store 211.

Starting at step/operation 2902, a user operating a user computing entity 30 (e.g., operated by a user) may access a user portlet 2612, and the ER system 100 initializes the selected application and validates the credentials of the user. For instance, after logging on, the ER access/function request may be to access medication information/data in a user's ER and/or prescribe medication to the user (e.g., perform a function/operation). In one embodiment, the user portlet 2612 may prompt the user (e.g., requesting entity) for identification of the patient/subject entity if the patient/subject entity has not already been identified. Upon selection of the patient/subject entity, the user portlet 2612 sends an ER access/function request, for example. In response, the user portlet 2612 generates a web service request, for example, on behalf of the user (e.g., the requesting entity).

At step/operation 2904, the server 65 receives the ER access/function request generated from the user portlet 2612. The server 65 determines a requesting entity identifier corresponding to the requesting entity (e.g., the user) whose interaction with the user portlet 2612 caused the ER access/function request to be generated/created and provided. The server 65 also determines a subject entity identifier corresponding to the subject entity corresponding to the ER that is to be acted upon via the access/function request. For example, information/data identifying the requesting entity and/or the subject entity may be extracted from the ER access/function request. The information/data identifying the requesting entity may be passed to the identity matching service 240 (e.g., via an invoking API call (e.g., an API request)), and a corresponding requesting entity identifier may be received from the identity matching service 240 (e.g., via an API response). Similarly, the information/data identifying the subject entity may be passed to the identity matching service 240 (e.g., via an invoking API call (e.g., an API request)), and a corresponding subject entity identifier may be received from the identity matching service 240 (e.g., via an API response). In another embodiment, the entity identifier may be stored as part of a user profile, such that the entity identifier(s) is automatically provided when logging into or accessing the ER system 100.

At step/operation 2906, the data access/function controller 255 determines a relationship between the requesting entity and the subject entity. In a particular embodiment, this may include determining a relationship "type" and a relationship "status." As will be recognized, determining relationship types and statuses between or among entities can be performed using a variety of techniques and approaches.

In one embodiment, relationships (including relationship types and statuses) may be determined using a graph data structure. For example, the ER system 100 may store a graph data structure (e.g., relationship graph) representing information/data representing relationships between various entities (stored as nodes and edges, for instance). FIG. 30A represents a portion of such a graph data structure (e.g., relationship graph). In an example embodiment, the ER data store 211 stores relationship SBROs that provide information/data corresponding to relationships between pairs of entities. The graph data structure (e.g., relationship graph) may encode at least a portion of the information/data stored in the relationship SBROs. For example, the nodes of the graph data structure (e.g., relationship graph) may be entities and the edges connecting the nodes may encode information/data stored in the corresponding relationship SBROs. If a relationship SBRO does not exist for a pair of entities, the graph data structure (e.g., relationship graph) does not include an edge directly (e.g., without any intermediate nodes) connecting the pair of entities.

In the graph context, the data access/function controller 255 (e.g., executing on the server 65) uses the requesting entity identifier, the subject entity identifier, and the graph data structure (e.g., the relationship graph) to determine a relationship "type" between the requesting entity and the subject entity. For instance, the requesting entity may be identified in the graph data structure (e.g., relationship graph) based at least in part on the requesting entity identifier and the subject entity identifier in the graph data structure (e.g., relationship graph). The relationship "type" between the requesting entity and the subject entity is then determined by evaluating the preferred path (e.g., the nodes and edges) between the requesting entity and the subject entity through the graph data structure (e.g., relationship graph). In various embodiments, the preferred path between the requesting entity and the subject entity through the graph data structure (e.g., relationship graph) is the path that includes the least number of nodes (e.g., intermediate nodes) and edges. For example, a "direct" relationship (e.g., having no intermediate nodes between the requesting entity and the subject entity) is preferred over a path that includes one or more intermediate nodes (an "indirect" relationship). In an example embodiment, the "preferred path" through the graph data structure (e.g., relationship graph) is the path between the requesting entity and the subject entity through the graph data structure (e.g., relationship graph) that (a) corresponds to the most recently updated relationship SBROs and/or (b) has the least number of intermediate nodes. For instance, a path where the SBROs corresponding to all of the edges have been updated within the past year may be preferred to a path where one or more of the SBROs corresponding to edges of the path have not been updated in more than five years. In an example embodiment, the preferred path between the requesting entity and the subject entity through the graph data structure (e.g., relationship graph) is determined based at least in part on minimizing the number of intermediate nodes.

In the graph context, the data access/function controller 255 (e.g., executing on the server 65) uses the requesting entity identifier, the subject entity identifier, and the graph data structure (e.g., relationship graph) to determine a relationship "status" between the requesting entity and the subject entity. For example, minimizing the number of edges having a status of inactive may also be a preferred path between the requesting entity and the subject entity. In an example embodiment, only certain types of relationships having a status of "inactive" are included in the graph data structure (e.g., relationship graph). For example, if a particular physician used to be the attending physician for a particular patient, the relationship between the particular physician and the particular patient may be included in the graph data structure (e.g., relationship graph). However, if a nurse used to work for the particular physician but no longer does, the relationship of the nurse being a staff member of the particular physician's practice is not be included in the graph data structure (e.g., relationship graph). In that regard, the data access/function controller 255 may determine whether the relationship "status" between the requesting entity and the subject entity is "active" or "inactive" based at least in part on the determined preferred path and/or other indicators. For example, one or more edges along the preferred path may be examined to determine if the relationship between the requesting entity and the subject entity is active or inactive. For instance, if the requesting entity is a physician that, according to the corresponding SBRO, was a former attending physician for the subject entity, the relationship between the requesting entity and the subject entity is determined to be "inactive." Similarly, if the requesting entity is a staff member in the practice of a physician that, according to the corresponding SBRO, was a former attending physician for the subject entity, the relationship between the requesting entity and the subject entity is determined to be "inactive." However, if the requesting entity is a staff member in the practice of a physician that, according to the corresponding SBRO, is a current attending physician for the subject entity, the relationship between the requesting entity and the subject entity is determined to be "active." Alternatively, each relationship SBRO may comprise a start date (e.g., 2020-02-01 00:00:00.000) and an end date for the relationship (e.g., or 2020-07-01 00:00:00.000 or 2021-01-01 00:00:00.000). In such a case, if the current time and date are within the start and end date of each relationship data object, the relationship status is "active." However, if the start date is in the future or in end date is in the past, the relationship status is "inactive."

In another embodiment, relationships (including relationship types and statuses) may be determined using one or more relationship data objects. For example, the ER system 100 may comprise or have access to a relationship table (e.g., accessible via the DSML 245) representing information/data representing relationships between various entities (stored as relationship data objects, for instance). In an example embodiment, the ER data store 211 stores relationship SBROs that provide information/data corresponding to relationships between pairs of entities. The relationship data objects may encode at least a portion of the information/data stored in the relationship SBROs. For example, a given entity may have a respective relationship data object for every relationship. Returning to FIG. 30, if these relationships were represented as data objects in a table for Patient A, there would be: (1) a relationship data object representing the relationship between Patient A and Provider B; (2) a relationship data object representing the relationship between Patient A and Practice C; (3) a relationship data object representing the relationship between Patient A and Provider F; (4) a relationship data object representing the relationship between Patient A and Nurse D; and (5) a relationship data object representing the relationship between Patient A and Clinic E. Similarly, for Provider B, there would be a relationship data object representing the relationship between Provider B and Patient A. For Practice C, there would be a relationship data object representing the relationship between Practice C and Patient A. For Provider F, there would be a relationship data object representing the relationship between Provider F and Patient A. For Nurse D, there would be a relationship data object representing the relationship between Nurse D and Patient A. And for Clinic E, there would be a relationship data object representing the relationship between Clinic E and Patient A. This structure allows for parallel or serial queries for both entities to determine their relationship. For instance, the query for Patient A can be used to retrieve the relationship data objects for Patient A and so on.

In the relationship data object context, the data access/function controller 255 (e.g., executing on the server 65) uses the requesting entity identifier and the subject entity identifier to determine a relationship "type" between the requesting entity and the subject entity. For instance, the requesting entity identifier and the subject entity identifier may be used to generate two separate queries: one query for the requesting entity to determine the relationship with the subject entity and another query for the subject entity to determine the relationship with the requesting entity. In one embodiment, to increase operational efficiency, the data access/function controller 255 may use a database index for each query. Indexes allow for the efficient location of information/data without having to search every row in a database table, for instance, every time a database table is accessed. Such indexes may include clustered indexes, non-clustered indexes, and/or the like. In a clustered index, the index may be implemented as a binary tree data structure where ERs are stored in order according to the clustered index that has one index per table. In a non-clustered index, the index may also be implemented as a tree data structure where ERs are stored in an order that is different than the non-clustered index, where there may be multiple indexes per table. Continuing with the above example, if a relationship exists between the requesting entity and the subject entity, two relationship data objects will be returned that represent the relationship. The relationship data object for the requesting entity defines the relationship with the subject entity, and the relationship data object for the subject entity defines the relationship with the requesting entity. Returning to FIG. 30A, Patient A's ER will have a relationship data object for Provider B (indicating a direct relationship), and Provider B's ER will have a relationship data object for Patient A (indicating a direct relationship). Each relationship data objects defines the corresponding relationship, and the relationship data objects should comprise the same relationship type, which can be used as an additional security measure. For example, once each relationship data object has been returned, the data access/function controller 255 determines whether the relationship data objects both indicate the same "type" of relationship.

In the relationship data object context, the data access/function controller 255 (e.g., executing on the server 65) uses the returned relationship data objects determine a relationship "status" between the requesting entity and the subject entity. For example, each relationship data object may comprise a start date (e.g., 2020-02-01 00:00:00.000) and an end date for the relationship (e.g., or 2020-07-0100: 00:00.000 or 2021-01-0100:00:00.000). In such a case, if the current time and date are within the start and end date of each relationship data object, the relationship status is "active." However, if the start date is in the future or in end date is in the past, the relationship status is "inactive." Thus, once each relationship data object has been returned, the data access/function controller 255 determines whether the relationship data objects both indicate the same "status" of relationship. As will be recognized, each relationship data object may be an SBRO for each respective entity.

At step/operation 2908, the user role of the requesting entity for the relationship between the requesting entity and the subject entity is determined. For example, based at least in part on the relationship type and relationship status, the data access/function controller 255 (e.g., executing on the server 65) determines a user role for the requesting entity with respect to the relationship between the requesting entity and the subject entity. As described above, a variety of user roles may be defined within the ER system 100. The user roles may be business entity specific (e.g., generated/created by a business entity and only applied in relationships including the business entity), globally defined (e.g., may be applied to various relationships defined with the ER system 100), and/or the like.

Continuing with the above, one user may have one or more user roles and corresponding rights groups with respective rights. For example, Dr. Smith may be a managed care medical director, an on-call trauma surgeon, and a general surgeon. As a managed care medical director, Dr. Smith's first user role (e.g., scope) may be as an employee of a large insurance company and may access those ERs where the subject entity's insurance name matches the employer name of the user. In the managed care medical director context, Dr. Smith may be able to perform a first set of functions/operations (e.g., claims, eligibility, and referrals) and access a first set of data types (e.g., all data and protected data). As an on-call trauma surgeon, Dr. Smith's second user role (e.g., scope) may be as an employee of a medical center and may access those ERs where the subject entity's attending physician matches the attending physician of user. In the on-call trauma surgeon context, Dr. Smith may be able to perform a second set of functions/operations (e.g., allergies, events, medications, and problems) and access a second set of data types (e.g., all data and protected data with override). And finally, as a general surgeon, Dr. Smith may have a third user role (e.g., scope) as a general surgeon practice and may access those ERs where the subject entity's referral physician matches the physician name of the user. In the general surgeon practice context, Dr. Smith may be able to perform a third set of functions/operations (e.g., allergies, claims, events, medications, problems, and referrals) and access a third set of data types (e.g., all data and data user authored and protected data granted user by patient).

At step/operation 2910, one or more rights groups assigned to the determined user role are determined. For instance, the data access/function controller 255 may determine one or more rights groups assigned to the determined user role. For example, each user role may be associated with and/or have assigned thereto one or more rights groups. For instance, a user role definition may include one or more rights group identifiers that identify rights group data objects, such as XML documents for the rights groups (an corresponding rights) assigned to the user role. As noted, each rights group comprises or defines one or more rights, such as described above with regard to Dr. Smith. See FIG. 37.

In various embodiments, each rights group data object may also identify or be associated with one or more access/function keys. The access/function keys can be used to enable corresponding access/function code modules to perform the ER access/function request (e.g., read, write, modify, delete, and/or the like). For example, as described, a rights group data object may be an XML document or other data object comprising a description of the rights group or right, the access/function key, the access/function code module, and/or the like. In one embodiment, the access/function key is used to perform the ER access/function request. In another embodiment, the access/function key is used to enable the corresponding access/function code module to perform the ER access/function request. In this embodiment, at step/operation 2912, the access/function key is used to enable the corresponding access/function code module to perform the ER access/function request. Consequently, the access/function code module may then be used to perform the ER access/function request. As will be recognized, the ER access/function request may vary depending on the context and needs of the user (e.g., requesting entity). Steps/operations 2914, 2916, 2918, 2920, and 2922 provide some examples.

In one embodiment, to display, provide, and/or extract/retrieve information/data (e.g., show medication information/data), the ER access/function request is transformed into an EPDO, at step/operation 2914. In various embodiments, an EPDO is similar to an OPDO, except that, rather than comprising observations (e.g., ontology concept identifiers and corresponding values), the EPDO comprises extractables (e.g., ontology concept identifiers for which values should be accessed form the ER corresponding to the subject entity). And similar to OPDOs, EPDOs are used to generate/create DAPDOs by the extraction processing module 260. For example, at step/operation 2916, the EPDO can be submitted to the extraction processing module 260. The extraction processing module 260 (e.g., executing on the server 65) processes the EPDO to create/generate a DAPDO, which is in turn used to generate/create one or more observation groups, such as is described with regard to process 3100. For example, the extraction processing module 260 may process the DAPDO to determine which information/data to access and invoke and/or cause the DSML 245 to interface with the persistent storage of the ER data store 211 to retrieve the requested information/data. For instance, the generated/created observation groups may include observations (e.g., ontology concept identifiers and corresponding values) that correspond to the extractables of the EPDO and have values extracted from the ER corresponding to the subject entity.

At step/operation 2918, the generated/created one or more observation groups are provided to the back-end portlet 2622. The back-end portlet may generate/create a response based at least in part on the one or more observation groups. For example, the response may include the information/data of the one or more observation groups. In an example embodiment, the response is generated/created in a source vocabulary corresponding to the user computing entity 30, the user portal 2610, the requesting entity, and/or the like. For instance, the back-end portlet 2622 may transform the generated/created observation groups into a source vocabulary corresponding to the user portal 2610. The back-end portlet 2622 may then provide the response such that the user portlet 2612 receives the response. The user portlet 2612 may receive the response. Responsive to the user portlet 2612 receiving and/or processing the response, the user computing entity 30 (e.g., via display 316 and/or another user output device/interface) may provide at least a portion of the response (e.g., the information/data contained therein and accessed from the ER corresponding to the subject entity).

In another embodiment, at step/operation 2920, the access/function code module may then be used to perform the ER access/function request (e.g., prescribe a medication). That is, the appropriate access/function code module allows the requesting entity to prescribe a medication for the subject entity. And as a result, at step/operation 2922, the completion of the same can be presented to the user (e.g., requesting entity) via a user portlet 2612, for example. As will be recognized, a variety of other approaches an techniques can be used to adapt to various needs and circumstances.

Various embodiments of this security architecture provide technical solutions to technical problems related to controlling access to and functions/operations on information/data stored in the ER data store 211. In particular, the graph data structure (e.g., relationship graph) enables efficient and effective determinations of the relationship between a requesting entity and a subject entity and various attributes of the relationship (e.g., active/inactive, direct/indirect, and/or the like). Based at least in part on the relationship and relationship attributes represented by the graph data structure (e.g., relationship graph), a user role for the requesting entity with respect to the subject entity may be determined. Similarly, the relationship data objects provide for increased operational determinations and efficiency. Accordingly, ER access/function requests for a user are limited by the rights group assigned to the user role determined for the requesting entity with respect to the subject entity. Thus, for different subject entities, the functions that a requesting entity (e.g., requesting user) may cause to occur (e.g., to the ER corresponding to the subject entity) may be different. Moreover, as a relationship between the requesting entity and the subject entity changes with time, the permissible ER access/function requests the requesting entity (e.g., requesting user) may carry out (e.g., to the ER corresponding to the subject entity) may also change. By using graph data structure (e.g., relationship graph), this architecture provides a flexible structure may be updated as corresponding relationship SBROs are updated. Further, this allows users roles for any entity respect to the subject entity to be efficiently maintained and remain up-to-date in an automated manner. Various embodiments therefore provide improvements to the automated management of user access to information/data stored in the ER data store 211.

Extraction Processing

In various embodiments, the extraction processing module 260 is executed by the server 65 to enable access to information/data stored in an ER to a user operating a user computing entity 30. For instance, the extraction processing module 260 is configured to process an EPDO (see EPDO 1002 of FIG. 0C) and thereby cause the requested function and/or operation corresponding to the ER access/function request to be performed. For example, the extraction processing module 260 may process an EPDO to generate a DAPDO to cause information/data to be accessed, read, and/or extracted from an ER to generate/create one or more observation groups.

FIG. 31 provides a flowchart for exemplary process 3100 (e.g., data extraction process 3100) illustrating various processes, procedures, steps, operations, and/or the like performed by an extraction processing module 260 operating on and/or being executed by a server 65 to process a DAPDO to generate/create populated observation groups that may be used to generate/create a response to record access/function request. Starting at step/operation 3102, the extraction processing module 260 receives an EPDO. For instance, an access/function code module accessed using an access/function key via the data access/function controller 255 may generate/create an EPDO based at least in part on an ER access/function request received via the ER system connection layer 2620. The access/function code module and/or the data access/function controller 255 may then provide the EPDO, such that the extraction processing module 260 receives the EPDO. The EPDO typically comprises a subject entity identifier and one or more ontology concept identifiers (e.g., extractable identifiers) corresponding to elements of information/data to be accessed from the ER corresponding to the subject entity.

At steps/operations 3104 and 3106, information/data is read from the EPDO and used to generate/create a DAPDO, as has been previously described with regard to FIGS. 8, 12, 13, and 14 and their corresponding steps/operations. For example, the EPDO (along with other information/data) is transformed from an XML document used for storage and transmission to a Java object that is executable or used for execution, such as via unmarshalling. Thus, the DAPDO comprises the structure of the EPDO with additional information/data that allows for the construction of a container tree data structure to extract/retrieve information/data identified in the EPDO. For example, each DAPDO comprises a DAPDO identifier, information/data from the corresponding EPDO, a DAPDO type (indicate the information/data it contains), an owner, and/or the like. This allows the DAPDO to be generated/created with the necessary information/data. The steps/operations of FIGS. 8, 12, 13, and 14 are not repeated here, but are incorporated by reference.

The extraction processing module 260 may also generate/create data objects comprising one or more empty observation groups (e.g., observation groups where values are not associated with the graph-based ontology concept identifiers). In various embodiments, the empty observation groups are generated/created based at least in part on extractables indicated in the DAPDO. For instance, based at least in part on the extractables indicated in the DAPDO, empty observation groups may be generated/created in a manner similar to generating observation groups observables in DAPDO (for ingestion), but with the values of the corresponding observables being empty. In an example embodiment, a data object is generated/created for each empty observation group corresponding to the DAPDO. In an example embodiment, a data object may comprise a plurality (e.g., two or more) of empty observation groups corresponding to the DAPDO.

At step/operation 3108, the extraction process 3100 constructs an empty container tree data structure corresponding to the empty observation group(s). In various embodiments, a data artifact packet container node is generated/created. The data artifact packet container node is the receptacle that holds all other container nodes of the empty container tree data structure and is the root node of the empty container tree data structure. The graph-based domain ontology defines ontology concepts with appropriate selectable extractables to generate/create the empty container tree data structure. For example, container nodes of the empty container tree data structure comprise extractables corresponding to the observation group(s) of each data object. Each of the container nodes in the empty container tree data structure contains extractables used to populate the empty container tree data structure. Container nodes are recursive but dependent upon the graph data structure representing the graph-based ontology. For instance, the empty container tree data structure comprises a plurality of nested container nodes held within the root node (e.g., the data artifact packet tree data structure). The leaves of the empty container tree data structure (which at this stage are empty) are values corresponding to the graph-based ontology concepts (e.g., identifiable by the concept identifiers) of the container node comprise the leaf node. For example, the extractables in an empty observable group are related to one another in a manner described in the graph data structure representing the graph-based ontology. This graph data structure defines which container nodes can be subcontainer nodes of other container nodes. For instance, an entity in the corresponding data object corresponds to an entity container node in the empty container tree data structure and the entity's name(s) corresponds to a subcontainer node of the entity container node (e.g., an entity name container). However, the reverse would never be true. In particular, an entity name container would never be a subcontainer node of an entity container node because this structure is not supported by the graph-based ontology or the graph data structure representing the graph-based ontology. In an example embodiment, the empty container tree data structure is constructed in a manner similar to that shown in and described with respect to FIG. 14—with at least two differences. For the first difference, process 1308 eliminates any observable (container node) from the tree construction that has a null value and does not have a property defined (used for defaults). In contrast, the tree construction of process 3100 only has empty observation values and will construct nodes for all submitted observations into a container tree data structure. For the second difference, process 1308 will not query graph-based ontology for any property definition in an attempt to populate default values; however, process 3100 will. Thus, process 1308 is incorporated herein by reference with these two exceptions. Thus, the empty container tree data structure is constructed as described with regard to process 1308 with these two exceptions.

Once the empty container tree data structure has been constructed based at least in part on the observation group(s), the container nodes of the container tree data structure are disassembled (e.g., via a disassembly process) at step/operation 3110 to populate the empty container tree data structure (e.g., to generate/create a populated container tree data structure). For instance, the extraction processing module 260 adds the polymorphic disassemble method to the container nodes to execute the disassembly process. Thus, the disassembly process is responsible for acquiring the value for the extractable represented by that container node. As discussed, a container node either represents a specific element of ER information/data or it has subcontainer nodes that represent parts of the value represented by the container node. In one embodiment, the disassembly process may cause values corresponding to the extractables of the corresponding data object (e.g., as represented by the empty container tree data structure) to be extracted, read, and/or accessed from the ER (e.g., via the DSML 245) corresponding to the subject entity and cause the empty container tree data structure to be populated with the values such that a populated container tree data structure is constructed.

In various embodiments, population is the process by which the extraction processing module 260 acquires values (e.g., via the DSML 245) for the extractables specified in the observation group(s) of the corresponding data object and populates in the values in each container node of the empty container tree data structure to generate/create a populated container tree data structure. This process is referred to as disassembly herein, and in an example embodiment, is the inverse of the ingestion processing module 225 assembly process described above. For example, an empty container tree data structure may be populated to generate/create a populated container tree data structure by invoking a disassembly get function on the data artifact packet tree data structure. This may initiate a cascade within each subcontainer node, causing each subcontainer node to be evaluated down to the leaves of the empty container tree data structure. In various embodiments, acquiring values for container nodes comprises retrieving a value directly from the subject entity's ER or in aggregating the values from subcontainer nodes. There may also be additional observations to be populated in a particular container in addition to the persisted ER information/data. The end effect of invoking the disassembly function on the data artifact packet tree data structure is a fully populated container tree data structure from which one or more populated observation groups are determined and/or generated/created. When an extractable or group of extractables represents a collection, the extraction processing module 260 returns all elements of the collection in an observation group, with each element of the collection in its own child observation group.

In various embodiments, an ontology concept has three attributes which are persisted: the source vocabulary, source vocabulary code, and an optional text description. In various embodiments, disaggregators are used to produce the source vocabulary, source vocabulary code, and optional text description corresponding to an ontology concept identifier of the empty container tree data structure. When the populated container tree data structure is converted into one or more populated observation groups, the source vocabulary, source vocabulary code, and optional text description may be provided as child observation groups of a populated observation group.

In various embodiments, to prevent recursions and attempts to disassemble container nodes with errors, during disassembly, a container exists in one of four states: not disassembled (disassembly of the container has not yet been attempted), undergoing disassembly (the container is currently being disassembled), disassembled (the container has been successfully disassembled), and unable to disassemble (the attempt to disassemble the container has resulted in an exception). For instance, if, during disassembly, it is determined that the value of a container cannot be extracted from the ER corresponding to the subject entity (e.g., based at least in part on the requesting entity not being authorized to access the value, the value not being present in the ER corresponding to the subject entity, and/or the like), the container node may be determined to have an exception and be assigned the status of unable to disassemble. Any exceptions or warnings encountered during this process are added to the appropriate collections (e.g., a warnings collection, an exceptions collection, and/or the like). For example, when a container is assigned the state unable to disassemble, an exception or warning may be logged such that the manual review may be performed. In various embodiments, exceptions are used to associate a Java exception with an ontology concept. This allows further information/data such as expanded descriptions and suggested resolutions.

In various embodiments, the populated container tree data structure is converted into and/or used to determine and/or generate/create one or more populated observation groups. For instance, the values extracted from the ER corresponding to the subject entity and/or aggregated from subcontainer nodes may be used to populate the empty observation groups and/or to generate/create populated observation groups.

In various embodiments, the extraction processing module 260 is executed (e.g., by the processing element 205 of the server 65) to generate/create one or more populated observation groups based at least in part on the population of the empty container tree data structure by traversing the empty container tree data structure in a depth-first traversal. For example, the empty container tree data structure may be traversed starting at a leaf node (e.g., to populate the value of a container based at least in part on extracting a value from the ER corresponding to the subject entity) upward to the root of the empty container tree data structure. For instance, the values of a first container requiring extraction from the ER corresponding to subject entity may be used and/or aggregated to determine and/or generate/create a value for a container for which the first container is a subcontainer. By way of example, systolic blood-pressure and diastolic blood-pressure can be separate retrieved from corresponding leaf nodes and aggregated up to a subcontainer node with a single blood-pressure reading. Thus, each value is respectively retrieved and aggregated up the container tree data structure to form a single blood-pressure reading. In an example embodiment, the result of invoking the disassembly process on the empty container tree data structure is the generation of one or more populated observation groups.

After completing the disassembly process (e.g., once all the container nodes have a status of one of disassembled and/or unable to disassemble) and/or responsive to completing the disassembly process, the extraction processing module 260 provides the one or more populated observation groups generated/created for use in generating a response to the ER access/function request, at step/operation 3112. For example, the extraction processing module 260 may provide the one or more populated observation groups for use in generating a response that is provided to a user computing entity 30, via messages, transfer data objects, interfaces, and/or the like. In an example embodiment, the back-end portlet 2622 via which the ER access/function request was received receives the populated observation groups and generates and provides the response. For instance, the back-end portlet 2622 may generate/create the response (possibly in a source vocabulary corresponding to the requesting entity, the user computing entity 30, a user portal 2610, and/or the like) and provide the response such that the user computing entity 30 receives the response and provides (e.g., displays and/or audibly provides) at least a portion of the response via a user interface thereof.

As will be recognized, after extraction, each DAPDO used for extraction can be stored in a data store archive that allows for a complete audit history of all access and functions associated with information information/data in the ER system 211. In other words, by persisting a copy of each DAPDO, the source of any activity can be traced to a DAPDO and requesting entity. As will be recognized, a variety of other approaches and techniques can be used to adapt to various needs and circumstances.

Exemplary Interfaces and Outputs

FIGS. 32-36 provide some example views of various user interfaces that may be provided via user portal 2610 and/or portlets 2612.

Figure 32:
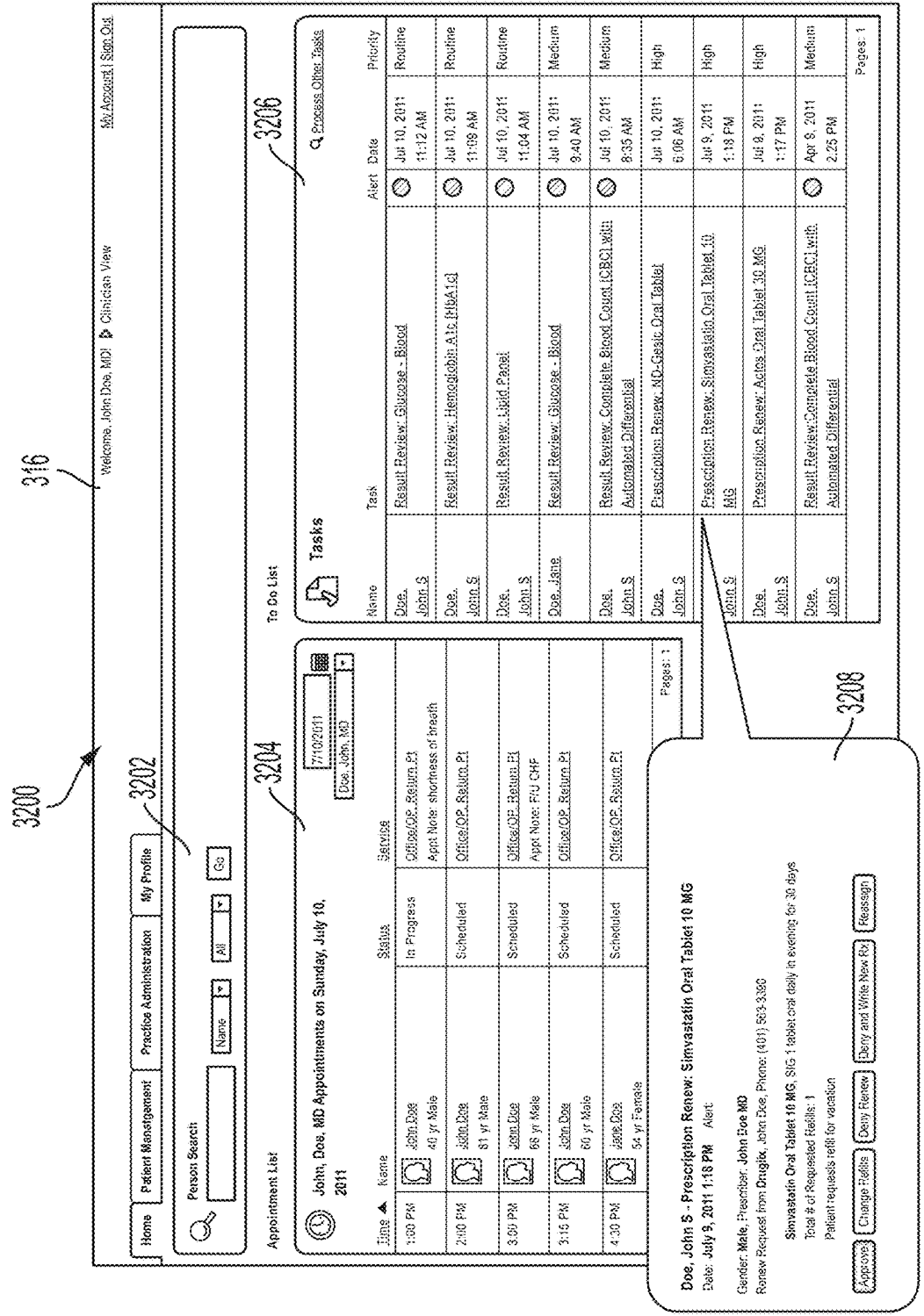

FIG. 32 provides an example view of a provider (e.g., physician) dashboard and/or landing page 3200 provided via a user portal 2610. For example, when a provider (e.g., physician) operates a user computing entity 30 to log into and/or be authenticated by the user portal 2610 (e.g., a provider/physician portal), the portal 2610 may cause a user interface of the user computing entity 30 (e.g., display 316) to display the dashboard or landing page 3200. The dashboard and/or landing page 3200 comprises a patient search portlet 3202 that may be used to search for information/data corresponding to an individual and/or to access information/data from an electronic record corresponding to a patient. The dashboard and/or landing page 3200 comprises an appointment list 3204 indicating the upcoming appointments the provider (e.g., physician) scheduled for the provider. The information/data provided in the appointment list 3204 may be pulled and/or accessed from a practice management system corresponding to the provider (e.g., physician) rather than from the ER system 100, in an example embodiment.

The dashboard and/or landing page 3200 comprises a task list 3206. The task list may indicate tasks to be performed by the provider (e.g., physician) other than attending the scheduled appointments. For example, the task list 3206 may indicate tasks such as refilling prescriptions and/or authorizing repopulates of prescriptions, reviewing lab work or other test results, and/or the like. In various embodiments, the items listed in the task list 3206 are determined based at least in part on changes made to ER corresponding to patients of the provider (e.g., physician). For example, if lab work that was ordered by the provider (e.g., physician) for a first patient was recorded in the ER corresponding to the patient (e.g., the patient is the subject entity associated with the ER), a review lab work task may be populated on the task list 3206 for the provider (e.g., physician) via the task portlet that provides the task list 3206. For example, when the provider (e.g., physician) logs into and/or is authenticated by the portal 2610, the ER system 100 may determine (e.g., via one or more change logs, modified collections, and/or the like) what updates and/or modifications have been made to ER associated with subject entities for which the provider (e.g., physician) has an active relationship associated with the user role of attending physician, where the updates and/or modifications have been made since the provider last logged in to and/or was authenticated by the portal. The ER system 100 may then analyze the identified updates and/or modifications using a rules engine to determine what, if any, actions should be taken based at least in part on the identified updates and/or modifications. The task list 3206 may provide a result of that analysis of the updated and/or modifications that correspond to an action being taken on the part of the provider (e.g., physician). In an example embodiment, the action to be taken on the part of the provider (e.g., physician) is simply viewing at least a portion of an ER that has been updated and/or modified so that the provider (e.g., physician) is made aware of the update and/or modification. In an example embodiment, a user (e.g., the provider/physician) may mouse over or select (e.g., click) an item on the task list 3206 or an item on the appointment list 3204 to cause an item detail view 3208 to be provided. In various embodiments, the item detail view 3208 is a pop-up window, an embedded window, a dialog box, and/or the like.

Figure 33:
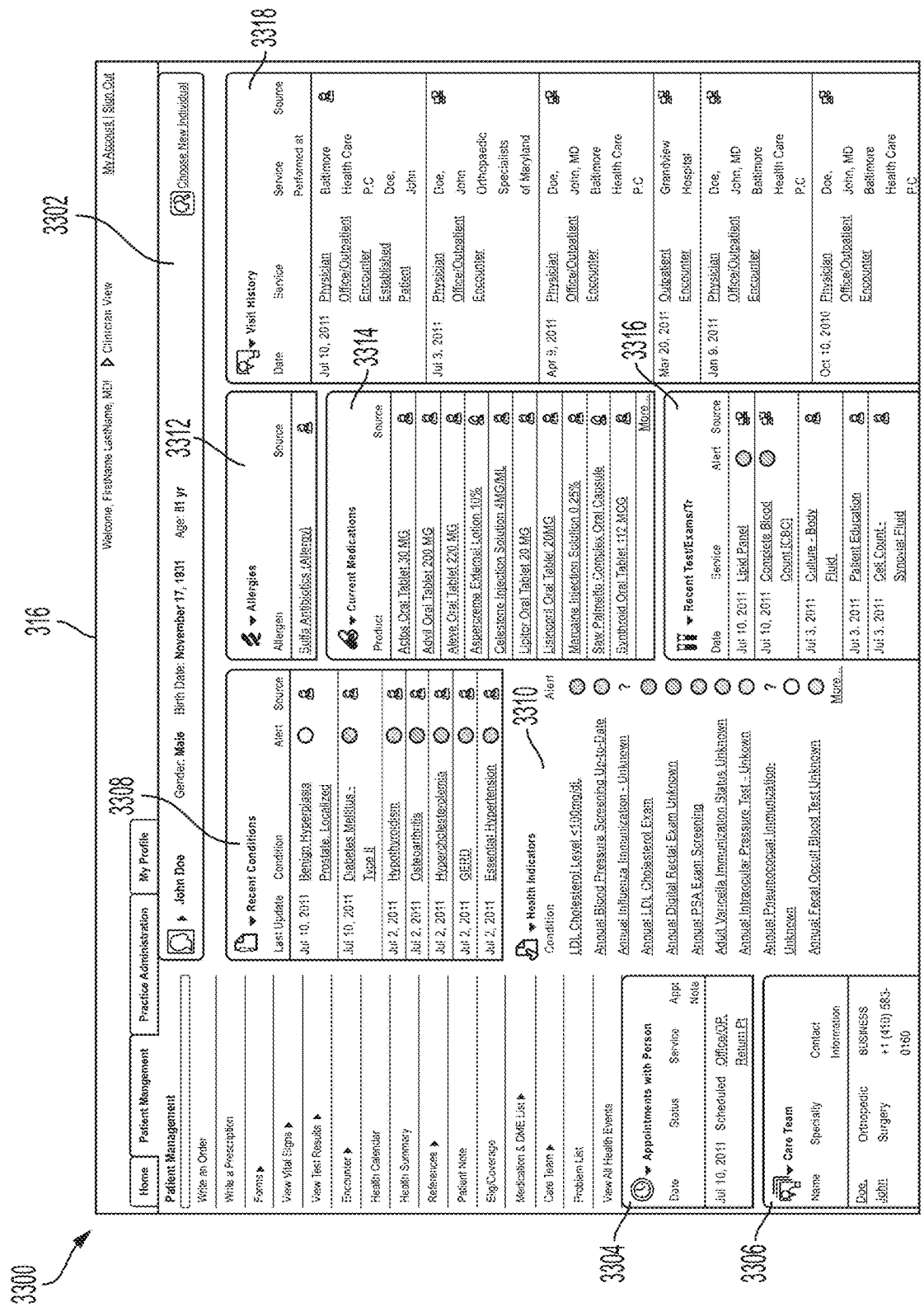

FIG. 33 provides an example individual ER view 3300 provided via a user portal 2610. For example, via the dashboard and/or landing page 3200, the provider (e.g., physician) may use the patient search portlet 3202 to search for a particular patient and view the ER for which the particular patient is the subject entity. The provider (e.g., physician) may then be provided with the individual ER view 3300 of the user portal 2610. In an example embodiment, the individual ER view 3300 comprises a patient information section 3302 that provides demographic information/data corresponding to the patient. For example, the patient information section 3302 may include the patient name; birthdate; age; sex, gender, and/or preferred pronouns; and/or the like. The individual ER view 3300 may comprise an upcoming appointment section 3304 indicating any upcoming appointments schedule for the patient to meet with the provider (e.g., physician) and/or a staff member (e.g., nurse, lab technician, and/or the like) of the provider's practice. The individual ER view 3300 may comprise a care team section 3306 that indicates other providers, care givers, case workers, and/or the like that are currently providing care to the patient. In an example, embodiment, the information/data provided in the care team section 3306 is determined based at least in part on relationships between the patient and other providers indicated by relationship SBROs stored in the data storage 211.

The individual ER view 3300 may further comprise a plurality of portlets (e.g., user portlets 2612). For example, the individual ER view 3300 may comprise a "recent conditions" portlet view 3308 which may provide a list of current and/or recent diagnoses for the patient. For example, the individual ER view 3300 may comprise a "health indicators" portlet view 3310 which may provide a list of test and/or lab work results, periodic tests and/or exams, and/or the like. For example, the individual ER view 3300 may comprise an "allergies" portlet view 3312 which may provide a list of any known allergies of the patient. For example, the individual ER view 3300 may comprise a "current medications" portlet view 3314 that may provide a list of medications currently being taken by and/or prescribed to the patient. For example, the individual ER view 3300 may comprise a "recent tests/exams/treatments" portlet view 3316 that lists the results of recent texts/exams/treatments for the patient. For example, the individual ER view 3300 may comprise a "visit history" portlet view 3318 which may provide a list summarizing the patient's recent visits with providers of the patient's healthcare team (e.g., as indicated in the care team section 3306). In various embodiments, the information/data provided in the "recent conditions" portlet view 3308, "health indicators" portlet view 3310, "allergies" portlet view 3312, "current medications" portlet view 3314, "recent tests/exams/treatments" portlet view 3316, and/or "visit history" portlet view 3318 may be accessed from the ER associated with the subject entity identifier corresponding to the patient and stored in the data storage 211. For example, the information/data provided in the "recent conditions" portlet view 3308, "health indicators" portlet view 3310, "allergies" portlet view 3312, "current medications" portlet view 3314, "recent tests/exams/treatments" portlet view 3316, and/or "visit history" portlet view 3318 may be populated through a process similar to that described with respect to FIG. 32.

In various embodiments, the user portal 2610 may further comprise a variety of other views that may provide a provider with specific test results, additional information/data about a selected medication, reports corresponding to care and/or test/exam/treatments related to the patient and generated by the provider and/or other members of the care team listed in the care team section 3306, and/or the like. In various embodiments, the user portal 2610 may provide a user interface view and/or portlet for generating a report, entering a diagnosis, and/or otherwise providing information/data to be included in the patient's ER (the ER for which the patient is the subject entity).

Figure 34A:
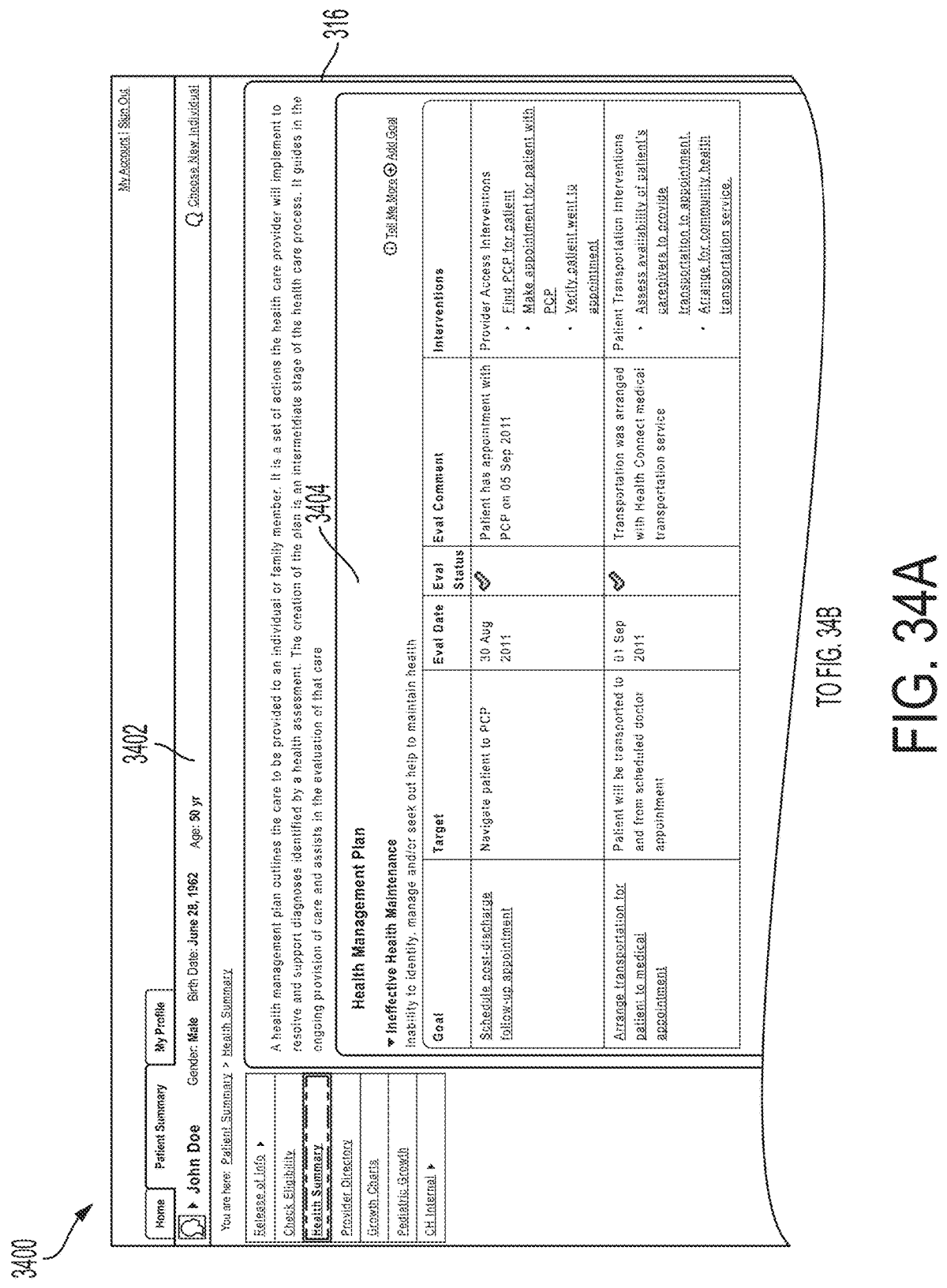
Figure 34B:
Figure 36:
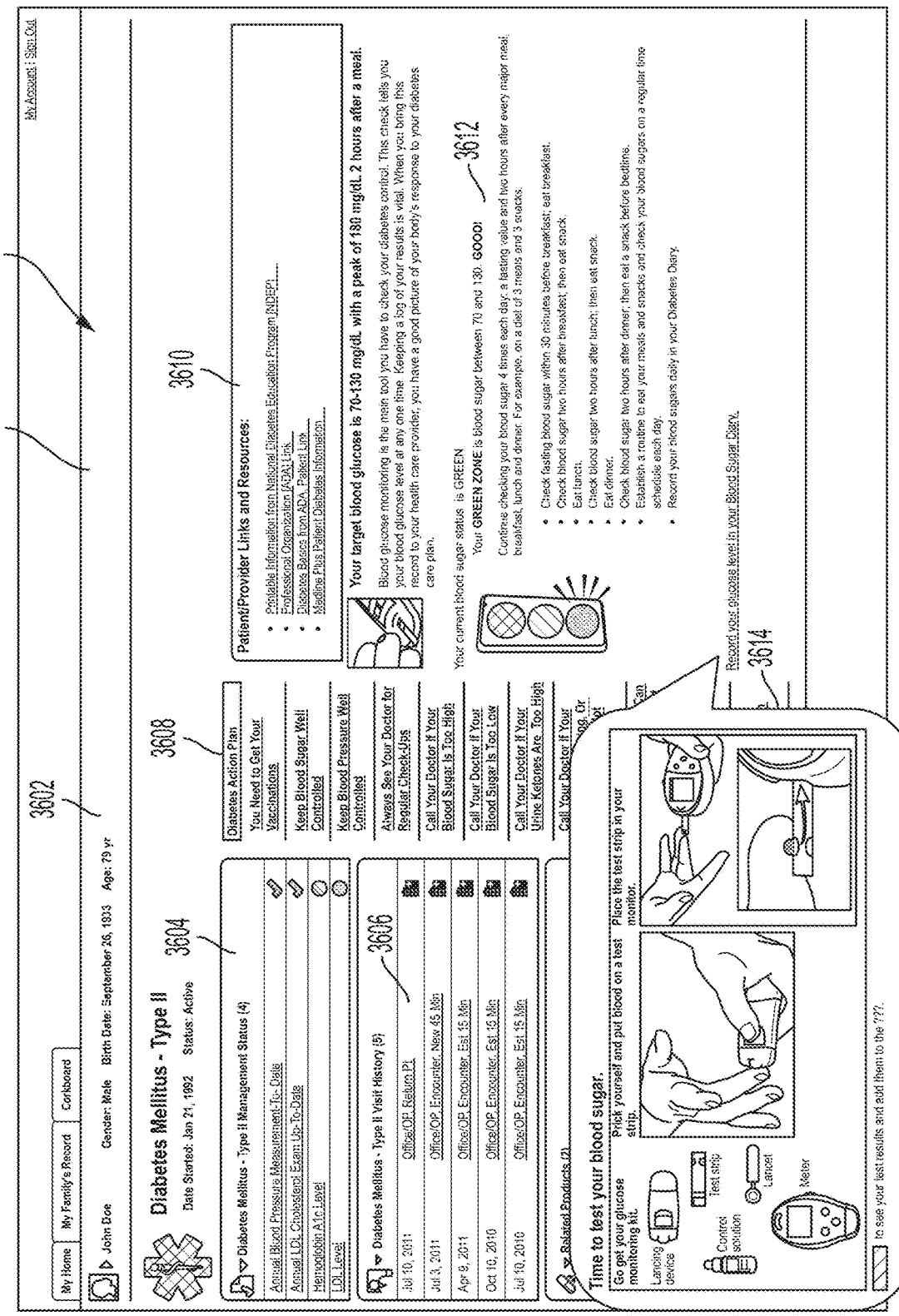

In various embodiments, user portals 2610 may be provided for a variety of providers. For example, various user portals 2610 may be provided that are tailored to the various types of providers. For example, the ER system 100 may provide a user portal 2610 tailored to physicians, nurse practitioners, lab workers, case managers, physical therapists, mental health practitioners, and/or the like. For example, FIGS. 34A and 34B provide an example "management plan" view portlet 3400 that may be provided to a case worker via a tailored user portal 2610. In an example embodiment, the "management plan" view portlet 3400 comprises a patient information section 3402 that provides demographic information/data corresponding to the patient. For example, the patient information section 3402 may include the patient name; birthdate; age; sex, gender, and/or preferred pronouns; and/or the like. The "management plan" portlet view 3400 may also include a "management plan" portlet view 3404 that includes a summary of various health goals and plans to achieve those health goals for the patient. The health goals and plans to achieve those health goals may correspond to input and/or actions to be taken by the patient and to one or more providers. Various other user portals 2610 and/or user portlets 2612 that are tailored to various providers and/or provider types may be provided in various embodiments.

Figure 35:
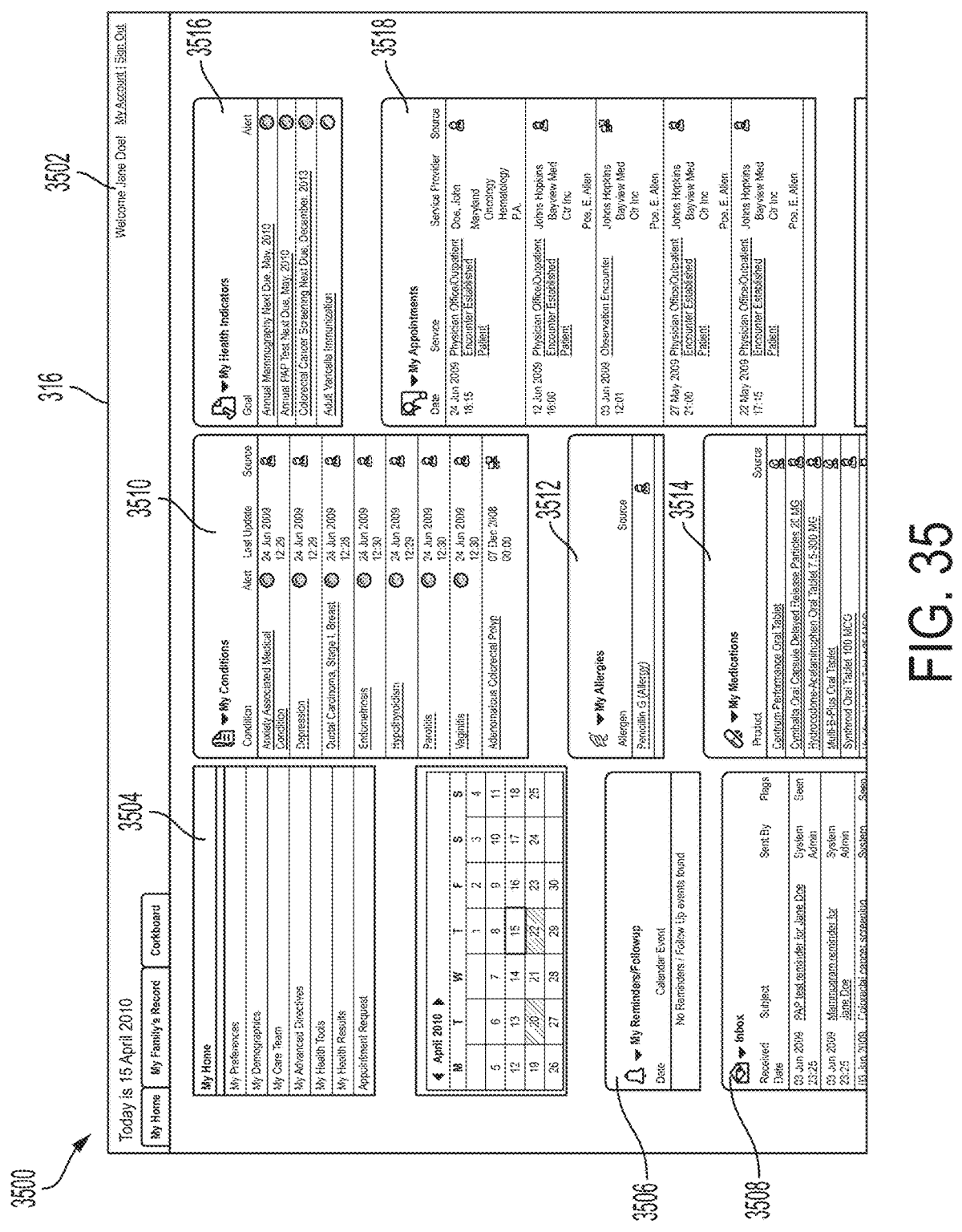

In various embodiments, the ER system 100 may provide a user portal 2610 for use by patients to view at least a portion of the information/data stored in the patient's ER and/or contribute information/data to the patient's ER. For example, FIG. 35 provides an example view of a dashboard and/or landing page 3500 for a patient provided via a user portal 2610. In various embodiments, the dashboard and/or landing page 3500 comprises a patient indicator 3502 configured to indicate the user and/or patient that the dashboard and/or landing page 3500 was populated for. For example, the dashboard and/or landing page 3500 may comprise a patient management links section 3504, via which a user/patient may select a link to submit updates for a corresponding aspect of the ER for which the patient is the subject entity. For example, the dashboard and/or landing page 3500 may comprise a "reminders" portlet view 3506 configured to provide the user/patient with reminders of any upcoming actions that should be taken on the part of the patient/user. For example, the dashboard and/or landing page 3500 may comprise an inbox section 3508 that may be used to receive and/or send secured messages to one or more providers of the patient's care team. For example, the dashboard and/or landing page 3500 may comprise a "my conditions" portlet view 3510 that lists recent and/or current diagnoses for the user/patient. For example, the dashboard and/or landing page 3500 may comprise a "my allergies" portlet view 3512 that lists the user/patient's known allergies. For example, the dashboard and/or landing page 3500 may comprise a "my medications" portlet view 3514 that lists medications the user/patient is taking and/or medications prescribed to the user/patient. For example, the dashboard and/or landing page 3500 may comprise a "my health" indicators portlet view 3516 which may provide a list of test and/or lab work results, periodic tests and/or exams, and/or the like corresponding to the user/patient. For example, the dashboard and/or landing page 3500 may comprise an upcoming appointment section 3518 that shows upcoming scheduled appointments for the user/patient. In various embodiments, the information/data provided in the "reminders" portlet view 3506, "my conditions" portlet view 3510, "my allergies" portlet view 3512, "my medications" portlet view 3514, "my health indicators" portlet view 3516, and/or upcoming appointments section 3518 may be accessed from the ER associated with the subject entity identifier corresponding to the patient and stored in the data storage 211. For example, the information/data provided in the "reminders" portlet view 3506, "my conditions" portlet view 3510, "my allergies" portlet view 3512, "my medications" portlet view 3514, "my health indicators" portlet view 3516, and/or upcoming appointments section 3518 may be populated through a process similar to that described with respect to FIG. 29.

In various embodiments, a user may select an element from the dashboard and/or landing page 3500 to view in depth information regarding that element. For example, a user/patient may select (e.g., click on) an element from the "my conditions" portlet view 3510 corresponding to type 2 diabetes. Responsive to the user/patient's selection, the user portal 2610 may cause a "diabetes" portlet view 3600 to be provided (e.g., via a user interface, such as display 316, of a user computing entity 30 being operated by the user).

In an example embodiment, the "diabetes" portlet view 3600 comprises a patient information section 3602 that provides demographic information/data corresponding to the patient. For example, the patient information section 3602 may include the patient name; birthdate; age; sex, gender, and/or preferred pronouns; and/or the like. In an example embodiment, the "diabetes" portlet view 3600 comprises a management overview 3604 which lists various actions and/or health conditions to monitors as part of managing the user/patient's diabetes and an indication of whether those actions are complete or need to be completed and/or a current status of the monitored health conditions. In an example embodiment, the "diabetes" portlet view 3600 comprises a visit history section 3606 indicating recent visits to various providers related to the user/patient's diabetes and/or management thereof. In an example embodiment, the "diabetes" portlet view 3600 comprises an action plan section 3608 that indicates various actions and/or steps to be taken as part of managing the user/patient's diabetes. The action plan section 3608 may comprise links to detailed information/data corresponding to one or more of the various actions and/or steps. In an example embodiment, the "diabetes" portlet view 3600 comprises a resources section 3610 that includes one or more links to various resources that the user/patient may view regarding the user/patient's health condition of diabetes, management thereof, things to expect, disease progression, slowing disease progression, and/or the like. In an example embodiment, the "diabetes" portlet view 3600 comprises a current status section 3612 that indicates the current status of the user/patient's blood sugar and/or other indicators corresponding to how well the user/patient's health condition is being managed. In an example embodiment, a user may mouse over or select (e.g., click) an action listed on the "diabetes" portlet view 3600 to view detailed instructions 3614 for completing the action. For example, the user/patient may mouse over or select (e.g., click) the "record your glucose level in your blood sugar diary" action and be provided with detailed instructions 3614 regarding how to measure the user/patient's glucose level and record the result. In various embodiments, the detailed instructions 3614 are provided in a pop-up window, an embedded window, a dialog box, and/or the like. The user/patient may select one or more other elements displayed on the "diabetes" portlet view 3600 to access further information/data regarding the selected element.

In various embodiments, the information/data provided in the patient information section 3602, management overview 3604, visit history section 3606, and/or current status section 3612 may be accessed from the ER associated with the subject entity identifier corresponding to the patient and stored in the data storage 211. For example, the information/data provided in the patient information section 3602, management overview 3604, visit history section 3606, and/or current status section 3612 may be populated through a process similar to that described with respect to FIG. 29. In various embodiments, the information/data provided in the action plan section 3608, resources section 3610, and/or detailed instructions 3614 are provided based at least in part on information/data stored in a data store in association with one or more ontology concept identifiers and are selected to be provided via the "diabetes" portlet view 3600 based at least in part on those one or more ontology concept identifiers.

Various other user portals 2610 and/or user portlets 2612 may be provided in various embodiments, as appropriate for the application, which provide various users with appropriate information/data for the user's role in the ER system 100 and that takes advantage of the domain ontology of the ER system 100.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for identifying an electronic record in a database corresponding to a subject entity, the method comprising:
   automatically receiving, by a computing entity, a message via one or more communications interfaces, wherein the message (a) comprises data corresponding to the subject entity, and (b) is received from a source system;
   identifying, by the computing entity, a first attribute and a second attribute for the subject entity from the message;
   generating, by the computing entity, an application programming interface (API) request to an identity matching service, wherein (a) the API request comprises the first attribute and the second attribute, and (b) responsive to the API request, the identity matching service:
accesses a rule set from a plurality of rule sets based at least in part on the source system,
generates a first query based at least in part on the rule set and the first attribute,
queries a database, using the first query, for an electronic record stored in the database corresponding to the first attribute,
responsive to an electronic record not being identified based at least in part on the first attribute, generates a second query based at least in part on the rule set and the second attribute,
queries the database, using the second query, for an electronic record stored in the database corresponding to the second attribute, wherein the electronic record comprises an entity identifier corresponding to the subject entity, and
responsive to an electronic record being identified based at least in part on the second attribute, generates an API response comprising the entity identifier corresponding to the subject entity;
receiving, by the computing entity, the API response comprising the entity identifier corresponding to the subject entity;
automatically generating, by the computing entity, a data artifact packet data object, wherein (a) the data artifact packet data object comprises the entity identifier, (b) the data artifact packet data object is generated based at least in part on an observable packet data object, and (c) the observable packet data object is an XML, document generated based at least in part on parsing a message received from a source system;
providing, by the computing entity, the data artifact packet data object corresponding to the first entity identifier to an ingestion processing module for processing;
automatically generating, by the computing entity, a container tree data structure comprising a data artifact packet container node as a root node based at least in part on the data artifact packet data object, wherein (a) the container tree data structure is generated based at least in part on the data artifact packet data object, (b) the container tree data structure comprises a plurality of container nodes that are descendants of the root node based at least in part on the data artifact packet data object, (c) each container node of the plurality of container nodes corresponds to one pair of the plurality of observable-value pairs, and (d) automatically generating the container tree data structure comprises:
 (i) determining a type of container node for an observable-value pair of the plurality of observable-value pairs based at least in part on the graph-based domain ontology,
 (ii) determining whether a container node having the determined type is present in the container tree data structure, and
 (iii) responsive to determining that a container node having the determined type is not present in the container tree data structure:
  (1) constructing the container node having the determined type,
  (2) inserting the container node into an appropriate position in the container tree data structure, wherein the appropriate position in the container tree data structure is determined based at least in part on the graph-based domain ontology, and
  (3) storing the observable-value pair in the container node;
automatically identifying, by the computing entity, an entity associated with the container tree data structure based at least in part on the entity identifier;
automatically traversing the container tree data structure in a depth-first traversal to generate a data transfer object for each of container node of the plurality of container nodes, wherein (a) each data transfer object corresponds to one pair of the plurality of observable-value pairs, and (b) the depth-first traversal of the container tree data structure comprises comparing a value of an observable-value pair of the plurality of observable-value pairs to at least one requirement corresponding to an observable of the observable-value pair to determine whether the value satisfies the at least one requirement; and
automatically providing, by the computing entity, at least one of the plurality of data transfer objects for use in performing a database update function.

2. The method of claim 1 further comprising:
automatically storing, by the computing entity, the data artifact packet data object in a database, wherein the data artifact packet data object is identifiable by the corresponding entity identifier;
automatically detecting, by the computing entity, a user interaction event corresponding to a first entity identifier; and
responsive to detecting the user interaction event corresponding to the first entity identifier, automatically retrieving, by the computing entity, the data artifact packet data object corresponding to the first entity identifier.

3. The method of claim 1, wherein at least one container node comprises at least one of a source vocabulary description, source vocabulary code, or text description of an observable, and during the depth-first traversal of the container tree data structure, an aggregator method resolves the at least one of the source vocabulary description, the source vocabulary code, or the text description of the observable.

4. The method of claim 1, wherein the electronic record is identified based at least in part on the second attribute when the electronic record comprises a record attribute that (a) corresponds to the second attribute and (b) has a same value as the second attribute.

5. A system comprising one or more processors, one or more memory storage areas comprising program code, the one or more memory storage areas and the program code configured to, with the one or more processors, cause the system to at least:
automatically receive a message via one or more communications interfaces, wherein the message (a) comprises data corresponding to the subject entity, and (b) is received from a source system;
identify a first attribute and a second attribute for the subject entity from the message;
generate an application programming interface (API) request to an identity matching service, wherein (a) the API request comprises the first attribute and the second attribute, and (b) responsive to the API request, the identity matching service:
accesses a rule set from a plurality of rule sets based at least in part on the source system,
generates a first query based at least in part on the rule set and the first attribute, queries a database, using the first query, for an electronic record stored in the database corresponding to the first attribute, responsive to an electronic record not being identified based at least in part on the first attribute, generates a second query based at least in part on the rule set and the second attribute, queries the database, using the second query, for an electronic record stored in the database corresponding to the second attribute, wherein the electronic record comprises an entity identifier corresponding to the subject entity, and responsive to an electronic record being identified based at least in part on the second attribute, generates an API response comprising the entity identifier corresponding to the subject entity;

receive the API response comprising the entity identifier corresponding to the subject entity; and automatically generate a data artifact packet data object, wherein (a) the data artifact packet data object comprises the entity identifier, (b) the data artifact packet data object is generated based at least in part on an observable packet data object, and (c) the observable packet data object is an XML document generated based at least in part on parsing a message received from a source system;

provide the data artifact packet data object corresponding to the first entity identifier to an ingestion processing module for processing;

automatically generate a container tree data structure comprising a data artifact packet container node as a root node based at least in part on the data artifact packet data object, wherein (a) the container tree data structure is generated based at least in part on the data artifact packet data object, (b) the container tree data structure comprises a plurality of container nodes that are descendants of the root node based at least in part on the data artifact packet data object, (c) each container node of the plurality of container nodes corresponds to one pair of the plurality of observable-value pairs, and (d) automatically generating the container tree data structure comprises:

(i) determining a type of container node for an observable-value pair of the plurality of observable-value pairs based at least in part on the graph-based domain ontology, (ii) determining whether a container node having the determined type is present in the container tree data structure, and (iii) responsive to determining that a container node having the determined type is not present in the container tree data structure:

(1) constructing the container node having the determined type, (2) inserting the container node into an appropriate position in the container tree data structure, wherein the appropriate position in the container tree data structure is determined based at least in part on the graph-based domain ontology, and (3) storing the observable-value pair in the container node;

automatically identifying, by the computing entity, an entity associated with the container tree data structure based at least in part on the entity identifier;

automatically traverse the container tree data structure in a depth-first traversal to generate a data transfer object for each of container node of the plurality of container nodes, wherein (a) each data transfer object corresponds to one pair of the plurality of observable-value pairs, and (b) the depth-first traversal of the container tree data structure comprises comparing a value of an observable-value pair of the plurality of observable-value pairs to at least one requirement corresponding to an observable of the observable-value pair to determine whether the value satisfies the at least one requirement; and automatically provide at least one of the plurality of data transfer objects for use in performing a database update function.

6. The system of claim 5, wherein the one or more memory storage areas and the program code configured to, with the one or more processors, further cause the system to:

automatically store the data artifact packet data object in a database, wherein the data artifact packet data object is identifiable by the corresponding entity identifier; and automatically detect a user interaction event corresponding to a first entity identifier; and responsive to detecting the user interaction event corresponding to the first entity identifier, automatically retrieve the data artifact packet data object corresponding to the first entity identifier.

7. The system of claim 6, wherein at least one container node comprises at least one of a source vocabulary description, source vocabulary code, or text description of an observable, and during the depth-first traversal of the container tree data structure, an aggregator method resolves the at least one of the source vocabulary description, the source vocabulary code, or the text description of the observable.

8. The system of claim 5, wherein the electronic record is identified based at least in part on the second attribute when the electronic record comprises a record attribute that (a) corresponds to the second attribute and (b) has a same value as the second attribute.

9. A computer program product comprising at least one non-transitory computer-readable storage medium having computer-readable program code stored therein, the computer-readable program code configured to at least:

automatically receive a message via one or more communications interfaces, wherein the message (a) comprises data corresponding to the subject entity, and (b) is received from a source system;

identify a first attribute and a second attribute for the subject entity from the message;

generate an application programming interface (API) request to an identity matching service, wherein (a) the API request comprises the first attribute and the second attribute, and (b) responsive to the API request, the identity matching service:

accesses a rule set from a plurality of rule sets based at least in part on the source system, generates a first query based at least in part on the rule set and the first attribute, queries a database, using the first query, for an electronic record stored in the database corresponding to the first attribute, responsive to an electronic record not being identified based at least in part on the first attribute, generates a second query based at least in part on the rule set and the second attribute, queries the database, using the second query, for an electronic record stored in the database corresponding to the second attribute, wherein the electronic record comprises an entity identifier corresponding to the subject entity, and responsive to an electronic record being identified based at least in part on the second attribute, generates an API response comprising the entity identifier corresponding to the subject entity;

receive the API response comprising the entity identifier corresponding to the subject entity; and automatically generate a data artifact packet data object, wherein (a) the data artifact packet data object comprises the entity identifier, (b) the data artifact packet data object is generated based at least in part on an observable packet data object, and (c) the observable packet data object is an XML document generated based at least in part on parsing a message received from a source system;

provide the data artifact packet data object corresponding to the first entity identifier to an ingestion processing module for processing;

automatically generate a container tree data structure comprising a data artifact packet container node as a root node based at least in part on the data artifact packet data object, wherein (a) the container tree data structure is generated based at least in part on the data artifact packet data object, (b) the container tree data structure comprises a plurality of container nodes that are descendants of the root node based at least in part on the data artifact packet data object, (c) each container node of the plurality of container nodes corresponds to one pair of the plurality of observable-value pairs, and (d) automatically generating the container tree data structure comprises:
  (i) determining a type of container node for an observable-value pair of the plurality of observable-value pairs based at least in part on the graph-based domain ontology,
  (ii) determining whether a container node having the determined type is present in the container tree data structure, and
  (iii) responsive to determining that a container node having the determined type is not present in the container tree data structure:
    (1) constructing the container node having the determined type,
    (2) inserting the container node into an appropriate position in the container tree data structure, wherein the appropriate position in the container tree data structure is determined based at least in part on the graph-based domain ontology, and
    (3) storing the observable-value pair in the container node;

automatically identifying, by the computing entity, an entity associated with the container tree data structure based at least in part on the entity identifier;

automatically traverse the container tree data structure in a depth-first traversal to generate a data transfer object for each of container node of the plurality of container nodes, wherein (a) each data transfer object corresponds to one pair of the plurality of observable-value pairs, and (b) the depth-first traversal of the container tree data structure comprises comparing a value of an observable-value pair of the plurality of observable-value pairs to at least one requirement corresponding to an observable of the observable-value pair to determine whether the value satisfies the at least one requirement; and automatically provide at least one of the plurality of data transfer objects for use in performing a database update function.

10. The computer program product of claim 9, wherein the computer-readable program code is further configured to:

automatically store the data artifact packet data object in a database, wherein the data artifact packet data object is identifiable by the corresponding entity identifier; and automatically detect a user interaction event corresponding to a first entity identifier; and responsive to detecting the user interaction event corresponding to the first entity identifier, automatically retrieve the data artifact packet data object corresponding to the first entity identifier.

11. The computer program product of claim 9, wherein at least one container node comprises at least one of a source vocabulary description, source vocabulary code, or text description of an observable, and during the depth-first traversal of the container tree data structure, an aggregator method resolves the at least one of the source vocabulary description, the source vocabulary code, or the text description of the observable.

12. The computer program product of claim 9, wherein the electronic record is identified based at least in part on the second attribute when the electronic record comprises a record attribute that (a) corresponds to the second attribute and (b) has a same value as the second attribute.

* * * * *

UNITED STATES PATENT AND TRADEMARK OFFICE
CERTIFICATE OF CORRECTION

PATENT NO. : 11,586,613 B2
APPLICATION NO. : 16/830657
DATED : February 21, 2023
INVENTOR(S) : Ralph A. Korpman et al.

It is certified that error appears in the above-identified patent and that said Letters Patent is hereby corrected as shown below:

In the Claims

In Column 127, Claim 1, Line 31, delete "XML," and insert -- XML --, therefor.

Signed and Sealed this
Twenty-fifth Day of April, 2023

Katherine Kelly Vidal
*Director of the United States Patent and Trademark Office*